US008191040B2

(12) United States Patent
Hejlsberg et al.

(10) Patent No.: US 8,191,040 B2
(45) Date of Patent: *May 29, 2012

(54) APPLICATION PROGRAM INTERFACE FOR NETWORK SOFTWARE PLATFORM

(75) Inventors: Anders Hejlsberg, Seattle, WA (US); Daniel Dedu-Constantin, Redmond, WA (US); Erik B. Christensen, Seattle, WA (US); Keith W. Ballinger, North Bend, WA (US); Mark W. Fussell, Sammamish, WA (US); Neetu Rajpal, Redmond, WA (US); Nithyalakshmi Sampathkumar, Bellevue, WA (US); Omri Gazitt, Redmond, WA (US); Stefan H. Pharies, Seattle, WA (US); William A. Adams, Bellevue, WA (US); Yan Leshinsky, Bellevue, WA (US); Chia-Hsun Chen, Redmond, WA (US); Christopher J. Lovett, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 1227 days.

This patent is subject to a terminal disclaimer.

(21) Appl. No.: 11/622,836

(22) Filed: Jan. 12, 2007
(Under 37 CFR 1.47)

(65) Prior Publication Data
US 2008/0216052 A1 Sep. 4, 2008

Related U.S. Application Data

(63) Continuation of application No. 09/902,810, filed on Jul. 10, 2001, now Pat. No. 7,165,239.

(51) Int. Cl.
*G06F 9/44* (2006.01)

(52) U.S. Cl. ........ 717/114; 717/116; 717/117; 717/118; 717/140

(58) Field of Classification Search .......... 717/114–118, 717/140–161
See application file for complete search history.

(56) References Cited

U.S. PATENT DOCUMENTS

| | | | |
|---|---|---|---|
| 5,218,699 A | 6/1993 | Brandle et al. | |
| 5,430,876 A | 7/1995 | Schreiber et al. | |
| 5,689,700 A | 11/1997 | Miller et al. | |
| 5,748,962 A | 5/1998 | Brechtel et al. | |
| 5,761,494 A | 6/1998 | Smedley et al. | |
| 5,822,580 A | 10/1998 | Leung | |
| 5,903,753 A | 5/1999 | Bramnick et al. | |
| 5,937,406 A | 8/1999 | Balabine et al. | |
| 5,943,424 A | 8/1999 | Berger et al. | |
| 5,956,509 A | 9/1999 | Kevner | |
| 5,987,517 A | 11/1999 | Firth et al. | |
| 6,061,743 A | 5/2000 | Thatcher | |
| 6,175,878 B1 | 1/2001 | Seaman et al. | |
| 6,209,124 B1* | 3/2001 | Vermeire et al. | 717/114 |
| 6,256,678 B1 | 7/2001 | Traughber et al. | |
| 6,275,871 B1 | 8/2001 | Reinfelder et al. | |
| 6,282,581 B1 | 8/2001 | Moore et al. | |
| 6,298,354 B1 | 10/2001 | Saulpaugh et al. | |
| 6,349,343 B1* | 2/2002 | Foody et al. | 719/316 |

(Continued)

OTHER PUBLICATIONS

Clark et al., XML Path Language (XPath) Version 1.0; aquired from http://www.w3.org/TR/xpath; 1999; pp. 1-42.*

(Continued)

*Primary Examiner* — Wei Zhen
*Assistant Examiner* — Satish Rampuria

(57) ABSTRACT

An application program interface (API) provides a set of functions that make available support for processing XML documents for application developers who build Web applications on Microsoft Corporation's .NET™ platform.

19 Claims, 4 Drawing Sheets

U.S. PATENT DOCUMENTS

| | | |
|---|---|---|
| 6,353,830 B1 | 3/2002 | Yee et al. |
| 6,360,230 B1 | 3/2002 | Chan et al. |
| 6,360,266 B1 | 3/2002 | Pettus |
| 6,381,632 B1 | 4/2002 | Lowell |
| 6,418,448 B1* | 7/2002 | Sarkar .................................. 1/1 |
| 6,430,593 B1 | 8/2002 | Lindsley |
| 6,442,548 B1 | 8/2002 | Balabine et al. |
| 6,446,253 B1 | 9/2002 | Mellmer |
| 6,446,256 B1 | 9/2002 | Hyman et al. |
| 6,473,794 B1 | 10/2002 | Guheen et al. |
| 6,480,865 B1 | 11/2002 | Lee et al. |
| 6,487,578 B2 | 11/2002 | Ranganathan |
| 6,507,856 B1 | 1/2003 | Chen et al. |
| 6,519,571 B1 | 2/2003 | Guheen et al. |
| 6,536,037 B1 | 3/2003 | Guheen et al. |
| 6,598,093 B1 | 7/2003 | Schmidt et al. |
| 6,615,166 B1 | 9/2003 | Guheen |
| 6,643,652 B2 | 11/2003 | Helgeson et al. |
| 6,721,713 B1 | 4/2004 | Guheen et al. |
| 6,792,605 B1 | 9/2004 | Roberts et al. |
| 6,968,503 B1 | 11/2005 | Chang et al. |
| 7,426,734 B2 | 9/2008 | Debique et al. |
| 2002/0073236 A1 | 6/2002 | Helgeson |
| 2002/0092004 A1 | 7/2002 | Lee et al. |
| 2002/0099687 A1 | 7/2002 | Krishnaprasad et al. |
| 2002/0112078 A1 | 8/2002 | Yach |
| 2002/0152244 A1 | 10/2002 | Dean et al. |
| 2002/0169679 A1* | 11/2002 | Neumayer ....................... 705/26 |
| 2002/0184401 A1 | 12/2002 | Kadel, Jr. et al. |
| 2003/0028685 A1 | 2/2003 | Smith et al. |
| 2003/0051236 A1 | 3/2003 | Pace et al. |
| 2003/0074206 A1 | 4/2003 | Hoffman et al. |
| 2003/0084120 A1 | 5/2003 | Egli |
| 2003/0120665 A1* | 6/2003 | Fox et al. ....................... 707/100 |
| 2003/0149934 A1 | 8/2003 | Worden |
| 2003/0167277 A1 | 9/2003 | Hejlsberg et al. |
| 2003/0167355 A1 | 9/2003 | Smith et al. |
| 2003/0167356 A1 | 9/2003 | Smith et al. |
| 2003/0172196 A1 | 9/2003 | Hejlsberg et al. |
| 2003/0177282 A1 | 9/2003 | Hjlsberg et al. |
| 2004/0083463 A1 | 4/2004 | Hawley |
| 2004/0117759 A1 | 6/2004 | Rippert, Jr. |
| 2004/0205694 A1 | 10/2004 | James et al. |
| 2006/0294500 A1 | 12/2006 | Chiang |

OTHER PUBLICATIONS

"Java 2 Platform Enterprise Edition Specification v1.2", *Sun Microsystems, Final Release* Nov. 24, 2003 Bill Shannon, (Dec. 17, 1999),pp. 2-8 thru 2-11 and 6-2 thru 6-6.
"Microsoft, Delegates in Visual J++ 6.0", (Mar. 11, 1998),pp. 1-6.
"The Java(tm) 2 Enterprise Edition Developers Guide", *v 1.2.1, Sun Microsystems*, Palo Alto, CA, Ch. 1 and Ch. 9, (May 2000),pp. 1-10 and 152-155.
"W3C, XML Path Language (XPath Version 1.0", retrieved from <<http://www.w3.org/TR/1999/REC-xpath-19991116.htmll>> on Jan. 10, 2006, (Nov. 1999),32 pages.
"XML-Data, W3C Note", retrieved from <<http://www.w3.org/TR/1998/NOTE-XML-data-0105/>> on Dec. 30, 2010, (Jan. 5, 1998),25 pages.
Albahari, Ben "A Comparative Overview of C#", *Genamics*, available at <<http://genamics.com/developer/csharp_comparative.htm>>, (Jul. 31, 2000),15 pages.
Arulanthu, et al., "The Design and Performance of a Scalable ORB Architecture for CORBA Asynchornous Messaging", *Middleware 2000*, Springer-Verlag, (2000),pp. 208-228.
Carr, H. et al., "Compiling Distributed C++", *Department of Computer Science, University of Utah, IEEE*, (1993),pp. 496-503.
Cheng, et al., "XML and DB2", *IEEE Data Engineering 2000. Proceedings 16th International Conference.*, (Feb. 29-Mar. 3, 2000),pp. 569-573.
Cohn, et al., "Web Programming with Visual J++", Sams.net, chapters 5-6, 17-19 retrieved from <<http://docs.rinet.ru/WebJPP/contents.htm>> on Mar. 23, 2006,(1997),120 pages.
Deitel & Deitel, "Java(TM) How to Program Book", *Prentice Hall Third Edition*, (1999),pp. 7-29, 214-226, 698-699, 714-717, 817-838, 876-878, 936-977, 980-998, 1002-1046.
Ensel, et al., "Managing Application Service Dependencies with XML and the Resource Description Framework", *IEEE* (May 2001),pp. 661-674.
Farley, "Microsoft .Net vs. J2EE: How Do They Stack Up?", retrieved from <<http://www.oreillynet.com/1pt/a/1799>> on Apr. 27, 2007, O-Reilly Media, Inc.,(2007),6 pages.
Flanagan, "Java Foundation Classes in a Nutshell", *O'Reilly 09-1000*, Ch. 1-2, (Sep. 1999),24 pages.
Flanagan, "Java in a Nutshell", O'Reilly & Associates, Inc., (Feb. 1996),pp. 193-200, 237-253, 267-270, 339-342.
Gould, "Develop n-tier Applications Using J2EE", *Java World* Dec. 2000, pp. 1-10.
Hanson, "Differences Between J2SE and J2EE", SearchTechTarget.com, (Sep. 8, 2003),1 page.
Jingyu, et al., "Object-Oriented Representation for XML Data", *IEEE*, (Apr. 2001),pp. 40-49.
Meyer, "Microsoft: Net is Coming, Microsoft Web Services Platform", *IEEE Computer* vol. 34, Iss. 8, (Aug. 2001),pp. 92-97.
O-Reilly, "The Network Really is the Computer", *The O'Reilly Network*, retrieved from <<http://www.oreillynet.com>> on Apr. 7, 2003, (Jun. 8, 2000),pp. 1-11.
Perry, "Sams Teach Yourself Visual Basic 6 in 21 Days", *Sams*, (1998),23 pages.
Sneed, "Wrapping Legacy COBOL Programs behind an XML-Interface", *IEEE*, (Oct. 2001),pp. 189-197.
Wille, "Presenting C#", *Sams Publishing*, (Jul. 2000),22 pages.
Williams, "Teach Yourself Visual C++ 6 in 24 hours", *Sams Publishing*, (Aug. 1998),54 pages.
"Java 2 Platform, Standard Edition", retrieved on Apr. 4, 2003 at <<http://java.sun.com/products/jdk/1.2/docs/api/overview-summary.hetml>>, Sun Microsystems, v.1.2.2.,(1993-1999),pp. 1-4.
Flynn, Jim et al., "Visual J++ Java Programming", *Master Java While Turbo-Charging your Productivity with Visual J++*, New Riders Publishing, (1996), pp. 133-143.
"XSL Transformations (XSLT) Version 1.0", http://www.w3.org/TR/xslt, (Nov. 16, 1999), 90 pages.

* cited by examiner

APPLICATION PROGRAM INTERFACE FOR NETWORK SOFTWARE PLATFORM

RELATED APPLICATIONS

This patent application is a continuation of U.S. patent application Ser. No. 09/902,810, titled "Application Program Interface for Network Software Platform", filed on Jul. 10, 2001, commonly owned hereby, and incorporated by reference.

TECHNICAL FIELD

This invention relates to network software, such as Web applications, and to computer software development of such network software. More particularly, this invention relates to an application program interface (API) that facilitates use of a network software platform by application programs and computer hardware.

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as Microsoft Windows®, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation is developing a network software platform known as the ".NET" platform (read as "Dot Net"). The platform allows developers to create Web services that will execute over the Internet. Such a dynamic shift requires a new ground-up design of an entirely new API.

In response to this challenge, the inventors developed a unique set of API functions for Microsoft's .NET™ platform.

SUMMARY

An application program interface (API) provides a set of functions that make available support for processing XML documents for application developers who build Web applications on a network platform, such as Microsoft Corporation's .NET™ platform.

BRIEF DESCRIPTION OF THE DRAWINGS

The same numbers are used throughout the drawings to reference like features.

BRIEF DESCRIPTION OF ACCOMPANYING COMPACT DISC

Accompanying this specification is a compact disc that stores a compiled HTML help file identifying the API (application program interface) for Microsoft's .NET™ network platform. The file is named "cpref.chm" and was created on Jun. 8, 2001. It is 30.81 Mbytes in size. The file can be executed on a Windows®-based computing device (e.g., IBM-PC, or equivalent) that executes a Windows®-brand operating system (e.g., Windows® NT, Windows® 98, Windows® 2000, etc.). The compiled HTML help file stored on the compact disk is hereby incorporated by reference.

Additionally, the APIs contained in the compiled HTML help file are also provided in approximately 100 separate text files named "NamespaceName.txt". The text files comply with the ASCII format.

The compact disc itself is a CD-ROM, and conforms to the ISO 9660 standard.

DETAILED DESCRIPTION

This disclosure addresses an application program interface (API) for a network platform upon which developers can build Web applications and services. More particularly, an exemplary API is described for the .NET™ platform created by Microsoft Corporation. The .NET™ platform is a software platform for Web services and Web applications implemented in the distributed computing environment. It represents the next generation of Internet computing, using open communication standards to communicate among loosely coupled Web services that are collaborating to perform a particular task.

In the described implementation, the .NET™ platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the .NET™ platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

Exemplary Network Environment

Figure 1:
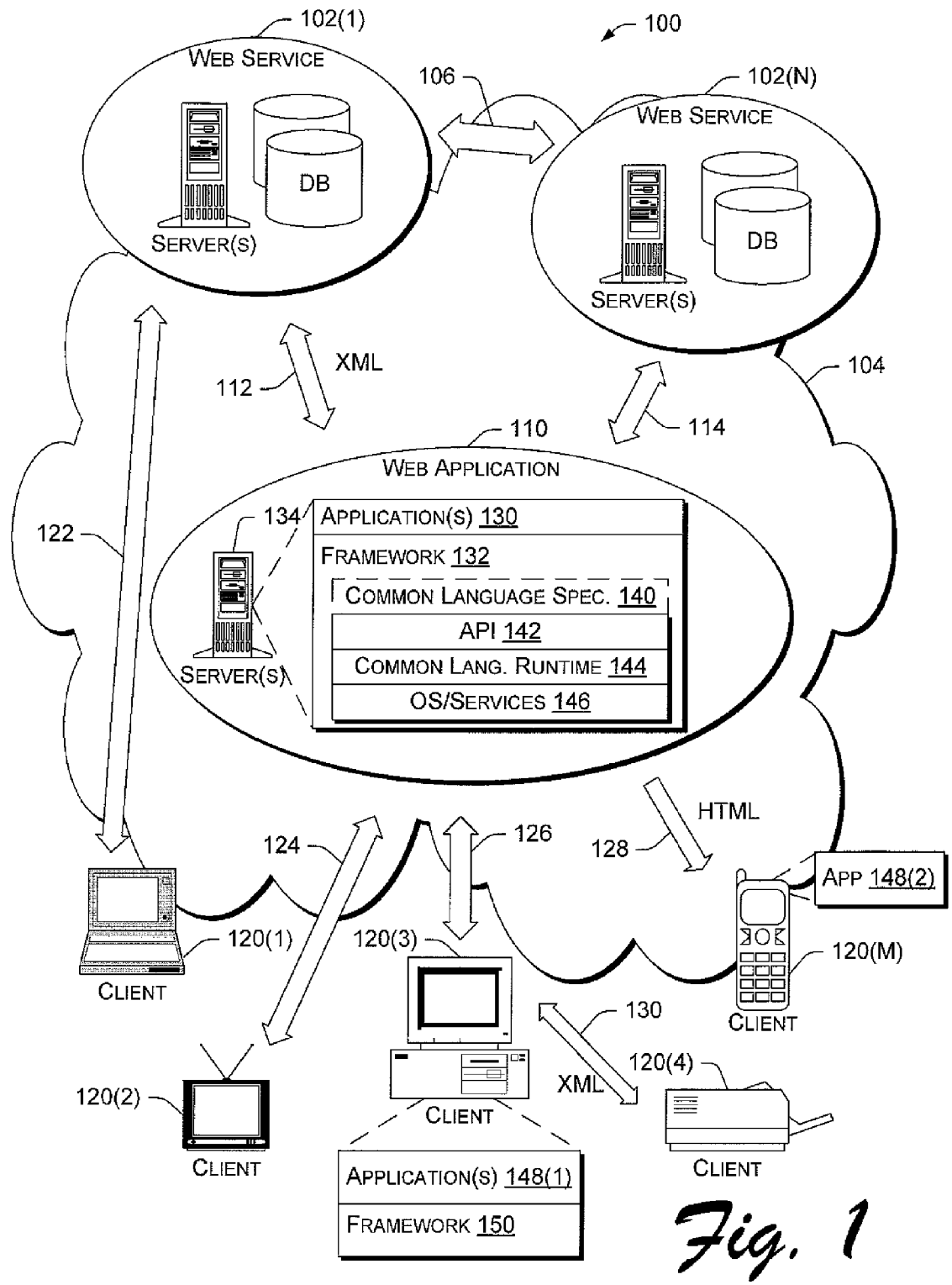
FIG. 1 illustrates a network architecture in which clients access Web services over the Internet using conventional protocols.

FIG. 1 shows a network environment 100 in which a network platform, such as the .NET™ platform, may be implemented. The network environment 100 includes representative Web services 102(1), ..., 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), ..., 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers. By adhering to the CLS, libraries written in one language can be directly accessible to code modules written in other languages to achieve seamless integration between code modules written in one language and code modules written in another language.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
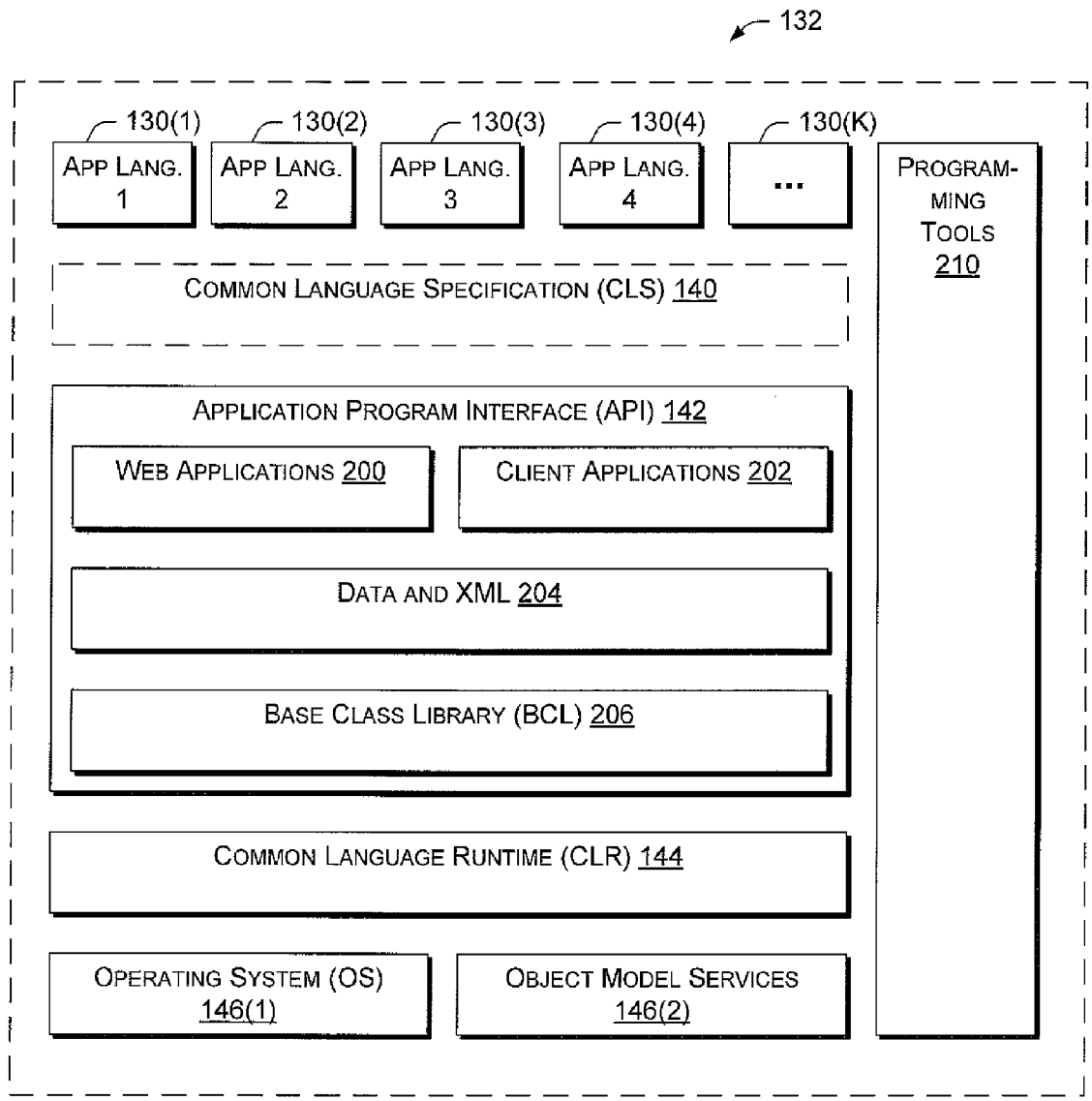
FIG. 2 is a block diagram of a software architecture for Microsoft's .NET™ platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allows seamless multi-language development, with cross language inheritance, and provides a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598, 105) and "Unified Data Type System and Method" filed Jul. 10, 2000 (Ser. No. 09/613,289), which are incorporated by reference.

The framework 132 encapsulates the operating system 146 (1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized into four root namespaces: a first namespace 200 for Web applications, a second namespace 202 for client applications, a third namespace 204 for data and XML, and a fourth namespace 206 for base class libraries (BCLs). Each group can then be assigned a name. For instance, types in the Web applications namespace 200 are assigned the name "Web", and types in the data and XML namespace 204 can be assigned names "Data" and "XML" respectively. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the Web applications namespace 200 can be referenced using the hierarchical name "System.Web". In this way, the individual namespaces 200, 202, 204, and 206 become major branches off of the System namespace and can carry a designation where the individual namespaces are prefixed with a designator, such as a "System." prefix.

The Web applications namespace 200 pertains to Web based functionality, such as dynamically generated Web pages (e.g., Microsoft's Active Server Pages (ASP)). It supplies types that enable browser/server communication. The client applications namespace 202 pertains to drawing and client side UI functionality. It supplies types that enable drawing of two-dimensional (2D) and three-dimensional (3D) drawings, imaging, and printing, as well as the ability to construct window forms, menus, boxes, and so on.

The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions.

In addition to the framework 132, programming tools 210 are provided to assist the developer in building Web services and/or applications. One example of the programming tools 200 is Visual Studio™, a multi-language suite of programming tools offered by Microsoft Corporation.

Root API Namespaces

Figure 3:
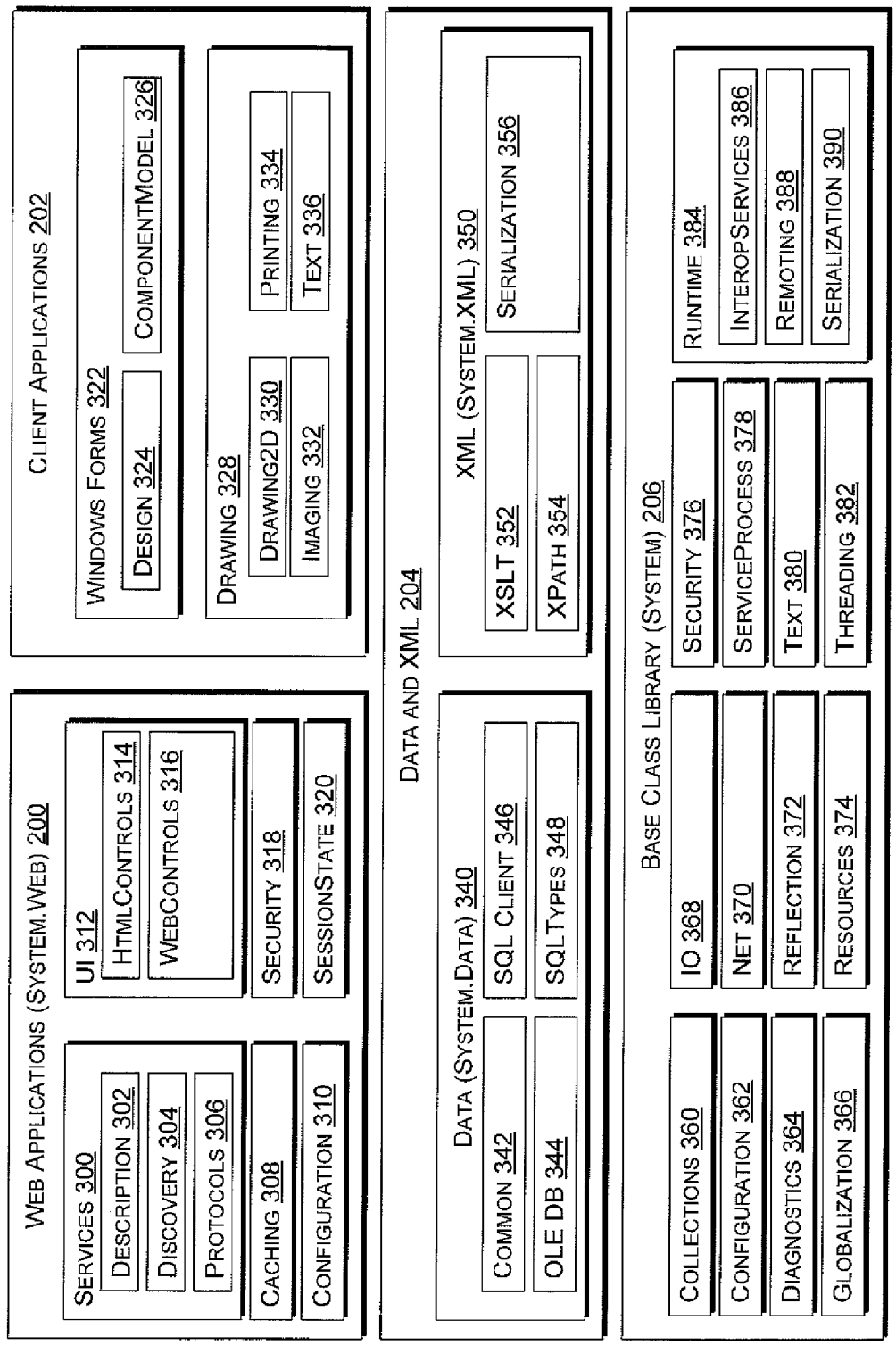
FIG. 3 is a block diagram of unique namespaces supported by the API, as well as function classes of the various API functions.

FIG. 3 shows the API 142 and its four root namespaces in more detail. In one embodiment, the namespaces are identified according to a hierarchical naming convention in which strings of names are concatenated with periods. For instance, the Web applications namespace 200 is identified by the root name "System.Web". Within the "Sytem.Web" namespace is another namespace for Web services, identified as "System.Web.Services", which further identifies another namespace for a description known as "System.Web.Services.Description". With this naming convention in mind, the following provides a general overview of selected namespaces of the API 142, although other naming conventions could be used with equal effect.

The Web applications namespace 200 ("System.Web") defines additional namespaces, including:

A services namespace 300 ("System.Web.Services") containing classes that enable a developer to build and use Web services. The services namespace 300 defines additional namespaces, including a description namespace 302 ("System.Web.Services.Description") containing classes that enable a developer to publicly describe a Web service via a service description language (such as WSDL, a specification available from the W3C), a discovery namespace 304 ("System.Web.Services.Discovery") containing classes that allow Web service consumers to locate available Web Services on a Web server, and a protocols namespace 306 ("System.Web.Services.Protocols") containing classes that define the protocols used to transmit data across a network during communication between Web service clients and the Web service itself.

A caching namespace 308 ("System.Web.Caching") containing classes that enable developers to decrease Web application response time through temporarily caching frequently used resources on the server. This includes ASP.NET pages, web services, and user controls. (ASP-.NET is the updated version of Microsoft's ASP technology.) Additionally, a cache dictionary is available for developers to store frequently used resources, such as hash tables and other data structures.

A configuration namespace 310 ("System.Web.Configuration") containing classes that are used to read configuration data in for an application.

A UI namespace 312 ("System.Web.UI") containing types that allow developers to create controls and pages that will appear in Web applications as user interfaces on a Web page. This namespace includes the control class, which provides all web based controls, whether those encapsulating HTML elements, higher level Web controls, or even custom User controls, with a common set of functionality. Also provided are classes which provide the web forms server controls data binding functionality, the ability to save the view state of a given control or page, as well as parsing functionality for both programmable and literal controls. Within the UI namespace 312 are two additional namespaces: an HTML controls namespace 314 ("System.Web.UI.HtmlControls") containing classes that permit developers to interact with types that encapsulates html 3.2 elements create HTML controls, and a Web controls namespace 316 ("System.Web.UI.WeblControls") containing classes that allow developers to create higher level Web controls.

A security namespace 318 ("System.Web.Security") containing classes used to implement security in web server applications, such as basic authentication, challenge response authentication, and role based authentication.

A session state namespace 320 ("System.Web.SessionState") containing classes used to access session state values (i.e., data that lives across requests for the lifetime of the session) as well as session-level settings and lifetime management methods.

The client applications namespace 202 is composed of two namespaces:

A windows forms namespace 322 ("System.Windows.Forms") containing classes for creating Windows®-based client applications that take full advantage of the rich user interface features available in the Microsoft Windows® operating system, such as the ability to drag and drop screen elements. Such classes may include wrapped APIs available in the Microsoft Windows® operating system that are used in a windowing UI environment. Within this namespace are a design namespace 324 ("System.Windows.Forms.Design") that contains classes to extend design-time support for Windows forms and a component model namespace 326 ("System.Windows.Forms.ComponentModel") that contains the windows form implementation of the general component model defined in System.ComponentModel. This namespace contains designer tools, such as Visual Studio, which offer a rich experience for developers at design time.

A drawing namespace 328 ("System.Drawing") containing classes for graphics functionality. The drawing namespace 328 includes a 2D drawing namespace 330 ("System.Drawing.Drawing2D") that contains classes and enumerations to provide advanced 2-dimensional and vector graphics functionality, an imaging namespace 332 ("System.Drawing.Imaging") that contains classes for advanced imaging functionality, a printing namespace 334 ("System.Drawing.Printing") that contains classes to permit developers to customize printing, and a text namespace 336 ("System.Drawing.Text") that contains classes for advanced typography functionality.

The data and XML namespace 204 is composed of two namespaces:

A data namespace 340 ("System.Data") containing classes that enable developers to build components that efficiently manage data from multiple data sources. It implements an architecture that, in a disconnected scenario (such as the Internet), provides tools to request, update, and reconcile data in multiple tier systems. The data namespace 340 includes a common namespace 342 that contains types shared by data providers. A data provider describes a collection of types used to access a data source, such as a database, in the managed space. The data namespace 340 also includes an OLE DB namespace 344 that contains types pertaining to data used in object-oriented databases (e.g., Microsoft's SQL Server), and a SQL client namespace 346 that contains types pertaining to data used by SQL clients. The data namespace also includes a SQL types namespace 348 ("System.Data.SqlTypes") that contains classes for native data types within Microsoft's SQL Server. The classes provide a safer, faster alternative to other data types. Using the objects within this namespace helps prevent type conversion errors caused in situations where loss of precision could occur. Because other data types are converted to and from SQL types behind the scenes, explicitly creating and using objects within this namespace results in faster code as well.

An XML namespace 350 ("System.XML") containing classes that provide standards-based support for processing XML. The supported standards include XML (e.g., version 1.0), XML Namespaces (both stream level and DOM), XML Schemas, XPath expressions, XSL/T transformations, DOM Level 2 Core, and SOAP (e.g., version 1.1). The XML namespace 350 includes an XSLT namespace 352 ("System.XML.Xsl") that contains classes and enumerations to support XSLT (Extensible Stylesheet Language Transformations), an Xpath namespace 354 ("System.XML.Xpath") that contains an XPath parser and evaluation engine, and a serialization namespace 356 ("System.XML.Serialization") that contains classes used to serialize objects into XML format documents or streams.

The base class library namespace 206 ("System") includes the following namespaces:

A collections namespace 360 ("System.Collections") containing interfaces and classes that define various collections of objects, such as lists, queues, arrays, hash tables and dictionaries.

A configuration namespace 362 ("System.Configuration") containing classes and interfaces that allow developers to programmatically access configuration settings and handle errors in configuration files.

A diagnostics namespace 364 ("System.Diagnostics") containing classes that are used to debug applications and to trace code execution. The namespace allows developers to start system processes, read and write to event logs, and monitor system performance using performance counters.

A globalization namespace 366 ("System.Globalization") containing classes that define culture-related information, including the language, the country/region, the calendars in use, the format patterns for dates, currency and numbers, and the sort order for strings.

An I/O namespace 368 ("System.IO") containing the infrastructure pieces to operate with the input/output of data streams, files, and directories. This namespace includes a model for working with streams of bytes, higher level readers and writers which consume those bytes, various constructions or implementations of the streams (e.g., FileStream and MemoryStream) and, a set of utility classes for working with files and directories.

A net namespace 370 ("System.Net") providing an extensive set of classes for building network-enabled application, referred to as the Net Class Libraries (NCL). One element to the design of the Net Class Libraries is an extensible, layered approach to exposing networking functionality. The NCL stack contains three basic layers. A base layer (System.Net.Socket) provides access to an interface to TCP/IP, the communications protocol of UNIX networks and the Internet. One example of such an interface is the "WinSock API" from Microsoft Corporation. The next layer is the Transport Protocol classes, which support such transport protocols as TCP and UDP. Developers may write their own protocol classes to provide support for protocols such as IGMP and ICMP. The third layer is the Web request, which provides an abstract factory pattern for the creation of other protocol classes. The NCL provides implementations for Hyper Text Transport Protocol (HTTP).

A reflection namespace ("System.Reflection") 372 containing types that provide a managed view of loaded types, methods, and fields, with the ability to dynamically create and invoke types.

A resources namespace 374 ("System.Resources") containing classes and interfaces that allow developers to create, store and manage various culture-specific resources used in an application.

A security namespace 376 ("System.Security") supporting the underlying structure of the security system, including interfaces, attributes, exceptions, and base classes for permissions.

A service process namespace 378 ("System.ServiceProcess") containing classes that allow developers to install and run services. Services are long-running executables that run without a user interface. They can be installed to run under a system account that enables them to be started at computer reboot. Services whose implementation is derived from processing in one class can define specific behavior for start, stop, pause, and continue commands, as well as behavior to take when the system shuts down.

A text namespace 380 ("System.Text") containing classes representing various types of encodings (e.g., ASCII, Unicode, UTF-7, and UTF-8), abstract base classes for converting blocks of characters to and from blocks of bytes, and a helper class that manipulates and formats string objects without creating intermediate instances.

A threading namespace 382 ("System.Threading") containing classes and interfaces that enable multi-threaded programming. The threading namespace includes a ThreadPool class that manages groups of threads, a Timer class that enables a delegate to be called after a specified amount of time, and a Mutex class for synchronizing mutually-exclusive threads. This namespace also provides classes for thread scheduling, wait notification, and deadlock resolution.

A runtime namespace 384 ("System.Runtime") containing multiple namespaces concerning runtime features, including an interoperation services namespace 386 ("System.Runtime.InteropServices") that contains a collection of classes useful for accessing COM objects. The types in the InteropServices namespace fall into the following areas of functionality: attributes, exceptions, managed definitions of COM types, wrappers, type converters, and the Marshal class. The runtime namespace 384 further includes a remoting namespace 388 ("System.Runtime.Remoting") that contains classes and interfaces allowing developers to create and configure distributed applications. Another namespace within the runtime namespace 384 is a serialization namespace 390 ("System.Runtime.Serialization") that contains classes used for serializing and deserializing objects. Serialization is the process of converting an object or a graph of objects into a linear sequence of bytes for either storage or transmission to another location.

Portions of the XML namespace 350 ("System.XML") are discussed in additional detail below.

System.Xml Namespace

This is the overall namespace for the XML classes that provide standards-based support for processing XML. Various functionality for processing XML documents can be invoked via the XML namespace, such as non-cached forward only access to XML data, read-only random access to a data store, transforming of XML data using an XSLT stylesheet, constructing and editing of schemas, resolving of external XML resources named by a Uniform Resource Identifier (URI), storage and retrieval (as well as manipulation) of structured data through a relational dataset, non-cached forward only generation of streams and files containing XML data, DTD and XDR (as well as XSD) schema validation, and so forth. In one exemplary implementation, standards may be located on the World Wide Web (www.), and the standards supported by the namespace are located at:

XML 1.0—w3.org/TR/1998/REC-xml-19980210—including DTD support (XmlTextReader);

XML Namespaces—w3.org/TR/REC-xml-names/—both stream level and DOM;

XML Schemas—w3.org/TR/xmlschema-1/—supported for schema mapping and serialization. (see also XmlSchemaCollection which provides XDR schema validation);

XPath expressions—w3.org/TR/xpath (XmlNavigator);

XSL/T transformations—w3.org/TR/xslt (XslTransform);

DOM Level 2 Core—w3.org/TR/DOM-Level-2/—for (XmlDocument);

SOAP 1.1—msdn.microsoft.com/xml/general/soapspec.asp (including the Soap Contract Language and Soap Discovery) used in XML object serialization.

The System.Xml namespace also includes a System.Xml.Schema namespace that contains XML classes that provide standards-based support for XML schemas. In one exemplary implementation, standards may be located on the World Wide Web (www.), and the supported standards are located at:

XML Schemas for Structures—w3.org/TR/xmlschema-1/—supports for schema mapping and for validation. (see also XmlSchemaCollection which provides XSD and XDR schema validation); and XML Schemas for Data Types—w3.org/TR/xmlschema-2/—supports data types for XML schema definitions. (see also XmlSchemaCollection which provides XSD and XDR schema validation).

The following is a more detailed description of the System.Xml namespace, identifying various classes, interfaces, enumerations, and so forth contained in the System.Xml namespace (as well as the System.Xml.Schema, System.Xml.Serialization, System.Xml.Xpath, and System.Xml.Xsl namespaces contained therein).

System.Xml

This is the overall namespace for the XML classes that provide standards-based support for processing XML. The standards may be located on the World Wide Web (www.), and the supported standards are: XML 1.0—located at w3.org/TR/1998/REC-xml-19980210—including DTD support (XmlTextReader) XML Namespaces—located at w3.org/TR/REC-xml-names/—both stream level and DOM.

Description

This is the overall namespace for the XML classes that provide standards-based support for processing XML. The standards may be located on the World Wide Web (www.), and the supported standards are: XML 1.0—located at w3.org/TR/1998/REC-xml-19980210—including DTD support (XmlTextReader) XML Namespaces—located at w3.org/TR/REC-xml-names/—both stream level and DOM.

XmlDataDocument class (System.Xml)

Description

Allows structured data to be stored, retrieved, and manipulated through a relational System.Data.DataSet.

This class extends System.Xml.XmlDocument. It enables you to load either relational data or XML data and manipulate that data using the W3C Document Object Model (DOM). The DOM presents data as a hierarchy of node objects. Because XmlDataDocument implements the System.Xml.XPath.IXPathNavigable interface it can also be used as the source document for the System.Xml.Xsl.XslTransform class.

Constructors:

XmlDataDocument

Example Syntax:

[C#] public XmlDataDocument( );

[C++] public: XmlDataDocument( );

[VB] Public Sub New( )

[JScript] public function XmlDataDocument( ); Initializes a new instance of the XmlDataDocument class.

Description

Initializes a new instance of the XmlDataDocument class.

The first time the System.Xml.XmlDataDocument.DataSet property is used, a new DataSet is created an associated with the XmlDataDocument.

XmlDataDocument

Example Syntax:

[C#] public XmlDataDocument(DataSet dataset);

[C++] public: XmlDataDocument(DataSet* dataset);

[VB] Public Sub New(ByVal dataset As DataSet)

[JScript] public function XmlDataDocument(dataset: DataSet);

Description

Initializes a new instance of the XmlDataDocument class with the specified System.Data.DataSet.

The XmlDataDocument is synchronized with the specified DataSet. Any data in the DataSet is immediately available through the XmlDataDocument. Any changes in the DataSet are propagated in the XmlDataDocument. Any changes made in the XmlDataDocument, provided they match the DataSet schema, are propagated in the DataSet. The DataSet to load into the XmlDataDocument.

Properties:

Attributes

BaseURI

ChildNodes

DataSet

Description

Gets a System.Data.DataSet that provides a relational representation of the data in the XmlDataDocument.

The DataSet enables you to access the data in the XmlDataDocument using a relational model. This means that you can handle the data as tables and views, rows and columns, relations, and so on.

DocumentElement

DocumentType

FirstChild

HasChildNodes

Implementation

InnerText

InnerXml

IsReadOnly

Item

Item

LastChild

LocalName

Name

NamespaceURI

NameTable

NextSibling

NodeType

OuterXml

OwnerDocument

ParentNode

Prefix

PreserveWhitespace

PreviousSibling

Value

XmlResolver

Methods:

CloneNode

[C#] public override XmlNode CloneNode(bool deep);

[C++] public: XmlNode* CloneNode(bool deep);

[VB] Overrides Public Function CloneNode(ByVal deep As Boolean) As XmlNode
[JScript] public override function CloneNode(deep: Boolean): XmlNode;
Description
Creates a duplicate of the current node.
Return Value: The cloned node.
Cloning the XmlDataDocument also clones the System.Data.DataSet schema. true to recursively clone the subtree under the specified node; false to clone only the node itself.
CreateElement
[C#] public override XmlElement CreateElement(string prefix, string localName, string namespaceURI);
[C++] public: XmlElement* CreateElement(String* prefix, String* localName, String* namespaceURI);
[VB] Overrides Public Function CreateElement(ByVal prefix As String, ByVal localName As String, ByVal namespaceURI As String) As XmlElement
[JScript] public override function CreateElement(prefix: String, localName: String, namespaceURI: String): XmlElement; Creates an System.Xml.XmlElement.
Description
Creates an element with the specified System.Xml.XmlNode.Prefix, System.Xml.XmlDocument.LocalName, and System.Xml.XmlNode.NamespaceURI.
Return Value: A new System.Xml.XmlElement.
Notes to Inheritors If you overload this function, it should not be used for extensibility. Instead, you should return an element created by the base class, XmlDataDocument in this case. See the following example. The prefix of the new element; if String.Empty or null there is no prefix. The local name of the new element. The namespace URI of the new element; if String.Empty or null there is no namespaceURI.
CreateEntityReference
[C#] public override XmlEntityReference CreateEntityReference(string name);
[C++] public: XmlEntityReference* CreateEntityReference(String* name);
[VB] Overrides Public Function CreateEntityReference(ByVal name As String) As XmlEntityReference
[JScript] public override function CreateEntityReference(name: String): XmlEntityReference;
Description
Creates an System.Xml.XmlEntityReference with the specified name. Name of the entity reference.
CreateNavigator
[C#] protected override XPathNavigator CreateNavigator(XmlNode node);
[C++] protected: XPathNavigator* CreateNavigator(XmlNode* node);
[VB] Overrides Protected Function CreateNavigator(ByVal node As XmlNode) As XPathNavigator
[JScript] protected override function CreateNavigator(node: XmlNode): XPathNavigator; Creates a new System.Xml.XPath.XPathNavigator object for navigating this document.
Description
Creates a new System.Xml.XPath.XPathNavigator object for navigating this document.
Return Value: An XPathNavigator.
The XPathNavigator provides read-only, random access to data. Because it is optimized for XSLT transformations, it provides performance benefits when used as an input mechanism to the System.Xml.Xsl.XslTransform.Transform(System.Xml.XPath.IXPathNavigable,System.Xml.Xsl.XsltArgumentList) method. The System.Xml.XmlNode you want to navigate.

GetElementById
[C#] public override XmlElement GetElementById(string elemId);
[C++] public: XmlElement* GetElementById(String* elemId);
[VB] Overrides Public Function GetElementById(ByVal elemId As String) As XmlElement
[JScript] public override function GetElementById(elemId: String): XmlElement;
Description
Gets the System.Xml.XmlElement with the specified ID. The attribute ID to match.
GetElementFromRow
[C#] public XmlElement GetElementFromRow(DataRow r);
[C++] public: XmlElement* GetElementFromRow(DataRow* r);
[VB] Public Function GetElementFromRow(ByVal r As DataRow) As XmlElement
[JScript] public function GetElementFromRow(r: DataRow): XmlElement;
Description
Retrieves the System.Xml.XmlElement associated with the specified System.Data.DataRow.
Return Value: The XmlElement containing a representation of the specified DataRow. The DataRow whose associated XmlElement you wish to retrieve.
GetRowFromElement
[C#] public DataRow GetRowFromElement(XmlElement e);
[C++] public: DataRow* GetRowFromElement(XmlElement* e);
[VB] Public Function GetRowFromElement(ByVal e As XmlElement) As DataRow
[JScript] public function GetRowFromElement(e: XmlElement): DataRow;
Description
Retrieves the System.Data.DataRow associated with the specified System.Xml.XmlElement.
Return Value: The DataRow containing a representation of the XmlElement. The XmlElement whose associated DataRow you wish to retrieve.
Load
[C#] public override void Load(XmlReader reader);
[C++] public: void Load(XmlReader* reader);
[VB] Overrides Public Sub Load(ByVal reader As XmlReader)
[JScript] public override function Load(reader: XmlReader); Loads the XmlDataDocument using the specified data source and synchronizes the System.Data.DataSet with the loaded data.
Description
Loads the XmlDataDocument from the specified System.Xml.XmlReader.
System.Xml.XmlWhitespace nodes are not created unless System.Xml.XmlDocument.PreserveWhitespace is set to true. Also, if the reader has been configured to not return whitespace, then no whitespace nodes will be created. In other words Load does not change the whitespace handling of the given reader. XmlReader containing the XML document to load.
WriteTo
[C#] public override void WriteTo(XmlWriter writer);
[C++] public: void WriteTo(XmlWriter* writer);
[VB] Overrides Public Sub WriteTo(ByVal writer As XmlWriter)
[JScript] public override function WriteTo(writer: XmlWriter);

Description
Saves the current node to the specified System.Xml.XmlWriter. The XmlWriter to which you want to save.
EntityHandling enumeration (System.Xml)
WriteTo
Description
Specifies how entities are handled.
WriteTo
[C#] public const EntityHandling ExpandCharEntities;
[C++] public: const EntityHandling ExpandCharEntities;
[VB] Public Const ExpandCharEntities As EntityHandling
[JScript] public var ExpandCharEntities: EntityHandling;
Description
Expands character entities and returns general entities as nodes (System.Xml.XmlValidatingReader.NodeType= XmlNodeType.EntityReference, System.Xml.XmlValidatingReader.Name=the name of the entity, System.Xml.XmlValidatingReader.HasValue=false).
WriteTo
[C#] public const EntityHandling ExpandEntities;
[C++] public: const EntityHandling ExpandEntities;
[VB] Public Const ExpandEntities As EntityHandling
[JScript] public var ExpandEntities: EntityHandling;
Description
Expands all entities. This is the default.
Formatting enumeration (System.Xml)
ToString
Description
Specifies formatting options for the System.Xml.XmlTextWriter.
ToString
[C#] public const Formatting Indented;
[C++] public: const Formatting Indented;
[VB] Public Const Indented As Formatting
[JScript] public var Indented: Formatting;
Description
Causes child elements to be indented according to the System.Xml.XmlTextWriter.Indentation and System.Xml.XmlTextWriter.IndentChar settings. This option indents element content only; mixed content is not affected. For the XML 1.0 definitions of these terms, see the W3C documentation, which may be located on the World Wide Web (www.) at (w3.org/TR/1998/REC-xml-19980210#sec-element-content and located at w3.org/TR/1998/REC-xml-19980210#sec-mixed-content).
ToString
[C#] public const Formatting None;
[C++] public: const Formatting None;
[VB] Public Const None As Formatting
[JScript] public var None: Formatting;
Description
No special formatting is applied. This is the default.
IHasXmlNode interface (System.Xml)
ToString
Description
Enables a class to return an System.Xml.XmlNode from the current context or position.
This interface is implemented by classes which operate over classes that have System.Xml.XmlNode nodes. For example, if an System.Xml.XPath.XPathNavigator is implemented over an System.Xml.XmlDocument you can use the System.Xml.IHasXmlNode.GetNode method to access the node representing the current position of the navigator.
GetNode
[C#] XmlNode GetNode( );
[C++] XmlNode* GetNode( );
[VB] Function GetNode( ) As XmlNode
[JScript] function GetNode( ): XmlNode;
Description
Returns the System.Xml.XmlNode for the current position.
Return Value: The XmlNode for the current position.
The following C# code uses GetNode to access a node the System.Xml.XPath.XPathNavigator is currently positioned on.
IXmlLineInfo interface (System.Xml)
GetNode
Description
Provides an interface to enable a class to return line and position information.
LineNumber
GetNode
[C#] int LineNumber {get;}
[C++] int get_LineNumber( );
[VB] ReadOnly Property LineNumber As Integer
[JScript] abstract function get LineNumber( ): int;
Description
Gets the current line number.
This property is used primarily for error reporting, but can be called at any time. The starting value is 1. Combined with System.Xml.IXmlLineInfo.LinePosition, a value of 1,1 indicates the start of a document.
LinePosition
GetNode
[C#] int LinePosition {get;}
[C++] int get_LinePosition( );
[VB] ReadOnly Property LinePosition As Integer
[JScript] abstract function get LinePosition( ): int;
Description
Gets the current line position.
This property is used primarily for error reporting, but can be called at any time. The starting value is 1. Combined with System.Xml.IXmlLineInfo.LineNumber, a value of 1,1 indicates the start of a document.
HasLineInfo
[C#] bool HasLineInfo( );
[C++] bool HasLineInfo( );
[VB] Function HasLineInfo( ) As Boolean
[JScript] function HasLineInfo( ): Boolean;
Description
Gets a value indicating whether the class can return line information.
Return Value: true if System.Xml.IXmlLineInfo.LineNumber and System.Xml.IXmlLineInfo.LinePosition can be provided; otherwise, false.
NameTable class (System.Xml)
HasLineInfo
Description
Implements a single-threaded System.Xml.XmlNameTable.
Several classes, such as System.Xml.XmlDocument and System.Xml.XmlReader use the NameTable class internally, to store attribute and element names. When an element or attribute name occurs multiple times in an XML document it is stored only once in the NameTable. This allows you to do object comparisons on these strings rather than a more expensive string comparison.
NameTable
Example Syntax:
HasLineInfo
[C#] public NameTable( );
[C++] public: NameTable( );
[VB] Public Sub New( )
[JScript] public function NameTable( );

Description
   Initializes a new instance of the NameTable class.
   Constructs an empty NameTable.
   Add
[C#] public override string Add(string key);
[C++] public: String* Add(String* key);
[VB] Overrides Public Function Add(ByVal key As String) As String
[JScript] public override function Add(key: String): String;
Atomizes the specified string and adds it to the NameTable.
Description
   Atomizes the specified string and adds it to the NameTable.
Return Value: The atomized string or the existing string if it already exists in the NameTable. The string to add.
   Add
[C#] public override string Add(char[ ] key, int start, int len);
[C++] public: String* Add(_wchar_t key _gc[ ], int start, int len);
[VB] Overrides Public Function Add(ByVal key( ) As Char, ByVal start As Integer, ByVal len As Integer) As String
[JScript] public override function Add(key: Char[ ], start: int, len: int): String;
Description
   Atomizes the specified string and adds it to the NameTable. Return Value: The atomized string or the existing atom if one already exists in the NameTable. If len is zero, String.Empty is returned. The character array containing the string to add. The zero-based index into the array specifying the first character of the string. The number of characters in the string.
   Get
[C#] public override string Get(string value);
[C++] public: String* Get(String* value);
[VB] Overrides Public Function Get(ByVal value As String) As String
[JScript] public override function Get(value: String): String;
Gets the atomized string object.
Description
   Gets the atomized string object with the specified value. Return Value: The atomized string object or null if the string has not already been atomized. The name to find.
   Get
[C#] public override string Get(char[ ] key, int start, int len);
[C++] public: String* Get(_wchar_t key _gc[ ], int start, int len);
[VB] Overrides Public Function Get(ByVal key( ) As Char, ByVal start As Integer, ByVal len As Integer) As String
[JScript] public override function Get(key: Char[ ], start: int, len: int): String;
Description
   Gets the atomized String object containing the same characters as the specified range of characters in the given array. Return Value: The atomized string or null if the string has not already been atomized. If len is zero, String.Empty is returned. The character array containing the name to find. The zero-based index into the array specifying the first character of the name. The number of characters in the name.
   ReadState enumeration (System.Xml)
   ToString
Description
   Specifies the state of the reader.
   ToString
[C#] public const ReadState Closed;
[C++] public: const ReadState Closed;
[VB] Public Const Closed As ReadState
[JScript] public var Closed: ReadState;

Description
   The System.Xml.XmlReader.Close method has been called.
   ToString
[C#] public const ReadState EndOfFile;
[C++] public: const ReadState EndOfFile;
[VB] Public Const EndOfFile As ReadState
[JScript] public var EndOfFile: ReadState;
Description
   The end of the file has been reached successfully.
   ToString
[C#] public const ReadState Error;
[C++] public: const ReadState Error;
[VB] Public Const Error As ReadState
[JScript] public var Error: ReadState;
Description
   An error occurred that prevents the read operation from continuing.
   ToString
[C#] public const ReadState Initial;
[C++] public: const ReadState Initial;
[VB] Public Const Initial As ReadState
[JScript] public var Initial: ReadState;
Description
   The Read method has not been called.
   ToString
[C#] public const ReadState Interactive;
[C++] public: const ReadState Interactive;
[VB] Public Const Interactive As ReadState
[JScript] public var Interactive: ReadState;
Description
   The Read method has been called. Additional methods may be called on the reader.
   ValidationType enumeration (System.Xml)
   ToString
Description
   Specifies the type of validation to perform.
   The validation model has three characteristics, strict, informative, and status. Strict, does not allow the mixing of validation types, informative provides a warning if the schema or DTD cannot be found, and status provides warnings if validation cannot be performed for elements and attributes from schemas.
   ToString
[C#] public const ValidationType Auto;
[C++] public: const ValidationType Auto;
[VB] Public Const Auto As ValidationType
[JScript] public var Auto: ValidationType;
Description
   System.Xml.XmlValidatingReader validates if DTD or schema information is found.
   ToString
[C#] public const ValidationType DTD;
[C++] public: const ValidationType DTD;
[VB] Public Const DTD As ValidationType
[JScript] public var DTD: ValidationType;
Description
   Validates according to the DTD.
   ToString
[C#] public const ValidationType None;
[C++] public: const ValidationType None;
[VB] Public Const None As ValidationType
[JScript] public var None: ValidationType;
Description
   Creates an XML 1.0 compliant non-validating parser. Default attributes are reported and general entities can be resolved by calling System.Xml.XmlValidatingReader.ResolveEntity. The DOCTYPE is not used for validation purposes.
ToString
[C#] public const ValidationType Schema;
[C++] public: const ValidationType Schema;
[VB] Public Const Schema As ValidationType
[JScript] public var Schema: ValidationType;
Description
Validate according to XSD schemas; including inline schemas. XSD schemas are associated with namespace URIs either by using the schemaLocation attribute or the provided System.Xml.XmlValidatingReader.Schemas property.
ToString
[C#] public const ValidationType XDR;
[C++] public: const ValidationType XDR;
[VB] Public Const XDR As ValidationType
[JScript] public var XDR: ValidationType;
Description
Validate according to XDR schemas; including inline schemas. XDR schemas are recognized using the x-schema namespace prefix or the System.Xml.XmlValidatingReader.Schemas property.
WhitespaceHandling enumeration (System.Xml)
ToString
Description
Specifies how whitespace is handled.
ToString
[C#] public const WhitespaceHandling All;
[C++] public: const WhitespaceHandling All;
[VB] Public Const All As WhitespaceHandling
[JScript] public var All: WhitespaceHandling;
Description
Return Whitespace and SignificantWhitespace nodes. This is the default.
ToString
[C#] public const WhitespaceHandling None;
[C++] public: const WhitespaceHandling None;
[VB] Public Const None As WhitespaceHandling
[JScript] public var None: WhitespaceHandling;
Description
Return no Whitespace and no SignificantWhitespace nodes.
ToString
[C#] public const WhitespaceHandling Significant;
[C++] public: const WhitespaceHandling Significant;
[VB] Public Const Significant As WhitespaceHandling
[JScript] public var Significant: WhitespaceHandling;
Description
Return SignificantWhitespace nodes only.
WriteState enumeration (System.Xml)
ToString
Description
Specifies the state of the System.Xml.XmlWriter.
ToString
[C#] public const WriteState Attribute;
[C++] public: const WriteState Attribute;
[VB] Public Const Attribute As WriteState
[JScript] public var Attribute: WriteState;
Description
An attribute value is being written.
ToString
[C#] public const WriteState Closed;
[C++] public: const WriteState Closed;
[VB] Public Const Closed As WriteState
[JScript] public var Closed: WriteState;
Description
The System.Xml.XmlWriter.Close method has been called.
ToString
[C#] public const WriteState Content;
[C++] public: const WriteState Content;
[VB] Public Const Content As WriteState
[JScript] public var Content: WriteState;
Description
The element content is being written.
ToString
[C#] public const WriteState Element;
[C++] public: const WriteState Element;
[VB] Public Const Element As WriteState
[JScript] public var Element: WriteState;
Description
An element start tag is being written.
ToString
[C#] public const WriteState Prolog;
[C++] public: const WriteState Prolog;
[VB] Public Const Prolog As WriteState
[JScript] public var Prolog: WriteState;
Description
The prolog is being written.
ToString
[C#] public const WriteState Start;
[C++] public: const WriteState Start;
[VB] Public Const Start As WriteState
[JScript] public var Start: WriteState;
Description
A Write method has not been called.
XmlAttribute class (System.Xml)
ToString
Description
Represents an attribute. Valid and default values for the attribute are defined in a DTD or schema.
XmlAttribute
Example Syntax:
ToString
[C#] protected internal XmlAttribute(string prefix, string localName, string namespaceURI, XmlDocument doc);
[C++] internal: XmlAttribute(String* prefix, String* localName, String* namespaceURI, XmlDocument* doc);
[VB] Protected Friend Sub New(ByVal prefix As String, ByVal localName As String, ByVal namespaceURI As String, ByVal doc As XmlDocument)
[JScript] package function XmlAttribute(prefix: String, localName: String, namespaceURI: String, doc: XmlDocument);
Description
Attributes
BaseURI
ToString
Description
Gets the base URI of the node.
A networked XML document is comprised of chunks of data aggregated using various W3C standard inclusion mechanisms and therefore contains nodes that come from different places. The BaseURI tells you where these nodes came from.
ChildNodes
FirstChild
HasChildNodes
InnerText
ToString
Description
Gets or sets the concatenated values of the node and all its children.

Setting this property replaces all the children with the parsed contents of the given string.
  InnerXml
  ToString
[C#] public override string InnerXml {get; set;}
[C++] public: _property virtual String* get_InnerXml( );public: _property virtual void set_InnerXml(String*);
[VB] Overrides Public Property InnerXml As String
[JScript] public function get InnerXml( ): String;public function set InnerXml(String);
Description
  Gets or sets the markup representing just the children of this node.
  This is also settable which replaces the children of the node with the parsed contents of the given string. The parsing is done in the current namespace context.
  IsReadOnly
  Item
  Item
  LastChild
  LocalName
  ToString
Description
  Gets the local name of the node.
  If the node does not have a prefix, LocalName is the same as System.Xml.XmlAttribute.Name.
  Name
  ToString
[C#] public override string Name {get;}
[C++] public: _property virtual String* get_Name( );
[VB] Overrides Public ReadOnly Property Name As String
[JScript] public function get Name( ): String;
Description
  Gets the qualified name of the node.
  NamespaceURI
  ToString
[C#] public override string NamespaceURI {get;}
[C++] public: _property virtual String* get_NamespaceURI( );
[VB] Overrides Public ReadOnly Property NamespaceURI As String
[JScript] public function get NamespaceURI( ): String;
Description
  Gets the namespace URI of this node.
  An attribute does not inherit its namespace from the element it is attached to. If an attribute is not explicitly given a namespace, the namespace URI is considered to be String.Empty.
  NextSibling
  NodeType
  ToString
Description
  Gets the type of the current node.
  OuterXml
  OwnerDocument
  ToString
Description
  Gets the System.Xml.XmlDocument to which this node belongs.
  OwnerElement
  ToString
[C#] public virtual XmlElement OwnerElement {get;}
[C++] public: _property virtual XmlElement* get_OwnerElement( );
[VB] Overridable Public ReadOnly Property OwnerElement As XmlElement
[JScript] public function get OwnerElement( ): XmlElement;
Description
  Gets the System.Xml.XmlElement that contains this attribute.
  ParentNode
  ToString
[C#] public override XmlNode ParentNode {get;}
[C++] public: _property virtual XmlNode* get_ParentNode( );
[VB] Overrides Public ReadOnly Property ParentNode As XmlNode
[JScript] public function get ParentNode( ): XmlNode;
Description
  Gets the parent of this node. For XmlAttribute nodes, this property always returns null.
  Prefix
  ToString
[C#] public override string Prefix {get; set;}
[C++] public: _property virtual String* get_Prefix( ); public: _property virtual void set Prefix(String*);
[VB] Overrides Public Property Prefix As String
[JScript] public function get Prefix( ): String;public function set Prefix(String);
Description
  Gets or sets the namespace prefix of this node.
  Changing the prefix of an attribute that is known to have a default value does not create a new attribute with the default value and the original prefix.
  PreviousSibling
  Specified
  ToString
Description
  Gets a value indicating whether the attribute value was explicitly set.
  The implementation is in charge of this property, not the user. If the user changes the value of the attribute (even if it ends up having the same value as the default/fixed value) then the specified flag is automatically flipped to true. To re-specify the attribute as the default/fixed value from the DTD, the user must delete the attribute. The implementation then makes a new attribute available with specified set to false and the default/fixed value (if one exists).
  Value
  ToString
[C#] public override string Value {get; set;}
[C++] public: _property virtual String* get_Value( );public: _property virtual void set_Value(String*);
[VB] Overrides Public Property Value As String
[JScript] public function get Value( ): String;public function set Value(String);
Description
  Gets or sets the value of the node.
  CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
  Creates a duplicate of this node.
Return Value: The duplicate node.
  This method serves as a copy constructor for nodes. The cloned node has no parent (System.Xml.XmlAttribute.ParentNode returns null). true to recursively clone the subtree under the specified node; false to clone only the node itself WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
Saves all the children of the node to the specified XmlWriter. The XmlWriter where you want to save the current node.
WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
Saves the node to the specified XmlWriter. The XmlWriter where you want to save the node.
XmlAttributeCollection class (System.Xml)
WriteTo
Description
Represents a collection of attributes that can be accessed by name or index.
Count
ItemOf
WriteTo
Description
Gets the attribute with the specified name.
This method is the same as calling System.Xml.XmlNamedNodeMap.GetNamedItem(System.String). The qualified name of the attribute.
ItemOf
WriteTo
[C#] public virtual XmlAttribute this[int i] {get;}
[C++] public: _property virtual XmlAttribute* get_ItemOf (int i);
[VB] Overridable Public Default ReadOnly Property ItemOf (ByVal i As Integer) As XmlAttribute
[JScript]
returnValue=XmlAttributeCollectionObject.ItemOf(i); Gets the attribute with the specified name or index.
Description
Gets the attribute with the specified index.
This method is the same as calling System.Xml.XmlNamedNodeMap.Item(System.Int32). The index of the attribute.
ItemOf
WriteTo
[C#] public virtual XmlAttribute this[string localName, string namespaceURI] {get;}
[C++] public: _property virtual XmlAttribute* get_ItemOf (String* localName, String* namespaceURI);
[VB] Overridable Public Default ReadOnly Property ItemOf (ByVal localName As String, ByVal namespaceURI As String) As XmlAttribute
[JScript]
returnValue=XmlAttributeCollectionObject.ItemOf(localName, namespaceURI);
Description
Gets the attribute with the specified local name and namespace URI.
This method is the same as calling System.Xml.XmlNamedNodeMap.GetNamedItem(System.String). The local name of the attribute. The namespace URI of the attribute.

Append
[C#] public virtual XmlAttribute Append(XmlAttribute node);
[C++] public: virtual XmlAttribute* Append(XmlAttribute* node);
[VB] Overridable Public Function Append(ByVal node As XmlAttribute) As XmlAttribute
[JScript] public function Append(node: XmlAttribute): XmlAttribute;
Description
Inserts the specified attribute as the last node in the collection.
If node is already in the collection, it is moved to the last position. If an attribute with the same name is already present in the collection, the original attribute is removed from the collection and node is added to the end of the collection. The System.Xml.XmlAttribute to insert.
CopyTo
[C#] public void CopyTo(XmlAttribute[ ] array, int index);
[C++] public: void CopyTo(XmlAttribute* array[ ], int index);
[VB] Public Sub CopyTo(ByVal array( ) As XmlAttribute, ByVal index As Integer)
[JScript] public function CopyTo(array: XmlAttribute[ ], index: int);
Description
Copies all the System.Xml.XmlAttribute objects from this collection into the given array. The array that is the destination of the objects copied from this collection. The index in array where copying begins.
InsertAfter
[C#] public virtual XmlAttribute InsertAfter(XmlAttribute newNode, XmlAttribute refNode);
[C++] public: virtual XmlAttribute* InsertAfter(XmlAttribute* newNode, XmlAttribute* refNode);
[VB] Overridable Public Function InsertAfter(ByVal newNode As XmlAttribute, ByVal refNode As XmlAttribute) As XmlAttribute
[JScript] public function InsertAfter(newNode: XmlAttribute, refNode: XmlAttribute): XmlAttribute;
Description
Inserts the specified attribute immediately after the specified reference attribute.
If an attribute with the same name is already present in the collection, the original attribute is removed from the collection and newNode is inserted into the collection. The System.Xml.XmlAttribute to insert. The System.Xml.XmlAttribute that is the reference attribute.
InsertBefore
[C#] public virtual XmlAttribute InsertBefore(XmlAttribute newNode, XmlAttribute refNode);
[C++] public: virtual XmlAttribute* InsertBefore(XmlAttribute* newNode, XmlAttribute* refNode);
[VB] Overridable Public Function InsertBefore(ByVal newNode As XmlAttribute, ByVal refNode As XmlAttribute) As XmlAttribute
[JScript] public function InsertBefore(newNode: XmlAttribute, refNode: XmlAttribute): XmlAttribute;
Description
Inserts the specified attribute immediately before the specified reference attribute.
If an attribute with the same name is already present in the collection, the original attribute is removed from the collection and newNode is inserted into the collection. The System.Xml.XmlAttribute to insert. The System.Xml.XmlAttribute that is the reference attribute.
Prepend
[C#] public virtual XmlAttribute Prepend(XmlAttribute node);

[C++] public: virtual XmlAttribute* Prepend(XmlAttribute* node);
[VB] Overridable Public Function Prepend(ByVal node As XmlAttribute) As XmlAttribute
[JScript] public function Prepend(node: XmlAttribute): XmlAttribute;
Description
Inserts the specified attribute as the first node in the collection.
If node is already in the collection, it is moved to the first position. If an attribute with the same name is already present in the collection, the original attribute is removed from the collection and node is added to the beginning of the collection. The System.Xml.XmlAttribute to insert.
Remove
[C#] public virtual XmlAttribute Remove(XmlAttribute node);
[C++] public: virtual XmlAttribute* Remove(XmlAttribute* node);
[VB] Overridable Public Function Remove(ByVal node As XmlAttribute) As XmlAttribute
[JScript] public function Remove(node: XmlAttribute): XmlAttribute;
Description
Removes the specified attribute from the collection.
Return Value: The node removed or null if it is not found in the collection. The System.Xml.XmlAttribute to remove.
RemoveAll
[C#] public virtual void RemoveAll;
[C++] public: virtual void RemoveAll( );
[VB] Overridable Public Sub RemoveAll( )
[JScript] public function RemoveAll( );
Description
Removes all attributes from the collection.
RemoveAt
[C#] public virtual XmlAttribute RemoveAt(int i);
[C++] public: virtual XmlAttribute* RemoveAt(int i);
[VB] Overridable Public Function RemoveAt(ByVal i As Integer) As XmlAttribute
[JScript] public function RemoveAt(i: int): XmlAttribute;
Description
Removes the attribute corresponding to the specified index from the collection.
Return Value: Returns null if there is no attribute at the specified index. The index of the node to remove. The first node has index 0.
SetNamedItem
[C#] public override XmlNode SetNamedItem(XmlNode node);
[C++] public: XmlNode* SetNamedItem(XmlNode* node);
[VB] Overrides Public Function SetNamedItem(ByVal node As XmlNode) As XmlNode
[JScript] public override function SetNamedItem(node: XmlNode): XmlNode;
Description
Adds a System.Xml.XmlNode using its System.Xml.XmlNode.Name property
Return Value: If the node replaces an existing node with the same name, the old node is returned; otherwise, null is returned. An attribute node to store in this collection. The node will later be accessible using the name of the node. If a node with that name is already present in the collection, it is replaced by the new one.
ICollection.CopyTo
[C#] void ICollection.CopyTo(Array array, int index);
[C++] void ICollection::CopyTo(Array* array, int index);
[VB] Sub CopyTo(ByVal array As Array, ByVal index As Integer) Implements ICollection.CopyTo
[JScript] function ICollection.CopyTo(array: Array, index: int);
XmlCDataSection class (System.Xml)
ToString
Description
Represents a CDATA section.
CDATA sections are used to quote or escape blocks of text to keep that text from being interpreted as markup language.
XmlCDataSection
Example Syntax:
ToString
[C#] protected internal XmlCDataSection(string data, XmlDocument doc);
[C++] internal: XmlCDataSection(String* data, XmlDocument* doc);
[VB] Protected Friend Sub New(ByVal data As String, ByVal doc As XmlDocument)
[JScript] package function XmlCDataSection(data: String, doc: XmlDocument);
Description
Attributes
BaseURI
ChildNodes
Data
FirstChild
HasChildNodes
InnerText
InnerXml
IsReadOnly
Item
Item
LastChild
Length
LocalName
ToString
Description
Gets the local name of the node.
Name
ToString
[C#] public override string Name {get;}
[C++] public: _property virtual String* get_Name( );
[VB] Overrides Public ReadOnly Property Name As String
[JScript] public function get Name( ): String;
Description
Gets the qualified name of the node.
NamespaceURI
NextSibling
NodeType
ToString
Description
Gets the type of the current node.
OuterXml
OwnerDocument
ParentNode
Prefix
PreviousSibling
Value
CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;

Description
   Creates a duplicate of this node.
Return Value: The cloned node.
   CloneNode serves as a copy constructor for nodes. For CDATA nodes, the cloned node always includes the data content. To see how this method behaves with other node types, see System.Xml.XmlNode.CloneNode(System.Boolean) method in the XmlNode class. true to recursively clone the subtree under the specified node; false to clone only the node itself.
   WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
   Saves the node to the specified System.Xml.XmlWriter. The XmlWriter to which you want to save.
   WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
   Saves the node to the specified System.Xml.XmlWriter. The XmlWriter to which you want to save.
   XmlCharacterData class (System.Xml)
   WriteTo
Description
   Provides text-manipulation methods that are used by several classes. This class is abstract.
   XmlCharacterData
   Example Syntax:
   WriteTo
[C#] protected internal XmlCharacterData(string data, XmlDocument doc);
[C++] internal: XmlCharacterData(String* data, XmlDocument* doe);
[VB] Protected Friend Sub New(ByVal data As String, ByVal doc As XmlDocument)
[JScript] package function XmlCharacterData(data: String, doc: XmlDocument);
Description
   Attributes
   BaseURI
   ChildNodes
   Data
   WriteTo
Description
   Contains this node's data.
   FirstChild
   HasChildNodes
   InnerText
   WriteTo
Description
   Gets or sets the concatenated values of the node and all its children.
   InnerXml
   IsReadOnly
   Item
   Item
   LastChild
   Length
   WriteTo Description
   Gets the length of the data, in characters.
   LocalName
   Name
   NamespaceURI
   NextSibling
   NodeType
   OuterXml
   OwnerDocument
   ParentNode
   Prefix
   PreviousSibling
   Value
   WriteTo
Description
   Gets or sets the value of the node.
   AppendData
[C#] public virtual void AppendData(string strData);
[C++] public: virtual void AppendData(String* strData);
[VB] Overridable Public Sub AppendData(ByVal strData As String)
[JScript] public function AppendData(strData: String);
Description
   Appends the specified string to the end of the character data of the node.
   When overriding AppendData in a derived class, in order for events to be fired correctly, you must call the base class's AppendData method. String data that is to be inserted into the existing string.
   DecideXPNodeTypeForTextNodes
[C#] protected internal bool DecideXPNodeTypeForTextNodes(XmlNode node, ref XPathNodeType xnt);
[C++] protected public: bool DecideXPNodeTypeForTextNodes(XmlNode* node, XPathNodeType* xnt);
[VB] Protected Friend Dim Function DecideXPNodeTypeForTextNodes(ByVal node As XmlNode, ByRef xnt As XPathNodeType) As Boolean
[JScript] package function DecideXPNodeTypeForTextNodes(node: XmlNode, xnt: XPathNodeType): Boolean;
Description
   DeleteData
[C#] public virtual void DeleteData(int offset, int count);
[C++] public: virtual void DeleteData(int offset, int count);
[VB] Overridable Public Sub DeleteData(ByVal offset As Integer, ByVal count As Integer)
[JScript] public function DeleteData(offset: int, count: int);
Description
   Remove a range of characters from the node.
   When overriding DeleteData in a derived class, in order for events to be fired correctly, you must call the base class's DeleteData method. Offset, in characters, at which to start deleting string data. Number of characters to delete.
   InsertData
[C#] public virtual void InsertData(int offset, string strData);
[C++] public: virtual void InsertData(int offset, String* strData);
[VB] Overridable Public Sub InsertData(ByVal offset As Integer, ByVal strData As String)
[JScript] public function InsertData(offset: int, strData: String);
Description
   Insert the specified string at the specified character offset.
   When overriding InsertData in a derived class, in order for events to be fired correctly, you must call the base class's InsertData method. Offset, in characters, at which to insert the supplied string data. String data that is to be inserted into the existing string.

ReplaceData
[C#] public virtual void ReplaceData(int offset, int count, string strData);
[C++] public: virtual void ReplaceData(int offset, int count, String* strData);
[VB] Overridable Public Sub ReplaceData(ByVal offset As Integer, ByVal count As Integer, ByVal strData As String)
[JScript] public function ReplaceData(offset: int, count: int, strData: String);
Description
  Replace the specified number of characters starting at the specified offset with the specified string.
  When overriding ReplaceData in a derived class, in order for events to be fired correctly, you must call the base class's ReplaceData method. Offset, in characters, at which to start replacing string data. Number of characters to replace. New data that replaces the old string data.
    Substring
[C#] public virtual string Substring(int offset, int count);
[C++] public: virtual String* Substring(int offset, int count);
[VB] Overridable Public Function Substring(ByVal offset As Integer, ByVal count As Integer) As String
[JScript] public function Substring(offset: int, count: int): String;
Description
  Retrieves a substring of the full string from the specified range. Offset, in characters, from the beginning of the string. An offset of zero indicates copying from the start of the data. Number of characters to retrieve from the specified offset.
    XmlComment class (System.Xml)
    WriteTo
Description
  Represents the content of an XML comment.
    XmlComment
    Example Syntax:
    WriteTo
[C#] protected internal XmlComment(string comment, XmlDocument doc);
[C++] internal: XmlComment(String* comment, XmlDocument* doc);
[VB] Protected Friend Sub New(ByVal comment As String, ByVal doc As XmlDocument)
[JScript] package function XmlComment(comment: String, doc: XmlDocument);
Description
  Attributes
  BaseURI
  ChildNodes
  Data
  FirstChild
  HasChildNodes
  InnerText
  InnerXml
  IsReadOnly
  Item
  Item
  LastChild
  Length
  LocalName
  WriteTo
Description
  Gets the local name of the node.
    Name
    WriteTo
[C#] public override string Name {get;}
[C++] public: _property virtual String* get_Name( );
[VB] Overrides Public ReadOnly Property Name As String
[JScript] public function get Name( ): String;
Description
  Gets the qualified name of the node.
    NamespaceURI
    NextSibling
    NodeType
    WriteTo
Description
  Gets the type of the current node.
    OuterXml
    OwnerDocument
    ParentNode
    Prefix
    PreviousSibling
    Value
    CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
  Creates a duplicate of this node.
Return Value: The cloned node.
  CloneNode serves as a copy constructor for nodes. For comment nodes, the cloned node always includes the text content. To see how this method behaves with other node types, see System.Xml.XmlNode.CloneNode(System.Boolean) method in the XmlNode class. true to recursively clone the subtree under the specified node; false to clone only the node itself.
    WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
  Saves all the children of the node to the specified System.Xml.XmlWriter. The XmlWriter to which you want to save.
    WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
  Saves the node to the specified System.Xml.XmlWriter. The XmlWriter to which you want to save.
    XmlConvert class (System.Xml)
    WriteTo
Description
  Encodes and decodes XML names and provides methods for converting between CLR types and XSD types.
    XmlConvert
    Example Syntax:
    WriteTo
[C#] public XmlConvert( );
[C++] public: XmlConvert( );
[VB] Public Sub New( )
[JScript] public function XmlConvert( );
    DecodeName
[C#] public static string DecodeName(string name);
[C++] public: static String* DecodeName(String* name);

[VB] Public Shared Function DecodeName(ByVal name As String) As String
[JScript] public static function DecodeName(name: String): String;
Description
　Transforms an XML name into an ADO.NET object name (such as DataTable or DataColumn).
　Decoding: When the method transforms an XML name into an ADO.NET object name, the decoding step follows the following rules: Names are decoded from left to right. The name to be transformed.
　　EncodeLocalName
[C#] public static string EncodeLocalName(string name);
[C++] public: static String* EncodeLocalName(String* name);
[VB] Public Shared Function EncodeLocalName(ByVal name As String) As String
[JScript] public static function EncodeLocalName(name: String): String;
Description
　Converts names, such as DataTable or DataColumn names, that contain characters that are not permitted in XML names to valid names.
Return Value: The encoded name.
　This method is the same as System.Xml.XmlConvert.EncodeName(System.String) except it also encodes the colon character, guaranteeing that this can be used as the LocalName part of a namespace qualified name. The name to be encoded.
　　EncodeName
[C#] public static string EncodeName(string name);
[C++] public: static String* EncodeName(String* name);
[VB] Public Shared Function EncodeName(ByVal name As String) As String
[JScript] public static function EncodeName(name: String): String;
Description
　Converts names, such as DataTable or DataColumn names, that contain characters that are not permitted in XML names to valid names.
Return Value: Returns the name with any invalid characters replaced by an escape string.
　This method translates invalid characters, such as spaces or half-width Katakana, that need to be mapped to XML names without the support or presence of schemas. The invalid characters are translated into escaped numeric entity encodings. A name to be translated.
　　EncodeNmToken
[C#] public static string EncodeNmToken(string name);
[C++] public: static String* EncodeNmToken(String* name);
[VB] Public Shared Function EncodeNmToken(ByVal name As String) As String
[JScript] public static function EncodeNmToken(name: String): String;
Description
　Verifies the name is valid according to the XML spec.
Return Value: The encoded name.
　This method guarantees the name is valid according to the XML spec. For example, if you passed this method the invalid name "70+", it would return "a_x003a_b" which is a valid XML name. The name to be encoded.
　　ToBoolean
[C#] public static bool ToBoolean(string s);
[C++] public: static bool ToBoolean(String* s);
[VB] Public Shared Function ToBoolean(ByVal s As String) As Boolean
[JScript] public static function ToBoolean(s: String): Boolean;
Description
　Converts the System.String to a System.Boolean equivalent.
Return Value: A Boolean value (i.e true or false).
　Valid strings are "1" or "true" for true and "0" or "false" for false. The string to convert.
　　ToByte
[C#] public static byte ToByte(string s);
[C++] public: static unsigned char ToByte(String* s);
[VB] Public Shared Function ToByte(ByVal s As String) As Byte
[JScript] public static function ToByte(s: String): Byte;
Description
　Converts the System.String to a System.Byte equivalent.
Return Value: A Byte equivalent of the string. The string to convert.
　　ToChar
[C#] public static char ToChar(string s);
[C++] public: static _wchar_t ToChar(String* s);
[VB] Public Shared Function ToChar(ByVal s As String) As Char
[JScript] public static function ToChar(s: String): Char;
Description
　Converts the System.String to a System.Char equivalent.
Return Value: A Char representing the first character in the string. The string to convert.
　　ToDateTime
[C#] public static DateTime ToDateTime(string s);
[C++] public: static DateTime ToDateTime(String* s);
[VB] Public Shared Function ToDateTime(ByVal s As String) As DateTime
[JScript] public static function ToDateTime(s: String): DateTime; Converts the System.String to a System.DateTime equivalent.
Description
　Converts the System.String to a System.DateTime equivalent.
Return Value: A DateTime equivalent of the string. The string to convert.
　　ToDateTime
[C#] public static DateTime ToDateTime(string s, string format);
[C++] public: static DateTime ToDateTime(String* s, String* format);
[VB] Public Shared Function ToDateTime(ByVal s As String, ByVal format As String) As DateTime
[JScript] public static function ToDateTime(s: String, format: String): DateTime;
Description
　Converts the System.String to a System.DateTime equivalent.
Return Value: A DateTime equivalent of the string. The string to convert. The format structure to apply to the converted DateTime. Valid formats include "yyyy-MM-ddTHH:mm:sszzzzzz" and its subsets. The string is validated against this format.
　　ToDateTime
[C#] public static DateTime ToDateTime(string s, string[ ] formats);
[C++] public: static DateTime ToDateTime(String* s, String* formats _gc[ ]);
[VB] Public Shared Function ToDateTime(ByVal s As String, ByVal formats( ) As String) As DateTime
[JScript] public static function ToDateTime(s: String, formats: String[ ]): DateTime;

Description
  Converts the System.String to a System.DateTime equivalent.
Return Value: A DateTime equivalent of the string.
  This method allows multiple formats for the string to be validated against. The string to convert. An array containing the format structures to apply to the converted DateTime. Valid formats include "yyyy-MM-ddTHH:mm:sszzzzzz" and its subsets.
  ToDecimal
[C#] public static decimal ToDecimal(string s);
[C++] public: static Decimal ToDecimal(String* s);
[VB] Public Shared Function ToDecimal(ByVal s As String) As Decimal
[JScript] public static function ToDecimal(s: String): Decimal;
Description
  Converts the System.String to a System.Decimal equivalent.
Return Value: A Decimal equivalent of the string. The string to convert.
  ToDouble
[C#] public static double ToDouble(string s);
[C++] public: static double ToDouble(String* s);
[VB] Public Shared Function ToDouble(ByVal s As String) As Double
[JScript] public static function ToDouble(s: String): double;
Description
  Converts the System.String to a System.Double equivalent.
Return Value: A Double equivalent of the string.
  If s is INF or –INF, this method returns Double.PositiveInfinity or Double.NegativeInfinity respectively. The string to convert.
  ToGuid
[C#] public static Guid ToGuid(string s);
[C++] public: static Guid ToGuid(String* s);
[VB] Public Shared Function ToGuid(ByVal s As String) As Guid
[JScript] public static function ToGuid(s: String): Guid;
Description
  Converts the System.String to a System.Guid equivalent.
Return Value: A Guid equivalent of the string. The string to convert.
  ToInt16
[C#] public static short ToInt16(string s);
[C++] public: static short ToInt16(String* s);
[VB] Public Shared Function ToInt16(ByVal s As String) As Short
[JScript] public static function ToInt16(s: String): Int16;
Description
  Converts the System.String to a System.Int16 equivalent.
Return Value: A Int16 equivalent of the string. The string to convert.
  ToInt32
[C#] public static int ToInt32(string s);
[C++] public: static int ToInt32(String* s);
[VB] Public Shared Function ToInt32(ByVal s As String) As Integer
[JScript] public static function ToInt32(s: String): int;
Description
  Converts the System.String to a System.Int32 equivalent.
Return Value: A Int32 equivalent of the string. The string to convert.
  ToInt64
[C#] public static long ToInt64(string s);
[C++] public: static _int64 ToInt64(String* s);
[VB] Public Shared Function ToInt64(ByVal s As String) As Long
[JScript] public static function ToInt64(s: String): long;
Description
  Converts the System.String to a System.Int64 equivalent.
Return Value: A Int64 equivalent of the string. The string to convert.
  ToSByte
[C#] public static sbyte ToSByte(string s);
[C++] public: static char ToSByte(String* s);
[VB] Public Shared Function ToSByte(ByVal s As String) As SByte
[JScript] public static function ToSByte(s: String): SByte;
Description
  Converts the System.String to a System.SByte equivalent.
Return Value: A SByte equivalent of the string. The string to convert.
  ToSingle
[C#] public static float ToSingle(string s);
[C++] public: static float ToSingle(String* s);
[VB] Public Shared Function ToSingle(ByVal s As String) As Single
[JScript] public static function ToSingle(s: String): float;
Description
  Converts the System.String to a System.Single equivalent.
Return Value: A Single equivalent of the string.
  If s is INF or –INF, this method returns Single.PositiveInfinity or Single.NegativeInfinity respectively. The string to convert.
  ToString
[C#] public static string ToString(bool value);
[C++] public: static String* ToString(bool value);
[VB] Public Shared Function ToString(ByVal value As Boolean) As String
[JScript] public static function ToString(value: Boolean): String; Converts strongly typed data to an equivalent System.String representation.
Description
  Converts the System.Boolean to a System.String.
Return Value: A string representation of the Boolean (i.e "true" or "false"). The value to convert.
  ToString
[C#] public static string ToString(byte value);
[C++] public: static String* ToString(unsigned char value);
[VB] Public Shared Function ToString(ByVal value As Byte) As String
[JScript] public static function ToString(value: Byte): String;
Description
  Converts the System.Byte to a System.String.
Return Value: A string representation of the Byte. The value to convert.
  ToString
[C#] public static string ToString(char value);
[C++] public: static String* ToString(_wchar_t value);
[VB] Public Shared Function ToString(ByVal value As Char) As String
[JScript] public static function ToString(value: Char): String;
Description
  Converts the System.Char to a System.String.
Return Value: A string representation of the Char. The value to convert.
  ToString
[C#] public static string ToString(DateTime value);
[C++] public: static String* ToString(DateTime value);
[VB] Public Shared Function ToString(ByVal value As DateTime) As String

[JScript] public static function ToString(value: DateTime): String;
Description
  Converts the System.DateTime to a System.String.
Return Value: A string representation of the DateTime in the format yyyy-MM-ddTHH:mm:ss where 'T' is a constant literal. The value to convert.
  ToString
[C#] public static string ToString(decimal value);
[C++] public: static String* ToString(Decimal value);
[VB] Public Shared Function ToString(ByVal value As Decimal) As String
[JScript] public static function ToString(value: Decimal): String;
Description
  Converts the System.Decimal to a System.String.
Return Value: A string representation of the Decimal. The value to convert.
  ToString
[C#] public static string ToString(double value);
[C++] public: static String* ToString(double value);
[VB] Public Shared Function ToString(ByVal value As Double) As String
[JScript] public static function ToString(value: double): String;
Description
  Converts the System.Double to a System.String.
Return Value: A string representation of the Double.
  If value is Double.PositiveInfinity or Double.NegativeInfinity, this method returns the string INF or -INF respectively. The value to convert.
  ToString
[C#] public static string ToString(Guid value);
[C++] public: static String* ToString(Guid value);
[VB] Public Shared Function ToString(ByVal value As Guid) As String
[JScript] public static function ToString(value: Guid): String;
Description
  Converts the System.Guid to a System.String.
Return Value: A string representation of the Guid. The value to convert.
  ToString
[C#] public static string ToString(short value);
[C++] public: static String* ToString(short value);
[VB] Public Shared Function ToString(ByVal value As Short) As String
[JScript] public static function ToString(value: Int16): String;
Description
  Converts the System.Int16 to a System.String.
Return Value: A string representation of the Int16. The value to convert.
  ToString
[C#] public static string ToString(int value);
[C++] public: static String* ToString(int value);
[VB] Public Shared Function ToString(ByVal value As Integer) As String
[JScript] public static function ToString(value: int): String;
Description
  Converts the System.Int32 to a System.String.
Return Value: A string representation of the Int32. The value to convert.
  ToString
[C#] public static string ToString(long value);
[C++] public: static String* ToString(_int64 value);
[VB] Public Shared Function ToString(ByVal value As Long) As String
[JScript] public static function ToString(value: long): String;

Description
  Converts the System.Int64 to a System.String.
Return Value: A string representation of the Int64. The value to convert.
  ToString
[C#] public static string ToString(sbyte value);
[C++] public: static String* ToString(char value);
[VB] Public Shared Function ToString(ByVal value As SByte) As String
[JScript] public static function ToString(value: SByte): String;
Description
  Converts the System.SByte to a System.String.
Return Value: A string representation of the SByte. The value to convert.
  ToString
[C#] public static string ToString(float value);
[C++] public: static String* ToString(float value);
[VB] Public Shared Function ToString(ByVal value As Single) As String
[JScript] public static function ToString(value: float): String;
Description
  Converts the System.Single to a System.String.
Return Value: A string representation of the Single.
  If value is Single.PositiveInfinity or Single.NegativeInfinity, this method returns the string INF or -INF respectively. The value to convert.
  ToString
[C#] public static string ToString(TimeSpan value);
[C++] public: static String* ToString(TimeSpan value);
[VB] Public Shared Function ToString(ByVal value As TimeSpan) As String
[JScript] public static function ToString(value: TimeSpan): String;
Description
  Converts the System.TimeSpan to a System.String.
Return Value: A string representation of the TimeSpan. The value to convert.
  ToString
[C#] public static string ToString(u short value);
[C++] public: static String* ToString(unsigned short value);
[VB] Public Shared Function ToString(ByVal value As UInt16) As String
[JScript] public static function ToString(value: UInt16): String;
Description
  Converts the System.UInt16 to a System.String.
Return Value: A string representation of the UInt16. The value to convert.
  ToString
[C#] public static string ToString(u int value);
[C++] public: static String* ToString(unsigned int value);
[VB] Public Shared Function ToString(ByVal value As UInt32) As String
[JScript] public static function ToString(value: UInt32): String;
Description
  Converts the System.UInt32 to a System.String.
Return Value: A string representation of the UInt32. The value to convert.
  ToString
[C#] public static string ToString(ulong value);
[C++] public: static String* ToString(unsigned _int64 value);
[VB] Public Shared Function ToString(ByVal value As UInt64) As String
[JScript] public static function ToString(value: UInt64): String;

Description
  Converts the System.UInt64 to a System.String.
Return Value: A string representation of the UInt64. The value to convert.
  ToString
[C#] public static string ToString(DateTime value, string format);
[C++] public: static String* ToString(DateTime value, String* format);
[VB] Public Shared Function ToString(ByVal value As DateTime, ByVal format As String) As String
[JScript] public static function ToString(value: DateTime, format: String): String;
Description
  Converts the System.DateTime to a System.String.
Return Value: A string representation of the DateTime in the specified format. The value to convert. The format structure that defines how to display the converted string. Valid formats include "yyyy-MM-ddTHH:mm:sszzzzzz" and its subsets.
  ToTimeSpan
[C#] public static TimeSpan ToTimeSpan(string s);
[C++] public: static TimeSpan ToTimepan(String* s);
[VB] Public Shared Function ToTimeSpan(ByVal s As String) As TimeSpan
[JScript] public static function ToTimeSpan(s: String): TimeSpan;
Description
  Converts the System.String to a System.TimeSpan equivalent.
Return Value: A TimeSpan equivalent of the string. The string to convert.
  ToUInt16
[C#] public static ushort ToUInt16(string s);
[C++] public: static unsigned short ToUInt16(String* s);
[VB] Public Shared Function ToUInt16(ByVal s As String) As UInt16
[JScript] public static function ToUInt16(s: String): UInt16;
Description
  Converts the System.String to a System.UInt16 equivalent.
Return Value: A UInt16 equivalent of the string. The string to convert.
  ToUInt32
[C#] public static uint ToUInt32(string s);
[C++] public: static unsigned int ToUInt32(String* s);
[VB] Public Shared Function ToUInt32(ByVal s As String) As UInt32
[JScript] public static function ToUInt32(s: String): UInt32;
Description
  Converts the System.String to a System.UInt32 equivalent.
Return Value: A UInt32 equivalent of the string. The string to convert.
  ToUInt64
[C#] public static ulong ToUInt64(string s);
[C++] public: static unsigned _int64 ToUInt64(String* s);
[VB] Public Shared Function ToUInt64(ByVal s As String) As UInt64
[JScript] public static function ToUInt64(s: String): UInt64;
Description
  Converts the System.String to a System.UInt64 equivalent.
Return Value: A UInt64 equivalent of the string. The string to convert.
  XmlDeclaration class (System.Xml)
  ToUInt64
Description
  Represents the XML declaration node:
  XmlDeclaration
  Example Syntax:
  ToUInt64

[C#] protected internal XmlDeclaration(string version, string encoding, string standalone, XmlDocument doc);
[C++] internal: XmlDeclaration(String* version, String* encoding, String* standalone, XmlDocument* doc);
[VB] Protected Friend Sub New(ByVal version As String, ByVal encoding As String, ByVal standalone As String, ByVal doc As XmlDocument)
[JScript] package function XmlDeclaration(version: String, encoding: String, standalone: String, doc: XmlDocument);
Description
  Attributes
  BaseURI
  ChildNodes
  Encoding
  ToUInt64
Description
  Gets or sets the encoding level of the XML document.
  Unlike most XML attributes, encoding attribute values are not case sensitive. This is because encoding character names follow ISO and Internet Assigned Numbers Authority (IANA) standards.
  FirstChild
  HasChildNodes
  InnerText
  ToUInt64
Description
  Gets or sets the concatenated values of the XmlDeclaration.
  InnerXml
  IsReadOnly
  Item
  Item
  LastChild
  LocalName
  ToUInt64
Description
  Gets the local name of the node.
  Name
  ToUInt64
[C#] public override string Name {get;}
[C++] public: _property virtual String* get_Name( );
[VB] Overrides Public ReadOnly Property Name As String
[JScript] public function get Name( ): String;
Description
  Gets the qualified name of the node.
  NamespaceURI
  NextSibling
  NodeType
  ToUInt64
Description
  Gets the type of the current node.
  OuterXml
  OwnerDocument
  ParentNode
  Prefix
  PreviousSibling
  Standalone
  ToUInt64
Description
  Gets or sets the value of the standalone attribute.
  Value
  ToUInt64
[C#] public override string Value {get; set;}
[C++] public: _property virtual String* get_Value( );public: _property virtual void set_Value(String*);
[VB] Overrides Public Property Value As String

[JScript] public function get Value( ): String;public function set Value(String);
Description
  Gets or sets the value of the XmlDeclaration.
  Version
  ToUInt64
[C#] public string Version {get;}
[C++] public: _property String* get_Version( );
[VB] Public ReadOnly Property Version As String
[JScript] public function get Version( ): String;
Description
  Gets the XML version of the document.
  CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
  Creates a duplicate of this node.
  Return Value: The cloned node.
  CloneNode serves as a copy constructor for nodes. For XmlDeclaration nodes, the cloned node always includes the data value. To see how this method behaves with other node types, see System.Xml.XmlNode.CloneNode(System.Boolean) method in the XmlNode class. true to recursively clone the subtree under the specified node; false to clone only the node itself.
  WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
  Saves the children of the node to the specified System.Xml.XmlWriter. The XmlWriter to which you want to save.
  WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
  Saves the node to the specified System.Xml.XmlWriter. The XmlWriter to which you want to save.
  XmlDocument class (System.Xml)
  WriteTo
Description
  Represents an XML document.
  This class implements the W3C Document Object Model (DOM) Level 1 Core and the Core DOM Level 2. The DOM is an in-memory (cache) tree representation of an XML document and enables the navigation and editing of this document. Because XmlDocument implements the System.Xml.XPath.IXPathNavigable interface it can also be used as the source document for the System.Xml.Xsl.XslTransform class.
  XmlDocument
  Example Syntax:
  WriteTo
[C#] public XmlDocument( );
[C++] public: XmlDocument( );
[VB] Public Sub New( )
[JScript] public function XmlDocument( ); Initializes a new instance of the XmlDocument class.
Description
  Initializes a new instance of the XmlDocument class.
  XmlDocument
  Example Syntax:
  WriteTo
[C#] protected internal XmlDocument(XmlImplementation imp);
[C++] internal: XmlDocument(XmlImplementation* imp);
[VB] Protected Friend Sub New(ByVal imp As XmlImplementation)
[JScript] package function XmlDocument(imp: XmlImplementation);
Description
  Initializes a new instance of the XmlDocument class with the specified System.Xml.XmlImplementation. The XmlImplementation to use.
  XmlDocument
  Example Syntax:
  WriteTo
[C#] public XmlDocument(XmlNameTable nt);
[C++] public: XmlDocument(XmlNameTable* nt);
[VB] Public Sub New(ByVal nt As XmlNameTable)
[JScript] public function XmlDocument(nt: XmlNameTable);
Description
  Initializes a new instance of the XmlDocument class with the specified System.Xml.XmlNameTable. The XmlNameTable to use.
  Attributes
  BaseURI
  WriteTo
Description
  Gets the base URI of the current node.
  A networked XML document is comprised of chunks of data aggregated using various W3C standard inclusion mechanisms and therefore contains nodes that come from different places. The BaseURI tells you where these nodes came from.
  ChildNodes
  DocumentElement
  WriteTo
Description
  Gets the root System.Xml.XmlElement for the document.
  DocumentType
  WriteTo
[C#] public virtual XmlDocumentType DocumentType {get;}
[C++] public: _property virtual XmlDocumentType* get_DocumentType( );
[VB] Overridable Public ReadOnly Property DocumentType As XmlDocumentType
[JScript] public function get DocumentType( ): XmlDocumentType;
Description
  Gets the node containing the DOCTYPE declaration.
  An XmlDocument may have one and only one child with System.Xml.XmlNodeType equal to DocumentType.
  FirstChild
  HasChildNodes
  Implementation
  WriteTo
Description
  Gets the System.Xml.XmlImplementation object for the current document.

XmlDocument objects created from the same XmlImplementation share the same System.Xml.XmlNameTable. This allows users to compare attribute and element names as objects rather than strings.
    InnerText
    InnerXml
    WriteTo
Description
    Gets or sets the markup representing just the children of this node.
    This is also settable which replaces the children of the node with the parsed contents of the given string. The parsing is done in the current namespace context.
    IsReadOnly
    WriteTo
[C#] public override bool IsReadOnly {get;}
[C++] public: _property virtual bool get_IsReadOnly( );
[VB] Overrides Public ReadOnly Property IsReadOnly As Boolean
[JScript] public function get IsReadOnly( ): Boolean;
Description
    Gets a value indicating whether the current node is read-only.
    A read-only node is one whose properties, attributes, or children cannot be changed. You can remove a read-only node from the tree and insert it somewhere else.
    Item
    Item
    LastChild
    LocalName
    WriteTo
Description
    Gets the local name of the node.
    The local name returned depends on the System.Xml.XmlDocument.NodeType of the node. To see a table describing the local name returned for each of the node types, see the System.Xml.XmlNode.LocalName property in the System.Xml.XmlNode class.
    Name
    WriteTo
[C#] public override string Name {get;}
[C++] public: _property virtual String* get_Name( );
[VB] Overrides Public ReadOnly Property Name As String
[JScript] public function get Name( ): String;
Description
    Gets the qualified name of the node.
    The name returned depends on the System.Xml.XmlDocument.NodeType of the node. To see a table describing the name returned for each of the node types, see the System.Xml.XmlNode.Name property in the System.Xml.XmlNode class.
    NamespaceURI
    NameTable
    WriteTo
Description
    Gets the System.Xml.XmlNameTable associated with this implementation.
    Each XmlDocument object has a System.Xml.NameTable object. Element and attribute names are stored in the NameTable as atomized strings. This means that even if a name is referenced in the document multiple times it is stored only once in the NameTable. For example, if the document had multiple elements with the name "Customer", NameTable returns the same object whenever it receives a request for that name. As a result, users can write code using object pointer comparisons on these strings rather than the more expensive string comparisons.
    NextSibling
    NodeType
    WriteTo
Description
    Gets the type of the current node.
    OuterXml
    OwnerDocument
    WriteTo
Description
    Gets the System.Xml.XmlDocument to which the current node belongs.
    ParentNode
    Prefix
    PreserveWhitespace
    WriteTo
Description
    Gets or sets a value indicating whether to preserve whitespace.
    PreviousSibling
    Value
    XmlResolver
    WriteTo
Description
    Sets the System.Xml.XmlResolver to use for resolving external resources.
    The XmlResolver can be used to load DTDs or expand entity references. Using the System.Xml.XmlResolver.Credentials property, you can set credentials on the XmlResolver to access resources stored on a secure network resource.
    WriteTo
[C#] public event XmlNodeChangedEventHandler NodeChanged;
[C++] public: _event XmlNodeChangedEventHandler* NodeChanged;
[VB] Public Event NodeChanged As XmlNodeChangedEventHandler
Description
    Occurs when the System.Xml.XmlNode.Value of a node belonging to this document has been changed.
    This event only applies to nodes that have a value.
    WriteTo
[C#] public event XmlNodeChangedEventHandler NodeChanging;
[C++] public: _event XmlNodeChangedEventHandler* NodeChanging;
[VB] Public Event NodeChanging As XmlNodeChangedEventHandler
Description
    Occurs when the System.Xml.XmlNode.Value of a node belonging to this document is about to be changed.
    This event allows the user to do extra checking and, if necessary, throw an exception to stop the operation. If an exception is thrown the XmlDocument returns to its original state. This event only applies to nodes that have a value.
    WriteTo
[C#] public event XmlNodeChangedEventHandler NodeInserted;
[C++] public: _event XmlNodeChangedEventHandler* NodeInserted;
[VB] Public Event NodeInserted As XmlNodeChangedEventHandler
Description
    Occurs when a node belonging to this document has been inserted into another node.
    All nodes created by this document, whether or not they have been inserted into the document, are included in this event.

WriteTo
[C#] public event XmlNodeChangedEventHandler NodeInserting;
[C++] public: _event XmlNodeChangedEventHandler* NodeInserting;
[VB] Public Event NodeInserting As XmlNodeChangedEventHandler
Description
Occurs when a node belonging to this document is about to be inserted into another node.
This event allows the user to do extra checking and, if necessary, throw an exception to stop the operation. If an exception is thrown the XmlDocument returns to its original state.
WriteTo
[C#] public event XmlNodeChangedEventHandler NodeRemoved;
[C++] public: _event XmlNodeChangedEventHandler* NodeRemoved;
[VB] Public Event NodeRemoved As XmlNodeChangedEventHandler
Description
Occurs when a node belonging to this document has been removed from its parent.
All nodes created by this document, whether or not they have been inserted into the document, are included in this event.
WriteTo
[C#] public event XmlNodeChangedEventHandler NodeRemoving;
[C++] public: _event XmlNodeChangedEventHandler* NodeRemoving;
[VB] Public Event NodeRemoving As XmlNodeChangedEventHandler
Description
Occurs when a node belonging to this document is about to be removed from the document.
This event allows the user to do extra checking and, if necessary, throw an exception to stop the operation. If an exception is thrown the XmlDocument returns to its original state.
CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
Creates a duplicate of this node.
Return Value: The cloned XmlDocument node.
This method serves as a copy constructor for nodes. The cloned node has no parent (System.Xml.XmlNode.ParentNode returns null). true to recursively clone the subtree under the specified node; false to clone only the node itself.
CreateAttribute
[C#] public XmlAttribute CreateAttribute(string name);
[C++] public: XmlAttribute* CreateAttribute(String* name);
[VB] Public Function CreateAttribute(ByVal name As String) As XmlAttribute
[JScript] public function CreateAttribute(name: String): XmlAttribute; Creates an System.Xml.XmlAttribute with the specified name.
Description
Creates an System.Xml.XmlAttribute with the specified System.Xml.XmlDocument.Name.
Return Value: The new XmlAttribute.

The XmlAttribute can be added to an System.Xml.XmlElement using the System.Xml.XmlElement.SetAttributeNode(System.Xml.XmlAttribute) method. The qualified name of the attribute. If the name contains a colon, the System.Xml.XmlNode.Prefix property reflects the part of the name preceding the first colon and the System.Xml.XmlDocument.LocalName property reflects the part of the name following the first colon. The System.Xml.XmlNode.NamespaceURI remains empty unless the prefix is a recognized built-in prefix such as xmlns. In this case NamespaceURI has a value of http://www.w3.org/2000/xmlns/.
CreateAttribute
[C#] public XmlAttribute CreateAttribute(string qualifiedName, string namespaceURI);
[C++] public: XmlAttribute* CreateAttribute(String* qualifiedName, String* namespaceURI);
[VB] Public Function CreateAttribute(ByVal qualifiedName As String, ByVal namespaceURI As String) As XmlAttribute
[JScript] public function CreateAttribute(qualifiedName: String, namespaceURI: String): XmlAttribute;
Description
Creates an System.Xml.XmlAttribute with the specified qualified name and System.Xml.XmlNode.NamespaceURI.
Return Value: The new XmlAttribute.
The XmlAttribute can be added to an System.Xml.XmlElement using the System.Xml.XmlElement.SetAttributeNode(System.Xml.XmlAttribute) method. The qualified name of the attribute. If the name contains a colon then the System.Xml.XmlNode.Prefix property will reflect the part of the name preceding the colon and the System.Xml.XmlDocument.LocalName property will reflect the part of the name after the colon. The namespaceURI of the attribute. If the qualified name includes a prefix of xmlns, then this parameter must be http://www.w3.org/2000/xmlns/.
CreateAttribute
[C#] public virtual XmlAttribute CreateAttribute(string prefix, string localName, string namespaceURI);
[C++] public: virtual XmlAttribute* CreateAttribute(String* prefix, String* localName, String* namespaceURI);
[VB] Overridable Public Function CreateAttribute(ByVal prefix As String, ByVal localName As String, ByVal namespaceURI As String) As XmlAttribute
[JScript] public function CreateAttribute(prefix: String, localName: String, namespaceURI: String): XmlAttribute;
Description
Creates an System.Xml.XmlAttribute with the specified System.Xml.XmlNode.Prefix, System.Xml.XmlDocument.LocalName, and System.Xml.XmlNode.NamespaceURI.
Return Value: The new XmlAttribute.
The XmlAttribute can be added to an System.Xml.XmlElement using the System.Xml.XmlElement.SetAttributeNode(System.Xml.XmlAttribute) method. The prefix of the attribute (if any). String.Empty and null are equivalent. The local name of the attribute. The namespace URI of the attribute (if any). String.Empty and null are equivalent. If prefix is xmlns, then this parameter must be http://www.w3.org/2000/xmlns/; otherwise an exception is thrown.
CreateCDataSection
[C#] public virtual XmlCDataSection CreateCDataSection(string data);
[C++] public: virtual XmlCDataSection* CreateCDataSection(String* data);
[VB] Overridable Public Function CreateCDataSection(ByVal data As String) As XmlCDataSection
[JScript] public function CreateCDataSection(data: String): XmlCDataSection;

Description
Creates an System.Xml.XmlCDataSection containing the specified data.
Return Value: The new XmlCDataSection.
Although this method creates the new object in the context of the document, it does not automatically add the new object to the document tree. To add the new object, you must explicitly call one of the node insert methods. The content of the new XmlCDataSection.
CreateComment
[C#] public virtual XmlComment CreateComment(string data);
[C++] public: virtual XmlComment* CreateComment (String* data);
[VB] Overridable Public Function CreateComment(ByVal data As String) As XmlComment
[JScript] public function CreateComment(data: String): XmlComment;
Description
Creates an System.Xml.XmlComment containing the specified data.
Return Value: The new XmlComment.
Although this method creates the new object in the context of the document, it does not automatically add the new object to the document tree. To add the new object, you must explicitly call one of the node insert methods. The content of the new XmlComment.
CreateDefaultAttribute
[C#] protected internal virtual XmlAttribute CreateDefaultAttribute(string prefix, string localName, string namespaceURI);
[C++] protected public: virtual XmlAttribute* CreateDefaultAttribute(String* prefix, String* localName, String* namespaceURI);
[VB] Overridable Protected Friend Dim Function CreateDefaultAttribute(ByVal prefix As String, ByVal localName As String, ByVal namespaceURI As String) As XmlAttribute
[JScript] package function CreateDefaultAttribute(prefix: String, localName String, namespaceURI: String): XmlAttribute;
Description
Creates a default attribute with the specified prefix, local name and namespace URI.
Return Value: The new System.Xml.XmlAttribute. The prefix of the attribute (if any). The local name of the attribute. The namespace URI of the attribute (if any).
CreateDocumentFragment
[C#] public virtual XmlDocumentFragment CreateDocumentFragment( );
[C++] public: virtual XmlDocumentFragment* CreateDocumentFragment( );
[VB] Overridable Public Function CreateDocumentFragment( ) As XmlDocumentFragment
[JScript] public function CreateDocumentFragment( ): XmlDocumentFragment;
Description
Creates an System.Xml.XmlDocumentFragment.
Return Value: The new XmlDocumentFragment.
DocumentFragment nodes cannot be inserted into a document. However, you can insert children of the DocumentFragment node into a document.
CreateDocumentType
[C#] public virtual XmlDocumentType CreateDocumentType(string name, string publicId, string systemId, string internalSubset);
[C++] public: virtual XmlDocumentType* CreateDocumentType(String* name, String* publicId, String* systemId, String* internalSubset);
[VB] Overridable Public Function CreateDocumentType (ByVal name As String, ByVal publicId As String, ByVal systemId As String, ByVal internalSubset As String) As XmlDocumentType
[JScript] public function CreateDocumentType(name: String, publicId: String, systemId: String, internalSubset: String): XmlDocumentType;
Description
Returns a new System.Xml.XmlDocumentType object.
Return Value: The new XmlDocumentType.
The returned node will have parsed System.Xml.XmlDocumentType.Entities and System.Xml.XmlDocumentType.Notations collections. Name of the document type. The public identifier of the document type or null. The system identifier of the document type or null. The DTD internal subset of the document type or null
CreateElement
[C#] public XmlElement CreateElement(string name);
[C++] public: XmlElement* CreateElement(String* name);
[VB] Public Function CreateElement(ByVal name As String) As XmlElement
[JScript] public function CreateElement(name: String): XmlElement; Creates an System.Xml.XmlElement.
Description
Creates an element with the specified name.
Return Value: The new XmlElement.
Note that the instance returned implements the XmlElement interface, so default attributes would be created directly on the returned object. The qualified name of the element. If the name contains a colon then the System.Xml.XmlNode.Prefix property reflects the part of the name preceding the colon and the System.Xml.XmlDocument.LocalName property reflects the part of the name after the colon. The qualified name cannot include a prefix of 'xmlns'.
CreateElement
[C#] public XmlElement CreateElement(string qualifiedName, string namespaceURI);
[C++] public: XmlElement* CreateElement(String* qualifiedName, String* namespaceURI);
[VB] Public Function CreateElement(ByVal qualifiedName As String, ByVal namespaceURI As String) As XmlElement
[JScript] public function CreateElement(qualifiedName: String, namespaceURI: String): XmlElement;
Description
Creates an System.Xml.XmlElement with the qualified name and System.Xml.XmlNode.NamespaceURI.
Return Value: The new XmlElement.
The following C# code XmlElement elem; elem=doc.CreateElement("item:bar", "urn:abc"); results in an XmlElement that is equivalent to the following XML text. The qualified name of the element. If the name contains a colon then the System.Xml.XmlNode.Prefix property will reflect the part of the name preceding the colon and the System.Xml.XmlDocument.LocalName property will reflect the part of the name after the colon. The qualified name cannot include a prefix of 'xmlns'. The namespace URI of the element.
CreateElement
[C#] public virtual XmlElement CreateElement(string prefix, string localName, string namespaceURI);
[C++] public: virtual XmlElement* CreateElement(String* prefix, String* localName, String* namespaceURI);

[VB] Overridable Public Function CreateElement(ByVal prefix As String, ByVal localName As String, ByVal namespaceURI As String) As XmlElement
[JScript] public function CreateElement(prefix: String, localName: String, namespaceURI: String): XmlElement;
Description
Creates an element with the specified System.Xml.XmlNode.Prefix, System.Xml.XmlDocument.LocalName, and System.Xml.XmlNode.NamespaceURI.
Return Value: The new System.Xml.XmlElement.
The following C# code XmlElement elem; elem=doc.CreateElement("item", "bar", "urn:abc"); creates an element equivalent to the following XML text: Although this method creates the new object in the context of the document, it does not automatically add the new object to the document tree. To add the new object, you must explicitly call one of the node insert methods. The prefix of the new element (if any). String.Empty and null are equivalent. The local name of the new element. The namespace URI of the new element (if any). String.Empty and null are equivalent.
CreateEntityReference
[C#] public virtual XmlEntityReference CreateEntityReference(string name);
[C++] public: virtual XmlEntityReference* CreateEntityReference(String* name);
[VB] Overridable Public Function CreateEntityReference(ByVal name As String) As XmlEntityReference
[JScript] public function CreateEntityReference(name: String): XmlEntityReference;
Description
Creates an System.Xml.XmlEntityReference with the specified name.
Return Value: The new XmlEntityReference.
If the referenced entity is known, the child list of the XmlEntityReference node is made the same as that of the corresponding System.Xml.XmlEntity node. The name of the entity reference.
CreateNavigator
[C#] protected internal virtual XPathNavigator CreateNavigator(XmlNode node);
[C++] protected public: virtual XPathNavigator* CreateNavigator(XmlNode* node);
[VB] Overridable Protected Friend Dim Function CreateNavigator(ByVal node As XmlNode) As XPathNavigator
[JScript] package function CreateNavigator(node: XmlNode): XPathNavigator; Creates a new System.Xml.XPath.XPathNavigator object for navigating this document.
Description
Creates an System.Xml.XPath.XPathNavigator object for navigating this document.
Return Value: An System.Xml.XPath.XPathNavigator object. The System.Xml.XmlNode to navigate.
CreateNode
[C#] public virtual XmlNode CreateNode(string nodeTypeString, string name, string namespaceURI);
[C++] public: virtual XmlNode* CreateNode(String* nodeTypeString, String* name, String* namespaceURI);
[VB] Overridable Public Function CreateNode(ByVal nodeTypeString As String, ByVal name As String, ByVal namespaceURI As String) As XmlNode
[JScript] public function CreateNode(nodeTypeString: String, name: String, namespaceURI: String): XmlNode;
Description
Creates an System.Xml.XmlNode with the specified node type, System.Xml.XmlDocument.Name, and System.Xml.XmlNode.NamespaceURI.
Return Value: The new XmlNode.

The nodeTypeString is case sensitive and must be one of the following: string XmlNodeType element Element attribute Attribute text Text cdatasection CDATA entityreference EntityReference processinginstruction ProcessingInstruction comment Comment document Document documenttype DocumentType documentfragment DocumentFragment Although this method creates the new object in the context of the document, it does not automatically add the new object to the document tree. To add the new object, you must explicitly call one of the node insert methods. String version of the System.Xml.XmlNodeType of the new node. This parameter must be one of the values listed below. The qualified name of the new node. If the name contains a colon, it is parsed into System.Xml.XmlNode.Prefix and System.Xml.XmlDocument.LocalName components. The namespace URI of the new node.
CreateNode
[C#] public virtual XmlNode CreateNode(XmlNodeType type, string name, string namespaceURI);
[C++] public: virtual XmlNode* CreateNode(XmlNodeType type, String* name, String* namespaceURI);
[VB] Overridable Public Function CreateNode(ByVal type As XmlNodeType, ByVal name As String, ByVal namespaceURI As String) As XmlNode
[JScript] public function CreateNode(type: XmlNodeType, name: String, namespaceURI: String): XmlNode;
Description
Creates an XmlNode with the specified System.Xml.XmlNodeType, System.Xml.XmlDocument.Name, and System.Xml.XmlNode.NamespaceURI.
Return Value: The new XmlNode.
Although this method creates the new object in the context of the document, it does not automatically add the new object to the document tree. To add the new object, you must explicitly call one of the node insert methods. The XmlNodeType of the new node. The qualified name of the new node. If the name contains a colon then it is parsed into System.Xml.XmlNode.Prefix and System.Xml.XmlDocument.LocalName components. The namespace URI of the new node.
CreateNode
[C#] public virtual XmlNode CreateNode(XmlNodeType type, string prefix, string name, string namespaceURI);
[C++] public: virtual XmlNode* CreateNode(XmlNodeType type, String* prefix, String* name, String* namespaceURI);
[VB] Overridable Public Function CreateNode(ByVal type As XmlNodeType, ByVal prefix As String, ByVal name As String, ByVal namespaceURI As String) As XmlNode
[JScript] public function CreateNode(type: XmlNodeType, prefix: String, name String, namespaceURI: String): XmlNode; Creates an System.Xml.XmlNode.
Description
Creates a System.Xml.XmlNode with the specified System.Xml.XmlNodeType, System.Xml.XmlNode.Prefix, System.Xml.XmlDocument.Name, and System.Xml.XmlNode.NamespaceURI.
Return Value: The new XmlNode.
Although this method creates the new object in the context of the document, it does not automatically add the new object to the document tree. To add the new object, you must explicitly call one of the node insert methods. The XmlNodeType of the new node. The prefix of the new node. The local name of the new node. The namespace URI of the new node.
CreateProcessingInstruction
[C#] public virtual XmlProcessingInstruction CreateProcessingInstruction(string target, string data);
[C++] public: virtual XmlProcessingInstruction* CreateProcessingInstruction(String* target, String* data);

[VB] Overridable Public Function CreateProcessingInstruction(ByVal target As String, ByVal data As String) As XmlProcessingInstruction
[JScript] public function CreateProcessingInstruction(target: String, data: String): XmlProcessingInstruction;
Description
Creates an System.Xml.XmlProcessingInstruction with the specified name and data.
Return Value: The new XmlProcessingInstruction.
Although this method creates the new object in the context of the document, it does not automatically add the new object to the document tree. To add the new object, you must explicitly call one of the node insert methods. The name of the processing instruction. The data for the processing instruction.
CreateSignificantWhitespace
[C#] public virtual XmlSignificantWhitespace CreateSignificantWhitespace(string text);
[C++] public: virtual XmlSignificantWhitespace* CreateSignificantWhitespace(String* text);
[VB] Overridable Public Function CreateSignificantWhitespace(ByVal text As String) As XmlSignificantWhitespace
[JScript] public function CreateSignificantWhitespace(text: String): XmlSignificantWhitespace;
Description
Creates an System.Xml.XmlSignificantWhitespace node.
Return Value: A new XmlSignificantWhitespace node.
This is used when you want to manually format your document. The string must contain only the following characters ¶ and
CreateTextNode
[C#] public virtual XmlText CreateTextNode(string text);
[C++] public: virtual XmlText* CreateTextNode(String* text);
[VB] Overridable Public Function CreateTextNode(ByVal text As String) As XmlText
[JScript] public function CreateTextNode(text: String): XmlText;
Description
Creates an System.Xml.XmlText with the specified text.
Return Value: The new XmlText node.
Although this method creates the new object in the context of the document, it does not automatically add the new object to the document tree. To add the new object, you must explicitly call one of the node insert methods. The text for the Text node.
CreateWhitespace
[C#] public virtual XmlWhitespace CreateWhitespace(string text);
[C++] public: virtual XmlWhitespace* CreateWhitespace(String* text);
[VB] Overridable Public Function CreateWhitespace(ByVal text As String) As XmlWhitespace
[JScript] public function CreateWhitespace(text: String): XmlWhitespace;
Description
Creates an System.Xml.XmlWhitespace node.
Return Value: A new XmlWhitespace node.
This is used when you want to manually format your document. The string must contain only the following characters ¶ and
CreateXmlDeclaration
[C#] public virtual XmlDeclaration CreateXmlDeclaration (string version, string encoding, string standalone);
[C++] public: virtual XmlDeclaration* CreateXmlDeclaration(String* version, String* encoding, String* standalone);
[VB] Overridable Public Function CreateXmlDeclaration (ByVal version As String, ByVal encoding As String, ByVal standalone As String) As XmlDeclaration
[JScript] public function CreateXmlDeclaration(version: String, encoding: String, standalone: String): XmlDeclaration;
Description
Creates an System.Xml.XmlDeclaration node with the specified values.
Return Value: The new XmlDeclaration node.
The attributes are exposed as special properties on the XmlDeclaration node, and not as System.Xml.XmlAttribute nodes. The version must be "1.0". The value of the encoding attribute. This is the encoding that is used when you save the System.Xml.XmlDocument; therefore, it must be set to a string supported by the System.Text.Encoding class, otherwise System.Xml.XmlDocument.Save(System.String) fails. If this is null or String.Empty, the Save method does not write an encoding attribute on the XML declaration and therefore the default encoding, UTF-8, is used. The value must be either "yes" or "no". If this is null or String.Empty, the Save method does not write a standalone attribute on the XML declaration.
GetElementById
[C#] public virtual XmlElement GetElementById(string elementId);
[C++] public: virtual XmlElement* GetElementById (String* elementId);
[VB] Overridable Public Function GetElementById(ByVal elementId As String) As XmlElement
[JScript] public function GetElementById(elementId: String): XmlElement;
Description
Gets the System.Xml.XmlElement with the specified ID.
Return Value: The XmlElement with the matching ID or null if no matching element is found.
If the document has multiple elements with the matching ID, this method returns the first matching element in the document. The attribute ID to match.
GetElementsByTagName
[C#] public virtual XmlNodeList GetElementsByTagName (string name);
[C++] public: virtual XmlNodeList* GetElementsByTagName(String* name);
[VB] Overridable Public Function GetElementsByTagName (ByVal name As String) As XmlNodeList
[JScript] public function GetElementsByTagName(name: String): XmlNodeList; Returns an System.Xml.XmlNodeList containing a list of all descendant elements that match the specified name.
Description
Returns an System.Xml.XmlNodeList containing a list of all descendant elements that match the specified System.Xml.XmlDocument.Name.
Return Value: An System.Xml.XmlNodeList containing a list of all matching nodes.
The nodes are placed in the order in which they would be encountered in the document. The qualified name to match. It is matched against the Name property of the matching node. The special value "*" matches all tags.
GetElementsByTagName
[C#] public virtual XmlNodeList GetElementsByTagName (string localName, string namespaceURI);
[C++] public: virtual XmlNodeList* GetElementsByTagName(String* localName, String* namespaceURI);
[VB] Overridable Public Function GetElementsByTagName (ByVal localName As String, ByVal namespaceURI As String) As XmlNodeList

[JScript] public function GetElementsByTagName(local-Name: String, namespaceURI: String): XmlNodeList;
Description
Returns an System.Xml.XmlNodeList containing a list of all descendant elements that match the specified System.Xml.XmlDocument.LocalName and System.Xml.XmlNode.NamespaceURI.
Return Value: An System.Xml.XmlNodeList containing a list of all matching nodes.
The nodes are placed in the order in which they would be encountered in the document tree. The LocalName to match. The special value "*" matches all tags. NamespaceURI to match.
ImportNode
[C#] public virtual XmlNode ImportNode(XmlNode node, bool deep);
[C++] public: virtual XmlNode* ImportNode(XmlNode* node, bool deep);
[VB] Overridable Public Function ImportNode(ByVal node As XmlNode, ByVal deep As Boolean) As XmlNode
[JScript] public function ImportNode(node: XmlNode, deep: Boolean): XmlNode;
Description
Imports a node from another document to the current document.
Return Value: The imported System.Xml.XmlNode.
The returned node has no parent. The source node is not altered or removed from the original document; ImportNode creates a copy of the source node. The node being imported. true to perform a deep clone; otherwise, false.
Load
[C#] public virtual void Load(Stream inStream);
[C++] public: virtual void Load(Stream* inStream);
[VB] Overridable Public Sub Load(ByVal inStream As Stream)
[JScript] public function Load(inStream: Stream);
Description
Loads the XML document from the specified stream.
System.Xml.XmlWhitespace nodes are not created unless System.Xml.XmlDocument.PreserveWhitespace is set to true. Also, if the reader has been configured to not return whitespace, then no whitespace nodes will be created. In other words Load does not change the whitespace handling of the given reader. The stream containing the XML document to load.
Load
[C#] public virtual void Load(string filename);
[C++] public: virtual void Load(String* filename);
[VB] Overridable Public Sub Load(ByVal filename As String)
[JScript] public function Load(filename: String); Loads the specified XML data.
Description
Loads the XML document from the specified URL.
System.Xml.XmlWhitespace nodes are not created unless System.Xml.XmlDocument.PreserveWhitespace is set to true. URL for the file containing the XML document to load.
Load
[C#] public virtual void Load(TextReader txtReader);
[C++] public: virtual void Load(TextReader* txtReader);
[VB] Overridable Public Sub Load(ByVal txtReader As TextReader)
[JScript] public function Load(txtReader: TextReader);
Description
Loads the XML document from the specified System.IO.TextReader.

System.Xml.XmlWhitespace nodes are not created unless System.Xml.XmlDocument.PreserveWhitespace is set to true. The TextReader used to feed the XML data into the document.
Load
[C#] public virtual void Load(XmlReader reader);
[C++] public: virtual void Load(XmlReader* reader);
[VB] Overridable Public Sub Load(ByVal reader As XmlReader)
[JScript] public function Load(reader: XmlReader);
Description
Loads the XML document from the specified System.Xml.XmlReader.
Whitespace nodes are not created unless System.Xml.XmlDocument.PreserveWhitespace is set to true. Also, if the reader has been configured to not return whitespace, then no whitespace nodes will be created. In other words Load does not change the whitespace handling of the given reader. The XmlReader used to feed the XML data into the document.
LoadXml
[C#] public virtual void LoadXml(string xml);
[C++] public: virtual void LoadXml(String* xml);
[VB] Overridable Public Sub LoadXml(ByVal xml As String)
[JScript] public function LoadXml(xml: String);
Description
Loads the XML document from the specified string.
By default the LoadXml method does not preserve whitespace nor significant whitespace. String containing the XML document to load.
ReadNode
[C#] public virtual XmlNode ReadNode(XmlReader reader);
[C++] public: virtual XmlNode* ReadNode(XmlReader* reader);
[VB] Overridable Public Function ReadNode(ByVal reader As XmlReader) As XmlNode
[JScript] public function ReadNode(reader: XmlReader): XmlNode;
Description
Creates an System.Xml.XmlNode object based on the information in the System.Xml.XmlReader. The reader must be positioned on a node or attribute.
Return Value: The new XmlNode or null if no more nodes exist.
Reads one XmlNode from the given reader and positions the reader on the next node. This method creates the type of XmlNode matching the System.Xml.XmlNode.NodeType on which the reader is currently positioned. (If the reader is in the initial state, ReadNode advances the reader to the first node and then operates on that node.) If the reader is positioned on the start of an element, ReadNode reads all the attributes and any child nodes, up to and including the end tag of the current node. The XmlNode returned contains the subtree representing everything read. The reader is positioned immediately after the end tag. The Xml source
Save
[C#] public virtual void Save(Stream outStream);
[C++] public: virtual void Save(Stream* outStream);
[VB] Overridable Public Sub Save(ByVal outStream As Stream)
[JScript] public function Save(outStream: Stream);
Description
Saves the XML document to the specified stream.
Whitespace is preserved only if System.Xml.XmlDocument.PreserveWhitespace is set to true. The stream to which you want to save.

Save
[C#] public virtual void Save(string filename);
[C++] public: virtual void Save(String* filename);
[VB] Overridable Public Sub Save(ByVal filename As String)
[JScript] public function Save(filename: String); Saves the XML document to the specified location.
Description
Saves the XML document to the specified file.
Whitespace is preserved in the output file only if System.Xml.XmlDocument.PreserveWhitespace is set to true. The location of the file where you want to save the document.
Save
[C#] public virtual void Save(TextWriter writer);
[C++] public: virtual void Save(TextWriter* writer);
[VB] Overridable Public Sub Save(ByVal writer As TextWriter)
[JScript] public function Save(writer: TextWriter);
Description
Saves the XML document to the specified System.IO.TextWriter. The TextWriter to which you want to save.
Save
[C#] public virtual void Save(XmlWriter writer);
[C++] public: virtual void Save(XmlWriter* writer);
[VB] Overridable Public Sub Save(ByVal writer As XmlWriter)
[JScript] public function Save(writer: XmlWriter);
Description
Saves the XML document to the specified System.Xml.XmlWriter.
Whitespace is preserved only if System.Xml.XmlDocument.PreserveWhitespace is set to true. The XmlWriter to which you want to save.
WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
Saves all the children of the XmlDocument node to the specified System.Xml.XmlWriter.
This method is functionally equivalent to the System.Xml.XmlDocument.InnerXml property. The XmlWriter to which you want to save.
WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
Saves the XmlDocument node to the specified System.Xml.XmlWriter.
This method is functionally equivalent to the System.Xml.XmlNode.OuterXml property. The XmlWriter to which you want to save.
XmlDocumentFragment class (System.Xml)
WriteTo
Description
Represents a lightweight object that is useful for tree insert operations.
XmlDocumentFragment
Example Syntax:
WriteTo
[C#] protected internal XmlDocumentFragment(XmlDocument ownerDocument);
[C++] internal: XmlDocumentFragment(XmlDocument* ownerDocument);
[VB] Protected Friend Sub New(ByVal ownerDocument As XmlDocument)
[JScript] package function XmlDocumentFragment(ownerDocument: XmlDocument);
Description
  Attributes
  BaseURI
  ChildNodes
  FirstChild
  HasChildNodes
  InnerText
  InnerXml
  WriteTo
Description
Gets or sets the markup representing the children of this node.
Setting this property replaces the children of the node with the parsed contents of the given string. The parsing is done in the current namespace context.
  IsReadOnly
  Item
  Item
  LastChild
  LocalName
  WriteTo
Description
Gets the local name of the node.
  Name
  WriteTo
[C#] public override string Name {get;}
[C++] public: _property virtual String* get_Name( );
[VB] Overrides Public ReadOnly Property Name As String
[JScript] public function get Name( ): String;
Description
Gets the qualified name of the node.
  NamespaceURI
  NextSibling
  NodeType
  WriteTo
Description
Gets the type of the current node.
  OuterXml
  OwnerDocument
  WriteTo
Description
Gets the System.Xml.XmlDocument that contains this node.
When adding nodes to the current node, use the XmlDocument returned by the OwnerDocument property to create the node.
  ParentNode
  WriteTo
[C#] public override XmlNode ParentNode {get;}
[C++] public: _property virtual XmlNode* get_ParentNode( );
[VB] Overrides Public ReadOnly Property ParentNode As XmlNode
[JScript] public function get ParentNode( ): XmlNode;
Description
Gets the parent of this node (for nodes that can have parents).
  Prefix
  PreviousSibling
  Value
  CloneNode

[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
   Creates a duplicate of this node.
Return Value: The cloned node.
   CloneNode serves as a copy constructor for nodes. To see how this method behaves with other node types, see System.Xml.XmlNode.CloneNode(System.Boolean) method in the XmlNode class. true to recursively clone the subtree under the specified node; false to clone only the node itself.
   WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
   Saves all the children of the node to the specified XmlWriter. The XmlWriter where you want to save the current node.
   WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
   Saves the node to the specified XmlWriter. The XmlWriter where you want to save the node.
   XmlDocumentType class (System.Xml)
   WriteTo
Description
   Represents the document type declaration.
   XmlDocumentType
   Example Syntax:
   WriteTo
[C#] protected internal XmlDocumentType(string name, string publicId, string systemId, string internalSubset, XmlDocument doc);
[C++] internal: XmlDocumentType(String* name, String* publicId, String* systemId, String* internalSubset, XmlDocument* doc);
[VB] Protected Friend Sub New(ByVal name As String, ByVal publicId As String, ByVal systemId As String, ByVal internalSubset As String, ByVal doc As XmlDocument)
[JScript] package function XmlDocumentType(name: String, publicId: String, systemId: String, internalSubset: String, doc: XmlDocument);
Description
   Attributes
   BaseURI
   ChildNodes
   Entities
   WriteTo
Description
   Gets the collection of System.Xml.XmlEntity nodes declared in the document type declaration.
   FirstChild
   HasChildNodes
   InnerText
   InnerXml
   InternalSubset
   WriteTo Description
   Gets the value of the DTD internal subset on the DOCTYPE declaration.
   IsReadOnly
   WriteTo
[C#] public override bool IsReadOnly {get;}
[C++] public: _property virtual bool get_IsReadOnly( );
[VB] Overrides Public ReadOnly Property IsReadOnly As Boolean
[JScript] public function get IsReadOnly( ): Boolean;
Description
   Gets a value indicating whether the node is read-only.
   A read-only node is one whose properties, attributes, or children cannot be changed. However, you can remove a read-only node from the tree and insert it somewhere else.
   Item
   Item
   LastChild
   LocalName
   WriteTo
Description
   Gets the local name of the node.
   Name
   WriteTo
[C#] public override string Name {get;}
[C++] public: _property virtual String* get_Name( );
[VB] Overrides Public ReadOnly Property Name As String
[JScript] public function get Name( ): String;
Description
   Gets the qualified name of the node.
   NamespaceURI
   NextSibling
   NodeType
   WriteTo
Description
   Gets the type of the current node.
   Notations
   WriteTo
[C#] public XmlNamedNodeMap Notations {get;}
[C++] public: _property XmlNamedNodeMap* get_Notations( );
[VB] Public ReadOnly Property Notations As XmlNamedNodeMap
[JScript] public function get Notations( ): XmlNamedNodeMap;
Description
   Gets the collection of System.Xml.XmlNotation nodes present in the document type declaration.
   OuterXml
   OwnerDocument
   ParentNode
   Prefix
   PreviousSibling
   PublicId
   WriteTo
Description
   Gets the value of the public identifier on the DOCTYPE declaration.
   SystemId
   WriteTo
[C#] public string SystemId {get;}
[C++] public: _property String* get_SystemId( );
[VB] Public ReadOnly Property SystemId As String
[JScript] public function get SystemId( ): String;
Description
   Gets the value of the system identifier on the DOCTYPE declaration.

Value
CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
Creates a duplicate of this node.
Return Value: The duplicate node.
This method serves as a generic copy constructor for nodes. The duplicate node has no parent (ParentNode returns null). true to recursively clone the subtree under the specified node; false to clone only the node itself (and its attributes if the node is an XmlElement).
WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
Saves all the children of the node to the specified XmlWriter. The XmlWriter where you want to save the current node.
WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
Saves the node to the specified XmlWriter. The XmlWriter where you want to save the node.
XmlElement class (System.Xml)
WriteTo
Description
Represents an element.
XmlElement
Example Syntax:
WriteTo
[C#] protected internal XmlElement(string prefix, string localName, string namespaceURI, XmlDocument doc);
[C++] internal: XmlElement(String* prefix, String* localName, String* namespaceURI, XmlDocument* doc);
[VB] Protected Friend Sub New(ByVal prefix As String, ByVal localName As String, ByVal namespaceURI As String, ByVal doc As XmlDocument)
[JScript] package function XmlElement(prefix: String, localName: String, namespaceURI: String, doc: XmlDocument);
Description
Attributes
WriteTo
[C#] public override XmlAttributeCollection Attributes {get;}
[C++] public: _property virtual XmlAttributeCollection* get_Attributes( );
[VB] Overrides Public ReadOnly Property Attributes As XmlAttributeCollection
[JScript] public function get Attributes( ): XmlAttributeCollection;
Description
Gets an System.Xml.XmlAttributeCollection containing the list of attributes for this node.
BaseURI
ChildNodes
FirstChild
HasAttributes
WriteTo
Description
Gets a value indicating whether the current node has any attributes.
HasChildNodes
InnerText
WriteTo
Description
Gets or sets the concatenated values of the node and all its children.
Setting this property replaces all the children with the parsed contents of the given string.
InnerXml
WriteTo
[C#] public override string InnerXml {get; set;}
[C++] public: _property virtual String* get_InnerXml( );public: _property virtual void set_InnerXml(String*);
[VB] Overrides Public Property InnerXml As String
[JScript] public function get InnerXml( ): String;public function set InnerXml(String);
Description
Gets or sets the markup representing just the children of this node.
Setting this property replaces the children of the node with the parsed contents of the given string. The parsing is done in the current namespace context.
IsEmpty
WriteTo
[C#] public bool IsEmpty {get; set;}
[C++] public: _property bool get_IsEmpty( );public: _property void set_IsEmpty(bool);
[VB] Public Property IsEmpty As Boolean
[JScript] public function get IsEmpty( ): Boolean;public function set IsEmpty(Boolean);
Description
Gets or sets the tag format of the element.
IsReadOnly
Item
Item
LastChild
LocalName
WriteTo
Description
Gets the local name of the current node.
If the node does not have a prefix, LocalName is the same as System.Xml.XmlElement.Name.
Name
WriteTo
[C#] public override string Name {get;}
[C++] public: _property virtual String* get_Name( );
[VB] Overrides Public ReadOnly Property Name As String
[JScript] public function get Name( ): String;
Description
Gets the qualified name of the node.
NamespaceURI
WriteTo
[C#] public override string NamespaceURI {get;}
[C++] public: _property virtual String* get_NamespaceURI( );
[VB] Overrides Public ReadOnly Property NamespaceURI As String
[JScript] public function get NamespaceURI( ): String;

Description
  Gets the namespace URI of this node.
  This is the namespace URI specified at creation time. For example, NamespaceURI is urn:samples for the element The following example displays information on the ISBN element.
  NextSibling
  WriteTo
[C#] public override XmlNode NextSibling {get;}
[C++] public: _property virtual XmlNode* get_NextSibling( );
[VB] Overrides Public ReadOnly Property NextSibling As XmlNode
[JScript] public function get NextSibling( ): XmlNode;
Description
  Gets the System.Xml.XmlNode immediately following this element.
  NodeType
  WriteTo
[C#] public override XmlNodeType NodeType {get;}
[C++] public: _property virtual XmlNodeType get_NodeType( );
[VB] Overrides Public ReadOnly Property NodeType As XmlNodeType
[JScript] public function get NodeType( ): XmlNodeType;
Description
  Gets the type of the current node.
  OuterXml
  OwnerDocument
  WriteTo
Description
  Gets the System.Xml.XmlDocument to which this node belongs.
  When adding nodes to the current node, use the XmlDocument returned by the OwnerDocument property to create the node.
  ParentNode
  Prefix
  WriteTo
Description
  Gets or sets the namespace prefix of this node.
  Setting this property changes the System.Xml.XmlElement.Name property, which holds the qualified name for an XmlElement.
  PreviousSibling
  Value
  CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
  Creates a duplicate of this node.
Return Value: The cloned node.
  This method serves as a copy constructor for nodes. The duplicate node has no parent (System.Xml.XmlNode.ParentNode returns null). true to recursively clone the subtree under the specified node; false to clone only the node itself (and its attributes if the node is an XmlElement).
  GetAttribute
[C#] public virtual string GetAttribute(string name);
[C++] public: virtual String* GetAttribute(String* name);
[VB] Overridable Public Function GetAttribute(ByVal name As String) As String
[JScript] public function GetAttribute(name: String): String;
Returns the attribute value for the specified attribute.
Description
  Returns the value for the attribute with the specified name.
Return Value: The value of the specified System.Xml.XmlAttribute as a string. Empty string is returned if that attribute does not have a specified or default value. The name of the attribute to retrieve. This is a qualified name. It is matched against the Name property of the matching node.
  GetAttribute
[C#] public virtual string GetAttribute(string localName, string namespaceURI*);
[C++] public: virtual String* GetAttribute(String* localName, String* namespaceURI);
[VB] Overridable Public Function GetAttribute(ByVal localName As String, ByVal namespaceURI As String) As String
[JScript] public function GetAttribute(localName: String, namespaceURI: String): String;
Description
  Returns the value for the attribute with the specified local name and namespace URI.
Return Value: The value of the specified attribute node as a string. Empty string is returned if that attribute does not have a specified or default value. The local name of the attribute to retrieve. The namespace URI of the attribute to retrieve.
  GetAttributeNode
[C#] public virtual XmlAttribute GetAttributeNode(string name);
[C++] public: virtual XmlAttribute* GetAttributeNode(String* name);
[VB] Overridable Public Function GetAttributeNode(ByVal name As String) As XmlAttribute
[JScript] public function GetAttributeNode(name: String): XmlAttribute; Return the specified System.Xml.XmlAttribute.
Description
  Returns the XmlAttribute with the specified name.
Return Value: The specified XmlAttribute or null if a matching attribute was not found. The name of the attribute to retrieve. This is a qualified name. It is matched against the Name property of the matching node.
  GetAttributeNode
[C#] public virtual XmlAttribute GetAttributeNode(string localName, string namespaceURI);
[C++] public: virtual XmlAttribute* GetAttributeNode(String* localName, String* namespaceURI);
[VB] Overridable Public Function GetAttributeNode(ByVal localName As String, ByVal namespaceURI As String) As XmlAttribute
[JScript] public function GetAttributeNode(localName: String, namespaceURI: String): XmlAttribute;
Description
  Returns the System.Xml.XmlAttribute with the specified local name and namespace URI.
Return Value: The specified XmlAttribute or null if a matching attribute was not found. The local name of the attribute. The namespace URI of the attribute.
  GetElementsByTagName
[C#] public virtual XmlNodeList GetElementsByTagName(string name);
[C++] public: virtual XmlNodeList* GetElementsByTagName(String* name);
[VB] Overridable Public Function GetElementsByTagName(ByVal name As String) As XmlNodeList

[JScript] public function GetElementsByTagName(name: String): XmlNodeList; Returns an System.Xml.XmlNodeList containing a list of all descendant elements that match the specified name.
Description
Returns an System.Xml.XmlNodeList containing a list of all descendant elements that match the specified System.Xml.XmlElement.Name.
Return Value: An System.Xml.XmlNodeList containing a list of all matching nodes.
The nodes are placed in the order in which they would be encountered in a preorder traversal of the System.Xml.XmlElement tree. The name tag to match. This is a qualified name. It is matched against the Name property of the matching node. The asterisk (*) is a special value that matches all tags.
GetElementsByTagName
[C#] public virtual XmlNodeList GetElementsByTagName (string localName, string namespaceURI);
[C++] public: virtual XmlNodeList* GetElementsByTagName(String* localName, String* namespaceURI);
[VB] Overridable Public Function GetElementsByTagName (ByVal localName As String, ByVal namespaceURI As String) As XmlNodeList
[JScript] public function GetElementsByTagName(localName: String, namespaceURI: String): XmlNodeList;
Description
Returns an System.Xml.XmlNodeList containing a list of all descendant elements that match the specified System.Xml.XmlElement.LocalName and System.Xml.XmlElement.NamespaceURI.
Return Value: An System.Xml.XmlNodeList containing a list of all matching nodes.
The nodes are placed in the order in which they would be encountered in a preorder traversal of the XmlElement tree. The local name to match. The asterisk (*) is a special value that matches all tags. The namespace URI to match.
HasAttribute
[C#] public virtual bool HasAttribute(string name);
[C++] public: virtual bool HasAttribute(String* name);
[VB] Overridable Public Function HasAttribute(ByVal name As String) As Boolean
[JScript] public function HasAttribute(name: String): Boolean; Determines whether the current node has the specified attribute.
Description
Determines whether the current node has the specified attribute.
Return Value: true if the current node has the specified attribute; otherwise, false. The name of the attribute to find. This is a qualified name. It is matched against the Name property of the matching node.
HasAttribute
[C#] public virtual bool HasAttribute(string localName, string namespaceURI*);
[C++] public: virtual bool HasAttribute(String* localName, String* namespaceURI);
[VB] Overridable Public Function HasAttribute(ByVal localName As String, ByVal namespaceURI As String) As Boolean
[JScript] public function HasAttribute(localName: String, namespaceURI: String): Boolean;
Description
Determines whether the current node has an attribute with the specified local name and namespace URI.
Return Value: true if the current node has the specified attribute; otherwise, false. The local name of the attribute to find. The namespace URI of the attribute to find.
RemoveAll
[C#] public override void RemoveAll( );
[C++] public: void RemoveAll( );
[VB] Overrides Public Sub RemoveAll( )
[JScript] public override function RemoveAll( );
Description
Removes all the attributes and children of the current node.
RemoveAllAttributes
[C#] public virtual void RemoveAllAttributes( );
[C++] public: virtual void RemoveAllAttributes( );
[VB] Overridable Public Sub RemoveAllAttributes( )
[JScript] public function RemoveAllAttributes( );
Description
Removes all attributes from the element.
RemoveAttribute
[C#] public virtual void RemoveAttribute(string name);
[C++] public: virtual void RemoveAttribute(String* name);
[VB] Overridable Public Sub RemoveAttribute(ByVal name As String)
[JScript] public function RemoveAttribute(name: String); Removes the specified attribute.
Description
Removes an attribute by name.
If the removed attribute is known to have a default value, an attribute immediately appears containing the default value and, if applicable, the corresponding namespace URI, local name, and prefix. The name of the attribute to remove. This is a qualified name. It is matched against the Name property of the matching node.
RemoveAttribute
[C#] public virtual void RemoveAttribute(string localName, string namespaceURI);
[C++] public: virtual void RemoveAttribute(String* localName, String* namespaceURI);
[VB] Overridable Public Sub RemoveAttribute(ByVal localName As String, ByVal namespaceURI As String)
[JScript] public function RemoveAttribute(localName: String, namespaceURI: String);
Description
Removes an attribute with the specified local name and namespace URI.
If the removed attribute is known to have a default value, an attribute immediately appears containing the default value and, if applicable, the corresponding namespace URI, local name, and prefix. The local name of the attribute to remove. The namespace URI of the attribute to remove.
RemoveAttributeAt
[C#] public virtual XmlNode RemoveAttributeAt(int i);
[C++] public: virtual XmlNode* RemoveAttributeAt(int i);
[VB] Overridable Public Function RemoveAttributeAt(ByVal i As Integer) As XmlNode
[JScript] public function RemoveAttributeAt(i: int): XmlNode;
Description
Removes the attribute node with the specified index from the element. The index of the node to remove. The first node has index 0.
RemoveAttributeNode
[C#] public virtual XmlAttribute RemoveAttributeNode (XmlAttribute oldAttr);
[C++] public: virtual XmlAttribute* RemoveAttributeNode (XmlAttribute* oldAttr);
[VB] Overridable Public Function RemoveAttributeNode (ByVal oldAttr As XmlAttribute) As XmlAttribute

[JScript] public function RemoveAttributeNode(oldAttr: XmlAttribute): XmlAttribute; Removes an System.Xml.XmlAttribute.
Description
  Removes the specified System.Xml.XmlAttribute.
Return Value: The removed XmlAttribute or null if oldAttr is not an attribute node of the XmlElement. The XmlAttribute node to remove. If the removed attribute has a default value, it is immediately replaced.
  RemoveAttributeNode
[C#] public virtual XmlAttribute RemoveAttributeNode (string localName, string namespaceURI);
[C++] public: virtual XmlAttribute* RemoveAttributeNode (String* localName, String* namespaceURI);
[VB] Overridable Public Function RemoveAttributeNode (ByVal localName As String, ByVal namespaceURI As String) As XmlAttribute
[JScript] public function RemoveAttributeNode(localName: String, namespaceURI: String): XmlAttribute;
Description
  Removes the System.Xml.XmlAttribute specified by the local name and namespace URI.
Return Value: The removed XmlAttribute or null if the XmlElement does not have a matching attribute node. The local name of the attribute. The namespace URI of the attribute.
  SetAttribute
[C#] public virtual void SetAttribute(string name, string value);
[C++] public: virtual void SetAttribute(String* name, String* value);
[VB] Overridable Public Sub SetAttribute(ByVal name As String, ByVal value As String)
[JScript] public function SetAttribute(name: String, value: String); Sets the value of the specified attribute.
Description
  Sets the value of the attribute with the specified name.
  If an attribute with the same name is already present in the element, its value is changed to that of value. The name of the attribute to create or alter. This is a qualified name. If the name contains a colon it is parsed into prefix and local name components. The value to set for the attribute.
  SetAttribute
[C#] public virtual string SetAttribute(string localName, string namespaceURI, string value);
[C++] public: virtual String* SetAttribute(String* localName, String* namespaceURI, String* value);
[VB] Overridable Public Function SetAttribute(ByVal localName As String, ByVal namespaceURI As String, ByVal value As String) As String
[JScript] public function SetAttribute(localName: String, namespaceURI: String, value: String): String;
Description
  Sets the value of the attribute with the specified local name and namespace URI. The local name of the attribute. The namespace URI of the attribute. The value to set for the attribute.
  SetAttributeNode
[C#] public virtual XmlAttribute SetAttributeNode(XmlAttribute newAttr);
[C++] public: virtual XmlAttribute* SetAttributeNode(XmlAttribute* newAttr);
[VB] Overridable Public Function SetAttributeNode(ByVal newAttr As XmlAttribute) As XmlAttribute
[JScript] public function SetAttributeNode(newAttr: XmlAttribute): XmlAttribute; Adds a new System.Xml.XmlAttribute.
Description
  Adds the specified System.Xml.XmlAttribute.
Return Value: If the attribute replaces an existing attribute with the same name, the old XmlAttribute is returned; otherwise, null is returned.
  If an attribute with that name is already present in the element, it is replaced by the new one. The XmlAttribute node to add to the attribute collection for this element.
  SetAttributeNode
[C#] public virtual XmlAttribute SetAttributeNode(string localName, string namespaceURI);
[C++] public: virtual XmlAttribute* SetAttributeNode (String* localName, String* namespaceURI);
[VB] Overridable Public Function SetAttributeNode(ByVal localName As String, ByVal namespaceURI As String) As XmlAttribute
[JScript] public function SetAttributeNode(localName: String, namespaceURI: String): XmlAttribute;
Description
  Adds the specified System.Xml.XmlAttribute.
Return Value: The XmlAttribute to add.
  The XmlAttribute does not have any children. Use System.Xml.XmlAttribute.Value to assign a text value to the attribute or use System.Xml.XmlNode.AppendChild(System.Xml.XmlNode) (or a similar method) to add children to the attribute. The local name of the attribute. The namespace URI of the attribute.
  WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
  Saves all the children of the node to the specified System.Xml.XmlWriter. The XmlWriter to which you want to save.
  WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
  Saves the current node to the specified System.Xml.XmlWriter. The XmlWriter to which you want to save.
  XmlEntity class (System.Xml)
  WriteTo
Description
  Represents an entity declaration:
  Attributes
  BaseURI
  WriteTo
Description
  Gets the base URI of the current node.
  A networked XML document is comprised of chunks of data aggregated using various W3C standard inclusion mechanisms and therefore contains nodes that come from different places. The BaseURI tells you where these nodes came from.
  ChildNodes
  FirstChild
  HasChildNodes
  InnerText
  WriteTo Description
  Gets the concatenated values of the entity node and all its children.
  XmlEntity nodes are read-only. Setting this property throws an exception.
  InnerXml
  WriteTo
[C#] public override string InnerXml {get; set;}
[C++] public: _property virtual String* get_InnerXml( );public: _property virtual void set_InnerXml(String*);
[VB] Overrides Public Property InnerXml As String
[JScript] public function get InnerXml( ): String;public function set InnerXml(String);
Description
  Gets the markup representing the children of this node.
  XmlEntity nodes are read-only. Setting this property throws an exception.
  IsReadOnly
  WriteTo
[C#] public override bool IsReadOnly {get;}
[C++] public: _property virtual bool get_IsReadOnly( );
[VB] Overrides Public ReadOnly Property IsReadOnly As Boolean
[JScript] public function get IsReadOnly( ): Boolean;
Description
  Gets a value indicating whether the node is read-only.
  A read-only node is one whose properties, attributes, or children cannot be changed. You can remove a read-only node from the tree and insert it somewhere else.
  Item
  Item
  LastChild
  LocalName
  WriteTo
Description
  Gets the name of the node without the namespace prefix.
  Name
  WriteTo
[C#] public override string Name {get;}
[C++] public: _property virtual String* get_Name( );
[VB] Overrides Public ReadOnly Property Name As String
[JScript] public function get Name( ): String;
Description
  Gets the name of the node.
  NamespaceURI
  NextSibling
  NodeType
  WriteTo
Description
  Gets the type of the node.
  NotationName
  WriteTo
[C#] public string NotationName {get;}
[C++] public: _property String* get_NotationName( );
[VB] Public ReadOnly Property NotationName As String
[JScript] public function get NotationName( ): String;
Description
  Gets the name of the optional NDATA attribute on the entity declaration.
  OuterXml
  WriteTo
[C#] public override string OuterXml {get;}
[C++] public: _property virtual String* get_OuterXml( );
[VB] Overrides Public ReadOnly Property OuterXml As String
[JScript] public function get OuterXml( ): String;

Description
  Gets the markup representing this node and all its children.
  OwnerDocument
  ParentNode
  Prefix
  PreviousSibling
  PublicId
  WriteTo
Description
  Gets the value of the public identifier on the entity declaration.
  SystemId
  WriteTo
[C#] public string SystemId {get;}
[C++] public: _property String* get_SystemId( );
[VB] Public ReadOnly Property SystemId As String
[JScript] public function get SystemId( ): String;
Description
  Gets the value of the system identifier on the entity declaration.
  Value
  CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
  Creates a duplicate of this node. Entity nodes cannot be cloned. Calling this method on an XmlEntity object throws an exception. true to recursively clone the subtree under the specified node; false to clone only the node itself.
  WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
  Saves all the children of the node to the specified System.Xml.XmlWriter. The XmlWriter to which you want to save.
  WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
  Saves the node to the specified System.Xml.XmlWriter. The XmlWriter to which you want to save.
  XmlEntityReference class (System.Xml)
  WriteTo
Description
  Represents an entity reference node.
  XmlEntityReference
  Example Syntax:
  WriteTo
[C#] protected internal XmlEntityReference(string name, XmlDocument doc);
[C++] internal: XmlEntityReference(String* name, XmlDocument* doc);
[VB] Protected Friend Sub New(ByVal name As String, ByVal doc As XmlDocument)
[JScript] package function XmlEntityReference(name: String, doc: XmlDocument);

Description
    Attributes
    BaseURI
    WriteTo
Description
    Gets the base URI of the current node.
    A networked XML document is comprised of chunks of data aggregated using various W3C standard inclusion mechanisms and therefore contains nodes that come from different places. The BaseURI tells you where these nodes came from. If there is no base URI for the nodes being returned (maybe they were parsed from an in-memory string), String.Empty is returned.
    ChildNodes
    FirstChild
    HasChildNodes
    InnerText
    InnerXml
    IsReadOnly
    WriteTo
Description
    Gets a value indicating whether the node is read-only.
    A read-only node is one whose properties, attributes, or children cannot be changed. However, you can remove a read-only node from the tree and insert it somewhere else.
    Item
    Item
    LastChild
    LocalName
    WriteTo
Description
    Gets the local name of the node.
    Name
    WriteTo
[C#] public override string Name {get;}
[C++] public: _property virtual String* get_Name( );
[VB] Overrides Public ReadOnly Property Name As String
[JScript] public function get Name( ): String;
Description
    Gets the name of the node.
    NamespaceURI
    NextSibling
    NodeType
    WriteTo
Description
    Gets the type of the node.
    OuterXml
    OwnerDocument
    ParentNode
    Prefix
    PreviousSibling
    Value
    WriteTo
Description
    Gets or sets the value of the node.
    CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
    Creates a duplicate of this node.
Return Value: The cloned node.
    This method serves as a copy constructor for nodes. The cloned node has no parent (System.Xml.XmlNode.ParentNode returns null). true to recursively clone the subtree under the specified node; false to clone only the node itself. For XmlEntityReference nodes, this method always returns an entity reference node with no children. The replacement text is set when the node is inserted into a parent.
    WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
    Saves all the children of the node to the specified XmlWriter. The XmlWriter where you want to save the current node.
    WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
    Saves the node to the specified XmlWriter. The XmlWriter where you want to save the node.
    XmlException class (System.Xml)
    WriteTo
Description
    Returns detailed information about the last exception.
    XmlException
    Example Syntax:
    WriteTo
[C#] public XmlException(SerializationInfo info, StreamingContext context);
[C++] public: XmlException(SerializationInfo* info, StreamingContext context);
[VB] Public Sub New(ByVal info As SerializationInfo, ByVal context As StreamingContext)
[JScript] public function XmlException(info: SerializationInfo, context: StreamingContext); Initializes a new instance of the XmlException class.
Description
    Initializes a new instance of the XmlException class using the information in the System.Runtime.Serialization.SerializationInfo and System.Runtime.Serialization. StreamingContext objects. The SerializationInfo object containing all the properties of an XmlException. The StreamingContext object containing the context information.
    XmlException
    Example Syntax:
    WriteTo
[C#] public XmlException(string message, Exception innerException);
[C++] public: XmlException(String* message, Exception* innerException);
[VB] Public Sub New(ByVal message As String, ByVal innerException As Exception)
[JScript] public function XmlException(message: String, innerException: Exception);
Description
    Initializes a new instance of the XmlException class. The description of the error condition. The System.Exception that threw the XmlException, if any. This value can be null.
    HelpLink
    HResult
    InnerException
    LineNumber
    WriteTo Description
  Gets the line number indicating where the error occurred.
  LinePosition
  WriteTo
[C#] public int LinePosition {get;}
[C++] public: _property int get_LinePosition( );
[VB] Public ReadOnly Property LinePosition As Integer
[JScript] public function get LinePosition( ): int;
Description
  Gets the line position indicating where the error occurred.
  Message
  WriteTo
[C#] public override string Message {get;}
[C++] public: _property virtual String* get_Message( );
[VB] Overrides Public ReadOnly Property Message As String
[JScript] public function get Message( ): String;
Description
  Gets the error message describing the exception.
  Source
  StackTrace
  TargetSite
  GetObjectData
[C#] public override void GetObjectData(SerializationInfo info, StreamingContext context);
[C++] public: void GetObjectData(SerializationInfo* info, StreamingContext context);
[VB] Overrides Public Sub GetObjectData(ByVal info As SerializationInfo, ByVal context As StreamingContext)
[JScript] public override function GetObjectData(info: SerializationInfo, context: StreamingContext);
Description
  Streams all the XmlException properties into the System.Runtime.Serialization.SerializationInfo class for the given System.Runtime.Serialization.StreamingContext. The SerializationInfo object. The StreamingContext object.
  XmlImplementation class (System.Xml)
  ToString
Description
  Defines the context for a set of System.Xml.XmlDocument objects.
  XmlDocument objects that are created from the same implementation share the same System.Xml.XmlNameTable. This enables users to compare attribute and element names between the objects more efficiently.
  XmlImplementation
  Example Syntax:
  ToString
[C#] public XmlImplementation( );
[C++] public: XmlImplementation( );
[VB] Public Sub New( )
[JScript] public function XmlImplementation( );
Description
  Initializes a new instance of the XmlImplementation class.
  CreateDocument
[C#] public virtual XmlDocument CreateDocument( );
[C++] public: virtual XmlDocument* CreateDocument( );
[VB] Overridable Public Function CreateDocument( ) As XmlDocument
[JScript] public function CreateDocument( ): XmlDocument;
Description
  Creates a new System.Xml.XmlDocument.
Return Value: The new XmlDocument object.
  XmlDocument objects created from the same implementation share the same name table. This enables users to compare attribute and element names between the objects more efficiently.
  HasFeature
[C#] public bool HasFeature(string strFeature, string strVersion);
[C++] public: bool HasFeature(String* strFeature, String* strVersion);
[VB] Public Function HasFeature(ByVal strFeature As String, ByVal strVersion As String) As Boolean
[JScript] public function HasFeature(strFeature: String, strVersion: String): Boolean;
Description
  Tests if the DOM implementation implements a specific feature.
Return Value: true if the feature is implemented in the specified version; otherwise, false. The package name of the feature to test. This name is not case-sensitive. This is the version number of the package name to test. If the version is not specified (null), supporting any version of the feature causes the method to return true.
  XmlLinkedNode class (System.Xml)
  ToString
Description
  Gets the node immediately preceding or following this node.
  Attributes
  BaseURI
  ChildNodes
  FirstChild
  HasChildNodes
  InnerText
  InnerXml
  IsReadOnly
  Item
  Item
  LastChild
  LocalName
  Name
  NamespaceURI
  NextSibling
  ToString
Description
  Gets the node immediately following this node.
  NodeType
  OuterXml
  OwnerDocument
  ParentNode
  Prefix
  PreviousSibling
  ToString
Description
  Gets the node immediately preceding this node.
  Value
  XmlNamedNodeMap class (System.Xml)
  WriteTo
Description
  Represents a collection of nodes that can be accessed by name or index.
  Count
  WriteTo
[C#] public virtual int Count {get;}
[C++] public: _property virtual int get_Count( );
[VB] Overridable Public ReadOnly Property Count As Integer
[JScript] public function get Count( ): int;
Description
  Gets the number of nodes in the XmlNamedNodeMap.
  GetEnumerator
[C#] public virtual IEnumerator GetEnumerator( );

[C++] public: virtual IEnumerator* GetEnumerator( );
[VB] Overridable Public Function GetEnumerator( ) As IEnumerator
[JScript] public function GetEnumerator( ): IEnumerator;
Description
　　Provides support for the "foreach" style iteration over the collection of nodes in the XmlNamedNodeMap.
Return Value: An System.Collections.IEnumerator.
　　GetNamedItem
[C#] public virtual XmlNode GetNamedItem(string name);
[C++] public: virtual XmlNode* GetNamedItem(String* name);
[VB] Overridable Public Function GetNamedItem(ByVal name As String) As XmlNode
[JScript] public function GetNamedItem(name: String): XmlNode; Retrieves the specified System.Xml.XmlNode from the collection of nodes in the System.Xml.XmlNamedNodeMap.
Description
　　Retrieves an System.Xml.XmlNode specified by name.
Return Value: An XmlNode with the specified name or null if a matching node is not found. The qualified name of the node to retrieve. It is matched against the System.Xml.XmlNode. Name property of the matching node.
　　GetNamedItem
[C#] public virtual XmlNode GetNamedItem(string localName, string namespaceURI);
[C++] public: virtual XmlNode* GetNamedItem(String* localName, String* namespaceURI);
[VB] Overridable Public Function GetNamedItem(ByVal localName As String, ByVal namespaceURI As String) As XmlNode
[JScript] public function GetNamedItem(localName: String, namespaceURI: String): XmlNode;
Description
　　Retrieves a node with the matching System.Xml.XmlNode.LocalName and System.Xml.XmlNode.NamespaceURI.
Return Value: An System.Xml.XmlNode with the matching local name and namespace URI or null if a matching node was not found. The local name of the node to retrieve. The namespace URI of the node to retrieve.
　　Item
[C#] public virtual XmlNode Item(int index);
[C++] public: virtual XmlNode* Item(int index);
[VB] Overridable Public Function Item(ByVal index As Integer) As XmlNode
[JScript] public function Item(index: int): XmlNode;
Description
　　Retrieves the node at the specified index in the XmlNamedNodeMap.
Return Value: The System.Xml.XmlNode at the specified index. If index is greater than or equal to the System.Xml.XmlNamedNodeMap.Count property, null is returned. The index position of the node to retrieve from the XmlNamedNodeMap. The index is zero-based; therefore, the first node's index is 0 and the last node's index is System.Xml.XmlNamedNodeMap.Count−1.
　　RemoveNamedItem
[C#] public virtual XmlNode RemoveNamedItem(string name);
[C++] public: virtual XmlNode* RemoveNamedItem (String* name);
[VB] Overridable Public Function RemoveNamedItem(ByVal name As String) As XmlNode
[JScript] public function RemoveNamedItem(name: String): XmlNode; Removes the specified node from the XmlNamedNodeMap.
Description
　　Removes the node from the XmlNamedNodeMap.
Return Value: The XmlNode removed from this XmlNamedNodeMap or null if a matching node was not found.
　　If the removed node is an System.Xml.XmlAttribute that contains a default value, it is immediately replaced in the XmlNamedNodeMap. The qualified name of the node to remove. The name is matched against the System.Xml.XmlNode.Name property of the matching node.
　　RemoveNamedItem
[C#] public virtual XmlNode RemoveNamedItem(string localName, string namespaceURI);
[C++] public: virtual XmlNode* RemoveNamedItem (String* localName, String* namespaceURI);
[VB] Overridable Public Function RemoveNamedItem(ByVal localName As String, ByVal namespaceURI As String) As XmlNode
[JScript] public function RemoveNamedItem(localName: String, namespaceURI: String): XmlNode;
Description
　　Removes a node with the matching System.Xml.XmlNode.LocalName and System.Xml.XmlNode.NamespaceURI.
Return Value: The System.Xml.XmlNode removed or null if a matching node was not found.
　　If the removed node is an System.Xml.XmlAttribute that contains a default value, it is immediately replaced in this XmlNamedNodeMap. The local name of the node to remove. The namespace URI of the node to remove.
　　SetNamedItem
[C#] public virtual XmlNode SetNamedItem(XmlNode node);
[C++] public: virtual XmlNode* SetNamedItem(XmlNode* node);
[VB] Overridable Public Function SetNamedItem(ByVal node As XmlNode) As XmlNode
[JScript] public function SetNamedItem(node: XmlNode): XmlNode;
Description
　　Adds an System.Xml.XmlNode using its System.Xml.XmlNode.Name property
Return Value: If the node replaces an existing node with the same name, the old node is returned; otherwise, null is returned. An XmlNode to store in the XmlNamedNodeMap. If a node with that name is already present in the map, it is replaced by the new one.
　　XmlNamespaceManager class (System.Xml)
　　ToString
Description
　　Resolves, adds and removes namespaces to a collection and provide scope management for these namespaces. This class is used by the System.Xml.Xsl.XsltContext and System.Xml.XmlReader classes.
　　XmlNamespaceManager stores prefixes and namespaces as strings.
　　XmlNamespaceManager
　　Example Syntax:
　　ToString
[C#] public XmlNamespaceManager(XmlNameTable nameTable);
[C++] public: XmlNamespaceManager(XmlNameTable* nameTable);
[VB] Public Sub New(ByVal nameTable As XmlNameTable)

[JScript] public function XmlNamespaceManager (nameTable: XmlNameTable);
Description
   Initializes a new instance of the XmlNamespaceManager class with the specified System.Xml.XmlNameTable.
   The name table is used to look up prefixes and namespaces. An existing name table with pre-atomized strings can be specified in the constructor. There are several advantages in doing so. If a XmlReader's name table is used, after each read any namespace and prefix strings pushed into the name table can be re-used by XmlNamespaceManager. Also, because XmlNamespaceManager is used internally by the XmlReader, it can take advantage of the reader's ability to atomize strings. The XmlNameTable to use.
   DefaultNamespace
   ToString
[C#] public virtual string DefaultNamespace {get;}
[C++] public: _property virtual String* get_DefaultNamespace( );
[VB] Overridable Public ReadOnly Property DefaultNamespace As String
[JScript] public function get DefaultNamespace( ): String;
Description
   Gets the namespace URI for the default namespace.
   This method is equivalent to calling LookupNamespace (String.Empty).
   NameTable
   ToString
[C#] public XmlNameTable NameTable {get;}
[C++] public: _property XmlNameTable* get_NameTable( );
[VB] Public ReadOnly Property NameTable As XmlNameTable
[JScript] public function get NameTable( ): XmlNameTable;
Description
   Gets the System.Xml.XmlNameTable associated with this object.
   The name table is used to look up prefixes and namespace URIs.
   AddNamespace
[C#] public virtual void AddNamespace(string prefix, string uri);
[C++] public: virtual void AddNamespace(String* prefix, String* uri);
[VB] Overridable Public Sub AddNamespace(ByVal prefix As String, ByVal uri As String)
[JScript] public function AddNamespace(prefix: String, uri: String);
Description
   Adds the given namespace to the collection.
   XmlNamespaceManager does not check prefix and uri for conformance. The prefix to associate with the namespace being added. Use String.Empty to add a default namespace. The namespace to add.
   GetEnumerator
[C#] public virtual IEnumerator GetEnumerator( );
[C++] public: virtual IEnumerator* GetEnumerator( );
[VB] Overridable Public Function GetEnumerator( ) As IEnumerator
[JScript] public function GetEnumerator( ): IEnumerator;
Description
   Provides support for the "foreach" style iteration over the collection of namespaces in the XmlNamespaceManager.
   Return Value: An System.Collections.IEnumerator.
   HasNamespace
[C#] public virtual bool HasNamespace(string prefix);
[C++] public: virtual bool HasNamespace(String* prefix);
[VB] Overridable Public Function HasNamespace(ByVal prefix As String) As Boolean
[JScript] public function HasNamespace(prefix: String): Boolean;
Description
   Gets a value indicating whether the supplied prefix has a namespace defined for the current pushed scope.
   Return Value: true if there is a namespace defined; otherwise, false.
   To determine whether there is a default empty namespace defined, set prefix to String.Empty (or null). If the method returns true, this indicates that xmlns=" ". Returning false indicates that no default namespace is defined. Note that xmlns:x=" " is illegal (the default namespace cannot be prefixed). The prefix of the namespace you want to find.
   LookupNamespace
[C#] public virtual string LookupNamespace(string prefix);
[C++] public: virtual String* LookupNamespace(String* prefix);
[VB] Overridable Public Function LookupNamespace(ByVal prefix As String) As String
[JScript] public function LookupNamespace(prefix: String): String;
Description
   Gets the namespace URI for the specified prefix.
   Return Value: Returns the namespace URI for prefix or null if there is no mapped namespace. The returned string is atomized. The prefix whose namespace URI you want to resolve. To match the default namespace, pass String.Empty.
   LookupPrefix
[C#] public virtual string LookupPrefix(string uri);
[C++] public: virtual String* LookupPrefix(String* uri);
[VB] Overridable Public Function LookupPrefix(ByVal uri As String) As String
[JScript] public function LookupPrefix(uri: String): String;
Description
   Finds the prefix declared for the given namespace URI.
   Return Value: The matching prefix. If there is no mapped prefix, the method returns String.Empty. If a null value is supplied then null is returned.
   This method finds the mapped prefix by walking the stack (i.e. it looks globally). The supplied string must be atomized for the lookup to succeed. In other words the supplied string object must exist in the XmlNamespaceManager's System.Xml.XmlNamespaceManager.NameTable. The namespace to resolve for the prefix.
   PopScope
[C#] public virtual bool PopScope( );
[C++] public: virtual bool PopScope( );
[VB] Overridable Public Function PopScope( ) As Boolean
[JScript] public function PopScope( ): Boolean;
Description
   Pops a namespace scope off the stack.
   Return Value: true if there are namespace scopes left on the stack; false if there are no more namespaces to pop.
   When you call this method, all of the namespaces which were added to XmlNamespaceManager (by calling System.Xml.XmlNamespaceManager.AddNamespace(System.String,System.String)) since the last call to PopScope, are removed.
   PushScope
[C#] public virtual void PushScope( );
[C++] public: virtual void PushScope( );
[VB] Overridable Public Sub PushScope( )
[JScript] public function PushScope( );
Description
   Pushes a namespace scope onto the stack.

After a call to this method all of the namespaces, which are added to XmlNamespaceManager (by calling System.Xml.XmlNamespaceManager.AddNamespace(System.String, System.String)), belong to the pushed namespace scope.
RemoveNamespace
[C#] public virtual void RemoveNamespace(string prefix, string uri);
[C++] public: virtual void RemoveNamespace(String* prefix, String* uri);
[VB] Overridable Public Sub RemoveNamespace(ByVal prefix As String, ByVal uri As String)
[JScript] public function RemoveNamespace(prefix: String, uri: String);
Description
Removes the given namespace for the given prefix. The prefix for the namespace The namespace to remove for the given prefix. The namespace removed is from the current namespace scope. Namespaces outside the current scope are ignored. Exceptions are never thrown.
XmlNameTable class (System.Xml)
ToString
Description
Table of atomized string objects.
Several classes, such as System.Xml.XmlDocument and System.Xml.XmlReader use the XmlNameTable class internally, to store attribute and element names. When an element or attribute name occurs multiple times in an XML document it is stored only once in the XmlNameTable. This enables you to do object comparisons on these strings rather than a more expensive string comparison.
XmlNameTable
Example Syntax:
ToString
[C#] protected XmlNameTable( );
[C++] protected: XmlNameTable( );
[VB] Protected Sub New( )
[JScript] protected function XmlNameTable( );
Add
[C#] public abstract string Add(string array);
[C++] public: virtual String* Add(String* array)=0;
[VB] MustOverride Public Function Add(ByVal array As String) As String
[JScript] public abstract function Add(array: String): String;
Description
When overridden in a derived class, atomizes the specified string and adds it to the XmlNameTable.
Return Value: The atomized string or the existing atom if one already exists. The name to add.
Add
[C#] public abstract string Add(char[ ] array, int offset, int length);
[C++] public: virtual String* Add(_wchar_t array _gc[ ], int offset, int length)=0;
[VB] MustOverride Public Function Add(ByVal array( ) As Char, ByVal offset As Integer, ByVal length As Integer) As String
[JScript] public abstract function Add(array: Char[ ], offset: int, length: int): String; When overridden in a derived class, atomizes the specified string and adds it to the XmlNameTable.
Description
When overridden in a derived class, atomizes the specified string and adds it to the XmlNameTable
Return Value: The atomized string or the existing atom if one already exists. If length is zero, String.Empty is returned. The character array containing the name to add. Zero based index into the array specifying the first character of the name. The number of characters in the name.
Get
[C#] public abstract string Get(string array);
[C++] public: virtual String* Get(String* array)=0;
[VB] MustOverride Public Function Get(ByVal array As String) As String
[JScript] public abstract function Get(array: String): String;
Description
When overridden in a derived class, gets the atomized String object containing the same value as the specified string.
Return Value: The atomized string or null if the string has not already been atomized. The name to look up.
Get
[C#] public abstract string Get(char[ ] array, int offset, int length);
[C++] public: virtual String* Get(_wchar_t array _gc[ ], int offset, int length)=0;
[VB] MustOverride Public Function Get(ByVal array( ) As Char, ByVal offset As Integer, ByVal length As Integer) As String
[JScript] public abstract function Get(array: Char[ ], offset: int, length: int): String; When overridden in a derived class, gets the atomized String object.
Description
When overridden in a derived class, gets the atomized String object containing the same characters as the specified range of characters in the given array.
Return Value: The atomized string or null if the string has not already been atomized. If length is zero, String.Empty is returned. The character array containing the name to look up. The zero-based index into the array specifying the first character of the name. The number of characters in the name.
XmlNode class (System.Xml)
ToString
Description
Represents a single node in the XML document.
Attributes
ToString
[C#] public virtual XmlAttributeCollection Attributes {get;}
[C++] public: _property virtual XmlAttributeCollection* get_Attributes( );
[VB] Overridable Public ReadOnly Property Attributes As XmlAttributeCollection
[JScript] public function get Attributes( ): XmlAttributeCollection;
Description
Gets an System.Xml.XmlAttributeCollection containing the attributes of this node.
BaseURI
ToString
[C#] public virtual string BaseURI {get;}
[C++] public: _property virtual String* get_BaseURI( );
[VB] Overridable Public ReadOnly Property BaseURI As String
[JScript] public function get BaseURI( ): String;
Description
Gets the base URI of the current node.
A networked XML document is comprised of chunks of data aggregated using various W3C standard inclusion mechanisms and therefore contains nodes that come from different places. The BaseURI tells you where these nodes came from.
ChildNodes
ToString
[C#] public virtual XmlNodeList ChildNodes {get;}

[C++] public: _property virtual XmlNodeList* get_ChildNodes( );
[VB] Overridable Public ReadOnly Property ChildNodes As XmlNodeList
[JScript] public function get ChildNodes( ): XmlNodeList;
Description
    Gets all the children of the node.
    FirstChild
    ToString
[C#] public virtual XmlNode FirstChild {get;}
[C++] public: _property virtual XmlNode* get_FirstChild( );
[VB] Overridable Public ReadOnly Property FirstChild As XmlNode
[JScript] public function get FirstChild( ): XmlNode;
Description
    Gets the first child of the node.
    HasChildNodes
    ToString
[C#] public virtual bool HasChildNodes {get;}
[C++] public: _property virtual bool get_HasChildNodes( );
[VB] Overridable Public ReadOnly Property HasChildNodes As Boolean
[JScript] public function get HasChildNodes( ): Boolean;
Description
  Gets a value indicating whether this node has any child nodes.
    InnerText
    ToString
[C#] public virtual string InnerText {get; set;}
[C++] public: _property virtual String* get_InnerText( );public: _property virtual void set_InnerText(String*);
[VB] Overridable Public Property InnerText As String
[JScript] public function get InnerText( ): String;public function set InnerText(String);
Description
  Gets or sets the concatenated values of the node and all its children.
  Setting this property replaces all the children with the parsed contents of the given string.
    InnerXml
    ToString
[C#] public virtual string InnerXml {get; set;}
[C++] public: _property virtual String* get_InnerXml( );public: _property virtual void set_InnerXml(String*);
[VB] Overridable Public Property InnerXml As String
[JScript] public function get InnerXml( ): String;public function set InnerXml(String);
Description
  Gets or sets the markup representing just the children of this node.
  This is also settable which replaces the children of the node with the parsed contents of the given string. The parsing is done in the current namespace context.
    IsReadOnly
    ToString
[C#] public virtual bool IsReadOnly {get;}
[C++] public: _property virtual bool get_IsReadOnly( );
[VB] Overridable Public ReadOnly Property IsReadOnly As Boolean
[JScript] public function get IsReadOnly( ): Boolean;
Description
  Gets a value indicating whether the node is read-only.
  A read-only node is one whose properties, attributes, or children cannot be changed. You can remove a read-only node from the tree and insert it somewhere else. For example, Entity nodes are always read-only.
    Item
    ToString
[C#] public virtual XmlElement this[string name] {get;}
[C++] public: _property virtual XmlElement* get_Item (String* name);
[VB] Overridable Public Default ReadOnly Property Item (ByVal name As String) As XmlElement
[JScript] returnValue=XmlNodeObject.Item(name); Gets the specified child element.
Description
  Gets the first child element with the specified System.Xml.XmlNode.Name. The qualified name of the element to retrieve
    Item
    ToString
[C#] public virtual XmlElement this[string localname, string ns] {get;}
[C++] public: _property virtual XmlElement* get_Item (String* localname, String* ns);
[VB] Overridable Public Default ReadOnly Property Item (ByVal localname As String, ByVal ns As String) As XmlElement
[JScript] returnValue=XmlNodeObject.Item(localname, ns); Description
  Gets the first child element with the specified System.Xml.XmlNode.LocalName and System.Xml.XmlNode.NamespaceURI. The local name of the element. The namespace URI of the element.
    LastChild
    ToString
[C#] public virtual XmlNode LastChild {get;}
[C++] public: _property virtual XmlNode* get_LastChild( );
[VB] Overridable Public ReadOnly Property LastChild As XmlNode
[JScript] public function get LastChild( ): XmlNode;
Description
  Gets the last child of the node.
    LocalName
    ToString
[C#] public abstract string LocalName {get;}
[C++] public: _property virtual String* get_LocalName( )=0;
[VB] MustOverride Public ReadOnly Property LocalName As String
[JScript] public abstract function get LocalName( ): String;
Description
  When overridden in a derived class, gets the local name of the node.
  If the node does not have a prefix, LocalName is the same as System.Xml.XmlNode.Name.
    Name
    ToString
[C#] public abstract string Name {get;}
[C++] public: _property virtual String* get_Name( )=0;
[VB] MustOverride Public ReadOnly Property Name As String
[JScript] public abstract function get Name( ): String;
Description
  When overridden in a derived class, gets the qualified name of the node.
    NamespaceURI
    ToString
[C#] public virtual string NamespaceURI {get;}
[C++] public: _property virtual String* get_NamespaceURI( );
[VB] Overridable Public ReadOnly Property NamespaceURI As String
[JScript] public function get NamespaceURI( ): String;

Description

Gets the namespace URI of this node.

This is the namespace URI specified at creation time. For example, NamespaceURI is urn:samples for the element An attribute does not inherit its namespace from the element it is attached to. If an attribute is not explicitly given a namespace, it simply has no namespace.

NextSibling
ToString

[C#] public virtual XmlNode NextSibling {get;}
[C++] public: _property virtual XmlNode* get_NextSibling( );
[VB] Overridable Public ReadOnly Property NextSibling As XmlNode
[JScript] public function get NextSibling( ): XmlNode;
Description Gets the node immediately following this node.

NodeType
ToString

[C#] public abstract XmlNodeType NodeType {get;}
[C++] public: _property virtual XmlNodeType get_NodeType( )=0;
[VB] MustOverride Public ReadOnly Property NodeType As XmlNodeType
[JScript] public abstract function get NodeType( ): XmlNodeType;
Description When overridden in a derived class, gets the type of the current node.

This property never returns the XmlNodeType EndElement, EndEntity or None.

OuterXml
ToString

[C#] public virtual string OuterXml {get;}
[C++] public: _property virtual String* get_OuterXml( );
[VB] Overridable Public ReadOnly Property OuterXml As String
[JScript] public function get OuterXml( ): String;
Description Gets the markup representing this node and all its children.

OwnerDocument
ToString

[C#] public virtual XmlDocument OwnerDocument {get;}
[C++] public: _property virtual XmlDocument* get_OwnerDocument( );
[VB] Overridable Public ReadOnly Property OwnerDocument As XmlDocument
[JScript] public function get OwnerDocument( ): XmlDocument;
Description Gets the System.Xml.XmlDocument to which this node belongs.

When adding nodes to the current node, use the System.Xml.XmlDocument returned by the System.Xml.XmlNode.OwnerDocument property to create the node.

ParentNode
ToString

[C#] public virtual XmlNode ParentNode {get;}
[C++] public: _property virtual XmlNode* get_ParentNode( );
[VB] Overridable Public ReadOnly Property ParentNode As XmlNode
[JScript] public function get ParentNode( ): XmlNode;
Description Gets the parent of this node (for nodes that can have parents).

All nodes except System.Xml.XmlDocument, System.Xml.XmlDocumentFragment, and System.Xml.XmlAttribute can have a parent. However, if a node has just been created and not yet added to the tree, or if it has been removed from the tree, the parent is null.

Prefix
ToString

[C#] public virtual string Prefix {get; set;}
[C++] public: _property virtual String* get_Prefix( ); public: _ property virtual void set_Prefix(String*);
[VB] Overridable Public Property Prefix As String
[JScript] public function get Prefix( ): String;public function set Prefix(String);
Description Gets or sets the namespace prefix of this node.

For example, Prefix is bk for the element Setting this property, when permitted, changes the name property, which holds the qualified name, as well as the TagName on XmlElement and the and Name properties on XmlAttribute. Setting this property on node types that cannot have a prefix (such as Text, Comment, EntityReference, CDATA, ProcessingInstruction, Document, and DocumentFragment) has no effect. Note also that changing the prefix of an attribute that is known to have a default value, does not make a new attribute with the default value and the original prefix appear, since the namespaceURI and localName do not change.

PreviousSibling
ToString

[C#] public virtual XmlNode PreviousSibling {get;}
[C++] public: _property virtual XmlNode* get_PreviousSibling( );
[VB] Overridable Public ReadOnly Property PreviousSibling As XmlNode
[JScript] public function get PreviousSibling( ): XmlNode;
Description Gets the node immediately preceding this node.

Value
ToString

[C#] public virtual string Value {get; set;}
[C++] public: _property virtual String* get_Value( );public: _ property virtual void set_Value(String*);
[VB] Overridable Public Property Value As String
[JScript] public function get Value( ): String;public function set Value(String);
Description Gets or sets the value of the node.

AppendChild

[C#] public virtual XmlNode AppendChild(XmlNode newChild);
[C++] public: virtual XmlNode* AppendChild(XmlNode* newChild);
[VB] Overridable Public Function AppendChild(ByVal newChild As XmlNode) As XmlNode
[JScript] public function AppendChild(newChild: XmlNode): XmlNode;
Description Adds the specified node to the end of the list of children of this node.

Return Value: The node added.

If the newChild is already in the tree, it is first removed. The node to add. If it is a XmlDocumentFragment, the entire contents of the document fragment are moved into the child list of this node.

Clone

[C#] public virtual XmlNode Clone( );
[C++] public: virtual XmlNode* Clone( );
[VB] Overridable Public Function Clone( ) As XmlNode
[JScript] public function Clone( ): XmlNode;

Description
  Creates a duplicate of this node.
Return Value: The cloned node.
  Cloning an System.Xml.XmlElement copies all attributes and their values, including those generated by the XML processor to represent defaulted attributes. This method recursively clones the node and the subtree underneath it.
    CloneNode
[C#] public abstract XmlNode CloneNode(bool deep);
[C++] public: virtual XmlNode* CloneNode(bool deep)=0;
[VB] MustOverride Public Function CloneNode(ByVal deep As Boolean) As XmlNode
[JScript] public abstract function CloneNode(deep: Boolean): XmlNode;
Description
  When overridden in a derived class, creates a duplicate of the node.
Return Value: The cloned node.
  This method serves as a copy constructor for nodes. The duplicate node has no parent (System.Xml.XmlNode.ParentNode returns null). true to recursively clone the subtree under the specified node; false to clone only the node itself.
    CreateNavigator
[C#] public XPathNavigator CreateNavigator( );
[C++] public: _sealed XPathNavigator* CreateNavigator( );
[VB] NotOverridable Public Function CreateNavigator( ) As XPathNavigator
[JScript] public function CreateNavigator( ): XPathNavigator;
Description
  Creates an System.Xml.XPath.XPathNavigator for navigating this object.
Return Value: An XPathNavigator object. The XPathNavigator is positioned on the node from which the method was called. It is not positioned on the root of the document.
  The XPathNavigator provides read-only, random access to data. Because it is optimized for XSLT transformations, it provides performance benefits when used as an input mechanism to the System.Xml.Xsl.XslTransform.Transform(System.Xml.XPath.IXPathNavigable,System.Xml.Xsl.XsltArgumentList) method.
    GetEnumerator
[C#] public IEnumerator GetEnumerator( );
[C++] public: IEnumerator* GetEnumerator( );
[VB] Public Function GetEnumerator( ) As IEnumerator
[JScript] public function GetEnumerator( ): IEnumerator;
Description
  Provides support for the for each style iteration over the nodes in the XmlNode.
Return Value: An System.Collections.IEnumerator.
    GetNamespaceOfPrefix
[C#] public virtual string GetNamespaceOfPrefix(string prefix);
[C++] public: virtual String* GetNamespaceOfPrefix (String* prefix);
[VB] Overridable Public Function GetNamespaceOfPrefix (ByVal prefix As String) As String
[JScript] public function GetNamespaceOfPrefix(prefix: String): String;
Description
  Looks up the closest xmlns declaration for the given prefix that is in scope for the current node and returns the namespace URI in the declaration.
Return Value: The namespace URI of the specified prefix. Prefix whose namespace URI you want to find
    GetPrefixOfNamespace
[C#] public virtual string GetPrefixOfNamespace(string namespaceURI);
[C++] public: virtual String* GetPrefixOfNamespace (String* namespaceURI);
[VB] Overridable Public Function GetPrefixOfNamespace (ByVal namespaceURI As String) As String
[JScript] public function GetPrefixOfNamespace(namespaceURI: String): String;
Description
  Looks up the closest xmlns declaration for the given namespace URI that is in scope for the current node and returns the prefix defined in that declaration.
Return Value: The prefix for the specified namespace URI. Namespace URI whose prefix you want to find
    InsertAfter
[C#] public virtual XmlNode InsertAfter(XmlNode newChild, XmlNode refChild);
[C++] public: virtual XmlNode* InsertAfter(XmlNode* newChild, XmlNode* refChild);
[VB] Overridable Public Function InsertAfter(ByVal newChild As XmlNode, ByVal refChild As XmlNode) As XmlNode
[JScript] public function InsertAfter(newChild: XmlNode, refChild: XmlNode): XmlNode;
Description
  Inserts the specified node immediately after the specified reference node.
  If refChild is null, insert newChild at the beginning of the list of children. If newChild is a XmlDocumentFragment object, all of its children are inserted, in the same order, after refChild. If the newChild is already in the tree, it is first removed. XmlNode to insert. XmlNode that is the reference node. The newNode is placed after the refNode.
    InsertBefore
[C#] public virtual XmlNode InsertBefore(XmlNode newChild, XmlNode refChild);
[C++] public: virtual XmlNode* InsertBefore(XmlNode* newChild, XmlNode* refChild);
[VB] Overridable Public Function InsertBefore(ByVal newChild As XmlNode, ByVal refChild As XmlNode) As XmlNode
[JScript] public function InsertBefore(newChild: XmlNode, refChild: XmlNode): XmlNode;
Description
  Inserts the specified node immediately before the specified reference node.
  If refChild is null, insert newChild at the end of the list of children. If newChild is a XmlDocumentFragment object, all of its children are inserted, in the same order, before refChild. If the newChild is already in the tree, it is first removed. The XmlNode to insert. The XmlNode that is the reference node. The newChild is placed before this node.
    Normalize
[C#] public virtual void Normalize( );
[C++] public: virtual void Normalize( );
[VB] Overridable Public Sub Normalize( )
[JScript] public function Normalize( );
Description
  Puts all XmlText nodes in the full depth of the sub-tree underneath this XmlNode into a "normal" form where only markup (e.g., tags, comments, processing instructions, CDATA sections, and entity references) separates XmlText nodes, that is, there are no adjacent XmlText nodes.
  This method can be used to ensure that the DOM view of a document is the same as if it were saved and re-loaded, and is useful when operations (such as XPointer lookups) that depend on a particular document tree structure are to be used.

PrependChild
[C#] public virtual XmlNode PrependChild(XmlNode newChild);
[C++] public: virtual XmlNode* PrependChild(XmlNode* newChild);
[VB] Overridable Public Function PrependChild(ByVal newChild As XmlNode) As XmlNode
[JScript] public function PrependChild(newChild: XmlNode): XmlNode;
Description
Adds the specified node to the beginning of the list of children of this node.
Return Value: The node added.
If the newChild is already in the tree, it is first removed. The node to add. If it is a XmlDocumentFragment, the entire contents of the document fragment are moved into the child list of this node.
RemoveAll
[C#] public virtual void RemoveAll( );
[C++] public: virtual void RemoveAll( );
[VB] Overridable Public Sub RemoveAll( )
[JScript] public function RemoveAll( );
Description
Removes all the children and/or attributes of the current node.
If a removed attribute is known to have a default value, an attribute immediately appears containing the default value and, if applicable, the corresponding namespace URI, local name, and prefix.
RemoveChild
[C#] public virtual XmlNode RemoveChild(XmlNode oldChild);
[C++] public: virtual XmlNode* RemoveChild(XmlNode* oldChild);
[VB] Overridable Public Function RemoveChild(ByVal oldChild As XmlNode) As XmlNode
[JScript] public function RemoveChild(oldChild: XmlNode): XmlNode;
Description
Removes specified child node.
Return Value: The node removed.
When overriding RemoveChild in a derived class, in order for events to be fired correctly, you must call the base class's RemoveChild method. The node being removed.
ReplaceChild
[C#] public virtual XmlNode ReplaceChild(XmlNode newChild, XmlNode oldChild);
[C++] public: virtual XmlNode* ReplaceChild(XmlNode* newChild, XmlNode* oldChild);
[VB] Overridable Public Function ReplaceChild(ByVal newChild As XmlNode, ByVal oldChild As XmlNode) As XmlNode
[JScript] public function ReplaceChild(newChild: XmlNode, oldChild: XmlNode): XmlNode;
Description
Replaces the child node oldChild with newChild node.
Return Value: The node replaced.
If the newChild is already in the tree, it is first removed. The new node to put in the child list. The node being replaced in the list.
SelectNodes
[C#] public XmlNodeList SelectNodes(string xpath);
[C++] public: XmlNodeList* SelectNodes(String* xpath);
[VB] Public Function SelectNodes(ByVal xpath As String) As XmlNodeList
[JScript] public function SelectNodes(xpath: String): XmlNodeList; Selects a list of nodes matching the XPath expression.
Description
Selects a list of nodes matching the XPath expression.
Return Value: An System.Xml.XmlNodeList containing a collection of nodes matching the XPath query.
If the XPath expression requires namespace resolution, you must use the SelectNodes overload which takes an System.Xml.XmlNamespaceManager as its argument. The XmlNamespaceManager is used to resolve namespaces. The XPath expression.
SelectNodes
[C#] public XmlNodeList SelectNodes(string xpath, XmlNamespaceManager nsmgr);
[C++] public: XmlNodeList* SelectNodes(String* xpath, XmlNamespaceManager* nsmgr);
[VB] Public Function SelectNodes(ByVal xpath As String, ByVal nsmgr As XmlNamespaceManager) As XmlNodeList
[JScript] public function SelectNodes(xpath: String, nsmgr: XmlNamespaceManager): XmlNodeList;
Description
Selects a list of nodes matching the XPath expression. Any prefixes found in the XPath expression are resolved using the supplied System.Xml.XmlNamespaceManager.
Return Value: An System.Xml.XmlNodeList containing a collection of nodes matching the XPath query.
XPath expressions can include namespaces. Namespace resolution is supported using the XmlNamespaceManager. If the XPath expression includes a prefix, the prefix and namespace URI pair must be added to the XmlNamespaceManager. The XPath expression. An System.Xml.XmlNamespaceManager to use for resolving namespaces for prefixes in the XPath expression.
SelectSingleNode
[C#] public XmlNode SelectSingleNode(string xpath);
[C++] public: XmlNode* SelectSingleNode(String* xpath);
[VB] Public Function SelectSingleNode(ByVal xpath As String) As XmlNode
[JScript] public function SelectSingleNode(xpath: String): XmlNode; Selects the first XmlNode that matches the XPath expression.
Description
Selects the first XmlNode that matches the XPath expression.
Return Value: The first XmlNode that matches the XPath query or null if no matching node was found.
If the XPath expression requires namespace resolution, you must use the SelectSingleNode overload which takes an System.Xml.XmlNamespaceManager as its argument. The XmlNamespaceManager is used to resolve namespaces. The XPath expression.
SelectSingleNode
[C#] public XmlNode SelectSingleNode(string xpath, XmlNamespaceManager nsmgr);
[C++] public: XmlNode* SelectSingleNode(String* xpath, XmlNamespaceManager* nsmgr);
[VB] Public Function SelectSingleNode(ByVal xpath As String, ByVal nsmgr As XmlNamespaceManager) As XmlNode
[JScript] public function SelectSingleNode(xpath: String, nsmgr: XmlNamespaceManager): XmlNode;
Description
Selects the first XmlNode that matches the XPath expression. Any prefixes found in the XPath expression are resolved using the supplied System.Xml.XmlNamespaceManager.

Return Value: The first XmlNode that matches the XPath query or null if no matching node was found.

XPath expressions can include namespaces. Namespace resolution is supported using the XmlNamespaceManager. If the XPath expression includes a prefix, the prefix and namespace URI pair must be added to the XmlNamespaceManager. The XPath expression. An System.Xml.XmlNamespaceManager to use for resolving namespaces for prefixes in the XPath expression.

Supports
[C#] public virtual bool Supports(string feature, string version);
[C++] public: virtual bool Supports(String* feature, String* version);
[VB] Overridable Public Function Supports(ByVal feature As String, ByVal version As String) As Boolean
[JScript] public function Supports(feature: String, version: String): Boolean;
Description
Test if the DOM implementation implements a specific feature.
Return Value: true if the feature is implemented in the specified version; otherwise, false. The package name of the feature to test. This name is case-insensitive. This is the version number of the package name to test. If the version is not specified (null), supporting any version of the feature will cause the method to return true.

IEnumerable.GetEnumerator
[C#] IEnumerator IEnumerable.GetEnumerator( );
[C++] IEnumerator* IEnumerable::GetEnumerator( );
[VB] Function GetEnumerator( ) As IEnumerator Implements IEnumerable.GetEnumerator
[JScript] function IEnumerable.GetEnumerator( ): IEnumerator;

ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;

WriteContentTo
[C#] public abstract void WriteContentTo(XmlWriter w);
[C++] public: virtual void WriteContentTo(XmlWriter* w)=0;
[VB] MustOverride Public Sub WriteContentTo(ByVal w As XmlWriter)
[JScript] public abstract function WriteContentTo(w: XmlWriter);
Description
When overridden in a derived class, saves all the children of the node to the specified System.Xml.XmlWriter.
This method is functionally equivalent to the System.Xml.XmlNode.InnerXml property. The XmlWriter to which you want to save.

WriteTo
[C#] public abstract void WriteTo(XmlWriter w);
[C++] public: virtual void WriteTo(XmlWriter* w)=0;
[VB] MustOverride Public Sub WriteTo(ByVal w As XmlWriter)
[JScript] public abstract function WriteTo(w: XmlWriter);
Description
When overridden in a derived class, saves the current node to the specified System.Xml.XmlWriter.
This method is functionally equivalent to the System.Xml.XmlNode.OuterXml property. The XmlWriter to which you want to save.

XmlNodeChangedAction enumeration (System.Xml)
WriteTo
Description
TODO: Specifies the type of node change TODO: Specifies the type of node change
WriteTo
[C#] public const XmlNodeChangedAction Change;
[C++] public: const XmlNodeChangedAction Change;
[VB] Public Const Change As XmlNodeChangedAction
[JScript] public var Change: XmlNodeChangedAction;
Description
TODO: A node value is being changed.
WriteTo
[C#] public const XmlNodeChangedAction Insert;
[C++] public: const XmlNodeChangedAction Insert;
[VB] Public Const Insert As XmlNodeChangedAction
[JScript] public var Insert: XmlNodeChangedAction;
Description
TODO: A node is being inserted in the tree.
WriteTo
[C#] public const XmlNodeChangedAction Remove;
[C++] public: const XmlNode ChangedAction Remove;
[VB] Public Const Remove As XmlNodeChangedAction
[JScript] public var Remove: XmlNodeChangedAction;
Description
TODO: A node is being removed from the tree.
XmlNodeChangedEventArgs class (System.Xml)
ToString
Description
Provides data for the System.Xml.XmlDocument.NodeChanged, System.Xml.XmlDocument.NodeChanging, System.Xml.XmlDocument.NodeInserted, System.Xml.XmlDocument.NodeInserting, System.Xml.XmlDocument.NodeRemoved and System.Xml.XmlDocument.NodeRemoving events.
The following C# code shows how to use the event handler.
Action
ToString
[C#] public XmlNodeChangedAction Action {get;}
[C++] public: _property XmlNodeChangedAction get_Action( );
[VB] Public ReadOnly Property Action As XmlNodeChangedAction
[JScript] public function get Action( ): XmlNodeChangedAction;
Description
Gets a value indicating what type of node change event is occurring.
NewParent
ToString
[C#] public XmlNode NewParent {get;}
[C++] public: _property XmlNode* get_NewParent( );
[VB] Public ReadOnly Property NewParent As XmlNode
[JScript] public function get NewParent( ): XmlNode;
Description
Gets the value of the System.Xml.XmlNode.ParentNode after the operation completes.
Node
ToString
[C#] public XmlNode Node {get;}
[C++] public: _property XmlNode* get_Node( );
[VB] Public ReadOnly Property Node As XmlNode
[JScript] public function get Node( ): XmlNode;
Description
Gets the System.Xml.XmlNode that is being added, removed or changed.

OldParent
ToString
[C#] public XmlNode OldParent {get;}
[C++] public: _property XmlNode* get_OldParent( );
[VB] Public ReadOnly Property OldParent As XmlNode
[JScript] public function get OldParent( ): XmlNode;
Description
    Gets the value of the System.Xml.XmlNode.ParentNode before the operation began.
    XmlNodeChangedEventHandler delegate (System.Xml)
    ToString
Description
    Represents the method that handles System.Xml.XmlDocument.NodeChanged, System.Xml.XmlDocument.NodeChanging, System.Xml.XmlDocument.NodeInserted, System.Xml.XmlDocument.NodeInserting, System.Xml.XmlDocument.NodeRemoved and System.Xml.XmlDocument.NodeRemoving events. The source of the event. An System.Xml.XmlNodeChangedEventArgs containing the event data.
    When you create an XmlNodeChangedEventHandler delegate, you identify the method that handles the event. To associate the event with your event handler, add an instance of the delegate to the event. The event handler is called whenever the event occurs, unless you remove the delegate. For more information about event handler delegates, see.
    XmlNodeList class (System.Xml)
    ToString
Description
    Represents an ordered collection of nodes.
    The XmlNodeList is "live": changes to the children of the node object that it was created from are immediately reflected in the nodes returned by the XmlNodeList properties and methods. The XmlNodeList is not a static snapshot of the content of the node. This is true for every XmlNodeList, including the ones returned by the System.Xml.XmlDocument.GetElementsByTagName(System.String) method.
    XmlNodeList
    Example Syntax:
    ToString
[C#] protected XmlNodeList( );
[C++] protected: XmlNodeList( );
[VB] Protected Sub New( )
[JScript] protected function XmlNodeList( );
    Count
    ToString
[C#] public abstract int Count {get;}
[C++] public: _property virtual int get_Count( )=0;
[VB] MustOverride Public ReadOnly Property Count As Integer
[JScript] public abstract function get Count( ): int;
Description
    Gets the number of nodes in the XmlNodeList.
    ItemOf
    ToString
[C#] public virtual XmlNode this[int i] {get;}
[C++] public: _property virtual XmlNode* get_ItemOf(int i);
[VB] Overridable Public Default ReadOnly Property ItemOf (ByVal i As Integer) As XmlNode
[JScript] returnValue=XmlNodeListObject.ItemOf(i);
Description
    Retrieves a node at the given index. Zero-based index into the list of nodes.
    GetEnumerator
[C#] public abstract IEnumerator GetEnumerator( );
[C++] public: virtual IEnumerator* GetEnumerator( )=0;
[VB] MustOverride Public Function GetEnumerator( ) As IEnumerator
[JScript] public abstract function GetEnumerator( ): IEnumerator;
Description
    Provides a simple "foreach" style iteration over the collection of nodes in the XmlNodeList.
Return Value: An System.Collections.IEnumerator.
    Item
[C#] public abstract XmlNode Item(int index);
[C++] public: virtual XmlNode* Item(int index)=0;
[VB] MustOverride Public Function Item(ByVal index As Integer) As XmlNode
[JScript] public abstract function Item(index: int): XmlNode;
Description
    Retrieves a node at the given index.
Return Value: The System.Xml.XmlNode in the collection. If index is greater than or equal to the number of nodes in the list, this returns null. Zero-based index into the list of nodes.
    XmlNodeOrder enumeration (System.Xml)
    ToString
Description
    Describes the document order of a node compared to a second node.
    ToString
[C#] public const XmlNodeOrder After;
[C++] public: const XmlNodeOrder After;
[VB] Public Const After As XmlNodeOrder
[JScript] public var After: XmlNodeOrder;
Description
    The current node of the supplied navigator is after the current node of this navigator.
    ToString
[C#] public const XmlNodeOrder Before;
[C++] public: const XmlNodeOrder Before;
[VB] Public Const Before As XmlNodeOrder
[JScript] public var Before: XmlNodeOrder;
Description
    The current node of the supplied navigator is before the current node of this navigator.
    ToString
[C#] public const XmlNodeOrder Same;
[C++] public: const XmlNodeOrder Same;
[VB] Public Const Same As XmlNodeOrder
[JScript] public var Same: XmlNodeOrder;
Description
    The current node of the supplied navigator is the same as the current node of this navigator.
    ToString
[C#] public const XmlNodeOrder Unknown;
[C++] public: const XmlNodeOrder Unknown;
[VB] Public Const Unknown As XmlNodeOrder
[JScript] public var Unknown: XmlNodeOrder;
Description
    The node positions cannot be determined in document order, relative to each other. This could occur if the two nodes reside in different trees.
    XmlNodeReader class (System.Xml)
    ToString
Description
    Represents a reader that provides fast, non-cached forward only access to XML data in an System.Xml.XmlNode.
    The XmlNodeReader has the ability to read an XML DOM subtree. This class does not support DTD or schema validation. To perform data validation, use the System.Xml.XmlValidatingReader.
    XmlNodeReader Example Syntax:
ToString
[C#] public XmlNodeReader(XmlNode node);
[C++] public: XmlNodeReader(XmlNode* node);
[VB] Public Sub New(ByVal node As XmlNode)
[JScript] public function XmlNodeReader(node: XmlNode);
Creates an instance of the XmlNodeReader.
Description
  Creates an instance of the XmlNodeReader class using the specified System.Xml.XmlNode.
  The following C# code creates an XmlNodeReader. The XmlNode you want to read.
  AttributeCount
  ToString
[C#] public override int AttributeCount {get;}
[C++] public: _property virtual int get_AttributeCount( );
[VB] Overrides Public ReadOnly Property AttributeCount As Integer
[JScript] public function get AttributeCount( ): int;
Description
  Gets the number of attributes on the current node.
  This property is relevant to Element, DocumentType and XmlDeclaration nodes only. (Other node types do not have attributes.) The following example reads all the attributes on the root node.
  BaseURI
  ToString
[C#] public override string BaseURI {get;}
[C++] public: _property virtual String* get_BaseURI( );
[VB] Overrides Public ReadOnly Property BaseURI As String
[JScript] public function get BaseURI( ): String;
Description
  Gets the base URI of the current node.
  A networked XML document is comprised of chunks of data aggregated using various W3C standard inclusion mechanisms and therefore contains nodes that come from different places. DTD entities are an example of this, but this is not limited to DTDs. The base URI tells you where these nodes came from. If there is no base URI for the nodes being returned (for example, they were parsed from an in-memory string), String.Empty is returned.
  CanResolveEntity
  ToString
[C#] public override bool CanResolveEntity {get;}
[C++] public: _property virtual bool get_CanResolveEntity( );
[VB] Overrides Public ReadOnly Property CanResolveEntity As Boolean
[JScript] public function get CanResolveEntity( ): Boolean;
Description
  Gets a value indicating whether this reader can parse and resolve entities.
  Depth
  ToString
[C#] public override int Depth {get;}
[C++] public: _property virtual int get_Depth( );
[VB] Overrides Public ReadOnly Property Depth As Integer
[JScript] public function get Depth( ): int;
Description
  Gets the depth of the current node in the XML document.
  EOF
  ToString
[C#] public override bool EOF {get;}
[C++] public: _property virtual bool get_EOF( );
[VB] Overrides Public ReadOnly Property EOF As Boolean
[JScript] public function get EOF( ): Boolean;
Description
  Gets a value indicating whether the reader is positioned at the end of the stream.
  HasAttributes
  ToString
[C#] public override bool HasAttributes {get;}
[C++] public: _property virtual bool get_HasAttributes( );
[VB] Overrides Public ReadOnly Property HasAttributes As Boolean
[JScript] public function get HasAttributes( ): Boolean;
Description
  Gets a value indicating whether the current node has any attributes.
  HasValue
  ToString
[C#] public override bool HasValue {get;}
[C++] public: _property virtual bool get_HasValue( );
[VB] Overrides Public ReadOnly Property HasValue As Boolean
[JScript] public function get HasValue( ): Boolean;
Description
  Gets a value indicating whether the current node can have a System.Xml.XmlNodeReader.Value.
  The following table lists node types that have a value to return.
  IsDefault
  ToString
[C#] public override bool IsDefault {get;}
[C++] public: _property virtual bool get_IsDefault( );
[VB] Overrides Public ReadOnly Property IsDefault As Boolean
[JScript] public function get IsDefault( ): Boolean;
Description
  Gets a value indicating whether the current node is an attribute that was generated from the default value defined in the DTD or schema.
  This property applies to attribute nodes only.
  IsEmptyElement
  ToString
[C#] public override bool IsEmptyElement {get;}
[C++] public: _property virtual bool get_IsEmptyElement( );
[VB] Overrides Public ReadOnly Property IsEmptyElement As Boolean
[JScript] public function get IsEmptyElement( ): Boolean;
Description
  Gets a value indicating whether the current node is an empty element (for example,).
  This property enables you to determine the difference between the following: (IsEmptyElement is true).
  Item
  ToString
[C#] public override string this[int i] {get;}
[C++] public: _property virtual String* get_Item(int i);
[VB] Overrides Public Default ReadOnly Property Item(ByVal i As Integer) As String
[JScript] returnValue=XmlNodeReaderObject.Item(i); Gets the value of the specified attribute.
Description
  Gets the value of the attribute with the specified index.
  This property does not move the reader. The index of the attribute.
  Item
  ToString
[C#] public override string this[string name] {get;}
[C++] public: _property virtual String* get_Item(String* name);

[VB] Overrides Public Default ReadOnly Property Item(ByVal name As String) As String
[JScript] returnValue=XmlNodeReaderObject.Item(name);
Description
    Gets the value of the attribute with the specified name.
    This property does not move the reader. The qualified name of the attribute.
    Item
    ToString
[C#] public override string this[string name, string namespaceURI] {get;}
[C++] public: _property virtual String* get_Item(String* name, String* namespaceURI);
[VB] Overrides Public Default ReadOnly Property Item(ByVal name As String, ByVal namespaceURI As String) As String
[JScript] returnValue=XmlNodeReaderObject.Item(name, namespaceURI);
Description
    Gets the value of the attribute with the specified local name and namespace URI.
    This property does not move the reader. The local name of the attribute. The namespace URI of the attribute.
    LocalName
    ToString
[C#] public override string LocalName {get;}
[C++] public: _property virtual String* get_LocalName( );
[VB] Overrides Public ReadOnly Property LocalName As String
[JScript] public function get LocalName( ): String;
Description
    Gets the local name of the current node.
    Name
    ToString
[C#] public override string Name {get;}
[C++] public: _property virtual String* get_Name( );
[VB] Overrides Public ReadOnly Property Name As String
[JScript] public function get Name( ): String;
Description
    Gets the qualified name of the current node.
    NamespaceURI
    ToString
[C#] public override string NamespaceURI {get;}
[C++] public: _property virtual String* get_NamespaceURI( );
[VB] Overrides Public ReadOnly Property NamespaceURI As String
[JScript] public function get NamespaceURI( ): String;
Description
    Gets the namespace URI (as defined in the W3C Namespace specification) of the node on which the reader is positioned.
    This property is relevant to Element and Attribute nodes only.
    NameTable
    ToString
[C#] public override XmlNameTable NameTable {get;}
[C++] public: _property virtual XmlNameTable* get_NameTable( );
[VB] Overrides Public ReadOnly Property NameTable As XmlNameTable
[JScript] public function get NameTable( ): XmlNameTable;
Description
    Gets the System.Xml.XmlNameTable associated with this implementation.
    All node and attribute names returned from this class are atomized using the NameTable. When the same name is returned multiple times (for example, Customer), then the same String object will be returned for that name. This makes it possible for you to write efficient code that does object comparisons on these strings instead of expensive string comparisons.
    NodeType
    ToString
[C#] public override XmlNodeType NodeType {get;}
[C++] public: _property virtual XmlNodeType get_NodeType( );
[VB] Overrides Public ReadOnly Property NodeType As XmlNodeType
[JScript] public function get NodeType( ): XmlNodeType;
Description
    Gets the type of the current node.
    Prefix
    ToString
[C#] public override string Prefix {get;}
[C++] public: _property virtual String* get_Prefix( );
[VB] Overrides Public ReadOnly Property Prefix As String
[JScript] public function get Prefix( ): String;
Description
    Gets the namespace prefix associated with the current node.
    QuoteChar
    ToString
[C#] public override char QuoteChar {get;}
[C++] public: _property virtual _wchar_t get_QuoteChar( );
[VB] Overrides Public ReadOnly Property QuoteChar As Char
[JScript] public function get QuoteChar( ): Char;
Description
    Gets the quotation mark character used to enclose the value of an attribute node.
    This property applies only to an attribute node.
    ReadState
    ToString
[C#] public override ReadState ReadState {get;}
[C++] public: _property virtual ReadState get_ReadState( );
[VB] Overrides Public ReadOnly Property ReadState As ReadState
[JScript] public function get ReadState( ): ReadState;
Description
    Gets the state of the reader.
    Value
    ToString
[C#] public override string Value {get;}
[C++] public: _property virtual String* get_Value( );
[VB] Overrides Public ReadOnly Property Value As String
[JScript] public function get Value( ): String;
Description
    Gets the text value of the current node.
    XmlLang
    ToString
[C#] public override string XmlLang {get;}
[C++] public: _property virtual String* get_XmlLang( );
[VB] Overrides Public ReadOnly Property XmlLang As String
[JScript] public function get XmlLang( ): String;
Description
    Gets the current xml:lang scope.
    This property represents the xml:lang scope within which the current node resides. For example, here is an XML fragment with xml:lang set to US English in the root element: Fred When the reader is positioned on the name element, you can use this property to find that it is in the scope of a US English xml:lang attribute.

XmlSpace
ToString
[C#] public override XmlSpace XmlSpace {get;}
[C++] public: _property virtual XmlSpace get_XmlSpace( );
[VB] Overrides Public ReadOnly Property XmlSpace As XmlSpace
[JScript] public function get XmlSpace( ): XmlSpace;
Description
  Gets the current xml:space scope.
  Close
[C#] public override void Close( );
[C++] public: void Close( );
[VB] Overrides Public Sub Close( )
[JScript] public override function Close( );
Description
  Changes the System.Xml.XmlNodeReader.ReadState to Closed.
  This method also releases any resources held while reading. If Close has already been called, no action is performed.
  GetAttribute
[C#] public override string GetAttribute(int i);
[C++] public: String* GetAttribute(int i);
[VB] Overrides Public Function GetAttribute(ByVal i As Integer) As String
[JScript] public override function GetAttribute(i: int): String;
Description
  Gets the value of the attribute with the specified index.
Return Value: The value of the specified attribute.
  This method does not move the reader. The index of the attribute. The index is zero-based. (The first attribute has index 0.)
  GetAttribute
[C#] public override string GetAttribute(string name);
[C++] public: String* GetAttribute(String* name);
[VB] Overrides Public Function GetAttribute(ByVal name As String) As String
[JScript] public override function GetAttribute(name: String): String; Gets the value of an attribute.
Description
  Gets the value of the attribute with the specified name.
Return Value: The value of the specified attribute. If the attribute is not found, String.Empty is returned.
  This method does not move the reader. The qualified name of the attribute.
  GetAttribute
[C#] public override string GetAttribute(string name, string namespaceURI);
[C++] public: String* GetAttribute(String* name, String* namespaceURI);
[VB] Overrides Public Function GetAttribute(ByVal name As String, ByVal namespaceURI As String) As String
[JScript] public override function GetAttribute(name: String, namespaceURI: String): String;
Description
  Gets the value of the attribute with the specified local name and namespace URI.
Return Value: The value of the specified attribute. If the attribute is not found, String.Empty is returned.
  The following XML contains an attribute in a specific namespace: You can lookup the dt:type attribute using one argument (prefix and local name) or two arguments (local name and namespace URI): String dt=reader.GetAttribute ("dt:type"); String dt2=reader.GetAttribute("type","urn:datatypes"); To lookup the xmlns:dt attribute, use one of the following arguments: String dt3=reader.GetAttribute ("xmlns:dt"); String dt4=reader.GetAttribute("dt",http://www.w3.org/2000/xmlns/);You can also get this information using the System.Xml.XmlNodeReader.Prefix property. The local name of the attribute. The namespace URI of the attribute.
  LookupNamespace
[C#] public override string LookupNamespace(string prefix);
[C++] public: String* LookupNamespace(String* prefix);
[VB] Overrides Public Function LookupNamespace(ByVal prefix As String) As String
[JScript] public override function LookupNamespace(prefix: String): String;
Description
  Resolves a namespace prefix in the current element's scope.
Return Value: The namespace URI to which the prefix maps or null if no matching prefix is found.
  In the preceding XML, if the reader is positioned on the href attribute, the prefix a is resolved by calling reader.LookupNamespace("a"). The returned string is urn:456. The prefix whose namespace URI you want to resolve. To match the default namespace, pass an empty string. This string does not have to be atomized.
  MoveToAttribute
[C#] public override void MoveToAttribute(int i);
[C++] public: void MoveToAttribute(int i);
[VB] Overrides Public Sub MoveToAttribute(ByVal i As Integer)
[JScript] public override function MoveToAttribute(i: int);
Description
  Moves to the attribute with the specified index. The index of the attribute.
  MoveToAttribute
[C#] public override bool MoveToAttribute(string name);
[C++] public: bool MoveToAttribute(String* name);
[VB] Overrides Public Function MoveToAttribute(ByVal name As String) As Boolean
[JScript] public override function MoveToAttribute(name: String): Boolean; Moves to the specified attribute.
Description
  Moves to the attribute with the specified name.
Return Value: true if the attribute is found; otherwise, false. If false, the reader's position does not change.
  After calling this method, the System.Xml.XmlNodeReader.Name, System.Xml.XmlNodeReader. NamespaceURI, and System.Xml.XmlNodeReader.Prefix properties reflect the properties of that attribute. The qualified name of the attribute.
  MoveToAttribute
[C#] public override bool MoveToAttribute(string name, string namespaceURI);
[C++] public: bool MoveToAttribute(String* name, String* namespaceURI);
[VB] Overrides Public Function MoveToAttribute(ByVal name As String, ByVal namespaceURI As String) As Boolean
[JScript] public override function MoveToAttribute(name: String, namespaceURI: String): Boolean;
Description
  Moves to the attribute with the specified local name and namespace URI.
Return Value: true if the attribute is found; otherwise, false. If false, the reader's position does not change.
  After calling this method, the System.Xml.XmlNodeReader.Name, System.Xml.XmlNodeReader. NamespaceURI, and System.Xml.XmlNodeReader.Prefix properties reflect the properties of that attribute. The local name of the attribute. The namespace URI of the attribute.
  MoveToElement
[C#] public override bool MoveToElement( );
[C++] public: bool MoveToElement( );

[VB] Overrides Public Function MoveToElement( ) As Boolean
[JScript] public override function MoveToElement( ): Boolean;
Description Moves to the element that contains the current attribute node.

Return Value: true if the reader is positioned on an attribute (the reader moves to the element that owns the attribute); false if the reader is not positioned on an attribute (the position of the reader does not change).

Use this method to return to an element after navigating through its attributes. This method moves the reader to one of the following node types: Element, DocumentType, or XmlDeclaration.

MoveToFirstAttribute
[C#] public override bool MoveToFirstAttribute( );
[C++] public: bool MoveToFirstAttribute( );
[VB] Overrides Public Function MoveToFirstAttribute( ) As Boolean
[JScript] public override function MoveToFirstAttribute( ): Boolean;
Description Moves to the first attribute.

Return Value: true if an attribute exists (the reader moves to the first attribute); otherwise, false (the position of the reader does not change).

MoveToNextAttribute
[C#] public override bool MoveToNextAttribute( );
[C++] public: bool MoveToNextAttribute( );
[VB] Overrides Public Function MoveToNextAttribute( ) As Boolean
[JScript] public override function MoveToNextAttribute( ): Boolean;
Description Moves to the next attribute.

Return Value: true if there is a next attribute; false if there are no more attributes.

If the current node is an element node, this method is equivalent to System.Xml.XmlNodeReader.MoveToFirstAttribute. If MoveToNextAttribute returns true, the reader moves to the next attribute; otherwise, the position of the reader does not change.

Read
[C#] public override bool Read( );
[C++] public: bool Read( );
[VB] Overrides Public Function Read( ) As Boolean
[JScript] public override function Read( ): Boolean;
Description Reads the next node from the stream.

Return Value: true if the next node was read successfully; false if there are no more nodes to read.

When a reader is first created and initialized, there is no information available. You must call Read to read the first node.

ReadAttributeValue
[C#] public override bool ReadAttributeValue( );
[C++] public: bool ReadAttributeValue( );
[VB] Overrides Public Function ReadAttributeValue( ) As Boolean
[JScript] public override function ReadAttributeValue( ): Boolean;
Description Parses the attribute value into one or more Text or EntityReference nodes.

Return Value: true if there are nodes to return.

Use this method after calling System.Xml.XmlNodeReader.MoveToAttribute(System.String) to read through the text or entity reference nodes that make up the attribute value. The System.Xml.XmlNodeReader.Depth of the attribute value nodes is one plus the depth of the attribute node; it increments and decrements by one when you step into and out of general entity references.

ReadInnerXml
[C#] public override string ReadInnerXml( );
[C++] public: String* ReadInnerXml( );
[VB] Overrides Public Function ReadInnerXml( ) As String
[JScript] public override function ReadInnerXml( ): String;
Description Reads all the content, including markup, as a string.

Return Value: All the XML content, including markup, in the current node. If the current node has no children, an empty string is returned.

This method returns all the content of the current node including the markup. The current node (start tag) and corresponding end node (end tag) are not returned. For example, if you had the following: this ReadInnerXml returns this This method handles element and attribute nodes in the following way: Node Type Child Content Return Value Position After the Call Element text text After the end tag.

ReadOuterXml
[C#] public override string ReadOuterXml( );
[C++] public: String* ReadOuterXml( );
[VB] Overrides Public Function ReadOuterXml( ) As String
[JScript] public override function ReadOuterXml( ): String;
Description Reads the content, including markup, representing this node and all its children.

Return Value: If the reader is positioned on an element or an attribute node, this method returns all the XML content, including markup, of the current node and all its children; otherwise, it returns an empty string.

This method is similar to System.Xml.XmlNodeReader.ReadInnerXml except it also returns the start and end tags.

ReadString
[C#] public override string ReadString( );
[C++] public: String* ReadString( );
[VB] Overrides Public Function ReadString( ) As String
[JScript] public override function ReadString( ): String;
Description Reads the contents of an element or text node as a string.

Return Value: The contents of the element or text node. This can be an empty string if the reader is positioned on something other than an element or text node, or if there is no more text content to return in the current context.

If positioned on an element, ReadString concatenates all text, significant whitespace, whitespace and CData section node types together and returns the concatenated data as the element content. It stops when any markup is encountered. This could occur in a mixed content model, or when an element end tag is read.

ResolveEntity
[C#] public override void ResolveEntity( );
[C++] public: void ResolveEntity( );
[VB] Overrides Public Sub ResolveEntity( )
[JScript] public override function ResolveEntity( );
Description Resolves the entity reference for EntityReference nodes.

If the reader is positioned on an EntityReference node (XmlNodeType.EntityReference), if System.Xml.XmlNodeReader.Read is called after calling this method, the entity replacement text is parsed. When the entity replacement text is finished, an EndEntity node is returned to close the entity reference scope.
Skip
[C#] public override void Skip( );
[C++] public: void Skip( );
[VB] Overrides Public Sub Skip( )
[JScript] public override function Skip( );
Description
Skips the current element.
For example, suppose you have the following XML input: abc . . . . If the reader is positioned on the " " node or any of its attributes, calling Skip positions the reader to the " " node.
XmlNodeType enumeration (System.Xml)
ToString
Description
Specifies the type of node.
ToString
[C#] public const XmlNodeType Attribute;
[C++] public: const XmlNodeType Attribute;
[VB] Public Const Attribute As XmlNodeType
[JScript] public var Attribute: XmlNodeType;
Description
An attribute.
ToString
[C#] public const XmlNodeType CDATA;
[C++] public: const XmlNodeType CDATA;
[VB] Public Const CDATA As XmlNodeType
[JScript] public var CDATA: XmlNodeType;
Description
A CDATA section.
ToString
[C#] public const XmlNodeType Comment;
[C++] public: const XmlNodeType Comment;
[VB] Public Const Comment As XmlNodeType
[JScript] public var Comment: XmlNodeType;
Description
A comment.
ToString
[C#] public const XmlNodeType Document;
[C++] public: const XmlNodeType Document;
[VB] Public Const Document As XmlNodeType
[JScript] public var Document: XmlNodeType;
Description
A document object that, as the root of the document tree, provides access to the entire XML document.
ToString
[C#] public const XmlNodeType DocumentFragment;
[C++] public: const XmlNodeType DocumentFragment;
[VB] Public Const DocumentFragment As XmlNodeType
[JScript] public var DocumentFragment: XmlNodeType;
Description
A document fragment.
ToString
[C#] public const XmlNodeType DocumentType;
[C++] public: const XmlNodeType DocumentType;
[VB] Public Const DocumentType As XmlNodeType
[JScript] public var DocumentType: XmlNodeType;
Description
The document type declaration, indicated by the following tag.
ToString
[C#] public const XmlNodeType Element;
[C++] public: const XmlNodeType Element;
[VB] Public Const Element As XmlNodeType
[JScript] public var Element: XmlNodeType;
Description
An element.
ToString
[C#] public const XmlNodeType EndElement;
[C++] public: const XmlNodeType EndElement;
[VB] Public Const EndElement As XmlNodeType
[JScript] public var EndElement: XmlNodeType;
Description
An end element tag.
ToString
[C#] public const XmlNodeType EndEntity;
[C++] public: const XmlNodeType EndEntity;
[VB] Public Const EndEntity As XmlNodeType
[JScript] public var EndEntity: XmlNodeType;
Description
Returned when XmlReader gets to the end of the entity replacement as a result of a call to System.Xml.XmlReader.ResolveEntity.
ToString
[C#] public const XmlNodeType Entity;
[C++] public: const XmlNodeType Entity;
[VB] Public Const Entity As XmlNodeType
[JScript] public var Entity: XmlNodeType;
Description
An entity declaration.
ToString
[C#] public const XmlNodeType EntityReference;
[C++] public: const XmlNodeType EntityReference;
[VB] Public Const EntityReference As XmlNodeType
[JScript] public var EntityReference: XmlNodeType;
Description
A reference to an entity.
ToString
[C#] public const XmlNodeType None;
[C++] public: const XmlNodeType None;
[VB] Public Const None As XmlNodeType
[JScript] public var None: XmlNodeType;
Description
This is returned by the System.Xml.XmlReader if a Read method has not been called.
ToString
[C#] public const XmlNodeType Notation;
[C++] public: const XmlNodeType Notation;
[VB] Public Const Notation As XmlNodeType
[JScript] public var Notation: XmlNodeType;
Description
A notation in the document type declaration.
ToString
[C#] public const XmlNodeType ProcessingInstruction;
[C++] public: const XmlNodeType ProcessingInstruction;
[VB] Public Const ProcessingInstruction As XmlNodeType
[JScript] public var ProcessingInstruction: XmlNodeType;
Description
A processing instruction.
ToString
[C#] public const XmlNodeType SignificantWhitespace;
[C++] public: const XmlNodeType SignificantWhitespace;
[VB] Public Const SignificantWhitespace As XmlNodeType
[JScript] public var SignificantWhitespace: XmlNodeType;
Description
Whitespace between markup in a mixed content model or whitespace within the xml:space="preserve" scope.
ToString
[C#] public const XmlNodeType Text;
[C++] public: const XmlNodeType Text;
[VB] Public Const Text As XmlNodeType
[JScript] public var Text: XmlNodeType;

Description
  The text content of a node.
  ToString
[C#] public const XmlNodeType Whitespace;
[C++] public: const XmlNodeType Whitespace;
[VB] Public Const Whitespace As XmlNodeType
[JScript] public var Whitespace: XmlNodeType;
Description
  Whitespace between markup.
  ToString
[C#] public const XmlNodeType XmlDeclaration;
[C++] public: const XmlNodeType XmlDeclaration;
[VB] Public Const XmlDeclaration As XmlNodeType
[JScript] public var XmlDeclaration: XmlNodeType;
Description
  The XML declaration.
  XmlNotation class (System.Xml)
  ToString
Description
  Represents a notation declaration:
  Attributes
  BaseURI
  ChildNodes
  FirstChild
  HasChildNodes
  InnerText
  InnerXml
  ToString
Description
  Gets the markup representing the children of this node.
  XmlNotation nodes are read-only. Setting this property throws an exception.
  IsReadOnly
  ToString
[C#] public override bool IsReadOnly {get;}
[C++] public: _property virtual bool get_IsReadOnly( );
[VB] Overrides Public ReadOnly Property IsReadOnly As Boolean
[JScript] public function get IsReadOnly( ): Boolean;
Description
  Gets a value indicating whether the node is read-only.
  A read-only node is one whose properties, attributes, or children cannot be changed. You can remove a read-only node from the tree and insert it somewhere else.
  Item
  Item
  LastChild
  LocalName
  ToString
Description
  Gets the name of the current node without the namespace prefix.
  Name
  ToString
[C#] public override string Name {get;}
[C++] public: _property virtual String* get_Name( );
[VB] Overrides Public ReadOnly Property Name As String
[JScript] public function get Name( ): String;
Description
  Gets the name of the current node.
  NamespaceURI
  NextSibling
  NodeType
  ToString
Description
  Gets the type of the current node.
  OuterXml
  ToString
[C#] public override string OuterXml {get;}
[C++] public: _property virtual String* get_OuterXml( );
[VB] Overrides Public ReadOnly Property OuterXml As String
[JScript] public function get OuterXml( ): String;
Description
  Gets the markup representing this node and all its children.
  OwnerDocument
  ParentNode
  Prefix
  PreviousSibling
  PublicId
  ToString
Description
  Gets the value of the public identifier on the notation declaration.
  SystemId
  ToString
[C#] public string SystemId {get;}
[C++] public: _property String* get_SystemId( );
[VB] Public ReadOnly Property SystemId As String
[JScript] public function get SystemId( ): String;
Description
  Gets the value of the system identifier on the notation declaration.
  Value
  CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
  Creates a duplicate of this node. Notation nodes cannot be cloned. Calling this method on an XmlNotation object throws an exception. true to recursively clone the subtree under the specified node; false to clone only the node itself.
  WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
  Saves the children of the node to the specified System.Xml.XmlWriter. The XmlWriter to which you want to save.
  WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
  Saves the node to the specified System.Xml.XmlWriter. The XmlWriter to which you want to save.
  XmlParserContext class (System.Xml)
  WriteTo
Description
  Provides all the context information required by System.Xml.XmlTextReader or System.Xml.XmlValidatingReader to parse an XML fragment.
  XmlParserContext
  Example Syntax:
  WriteTo

101

[C#] public XmlParserContext(XmlNameTable nt, XmlNamespaceManager nsMgr, string xmlLang, XmlSpace xmlSpace);
[C++] public: XmlParserContext(XmlNameTable* nt, XmlNamespaceManager* nsMgr, String* xmlLang, XmlSpace xmlSpace);
[VB] Public Sub New(ByVal nt As XmlNameTable, ByVal nsMgr As XmlNamespaceManager, ByVal xmlLang As String, ByVal xmlSpace As XmlSpace)
[JScript] public function XmlParserContext(nt: XmlNameTable, nsMgr: XmlNamespaceManager, xmlLang: String, xmlSpace: XmlSpace); Initializes a new instance of the XmlParserContext class with the specified values.
Description
  Initializes a new instance of the XmlParserContext class with the specified values.
  If nt and the name table used to construct the nsMgr are not the same, XmlParserContext does not recognize namespaces added to nsMgr and throws an System.Xml.XmlException when it encounters the unrecognized namespaces. The System.Xml.XmlNameTable to use to atomize strings. If this is null, the name table used to construct the nsMgr is used instead. The System.Xml.XmlNamespaceManager to use for looking up namespace information. The xml:lang scope. An System.Xml.XmlSpace value indicating the xml:space scope.
    XmlParserContext
    Example Syntax:
    WriteTo
[C#] public XmlParserContext(XmlNameTable nt, XmlNamespaceManager nsMgr, string docTypeName, string pubId, string sysId, string internalSubset, string baseURI, string xmlLang, XmlSpace xmlSpace);
[C++] public: XmlParserContext(XmlNameTable* nt, XmlNamespaceManager* nsMgr, String* docTypeName, String* pubId, String* sysId, String* internalSubset, String* baseURI, String* xmlLang, XmlSpace xmlSpace);
[VB] Public Sub New(ByVal nt As XmlNameTable, ByVal nsMgr As XmlNamespaceManager, ByVal docTypeName As String, ByVal pubId As String, ByVal sysId As String, ByVal internalSubset As String, ByVal baseURI As String, ByVal xmlLang As String, ByVal xmlSpace As XmlSpace)
[JScript] public function XmlParserContext(nt: XmlNameTable, nsMgr: XmlNamespaceManager, docTypeName: String, pubId: String, sysId: String, internalSubset: String, baseURI: String, xmlLang: String, xmlSpace: XmlSpace);
Description
  Initializes a new instance of the XmlParserContext class with the specified values.
  This constructor supplies all DocumentType information required by System.Xml.XmlValidatingReader. If this XmlParserContext is passed to an System.Xml.XmlTextReader, all DTD information is ignored. The System.Xml.XmlNameTable to use to atomize strings. If this is null, the name table used to construct the nsMgr is used instead. The System.Xml.XmlNamespaceManager to use for looking up namespace information. The name of the document type declaration. The public identifier. The system identifier. The internal DTD subset. The base URI for the XML fragment (the location from which the fragment was loaded). The xml:lang scope. An System.Xml.XmlSpace value indicating the xml:space scope.
    BaseURI
    WriteTo

102

[C#] public string BaseURI {get; set;}
[C++] public: _property String* get_BaseURI( );public: _property void set_BaseURI(String*);
[VB] Public Property BaseURI As String
[JScript] public function get BaseURI( ): String;public function set BaseURI(String);
Description
  Gets or sets the base URI.
  A networked XML document is comprised of chunks of data aggregated using various W3C standard inclusion mechanisms and therefore may contain nodes that come from different places.
    DocTypeName
    WriteTo
[C#] public string DocTypeName {get; set;}
[C++] public: _property String* get_DocTypeName( );public: _property void set_DocTypeName(String*);
[VB] Public Property DocTypeName As String
[JScript] public function get DocTypeName( ): String;public function set DocTypeName(String);
Description
  Gets or sets the name of the document type declaration.
  This property, along with System.Xml.XmlParserContext.PublicId, System.Xml.XmlParserContext.SystemId, and System.Xml.XmlParserContext.InternalSubset, provides all the document type declaration information. It is used to find and load the necessary DTD information so that you get all the default attributes and entities defined in the DTD.
    InternalSubset
    WriteTo
[C#] public string InternalSubset {get; set;}
[C++] public: _property String* get_InternalSubset( );public: _property void set_InternalSubset(String*);
[VB] Public Property InternalSubset As String
[JScript] public function get InternalSubset( ): String;public function set InternalSubset(String);
Description
  Gets or sets the internal DTD subset.
  This property, along with System.Xml.XmlParserContext.DocTypeName, System.Xml.XmlParserContext.PublicId, and System.Xml.XmlParserContext.SystemId, provides all the document type declaration information. It is used to find and load the necessary DTD information so that you get all the default attributes and entities defined in the DTD.
    NamespaceManager
    WriteTo
[C#] public XmlNamespaceManager NamespaceManager {get; set;}
[C++] public: _property XmlNamespaceManager* get_NamespaceManager( );public: _property void set_NamespaceManager(XmlNamespaceManager*);
[VB] Public Property NamespaceManager As XmlNamespaceManager
[JScript] public function get NamespaceManager( ): XmlNamespaceManager;public function set NamespaceManager(XmlNamespaceManager);
Description
  Gets or sets the System.Xml.XmlNamespaceManager.
  The NamespaceManager defines the current namespace scope and provides methods for looking up namespace information.
    NameTable
    WriteTo
[C#] public XmlNameTable NameTable {get; set;}
[C++] public: _property XmlNameTable* get_NameTable( );public: _property void set_NameTable(XmlNameTable*);

[VB] Public Property NameTable As XmlNameTable
[JScript] public function get NameTable( ): XmlNameTable; public function set NameTable(XmlNameTable);
Description
  Gets the System.Xml.XmlNameTable used to atomize strings.
  PublicId
  WriteTo
[C#] public string PublicId {get; set;}
[C++] public: _property String* get_PublicId( );public: _property void set_PublicId(String*);
[VB] Public Property PublicId As String
[JScript] public function get PublicId( ): String;public function set PublicId(String);
Description
  Gets or sets the public identifier.
  This property, along with System.Xml.XmlParserContext.DocTypeName, System.Xml.XmlParserContext.SystemId, and System.Xml.XmlParserContext.InternalSubset, provides all the document type declaration information. It is used to find and load the required DTD information so that you get all the default attributes and entities defined in the DTD.
  SystemId
  WriteTo
[C#] public string SystemId {get; set;}
[C++] public: _property String* get_SystemId( );public: _property void set_SystemId(String*);
[VB] Public Property SystemId As String
[JScript] public function get SystemId( ): String;public function set SystemId(String);
Description
  Gets or sets the system identifier.
  This property, along with System.Xml.XmlParserContext.DocTypeName, System.Xml.XmlParserContext.PublicId, and System.Xml.XmlParserContext.InternalSubset, provides all the document type declaration information. It is used to find and load the necessary DTD information so that you get all the default attributes and entities defined in the DTD.
  XmlLang
  WriteTo
[C#] public string XmlLang {get; set;}
[C++] public: _property String* get_XmlLang( );public: _property void set_XmlLang(String*);
[VB] Public Property XmlLang As String
[JScript] public function get XmlLang( ): String;public function set XmlLang(String);
Description
  Gets or sets the current xml:lang scope.
  For details on valid xml:lang values, refer to section 2.12 of the W3C Extensible Markup Language (XML) 1.0 recommendation.
  XmlSpace
  WriteTo
[C#] public XmlSpace XmlSpace {get; set;}
[C++] public: _property XmlSpace get_XmlSpace( ); public: _ property void set_XmlSpace(XmlSpace);
[VB] Public Property XmlSpace As XmlSpace
[JScript] public function get XmlSpace( ): XmlSpace;public function set XmlSpace(XmlSpace);
Description
  Gets or sets the current xml:space scope.
  XmlProcessingInstruction class (System.Xml)
  ToString
Description
  Represents a processing instruction, which XML defines to keep processor-specific information in the text of the document.
  XmlProcessingInstruction
  Example Syntax:
  ToString
[C#] protected internal XmlProcessingInstruction(string target, string data, XmlDocument doc);
[C++] internal: XmlProcessingInstruction(String* target, String* data, XmlDocument* doc);
[VB] Protected Friend Sub New(ByVal target As String, ByVal data As String, ByVal doc As XmlDocument)
[JScript] package function XmlProcessingInstruction(target: String, data: String, doc: XmlDocument);
Description
  Attributes
  BaseURI
  ChildNodes
  Data
  ToString
Description
  Gets or sets the content of the processing instruction, excluding the target.
  FirstChild
  HasChildNodes
  InnerText
  ToString
Description
  Gets or sets the concatenated values of the node and all its children.
  InnerXml
  IsReadOnly
  Item
  Item
  LastChild
  LocalName
  ToString
Description
  Gets the local name of the node.
  Name
  ToString
[C#] public override string Name {get;}
[C++] public: _property virtual String* get_Name( );
[VB] Overrides Public ReadOnly Property Name As String
[JScript] public function get Name( ): String;
Description
  Gets the qualified name of the node.
  NamespaceURI
  NextSibling
  NodeType
  ToString
Description
  Gets the type of the current node.
  OuterXml
  OwnerDocument
  ParentNode
  Prefix
  PreviousSibling
  Target
  ToString
Description
  Gets the target of the processing instruction.
  Value
  ToString
[C#] public override string Value {get; set;}
[C++] public: _property virtual String* get_Value( );public: _property virtual void set_Value(String*);
[VB] Overrides Public Property Value As String
[JScript] public function get Value( ): String;public function set Value(String);

Description
   Gets or sets the value of the node.
   CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
   Creates a duplicate of this node.
Return Value: The duplicate node.
   CloneNode serves as a copy constructor for nodes. For processing instruction nodes, the cloned node always includes the target and data. To see how this method behaves with other node types, see System.Xml.XmlNode.CloneNode(System.Boolean) method in the XmlNode class. true to recursively clone the subtree under the specified node; false to clone only the node itself.
   WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
   Saves all the children of the node to the specified System.Xml.XmlWriter. The XmlWriter to which you want to save.
   WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
   Saves the node to the specified System.Xml.XmlWriter. The XmlWriter to which you want to save.
   XmlQualifiedName class (System.Xml)
   WriteTo
Description
   Represents an XML qualified name.
   An XML qualified name is a namespace qualified local name, in the format namespace:localname.
   WriteTo
[C#] public static readonly XmlQualifiedName Empty;
[C++] public: static XmlQualifiedName* Empty;
[VB] Public Shared ReadOnly Empty As XmlQualifiedName
[JScript] public static var Empty: XmlQualifiedName;
Description
   Provides an empty XmlQualifiedName.
   This field allows you to do the following: XmlQualifiedName Qname=new XmlQualifiedName ("item","http://www.contoso.com/"); Qname.IsEmpty; //Returns false. Qname.Empty; //Sets the namespace and local name to String.Empty. Qname.IsEmpty; //Returns true.
   XmlQualifiedName
   Example Syntax:
   WriteTo
[C#] public XmlQualifiedName( );
[C++] public: XmlQualifiedName( );
[VB] Public Sub New( )
[JScript] public function XmlQualifiedName( ); Initializes a new instance of the XmlQualifiedName class.
Description
   Initializes a new instance of the XmlQualifiedName class. The object created has no name or namespace defined.
   XmlQualifiedName
   Example Syntax:
   WriteTo
[C#] public XmlQualifiedName(string name);
[C++] public: XmlQualifiedName(String* name);
[VB] Public Sub New(ByVal name As String)
[JScript] public function XmlQualifiedName(name: String);
Description
   Initializes a new instance of the XmlQualifedName class with the specified name.
   The object created does not have a namespace defined. The local name to use as the name of the XmlQualifiedName object.
   XmlQualifiedName
   Example Syntax:
   WriteTo
[C#] public XmlQualifiedName(string name, string ns);
[C++] public: XmlQualifiedName(String* name, String* ns);
[VB] Public Sub New(ByVal name As String, ByVal ns As String)
[JScript] public function XmlQualifiedName(name: String, ns: String);
Description
   Initializes a new instance of the XmlQualifiedName class with the specified name and namespace. The local name to use as the name of the XmlQualifiedName object. The namespace for the XmlQualifiedName object.
   IsEmpty
   WriteTo
[C#] public bool IsEmpty {get;}
[C++] public: _property bool get_IsEmpty( );
[VB] Public ReadOnly Property IsEmpty As Boolean
[JScript] public function get IsEmpty( ): Boolean;
Description
   Gets a value indicating whether the XmlQualifedName is empty.
   Name
   WriteTo
[C#] public string Name {get;}
[C++] public: _property String* get_Name( );
[VB] Public ReadOnly Property Name As String
[JScript] public function get Name( ): String;
Description
   Gets a string representation of the qualified name of the XmlQualifiedName.
   Namespace
   WriteTo
[C#] public string Namespace {get;}
[C++] public: _property String* get_Namespace( );
[VB] Public ReadOnly Property Namespace As String
[JScript] public function get Namespace( ): String;
Description
   Gets a string representation of the namespace of the XmlQualifiedName.
   Equals
[C#] public override bool Equals(object other);
[C++] public: bool Equals(Object* other);
[VB] Overrides Public Function Equals(ByVal other As Object) As Boolean
[JScript] public override function Equals(other: Object): Boolean;
Description
   Checks if the specified XmlQualifiedName is the same instance object as this object.
Return Value: true if the two are the same instance object; otherwise false. The XmlQualifiedName to compare.

GetHashCode
[C#] public override int GetHashCode( );
[C++] public: int GetHashCode( );
[VB] Overrides Public Function GetHashCode( ) As Integer
[JScript] public override function GetHashCode( ): int;
Description
  Returns the hash code for the XmlQualifiedName.
Return Value: A hash code for this object.
  op_Equality
[C#] public static bool operator==(XmlQualifiedName a, XmlQualifiedName b);
[C++] public: static bool op_Equality(XmlQualifiedName* a, XmlQualifiedName* b);
[VB] returnValue=XmlQualifiedName.op_Equality(a, b)
[JScript] returnValue=a==b;
Description
  Compares two XmlQualifiedName objects.
Return Value: true if the two objects have the same name and namespace values; otherwise false. An XmlQualifiedName to compare. An XmlQualifiedName to compare.
  op_Inequality
[C#] public static bool operator !=(XmlQualifiedName a, XmlQualifiedName b);
[C++] public: static bool op_Inequality(XmlQualifiedName* a, XmlQualifiedName* b);
[VB] returnValue=XmlQualifiedName.op_Inequality(a, b)
[JScript] returnValue=a !=b;
Description
  Compares two XmlQualifiedName objects.
Return Value: true if the name and namespace values for the two objects differ; otherwise false. An XmlQualifiedName to compare. An XmlQualifiedName to compare.
  ToString
[C#] public override string ToString( );
[C++] public: String* ToString( );
[VB] Overrides Public Function ToString( ) As String
[JScript] public override function ToString( ): String; Returns the string value of the XmlQualifiedName.
Description
  Returns the string value of the XmlQualifiedName.
Return Value: The string value of the XmlQualifiedName in the format of namespace:localname. If the object does not have a namespace defined, this method returns just the local name.
  ToString
[C#] public static string ToString(string name, string ns);
[C++] public: static String* ToString(String* name, String* ns);
[VB] Public Shared Function ToString(ByVal name As String, ByVal ns As String) As String
[JScript] public static function ToString(name: String, ns: String): String;
Description
  Returns the string value of the XmlQualifiedName.
Return Value: The string value of the XmlQualifiedName in the format of namespace:localname. If the object does not have a namespace defined, this method returns just the local name. The name of the object. The namespace of the object.
  XmlReader class (System.Xml)
  ToString
Description
  Represents a reader that provides fast, non-cached, forward-only access to XML data.
  XmlReader provides forward-only, read-only access to a stream of XML data. The current node refers to the node on which the reader is positioned. The reader is advanced using any of the read methods and properties reflect the value of the current node.
  XmlReader
  Example Syntax:
  ToString
[C#] protected XmlReader( );
[C++] protected: XmlReader( );
[VB] Protected Sub New( )
[JScript] protected function XmlReader( );
  AttributeCount
  ToString
[C#] public abstract int AttributeCount {get;}
[C++] public: _property virtual int get_AttributeCount( )=0;
[VB] MustOverride Public ReadOnly Property AttributeCount As Integer
[JScript] public abstract function get AttributeCount( ): int;
Description
  When overridden in a derived class, gets the number of attributes on the current node.
  This property is relevant to Element, DocumentType and XmlDeclaration nodes only. (Other node types do not have attributes.) See System.Xml.XmlTextReader.AttributeCount (in the XmlTextReader class) for an example using this method.
  BaseURI
  ToString
[C#] public abstract string BaseURI {get;}
[C++] public: _property virtual String* get_BaseURI( )=0;
[VB] MustOverride Public ReadOnly Property BaseURI As String
[JScript] public abstract function get BaseURI( ): String;
Description
  When overridden in a derived class, gets the base URI of the current node.
  A networked XML document is comprised of chunks of data aggregated using various W3C standard inclusion mechanisms and therefore contains nodes that come from different places. DTD entities are an example of this, but this is not limited to DTDs. The base URI tells you where these nodes came from. If there is no base URI for the nodes being returned (for example, they were parsed from an in-memory string), String.Empty is returned.
  CanResolveEntity
  ToString
[C#] public virtual bool CanResolveEntity {get;}
[C++] public: _property virtual bool get_CanResolveEntity( );
[VB] Overridable Public ReadOnly Property CanResolveEntity As Boolean
[JScript] public function get CanResolveEntity( ): Boolean;
Description
  Gets a value indicating whether this reader can parse and resolve entities.
  This property always returns false for implementations of XmlReader that do not support schema or DTD information. In this case, calling System.Xml.XmlReader.ResolveEntity throws an exception.
  Depth
  ToString
[C#] public abstract int Depth {get;}
[C++] public: _property virtual int get_Depth( )=0;
[VB] MustOverride Public ReadOnly Property Depth As Integer
[JScript] public abstract function get Depth( ): int;

Description
When overridden in a derived class, gets the depth of the current node in the XML document.
　EOF
　ToString
[C#] public abstract bool EOF {get;}
[C++] public: _property virtual bool get_EOF( )=0;
[VB] MustOverride Public ReadOnly Property EOF As Boolean
[JScript] public abstract function get EOF( ): Boolean;
Description
When overridden in a derived class, gets a value indicating whether the reader is positioned at the end of the stream.
　HasAttributes
　ToString
[C#] public virtual bool HasAttributes {get;}
[C++] public: _property virtual bool get_HasAttributes( );
[VB] Overridable Public ReadOnly Property HasAttributes As Boolean
[JScript] public function get HasAttributes( ): Boolean;
Description
Gets a value indicating whether the current node has any attributes.
　HasValue
　ToString
[C#] public abstract bool HasValue {get;}
[C++] public: _property virtual bool get_HasValue( )=0;
[VB] MustOverride Public ReadOnly Property HasValue As Boolean
[JScript] public abstract function get HasValue( ): Boolean;
Description
When overridden in a derived class, gets a value indicating whether the current node can have a System.Xml.XmlReader.Value.
The following table lists node types that have a value to return.
　IsDefault
　ToString
[C#] public abstract bool IsDefault {get;}
[C++] public: _property virtual bool get_IsDefault( )=0;
[VB] MustOverride Public ReadOnly Property IsDefault As Boolean
[JScript] public abstract function get IsDefault( ): Boolean;
Description
When overridden in a derived class, gets a value indicating whether the current node is an attribute that was generated from the default value defined in the DTD or schema.
IsDefault always returns false for implementations of XmlReader that do not support schema or DTD information. This property applies only to an attribute node.
　IsEmptyElement
　ToString
[C#] public abstract bool IsEmptyElement {get;}
[C++] public: _property virtual bool get_IsEmptyElement( )=0;
[VB] MustOverride Public ReadOnly Property IsEmptyElement As Boolean
[JScript] public abstract function get IsEmptyElement( ): Boolean;
Description
When overridden in a derived class, gets a value indicating whether the current node is an empty element (for example,).
This property enables you to determine the difference between the following: (IsEmptyElement is true).
　Item
　ToString
[C#] public abstract string this [int i] {get;}
[C++] public: _property virtual String* get_Item(int i)=0;
[VB] MustOverride Public Default ReadOnly Property Item (ByVal i As Integer) As String
[JScript] abstract returnValue=XmlReaderObject.Item(i);
When overridden in a derived class, gets the value of the attribute.
Description
When overridden in a derived class, gets the value of the attribute with the specified index.
This property does not move the reader. The index of the attribute.
　Item
　ToString
[C#] public abstract string this[string name] {get;}
[C++] public: _property virtual String* get_Item(String* name)=0;
[VB] MustOverride Public Default ReadOnly Property Item (ByVal name As String) As String
[JScript] abstract returnValue=XmlReaderObject.Item (name);
Description
When overridden in a derived class, gets the value of the attribute with the specified System.Xml.XmlReader.Name.
This property does not move the reader. The qualified name of the attribute.
　Item
　ToString
[C#] public abstract string this[string name, string namespaceURI] {get;}
[C++] public: _property virtual String* get_Item(String* name, String* namespaceURI)=0;
[VB] MustOverride Public Default ReadOnly Property Item (ByVal name As String, ByVal namespaceURI As String) As String
[JScript] abstract returnValue=XmlReaderObject.Item (name, namespaceURI);
Description
When overridden in a derived class, gets the value of the attribute with the specified System.Xml.XmlReader.LocalName and System.Xml.XmlReader.NamespaceURI.
This property does not move the reader. The local name of the attribute. The namespace URI of the attribute.
　LocalName
　ToString
[C#] public abstract string LocalName {get;}
[C++] public: _property virtual String* get_LocalName( )=0;
[VB] MustOverride Public ReadOnly Property LocalName As String
[JScript] public abstract function get LocalName( ): String;
Description
When overridden in a derived class, gets the local name of the current node.
　Name
　ToString
[C#] public abstract string Name {get;}
[C++] public: _property virtual String* get_Name( )=0;
[VB] MustOverride Public ReadOnly Property Name As String
[JScript] public abstract function get Name( ): String;
Description
When overridden in a derived class, gets the qualified name of the current node.
　NamespaceURI
　ToString
[C#] public abstract string NamespaceURI {get;}
[C++] public: _property virtual String* get_NamespaceURI( )=0;

[VB] MustOverride Public ReadOnly Property NamespaceURI As String
[JScript] public abstract function get NamespaceURI( ): String;
Description When overridden in a derived class, gets the namespace URI (as defined in the W3C Namespace specification) of the node on which the reader is positioned.

This property is relevant to Element and Attribute nodes only.
    NameTable
    ToString
[C#] public abstract XmlNameTable NameTable {get;}
[C++] public: _property virtual XmlNameTable* get_NameTable( )=0;
[VB] MustOverride Public ReadOnly Property NameTable As XmlNameTable
[JScript] public abstract function get NameTable( ): XmlNameTable;
Description When overridden in a derived class, gets the System.Xml.XmlNameTable associated with this implementation.

All node and attribute names returned from this class are atomized using the NameTable. When the same name is returned multiple times (for example, Customer), then the same String object will be returned for that name. This makes it possible for you to write efficient code that does object comparisons on these strings instead of expensive string comparisons.
    NodeType
    ToString
[C#] public abstract XmlNodeType NodeType {get;}
[C++] public: _property virtual XmlNodeType get_NodeType( )=0;
[VB] MustOverride Public ReadOnly Property NodeType As XmlNodeType
[JScript] public abstract function get NodeType( ): XmlNodeType;
Description When overridden in a derived class, gets the type of the current node.
    Prefix
    ToString
[C#] public abstract string Prefix {get;}
[C++] public: _property virtual String* get_Prefix( )=0;
[VB] MustOverride Public ReadOnly Property Prefix As String
[JScript] public abstract function get Prefix( ): String;
Description When overridden in a derived class, gets the namespace prefix associated with the current node.
    QuoteChar
    ToString
[C#] public abstract char QuoteChar {get;}
[C++] public: _property virtual _wchar_t get_QuoteChar( )=0;
[VB] MustOverride Public ReadOnly Property QuoteChar As Char
[JScript] public abstract function get QuoteChar( ): Char;
Description When overridden in a derived class, gets the quotation mark character used to enclose the value of an attribute node.

This property applies only to an attribute node.
    ReadState
    ToString
[C#] public abstract ReadState ReadState {get;}
[C++] public: _property virtual ReadState get_ReadState( )=0;
[VB] MustOverride Public ReadOnly Property ReadState As ReadState
[JScript] public abstract function get ReadState( ): ReadState;
Description When overridden in a derived class, gets the state of the reader.
    Value
    ToString
[C#] public abstract string Value {get;}
[C++] public: _property virtual String* get_Value( )=0;
[VB] MustOverride Public ReadOnly Property Value As String
[JScript] public abstract function get Value( ): String;
Description When overridden in a derived class, gets the text value of the current node.
    XmlLang
    ToString
[C#] public abstract string XmlLang {get;}
[C++] public: _property virtual String* get_XmlLang( )=0;
[VB] MustOverride Public ReadOnly Property XmlLang As String
[JScript] public abstract function get XmlLang( ): String;
Description When overridden in a derived class, gets the current xml:lang scope.

This property represents the xml:lang scope within which the current node resides. For example, here is an XML fragment with xml:lang set to US English in the root element: Fred When the reader is positioned on the name element, you can use this property to find that it is in the scope of a US English xml:lang attribute.
    XmlSpace
    ToString
[C#] public abstract XmlSpace XmlSpace {get;}
[C++] public: _property virtual XmlSpace get_XmlSpace( )=0;
[VB] MustOverride Public ReadOnly Property XmlSpace As XmlSpace
[JScript] public abstract function get XmlSpace( ): XmlSpace;
Description When overridden in a derived class, gets the current xml:space scope.
    Close
[C#] public abstract void Close( );
[C++] public: virtual void Close( )=0;
[VB] MustOverride Public Sub Close( )
[JScript] public abstract function Close( );
Description When overridden in a derived class, changes the System.Xml.XmlReader.ReadState to Closed.

This method also releases any resources held during reading. If Close has already been called, no action is performed.
    GetAttribute
[C#] public abstract string GetAttribute(int i);
[C++] public: virtual String* GetAttribute(int i)=0;
[VB] MustOverride Public Function GetAttribute(ByVal i As Integer) As String
[JScript] public abstract function GetAttribute(i: int): String;
Description When overridden in a derived class, gets the value of the attribute with the specified index.

Return Value: The value of the specified attribute. This method does not move the reader. The index of the attribute. The index is zero-based. (The first attribute has index 0.)
GetAttribute
[C#] public abstract string GetAttribute(string name);
[C++] public: virtual String* GetAttribute(String* name)=0;
[VB] MustOverride Public Function GetAttribute(ByVal name As String) As String
[JScript] public abstract function GetAttribute(name: String): String; When overridden in a derived class, gets the value of an attribute.
Description
When overridden in a derived class, gets the value of the attribute with the specified System.Xml.XmlReader.Name.
Return Value: The value of the specified attribute. If the attribute is not found, String.Empty is returned.
This method does not move the reader. The qualified name of the attribute.
GetAttribute
[C#] public abstract string GetAttribute(string name, string namespaceURI);
[C++] public: virtual String* GetAttribute(String* name, String* namespaceURI)=0;
[VB] MustOverride Public Function GetAttribute(ByVal name As String, ByVal namespaceURI As String) As String
[JScript] public abstract function GetAttribute(name: String, namespaceURI: String): String;
Description
When overridden in a derived class, gets the value of the attribute with the specified System.Xml.XmlReader.LocalName and System.Xml.XmlReader.NamespaceURI.
Return Value: The value of the specified attribute. If the attribute is not found, String.Empty is returned. This method does not move the reader.
The following XML contains an attribute in a specific namespace: You can lookup the dt:type attribute using one argument (prefix and local name) or two arguments (local name and namespace URI): String dt=reader.GetAttribute ("dt:type"); String dt2=reader.GetAttribute("type","urn: datatypes"); To lookup the xmlns:dt attribute, use one of the following arguments: String dt3=reader.GetAttribute ("xmlns:dt"); String dt4=reader.GetAttribute("dt",http:// www.w3.org/2000/xmlns/); You can also get this information using the System.Xml.XmlReader.Prefix property. The local name of the attribute. The namespace URI of the attribute.
IsName
[C#] public static bool IsName(string str);
[C++] public: static bool IsName(String* str);
[VB] Public Shared Function IsName(ByVal str As String) As Boolean
[JScript] public static function IsName(str: String): Boolean;
Description
Gets a value indicating whether the string argument is a valid XML name.
Return Value: true if the name is valid; otherwise, false.
This method uses the W3C XML 1.0 Recommendation (http://www.w3.org/TR/2000/REC-xml-20001006#NT-Name) to determine whether the name is valid. The name to validate.
IsNameToken
[C#] public static bool IsNameToken(string str);
[C++] public: static bool IsNameToken(String* str);
[VB] Public Shared Function IsNameToken(ByVal str As String) As Boolean
[JScript] public static function IsNameToken(str: String): Boolean;

Description
Gets a value indicating whether or not the string argument is a valid XML name token.
Return Value: true if it is a valid name token; otherwise false.
This method uses the W3C XML 1.0 Recommendation (http://www.w3.org/TR/2000/REC-xml-20001006#NT-Name) to determine whether the name token is valid. The name token to validate.
IsStartElement
[C#] public virtual bool IsStartElement( );
[C++] public: virtual bool IsStartElement( );
[VB] Overridable Public Function IsStartElement( ) As Boolean
[JScript] public function IsStartElement( ): Boolean; Tests if the current content node is a start tag.
Description
Calls System.Xml.XmlReader.MoveToContent and tests if the current content node is a start tag or empty element tag.
Return Value: true if MoveToContent finds a start tag or empty element tag; false if a node type other than XmlNodeType.Element was found.
This method skips whitespace, comments, and processing instructions until the reader is positioned on a content node. The method then tests if the current node is an element.
IsStartElement
[C#] public virtual bool IsStartElement(string name);
[C++] public: virtual bool IsStartElement(String* name);
[VB] Overridable Public Function IsStartElement(ByVal name As String) As Boolean
[JScript] public function IsStartElement(name: String): Boolean;
Description
Calls System.Xml.XmlReader.MoveToContent and tests if the current content node is a start tag or empty element tag and if the System.Xml.XmlReader.Name property of the element found matches the given argument.
Return Value: true if the resulting node is an element and the Name property matches the specified string.
This method skips whitespace, comments, and processing instructions until the reader is positioned on a content node. The method then tests if the current node is an element. The string matched against the Name property of the element found.
IsStartElement
[C#] public virtual bool IsStartElement(string localname, string ns);
[C++] public: virtual bool IsStartElement(String* localname, String* ns);
[VB] Overridable Public Function IsStartElement(ByVal localname As String, ByVal ns As String) As Boolean
[JScript] public function IsStartElement(localname: String, ns: String): Boolean;
Description
Calls System.Xml.XmlReader.MoveToContent and tests if the current content node is a start tag or empty element tag and if the System.Xml.XmlReader.LocalName and System.Xml.XmlReader.NamespaceURI properties of the element found match the given strings.
Return Value: true if the resulting node is an element.
This method skips whitespace, comments, and processing instructions until the reader is positioned on a content node. The method then tests if the current node is an element. The string to match against the LocalName property of the element found. The string to match against the NamespaceURI property of the element found.

LookupNamespace
[C#] public abstract string LookupNamespace(string prefix);
[C++] public: virtual String* LookupNamespace(String* prefix)=0;
[VB] MustOverride Public Function LookupNamespace(ByVal prefix As String) As String
[JScript] public abstract function LookupNamespace(prefix: String): String;
Description
When overridden in a derived class, resolves a namespace prefix in the current element's scope.
Return Value: The namespace URI to which the prefix maps or null if no matching prefix is found.
In the preceding XML, if the reader is positioned on the href attribute, the prefix a is resolved by calling reader.LookupNamespace("a"). The returned string urn:456. The prefix whose namespace URI you want to resolve. To match the default namespace, pass an empty string. This string does not have to be atomized.

MoveToAttribute
[C#] public abstract void MoveToAttribute(int i);
[C++] public: virtual void MoveToAttribute(int i)=0;
[VB] MustOverride Public Sub MoveToAttribute(ByVal i As Integer)
[JScript] public abstract function MoveToAttribute(i: int);
Description
When overridden in a derived class, moves to the attribute with the specified index. The index of the attribute.

MoveToAttribute
[C#] public abstract bool MoveToAttribute(string name);
[C++] public: virtual bool MoveToAttribute(String* name)=0;
[VB] MustOverride Public Function MoveToAttribute(ByVal name As String) As Boolean
[JScript] public abstract function MoveToAttribute(name: String): Boolean; When overridden in a derived class, moves to the specified attribute.
Description
When overridden in a derived class, moves to the attribute with the specified System.Xml.XmlReader.Name.
Return Value: true if the attribute is found; otherwise, false. If false, the reader's position does not change.
After calling MoveToAttribute, the System.Xml.XmlReader.Name, System.Xml.XmlReader.NamespaceURI, and System.Xml.XmlReader.Prefix properties reflect the properties of that attribute. The qualified name of the attribute.

MoveToAttribute
[C#] public abstract bool MoveToAttribute(string name, string ns);
[C++] public: virtual bool MoveToAttribute(String* name, String* ns)=0;
[VB] MustOverride Public Function MoveToAttribute(ByVal name As String, ByVal ns As String) As Boolean
[JScript] public abstract function MoveToAttribute(name: String, ns: String): Boolean;
Description
When overridden in a derived class, moves to the attribute with the specified System.Xml.XmlReader.LocalName and System.Xml.XmlReader.NamespaceURI.
Return Value: true if the attribute is found; otherwise, false. If false, the reader's position does not change.
After calling MoveToAttribute, the System.Xml.XmlReader.Name, System.Xml.XmlReader.NamespaceURI, and System.Xml.XmlReader.Prefix properties reflect the properties of that attribute. The local name of the attribute. The namespace URI of the attribute.

MoveToContent
[C#] public virtual XmlNodeType MoveToContent( );
[C++] public: virtual XmlNodeType MoveToContent( );
[VB] Overridable Public Function MoveToContent( ) As XmlNodeType
[JScript] public function MoveToContent( ): XmlNodeType;
Description
Checks whether the current node is a content (non-whitespace text, CDATA, Element, EndElement, EntityReference, or EndEntity) node. If the node is not a content node, the reader skips ahead to the next content node or end of file. It skips over nodes of the following type: ProcessingInstruction, DocumentType, Comment, Whitespace, or SignificantWhitespace.
Return Value: The System.Xml.XmlReader.NodeType of the current node found by the method or XmlNodeType.None if the reader has reached the end of the input stream.
If the current node is an attribute node, this method moves the reader back to the element that owns the attribute.

MoveToElement
[C#] public abstract bool MoveToElement( );
[C++] public: virtual bool MoveToElement( )=0;
[VB] MustOverride Public Function MoveToElement( ) As Boolean
[JScript] public abstract function MoveToElement( ): Boolean;
Description
When overridden in a derived class, moves to the element that contains the current attribute node.
Return Value: true if the reader is positioned on an attribute (the reader moves to the element that owns the attribute); false if the reader is not positioned on an attribute (the position of the reader does not change).
Use this method to return to an element after navigating through its attributes. This method moves the reader to one of the following node types: Element, DocumentType, or XmlDeclaration.

MoveToFirstAttribute
[C#] public abstract bool MoveToFirstAttribute( );
[C++] public: virtual bool MoveToFirstAttribute( )=0;
[VB] MustOverride Public Function MoveToFirstAttribute( ) As Boolean
[JScript] public abstract function MoveToFirstAttribute( ): Boolean;
Description
When overridden in a derived class, moves to the first attribute.
Return Value: true if an attribute exists (the reader moves to the first attribute); otherwise, false (the position of the reader does not change).

MoveToNextAttribute
[C#] public abstract bool MoveToNextAttribute( );
[C++] public: virtual bool MoveToNextAttribute( )=0;
[VB] MustOverride Public Function MoveToNextAttribute( ) As Boolean
[JScript] public abstract function MoveToNextAttribute( ): Boolean;
Description
When overridden in a derived class, moves to the next attribute.
Return Value: true if there is a next attribute; false if there are no more attributes.
If the current node is an element node, this method is equivalent to System.Xml.XmlReader.MoveToFirstAttribute. If MoveToNextAttribute returns true, the reader moves to the next attribute; otherwise, the position of the reader does not change.

Read
[C#] public abstract bool Read( );
[C++] public: virtual bool Read( )=0;
[VB] MustOverride Public Function Read( ) As Boolean
[JScript] public abstract function Read( ): Boolean;
Description
When overridden in a derived class, reads the next node from the stream.
Return Value: true if the next node was read successfully; false if there are no more nodes to read.
When an XmlReader is first created and initialized, there is no information available. You must call Read to read the first node.
ReadAttributeValue
[C#] public abstract bool ReadAttributeValue( );
[C++] public: virtual bool ReadAttributeValue( )=0;
[VB] MustOverride Public Function ReadAttributeValue( ) As Boolean
[JScript] public abstract function ReadAttributeValue( ): Boolean;
Description
When overridden in a derived class, parses the attribute value into one or more Text or EntityReference nodes.
Return Value: true if there are nodes to return.
Use this method after calling System.Xml.XmlReader.MoveToAttribute(System.String) to read through the text or entity reference nodes that make up the attribute value. The System.Xml.XmlReader.Depth of the attribute value nodes is one plus the depth of the attribute node; it increments and decrements by one when you step into and out of general entity references.
ReadElementString
[C#] public virtual string ReadElementString( );
[C++] public: virtual String* ReadElementString( );
[VB] Overridable Public Function ReadElementString( ) As String
[JScript] public function ReadElementString( ): String; This is a helper method for reading simple text-only elements.
Description
Reads a text-only element.
Return Value: The text contained in the element that was read. An empty string if the element is empty (or).
This is a helper method for reading simple text-only elements. It calls System.Xml.XmlReader.MoveToContent to find the next content node and then parses its value as a simple string.
ReadElementString
[C#] public virtual string ReadElementString(string name);
[C++] public: virtual String* ReadElementString(String* name);
[VB] Overridable Public Function ReadElementString(ByVal name As String) As String
[JScript] public function ReadElementString(name: String): String;
Description
Checks that the System.Xml.XmlReader.Name property of the element found matches the given string before reading a text-only element.
Return Value: The text contained in the element that was read. An empty string if the element is empty (or).
This is a helper method for reading simple text-only elements. It calls System.Xml.XmlReader.MoveToContent to find the next content node and then parses its value as a simple string. The name to check.
ReadElementString
[C#] public virtual string ReadElementString(string localname, string ns);
[C++] public: virtual String* ReadElementString(String* localname, String* ns);
[VB] Overridable Public Function ReadElementString(ByVal localname As String, ByVal ns As String) As String
[JScript] public function ReadElementString(localname: String, ns: String): String;
Description
Checks that the System.Xml.XmlReader.LocalName and System.Xml.XmlReader.NamespaceURI properties of the element found matches the given strings before reading a text-only element.
Return Value: The text contained in the element that was read. An empty string if the element is empty (or).
This is a helper method for reading simple text-only elements. It calls System.Xml.XmlReader.MoveToContent to find the next content node and then parses its value as a simple string. The local name to check. The namespace URI to check.
ReadEndElement
[C#] public virtual void ReadEndElement( );
[C++] public: virtual void ReadEndElement( );
[VB] Overridable Public Sub ReadEndElement( )
[JScript] public function ReadEndElement( );
Description
Checks that the current content node is an end tag and advances the reader to the next node.
ReadInnerXml
[C#] public abstract string ReadInnerXml( );
[C++] public: virtual String* ReadInnerXml( )=0;
[VB] MustOverride Public Function ReadInnerXml( ) As String
[JScript] public abstract function ReadInnerXml( ): String;
Description
When overridden in a derived class, reads all the content, including markup, as a string.
Return Value: All the XML content, including markup, in the current node. If the current node has no children, an empty string is returned.
This method returns all the content of the current node including the markup. The current node (start tag) and corresponding end node (end tag) are not returned. For example, if you had the following: this ReadInnerXml returns this This method handles element and attribute nodes in the following way: Node Type Child Content Return Value Position After the Call Element text text After the end tag.
ReadOuterXml
[C#] public abstract string ReadOuterXml( );
[C++] public: virtual String* ReadOuterXml( )=0;
[VB] MustOverride Public Function ReadOuterXml( ) As String
[JScript] public abstract function ReadOuterXml( ): String;
Description
When overridden in a derived class, reads the content, including markup, representing this node and all its children.
Return Value: If the reader is positioned on an element or an attribute node, this method returns all the XML content, including markup, of the current node and all its children; otherwise, it returns an empty string.
This method is similar to System.Xml.XmlReader.ReadInnerXml except it also returns the start and end tags.
ReadStartElement
[C#] public virtual void ReadStartElement( );
[C++] public: virtual void ReadStartElement( );
[VB] Overridable Public Sub ReadStartElement( )
[JScript] public function ReadStartElement( ); Checks that the current node is an element and advances the reader to the next node.

Description

Checks that the current node is an element and advances the reader to the next node.

This method calls System.Xml.XmlReader.IsStartElement followed by System.Xml.XmlReader.Read to position you on the content of that element found in the input stream.

ReadStartElement
[C#] public virtual void ReadStartElement(string name);
[C++] public: virtual void ReadStartElement(String* name);
[VB] Overridable Public Sub ReadStartElement(ByVal name As String)
[JScript] public function ReadStartElement(name: String);
Description Checks that the current content node is an element with the given System.Xml.XmlReader.Name and advances the reader to the next node.

A call to this method corresponds to a call to System.Xml.XmlReader.IsStartElement followed by a call to System.Xml.XmlReader.Read. The qualified name of the element.

ReadStartElement
[C#] public virtual void ReadStartElement(string localname, string ns);
[C++] public: virtual void ReadStartElement(String* localname, String* ns);
[VB] Overridable Public Sub ReadStartElement(ByVal localname As String, ByVal ns As String)
[JScript] public function ReadStartElement(localname: String, ns: String);
Description Checks that the current content node is an element with the given System.Xml.XmlReader.LocalName and System.Xml.XmlReader.NamespaceURI and advances the reader to the next node.

A call to this method corresponds to a call to System.Xml.XmlReader.IsStartElement followed by a call to System.Xml.XmlReader.Read. The local name of the element. The namespace URI of the element.

ReadString
[C#] public abstract string ReadString( );
[C++] public: virtual String* ReadString( )=0;
[VB] MustOverride Public Function ReadString( ) As String
[JScript] public abstract function ReadString( ): String;
Description When overridden in a derived class, reads the contents of an element or text node as a string.
Return Value: The contents of the element or text node. This can be an empty string if the reader is positioned on something other than an element or text node, or if there is no more text content to return in the current context.

If positioned on an element, ReadString concatenates all text, significant whitespace, whitespace, and CDATA section nodes together and returns the concatenated data as the element content. It stops when any markup is encountered. This could occur in a mixed content model, or when an element end tag is read.

ResolveEntity
[C#] public abstract void ResolveEntity( );
[C++] public: virtual void ResolveEntity( )=0;
[VB] MustOverride Public Sub ResolveEntity( )
[JScript] public abstract function ResolveEntity( );
Description When overridden in a derived class, resolves the entity reference for EntityReference nodes.

If the reader is positioned on an EntityReference node (XmlNodeType.EntityReference), if System.Xml.XmlReader.Read is called after calling this method, the entity replacement text is parsed. When the entity replacement text is finished, an EndEntity node is returned to close the entity reference scope.

Skip
[C#] public virtual void Skip( );
[C++] public: virtual void Skip( );
[VB] Overridable Public Sub Skip( )
[JScript] public function Skip( );
Description Skips the current element.

In the following XML input if the reader is positioned on the node or any of its attributes, calling Skip positions the reader to the node.

XmlResolver class (System.Xml)
ToString
Description

Resolves external XML resources named by a URI. This class is abstract.

XmlResolver is used to resolve external XML resources such as entities, DTDs or schemas. It is also used to process include and import elements found in Extensible StyleSheet Language (XSL) stylesheets or XML Schema Definition language (XSD) schemas.

XmlResolver
Example Syntax:
ToString
[C#] protected XmlResolver( );
[C++] protected: XmlResolver( );
[VB] Protected Sub New( )
[JScript] protected function XmlResolver( );
Credentials
ToString
[C#] ICredentials Credentials {set;}
[C++] public: _property virtual void set_Credentials(ICredentials*)=0;
[VB] Property Credentials As ICredentials
[JScript] public abstract function set Credentials(ICredentials);
Description When overridden in a derived class, sets the credentials used to authenticate Web requests.

If the virtual directory is configured to allow anonymous access, this property does not need to be set. Otherwise, the credentials of the user must be supplied. If credentials are needed but not supplied, the resolver uses default credentials (CredentialCache.DefaultCredential).

GetEntity
[C#] public abstract object GetEntity(Uri absoluteUri, string role, Type of ObjectToReturn);
[C++] public: virtual Object* GetEntity(Uri* absoluteUri, String* role, Type* of ObjectToReturn)=0;
[VB] MustOverride Public Function GetEntity(ByVal absoluteUri As Uri, ByVal role As String, ByVal of ObjectToReturn As Type) As Object
[JScript] public abstract function GetEntity(absoluteUri: Uri, role: String, of ObjectToReturn: Type): Object;
Description When overridden in a derived class, maps a URI to an object containing the actual resource.
Return Value: A System.IO.Stream object or null if a type other than stream is specified.

This method is used when the caller wants to map a given URI into the object containing the actual resource that the URI represents. The type of object returned is negotiable however the implementation must always support System.IO.Stream. The URI returned from System.Xml.XmlResolver.ResolveUri(System.Uri,System.String) The current version does not use this parameter when resolving URIs. This is provided for future extensibility purposes. For example, this can be mapped to the xlink:role and used as an implementation specific argument in other scenarios. The type of object to return. The current version only returns System.IO.Stream objects.

ResolveUri
[C#] public abstract Uri ResolveUri(Uri baseUri, string relativeUri);
[C++] public: virtual Uri* ResolveUri(Uri* baseUri, String* relativeUri)=0;
[VB] MustOverride Public Function ResolveUri(ByVal baseUri As Uri, ByVal relativeUri As String) As Uri
[JScript] public abstract function ResolveUri(baseUri: Uri, relativeUri: String): Uri;
Description
When overridden in a derived class, resolves the absolute URI from the base and relative URIs.
Return Value: The absolute URI or null if the relative URI can not be resolved.
The absolute URI may be used as the base URI for any subsequent requests for entities that are relative to this URI. The base URI used to resolve the relative URI The URI to resolve. The URI can be absolute or relative. If absolute, this value effectively replaces the baseUri value. If relative, it combines with the baseUri to make an absolute URI.

XmlSignificantWhitespace class (System.Xml)
ToString
Description
Represents whitespace between markup in a mixed content mode or whitespace withing an xml:space='preserve' scope. This is also referred to as significant whitespace. These nodes are created automatically at System.Xml.XmlDocument.Load(System.String) time only if the System.Xml.XmlDocument.PreserveWhitespace flag is true.
  XmlSignificantWhitespace
  Example Syntax:
  ToString
[C#] protected internal XmlSignificantWhitespace(string strData, XmlDocument doc);
[C++] internal: XmlSignificantWhitespace(String* strData, XmlDocument* doc);
[VB] Protected Friend Sub New(ByVal strData As String, ByVal doc As XmlDocument)
[JScript] package function XmlSignificantWhitespace(strData: String, doc: XmlDocument);
Description
  Attributes
  BaseURI
  ChildNodes
  Data
  FirstChild
  HasChildNodes
  InnerText
  InnerXml
  IsReadOnly
  Item
  Item
  LastChild
  Length
  LocalName
  ToString
Description
  Gets the local name of the node.
  Name
  ToString

[C#] public override string Name {get;}
[C++] public: _property virtual String* get_Name( );
[VB] Overrides Public ReadOnly Property Name As String
[JScript] public function get Name( ): String;
Description
  Gets the qualified name of the node.
  NamespaceURI
  NextSibling
  NodeType
  ToString
Description
  Gets the type of the current node.
  OuterXml
  OwnerDocument
  ParentNode
  Prefix
  PreviousSibling
  Value
  ToString
Description
  Gets or sets the value of the node.
  CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
  Creates a duplicate of this node.
Return Value: The duplicate node.
This method serves as a generic copy constructor for nodes. The duplicate node has no parent (ParentNode returns null). true to recursively clone the subtree under the specified node; false to clone only the node itself (and its attributes if the node is an XmlElement).
  WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
  Saves all the children of the node to the specified XmlWriter. The XmlWriter where you want to save the current node.
  WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
  Saves the node to the specified XmlWriter. The XmlWriter where you want to save the node.

XmlSpace enumeration (System.Xml)
  WriteTo
Description
  Specifies the current xml:space scope.
  WriteTo
[C#] public const XmlSpace Default;
[C++] public: const XmlSpace Default;
[VB] Public Const Default As XmlSpace
[JScript] public var Default: XmlSpace;
Description
  The xml:space scope equals default.
  WriteTo
[C#] public const XmlSpace None;

[C++] public: const XmlSpace None;
[VB] Public Const None As XmlSpace
[JScript] public var None: XmlSpace;
Description
   No xml:space scope.
   WriteTo
[C#] public const XmlSpace Preserve;
[C++] public: const XmlSpace Preserve;
[VB] Public Const Preserve As XmlSpace
[JScript] public var Preserve: XmlSpace;
Description
   The xml:space scope equals preserve.
   XmlText class (System.Xml)
   ToString
Description
   Represents the text content of an element or attribute.
   XmlText
   Example Syntax:
   ToString
[C#] protected internal XmlText(string strData, XmlDocument doc);
[C++] internal: XmlText(String* strData, XmlDocument* doc);
[VB] Protected Friend Sub New(ByVal strData As String, ByVal doc As XmlDocument)
[JScript] package function XmlText(strData: String, doc: XmlDocument);
Description
   Attributes
   BaseURI
   ChildNodes
   Data
   FirstChild
   HasChildNodes
   InnerText
   InnerXml
   IsReadOnly
   Item
   Item
   LastChild
   Length
   LocalName
   ToString
Description
   Gets the local name of the node.
   Name
   ToString
[C#] public override string Name {get;}
[C++] public: _property virtual String* get_Name( );
[VB] Overrides Public ReadOnly Property Name As String
[JScript] public function get Name( ): String;
Description
   Gets the qualified name of the node.
   NamespaceURI
   NextSibling
   NodeType
   ToString
Description
   Gets the type of the current node.
   OuterXml
   OwnerDocument
   ParentNode
   Prefix
   PreviousSibling
   Value
   ToString Description
   Gets or sets the value of the node.
   CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
   Creates a duplicate of this node.
   Return Value: The cloned node.
   CloneNode serves as a copy constructor for nodes. For text nodes, the cloned node always includes the data value. To see how this method behaves with other node types, see System.Xml.XmlNode.CloneNode(System.Boolean) method in the XmlNode class. true to recursively clone the subtree under the specified node; false to clone only the node itself.
   SplitText
[C#] public virtual XmlText SplitText(int offset);
[C++] public: virtual XmlText* SplitText(int offset);
[VB] Overridable Public Function SplitText(ByVal offset As Integer) As XmlText
[JScript] public function SplitText(offset: int): XmlText;
Description
   Splits the node into two nodes at the specified offset, keeping both in the tree as siblings.
   After SplitText is called, the original node contains all the content up to the offset point. A new node of the same type, contains all the content at and after the offset point, and is inserted as the next sibling of the original node. When the offset is equal to the length of this node, the new node has no data. The offset at which to split the node.
   WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
   Saves all the children of the node to the specified System.Xml.XmlWriter. The XmlWriter to which you want to save.
   WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
   Saves the node to the specified System.Xml.XmlWriter. The XmlWriter to which you want to save.
   XmlTextReader class (System.Xml)
   WriteTo
Description
   Represents a reader that provides fast, non-cached, forward-only access to XML data.
   XmlTextReader provides forward-only, read-only access to a stream of XML data. The current node refers to the node on which the reader is positioned. The reader is advanced using any of the read methods and properties reflect the value of the current node.
   XmlTextReader
   Example Syntax:
   WriteTo
[C#] protected XmlTextReader( );
[C++] protected: XmlTextReader( );
[VB] Protected Sub New( )

[JScript] protected function XmlTextReader( ); Initializes a new instance of the XmlTextReader.
Description
    Initializes a new instance of the XmlTextReader.
    XmlTextReader
    Example Syntax:
    WriteTo
[C#] public XmlTextReader(Stream input);
[C++] public: XmlTextReader(Stream* input);
[VB] Public Sub New(ByVal input As Stream)
[JScript] public function XmlTextReader(input: Stream); Initializes a new instance of the XmlTextReader.
Description
    Initializes a new instance of the XmlTextReader class with the specified stream.
    The XmlTextReader decodes the stream by wrapping it in a System.IO.StreamReader and calling SwitchEncoding according to the rules for XML encoding. The stream containing the XML data to read.
    XmlTextReader
    Example Syntax:
    WriteTo
[C#] public XmlTextReader(string url);
[C++] public: XmlTextReader(String* url);
[VB] Public Sub New(ByVal url As String)
[JScript] public function XmlTextReader(url: String);
Description
    Initializes a new instance of the XmlTextReader class with the specified file. The URL for the file containing the XML data.
    XmlTextReader
    Example Syntax:
    WriteTo
[C#] public XmlTextReader(TextReader input);
[C++] public: XmlTextReader(TextReader* input);
[VB] Public Sub New(ByVal input As TextReader)
[JScript] public function XmlTextReader(input: TextReader);
Description
    Initializes a new instance of the XmlTextReader class with the specified System.IO.TextReader.
    It is assumed that the TextReader is already set to the correct encoding. This is used by clients that have already read some things from the stream in a multi-part MIME scenario. The TextReader containing the XML data to read.
    XmlTextReader
    Example Syntax:
    WriteTo
[C#] protected XmlTextReader(XmlNameTable nt);
[C++] protected: XmlTextReader(XmlNameTable* nt);
[VB] Protected Sub New(ByVal nt As XmlNameTable)
[JScript] protected function XmlTextReader(nt: XmlNameTable); Initializes a new instance of the XmlTextReader class.
Description
    Initializes a new instance of the XmlTextReader class with the specified XmlNameTable. The XmlNameTable to use.
    XmlTextReader
    Example Syntax:
    WriteTo
[C#] public XmlTextReader(Stream input, XmlNameTable nt);
[C++] public: XmlTextReader(Stream* input, XmlNameTable* nt);
[VB] Public Sub New(ByVal input As Stream, ByVal nt As XmlNameTable)
[JScript] public function XmlTextReader(input: Stream, nt: XmlNameTable);
Description
    Initializes a new instance of the XmlTextReader class with the specified stream and System.Xml.XmlNameTable.
    The XmlTextReader decodes the stream by wrapping it in a System.IO.StreamReader and calling SwitchEncoding according to the rules for XML encoding. The stream containing the XML data to read. The XmlNameTable to use.
    XmlTextReader
    Example Syntax:
    WriteTo
[C#] public XmlTextReader(string url, Stream input);
[C++] public: XmlTextReader(String* url, Stream* input);
[VB] Public Sub New(ByVal url As String, ByVal input As Stream)
[JScript] public function XmlTextReader(url: String, input: Stream);
Description
    Initializes a new instance of the XmlTextReader class with the specified URL and stream. The URL to use for resolving external resources. The System.Xml.XmlTextReader.BaseURI is set to this value. The stream containing the XML data to read.
    XmlTextReader
    Example Syntax:
    WriteTo
[C#] public XmlTextReader(string url, TextReader input);
[C++] public: XmlTextReader(String* url, TextReader* input);
[VB] Public Sub New(ByVal url As String, ByVal input As TextReader)
[JScript] public function XmlTextReader(url: String, input: TextReader);
Description
    Initializes a new instance of the XmlTextReader class with the specified URL and System.IO.TextReader. The URL to use for resolving external resources. The System.Xml.XmlTextReader.BaseURI is set to this value. The TextReader containing the XML data to read.
    XmlTextReader
    Example Syntax:
    WriteTo
[C#] public XmlTextReader(string url, XmlNameTable nt);
[C++] public: XmlTextReader(String* url, XmlNameTable* nt);
[VB] Public Sub New(ByVal url As String, ByVal nt As XmlNameTable)
[JScript] public function XmlTextReader(url: String, nt: XmlNameTable);
Description
    Initializes a new instance of the XmlTextReader class with the specified file and System.Xml.XmlNameTable. The URL for the file containing the XML data to read. The XmlNameTable to use.
    XmlTextReader
    Example Syntax:
    WriteTo
[C#] public XmlTextReader(TextReader input, XmlNameTable nt);
[C++] public: XmlTextReader(TextReader* input, XmlNameTable* fit);
[VB] Public Sub New(ByVal input As TextReader, ByVal nt As XmlNameTable)
[JScript] public function XmlTextReader(input: TextReader, nt: XmlNameTable);

Description
  Initializes a new instance of the XmlTextReader class with the specified System.IO.TextReader and System.Xml.XmlNameTable.
  It is assumed that the TextReader is already set to the correct encoding. This is used by clients that have already read some things from the stream in a multi-part MIME scenario. The TextReader containing the XML data to read. The XmlNameTable to use.
  XmlTextReader
  Example Syntax:
  WriteTo
[C#] public XmlTextReader(Stream xmlFragment, XmlNodeType fragType, XmlParserContext context);
[C++] public: XmlTextReader(Stream* xmlFragment, XmlNodeType fragType, XmlParserContext* context);
[VB] Public Sub New(ByVal xmlFragment As Stream, ByVal fragType As XmlNodeType, ByVal context As XmlParserContext)
[JScript] public function XmlTextReader(xmlFragment: Stream, fragType: XmlNodeType, context: XmlParserContext);
Description
  Initializes a new instance of the XmlTextReader class with the specified values.
  This constructor parses the given string as a fragment of XML. If the XML fragment is an element or attribute, you can bypass the root level rules for well-formed XML documents. The stream containing the XML fragment to parse. The System.Xml.XmlNodeType of the XML fragment. This also determines what the fragment can contain. (See table below.) The System.Xml.XmlParserContext in which the xmlFragment is to be parsed. This includes the System.Xml.XmlNameTable to use, the namespace scope, the current xml:lang, and the xml:space scope.
  XmlTextReader
  Example Syntax:
  WriteTo
[C#] public XmlTextReader(string url, Stream input, XmlNameTable nt);
[C++] public: XmlTextReader(String* url, Stream* input, XmlNameTable* nt);
[VB] Public Sub New(ByVal url As String, ByVal input As Stream, ByVal nt As XmlNameTable)
[JScript] public function XmlTextReader(url: String, input: Stream, nt: XmlNameTable);
Description
  Initializes a new instance of the XmlTextReader class with the specified URL, stream and System.Xml.XmlNameTable. The URL to use for resolving external resources. The System.Xml.XmlTextReader.BaseURI is set to this value. The stream containing the XML data to read. The XmlNameTable to use.
  XmlTextReader
  Example Syntax:
  WriteTo
[C#] public XmlTextReader(string url, TextReader input, XmlNameTable nt);
[C++] public: XmlTextReader(String* url, TextReader* input, XmlNameTable* nt);
[VB] Public Sub New(ByVal url As String, ByVal input As TextReader, ByVal nt As XmlNameTable)
[JScript] public function XmlTextReader(url: String, input: TextReader, nt: XmlNameTable);
Description
  Initializes a new instance of the XmlTextReader class with the specified URL, System.IO.TextReader and System.Xml.XmlNameTable. The URL to use for resolving external resources. The System.Xml.XmlTextReader.BaseURI is set to this value. The TextReader containing the XML data to read. The XmlNameTable to use.
  XmlTextReader
  Example Syntax:
  WriteTo
[C#] public XmlTextReader(string xmlFragment, XmlNodeType fragType, XmlParserContext context);
[C++] public: XmlTextReader(String* xmlFragment, XmlNodeType fragType, XmlParserContext* context);
[VB] Public Sub New(ByVal xmlFragment As String, ByVal fragType As XmlNodeType, ByVal context As XmlParserContext)
[JScript] public function XmlTextReader(xmlFragment: String, fragType: XmlNodeType, context: XmlParserContext);
Description
  Initializes a new instance of the XmlTextReader class with the specified values.
  This constructor parses the given string as a fragment of XML. If the XML fragment is an element or attribute, you can bypass the root level rules for well-formed XML documents. This constructor can handle strings returned from System.Xml.XmlTextReader.ReadInnerXml. The string containing the XML fragment to parse. The System.Xml.XmlNodeType of the XML fragment. This also determines what the fragment string can contain. (See table below.) The System.Xml.XmlParserContext in which the xmlFragment is to be parsed. This includes the System.Xml.XmlNameTable to use, the namespace scope, the current xml:lang, and the xml:space scope.
  AttributeCount
  WriteTo
[C#] public override int AttributeCount {get;}
[C++] public: _property virtual int get_AttributeCount( );
[VB] Overrides Public ReadOnly Property AttributeCount As Integer
[JScript] public function get AttributeCount( ): int;
Description
  Gets the number of attributes on the current node.
  This property is relevant to Element, DocumentType and XmlDeclaration nodes only. (Other node types do not have attributes.) The following example displays all attributes on the current node.
  BaseURI
  WriteTo
[C#] public override string BaseURI {get;}
[C++] public: _property virtual String* get_BaseURI( );
[VB] Overrides Public ReadOnly Property BaseURI As String
[JScript] public function get BaseURI( ): String;
Description
  Gets the base URI of the current node.
  A networked XML document is comprised of chunks of data aggregated using various W3C standard inclusion mechanisms and therefore contains nodes that come from different places. DTD entities are an example of this, but this is not limited to DTDs. The base URI tells you where these nodes came from. If there is no base URI for the nodes being returned (for example, they were parsed from an in-memory string), String.Empty is returned.
  CanResolveEntity
  Depth
  WriteTo Description
   Gets the depth of the current node in the XML document.
  Encoding
    WriteTo
[C#] public Encoding Encoding {get;}
[C++] public: _property Encoding* get_Encoding( );
[VB] Public ReadOnly Property Encoding As Encoding
[JScript] public function get Encoding( ): Encoding;
Description
   Gets the encoding of the document.
   All encoding standards supported by the underlying operating system are supported.
  EOF
    WriteTo
[C#] public override bool EOF {get;}
[C++] public: _property virtual bool get_EOF( );
[VB] Overrides Public ReadOnly Property EOF As Boolean
[JScript] public function get EOF( ): Boolean;
Description
   Gets a value indicating whether the reader is positioned at the end of the stream.
  HasAttributes
  HasValue
    WriteTo
Description
   Gets a value indicating whether the current node can have a System.Xml.XmlTextReader.Value.
   The following table lists node types that have a value to return.
  IsDefault
    WriteTo
[C#] public override bool IsDefault {get;}
[C++] public: _property virtual bool get_IsDefault( );
[VB] Overrides Public ReadOnly Property IsDefault As Boolean
[JScript] public function get IsDefault( ): Boolean;
Description
   Gets a value indicating whether the current node is an attribute that was generated from the default value defined in the DTD or schema.
   This property applies only to attribute nodes.
  IsEmptyElement
    WriteTo
[C#] public override bool IsEmptyElement {get;}
[C++] public: _property virtual bool get_IsEmptyElement( );
[VB] Overrides Public ReadOnly Property IsEmptyElement As Boolean
[JScript] public function get IsEmptyElement( ): Boolean;
Description
   Gets a value indicating whether the current node is an empty element (for example,).
   This property enables you to determine the difference between the following: (IsEmptyElement is true).
  Item
    WriteTo
[C#] public override string this [int i] {get;}
[C++] public: _property virtual String* get_Item(int i);
[VB] Overrides Public Default ReadOnly Property Item(ByVal i As Integer) As String
[JScript] returnValue=XmlTextReaderObject.Item(i); Gets the value of the attribute.
Description
   Gets the value of the attribute with the specified index.
   This property does not move the reader. The index of the attribute.
  Item
    WriteTo

[C#] public override string this[string name] {get;}
[C++] public: _property virtual String* get_Item(String* name);
[VB] Overrides Public Default ReadOnly Property Item(ByVal name As String) As String
[JScript] returnValue=XmlTextReaderObject.Item(name);
Description
   Gets the value of the attribute with the specified name.
   This property does not move the reader. The qualified name of the attribute.
  Item
    WriteTo
[C#] public override string this[string name, string namespaceURI] {get;}
[C++] public: _property virtual String* get_Item(String* name, String* namespaceURI);
[VB] Overrides Public Default ReadOnly Property Item(ByVal name As String, ByVal namespaceURI As String) As String
[JScript] returnValue=XmlTextReaderObject.Item(name, namespaceURI);
Description
   Gets the value of the attribute with the specified local name and namespace URI.
   This property does not move the reader. The local name of the attribute. The namespace URI of the attribute.
  LineNumber
    WriteTo
[C#] public int LineNumber {get;}
[C++] public: _property int get_LineNumber( );
[VB] Public ReadOnly Property LineNumber As Integer
[JScript] public function get LineNumber( ): int;
Description
   Gets the current line number.
   This property is most commonly used for error reporting, but can be called at any time. The starting value for this property is 1.
  LinePosition
    WriteTo
[C#] public int LinePosition {get;}
[C++] public: _property int get_LinePosition( );
[VB] Public ReadOnly Property LinePosition As Integer
[JScript] public function get LinePosition( ): int;
Description
   Gets the current line position.
   This property is most commonly used for error reporting, but can be called at any time. The property's starting value is 1.
  LocalName
    WriteTo
[C#] public override string LocalName {get;}
[C++] public: _property virtual String* get_LocalName( );
[VB] Overrides Public ReadOnly Property LocalName As String
[JScript] public function get LocalName( ): String;
Description
   Gets the local name of the current node.
  Name
    WriteTo
[C#] public override string Name {get;}
[C++] public: _property virtual String* get_Name( );
[VB] Overrides Public ReadOnly Property Name As String
[JScript] public function get Name( ): String;
Description
   Gets the qualified name of the current node.
  Namespaces
    WriteTo

[C#] public bool Namespaces {get; set;}
[C++] public: _property bool get_Namespaces( );public: _property void set_Namespaces(bool);
[VB] Public Property Namespaces As Boolean
[JScript] public function get Namespaces( ): Boolean;public function set Namespaces(Boolean);
Description
  Gets or sets a value indicating whether to do namespace support.
  This property cannot be set after a read operation has occurred.
    NamespaceURI
    WriteTo
[C#] public override string NamespaceURI {get;}
[C++] public: _property virtual String* get_Namespace URI( );
[VB] Overrides Public ReadOnly Property NamespaceURI As String
[JScript] public function get NamespaceURI( ): String;
Description
  Gets the namespace URI (as defined in the W3C Namespace specification) of the node on which the reader is positioned.
  This property is relevant to Element and Attribute nodes only.
    NameTable
    WriteTo
[C#] public override XmlNameTable NameTable {get;}
[C++] public: _property virtual XmlNameTable* get_NameTable( );
[VB] Overrides Public ReadOnly Property NameTable As XmlNameTable
[JScript] public function get NameTable( ): XmlNameTable;
Description
  Gets the System.Xml.XmlNameTable associated with this implementation.
  All node and attribute names returned from this class are atomized using the NameTable. When the same name is returned multiple times (for example, Customer), then the same String object will be returned for that name. This makes it possible for you to write efficient code that does object comparisons on these strings instead of expensive string comparisons.
    NodeType
    WriteTo
[C#] public override XmlNodeType NodeType {get;}
[C++] public: _property virtual XmlNodeType get_NodeType( );
[VB] Overrides Public ReadOnly Property NodeType As XmlNodeType
[JScript] public function get NodeType( ): XmlNodeType;
Description
  Gets the type of the current node.
  This property never returns the following XmlNodeType types: Document, DocumentFragment, Entity, EndEntity, or Notation
    Normalization
    WriteTo
[C#] public bool Normalization {get; set;}
[C++] public: _property bool get_Normalization( );public: _property void set_Normalization(bool);
[VB] Public Property Normalization As Boolean
[JScript] public function get Normalization( ): Boolean;public function set Normalization(Boolean);
Description
  Gets or sets a value indicating whether to normalize whitespace and attribute values.

This property can be changed at any time and takes affect on the next read operation.
    Prefix
    WriteTo
[C#] public override string Prefix {get;}
[C++] public: _property virtual String* get_Prefix( );
[VB] Overrides Public ReadOnly Property Prefix As String
[JScript] public function get Prefix( ): String;
Description
  Gets the namespace prefix associated with the current node.
    QuoteChar
    WriteTo
[C#] public override char QuoteChar {get;}
[C++] public: _property virtual _wchar_t get_QuoteChar( );
[VB] Overrides Public ReadOnly Property QuoteChar As Char
[JScript] public function get QuoteChar( ): Char;
Description
  Gets the quotation mark character used to enclose the value of an attribute node.
  This property applies only to an attribute node.
    ReadState
    WriteTo
[C#] public override ReadState ReadState {get;}
[C++] public: _property virtual ReadState get_ReadState( );
[VB] Overrides Public ReadOnly Property ReadState As ReadState
[JScript] public function get ReadState( ): ReadState;
Description
  Gets the state of the reader.
    Value
    WriteTo
[C#] public override string Value {get;}
[C++] public: _property virtual String* get_Value( );
[VB] Overrides Public ReadOnly Property Value As String
[JScript] public function get Value( ): String;
Description
  Gets the text value of the current node.
    WhitespaceHandling
    WriteTo
[C#] public WhitespaceHandling WhitespaceHandling {get; set;}
[C++] public: _property WhitespaceHandling get_WhitespaceHandling( );public: _property void set_WhitespaceHandling(WhitespaceHandling);
[VB] Public Property WhitespaceHandling As WhitespaceHandling
[JScript] public function get WhitespaceHandling( ): WhitespaceHandling;public function set WhitespaceHandling(WhitespaceHandling);
Description
  Gets or sets a value that specifies how whitespace is handled.
  This property can be changed at any time and takes affect on the next read operation.
    XmlLang
    WriteTo
[C#] public override string XmlLang {get;}
[C++] public: _property virtual String* get_XmlLang( );
[VB] Overrides Public ReadOnly Property XmlLang As String
[JScript] public function get XmlLang( ): String;
Description
  Gets the current xml:lang scope.
  This property represents the xml:lang scope within which the current node resides. For example, here is an XML fragment with xml:lang set to US English in the root element: Fred When the reader is positioned on the name element, you can use this property to find that it is in the scope of a US English xml:lang attribute.

XmlResolver
WriteTo
[C#] XmlResolver XmlResolver {set;}
[C++] public: _property void set_XmlResolver(XmlResolver*);
[VB] Property XmlResolver As XmlResolver
[JScript] public function set XmlResolver(XmlResolver);
Description Sets the System.Xml.XmlResolver used for resolving DTD references.

The reader uses XmlResolver to resolve the location of the file loaded into the reader and also to resolve DTD references. For example, if your XML included the DOCTYPE declaration, the reader resolves this external file and ensures that the DTD is well-formed. The reader does not use the DTD for validation.

XmlSpace
WriteTo
[C#] public override XmlSpace XmlSpace {get;}
[C++] public: _property virtual XmlSpace get_XmlSpace( );
[VB] Overrides Public ReadOnly Property XmlSpace As XmlSpace
[JScript] public function get XmlSpace( ): XmlSpace;
Description Gets the current xml:space scope.

Close
[C#] public override void Close( );
[C++] public: void Close( );
[VB] Overrides Public Sub Close( )
[JScript] public override function Close( );
Description Changes the System.Xml.XmlReader.ReadState to Closed.

This method also releases any resources held while reading. If this reader was constructed using a stream, this method also calls Close on the underlying stream.

GetAttribute
[C#] public override string GetAttribute(int i);
[C++] public: String* GetAttribute(int i);
[VB] Overrides Public Function GetAttribute(ByVal i As Integer) As String
[JScript] public override function GetAttribute(i: int): String;
Gets the value of an attribute.
Description Gets the value of the attribute with the specified index.
Return Value: The value of the specified attribute.

This method does not move the reader. The index of the attribute. The index is zero-based. (The first attribute has index 0.)

GetAttribute
[C#] public override string GetAttribute(string name);
[C++] public: String* GetAttribute(String* name);
[VB] Overrides Public Function GetAttribute(ByVal name As String) As String
[JScript] public override function GetAttribute(name: String): String;
Description Gets the value of the attribute with the specified name.
Return Value: The value of the specified attribute. If the attribute is not found, String.Empty is returned.

This method does not move the reader. The qualified name of the attribute.

GetAttribute
[C#] public override string GetAttribute(string localName, string namespaceURI);
[C++] public: String* GetAttribute(String* localName, String* namespaceURI);
[VB] Overrides Public Function GetAttribute(ByVal localName As String, ByVal namespaceURI As String) As String
[JScript] public override function GetAttribute(localName: String, namespaceURI: String): String;
Description Gets the value of the attribute with the specified local name and namespace URI.
Return Value: The value of the specified attribute. If the attribute is not found, String.Empty is returned. This method does not move the reader.

The following XML contains an attribute in a specific namespace: You can lookup the dt:type attribute using one argument (prefix and local name) or two arguments (local name and namespace URI): String dt=reader.GetAttribute ("dt:type"); String dt2=reader.GetAttribute("type","urn: datatypes"); To lookup the xmlns:dt attribute, use one of the following arguments: String dt3=reader.GetAttribute ("xmlns:dt"); String dt4=reader.GetAttribute("dt",http:// www.w3.org/2000/xmlns/); You can also get this information using the System.Xml.XmlTextReader.Prefix property. The local name of the attribute. The namespace URI of the attribute.

GetRemainder
[C#] public TextReader GetRemainder( );
[C++] public: TextReader* GetRemainder( );
[VB] Public Function GetRemainder( ) As TextReader
[JScript] public function GetRemainder( ): TextReader;
Description Gets the remainder of the buffered XML.

Because XmlTextReader does a buffered Read, it must be able to return the remainder of the unused buffer so that no data is lost. This allows protocols (such as multi-part MIME) to package XML in the same stream as other things.

LookupNamespace
[C#] public override string LookupNamespace(string prefix);
[C++] public: String* LookupNamespace(String* prefix);
[VB] Overrides Public Function LookupNamespace(ByVal prefix As String) As String
[JScript] public override function LookupNamespace(prefix: String): String;
Description Resolves a namespace prefix in the current element's scope.
Return Value: The namespace URI to which the prefix maps or null if no matching prefix is found.

In the preceding XML, if the reader is positioned on the href attribute, the prefix a is resolved by calling reader.LookupNamespace("a"). The returned string is urn:456. The prefix whose namespace URI you want to resolve. To match the default namespace, pass an empty string. This string does not have to be atomized.

MoveToAttribute
[C#] public override void MoveToAttribute(int i);
[C++] public: void MoveToAttribute(int i);
[VB] Overrides Public Sub MoveToAttribute(ByVal i As Integer)
[JScript] public override function MoveToAttribute(i: int);
Description Moves to the attribute with the specified index. The index of the attribute.

MoveToAttribute
[C#] public override bool MoveToAttribute(string name);
[C++] public: bool MoveToAttribute(String* name);

[VB] Overrides Public Function MoveToAttribute(ByVal name As String) As Boolean
[JScript] public override function MoveToAttribute(name: String): Boolean; Moves to the specified attribute.
Description
Moves to the attribute with the specified name.
Return Value: true if the attribute is found; otherwise, false. If false, the reader's position does not change.
After calling MoveToAttribute, the System.Xml.XmlTextReader.Name, System.Xml.XmlTextReader.NamespaceURI, and System.Xml.XmlTextReader.Prefix properties will reflect the properties of that attribute. The qualified name of the attribute.
MoveToAttribute
[C#] public override bool MoveToAttribute(string localName, string namespaceURI);
[C++] public: bool MoveToAttribute(String* localName, String* namespaceURI);
[VB] Overrides Public Function MoveToAttribute(ByVal localName As String, ByVal namespaceURI As String) As Boolean
[JScript] public override function MoveToAttribute(localName: String, namespaceURI: String): Boolean;
Description
Moves to the attribute with the specified local name and namespace URI.
Return Value: true if the attribute is found; otherwise, false. If false, the reader's position does not change.
After calling MoveToAttribute, the System.Xml.XmlTextReader.Name, System.Xml.XmlTextReader.NamespaceURI, and System.Xml.XmlTextReader.Prefix properties will reflect the properties of that attribute. The local name of the attribute. The namespace URI of the attribute.
MoveToElement
[C#] public override bool MoveToElement( );
[C++] public: bool MoveToElement( );
[VB] Overrides Public Function MoveToElement( ) As Boolean
[JScript] public override function MoveToElement( ): Boolean;
Description
Moves to the element that contains the current attribute node.
Return Value: true if the reader is positioned on an attribute (the reader moves to the element that owns the attribute); false if the reader is not positioned on an attribute (the position of the reader does not change).
Use this method to return to an element after navigating through its attributes. This method moves the reader to one of the following node types: Element, DocumentType, or XmlDeclaration.
MoveToFirstAttribute
[C#] public override bool MoveToFirstAttribute( );
[C++] public: bool MoveToFirstAttribute( );
[VB] Overrides Public Function MoveToFirstAttribute( ) As Boolean
[JScript] public override function MoveToFirstAttribute( ): Boolean;
Description
Moves to the first attribute.
Return Value: true if an attribute exists (the reader moves to the first attribute); otherwise, false (the position of the reader does not change).
MoveToNextAttribute
[C#] public override bool MoveToNextAttribute( );
[C++] public: bool MoveToNextAttribute( );
[VB] Overrides Public Function MoveToNextAttribute( ) As Boolean
[JScript] public override function MoveToNextAttribute( ): Boolean;
Description
Moves to the next attribute.
Return Value: true if there is a next attribute; false if there are no more attributes.
If the current node is an element node, this method is equivalent to System.Xml.XmlTextReader.MoveToFirstAttribute. If MoveToNextAttribute returns true, the reader moves to the next attribute; otherwise, the position of the reader does not change.
Read
[C#] public override bool Read( );
[C++] public: bool Read( );
[VB] Overrides Public Function Read( ) As Boolean
[JScript] public override function Read( ): Boolean;
Description
Reads the next node from the stream.
Return Value: true if the next node was read successfully; false if there are no more nodes to read.
When a reader is first created and initialized, there is no information available. You must call Read to read the first node.
ReadAttributeValue
[C#] public override bool ReadAttributeValue( );
[C++] public: bool ReadAttributeValue( );
[VB] Overrides Public Function ReadAttributeValue( ) As Boolean
[JScript] public override function ReadAttributeValue( ): Boolean;
Description
Parses the attribute value into one or more Text or EntityReference nodes.
Return Value: true if there are nodes to return.
Use this method after calling MoveToAttribute to read through the text or entity reference nodes that make up the attribute value. The System.Xml.XmlReader.Depth of the attribute value nodes is one plus the depth of the attribute node; it increments and decrements by one when you step into and out of general entity references.
ReadBase64
[C#] public int ReadBase64(byte[ ] array, int offset, int len);
[C++] public: int ReadBase64(unsigned char array _gc[ ], int offset, int len);
[VB] Public Function ReadBase64(ByVal array( ) As Byte, ByVal offset As Integer, ByVal len As Integer) As Integer
[JScript] public function ReadBase64(array: Byte[ ], offset: int, len: int): int;
Description
Decodes Base64 and returns the decoded binary bytes.
Return Value: The number of bytes written to the buffer.
Like System.Xml.XmlTextReader.ReadChars(System.Char[ ],System.Int32,System.Int32), this method can be called successively to read large streams of embedded text. It decodes Base64 content and returns the decoded binary bytes (for example, an inline Base64 encoded GIF image) into the buffer. See RFC 1521. (You can obtain RFCs which may be located on the World Wide Web (www.), from the Request for Comments Web site located at rfc-editor.org) The following example reads a file containing Base64 and BinHex data. The array of characters that serves as the buffer to which the text contents are written. The zero-based index into the array specifying where the method should begin to write to the buffer. The number of bytes to write into the buffer.

ReadBinHex
[C#] public int ReadBinHex(byte[ ] array, int offset, int len);
[C++] public: int ReadBinHex(unsigned char array _gc[ ], int offset, int len);
[VB] Public Function ReadBinHex(ByVal array( ) As Byte, ByVal offset As Integer, ByVal len As Integer) As Integer
[JScript] public function ReadBinHex(array: Byte[ ], offset: int, len: int): int;
Description
Decodes BinHex and returns the decoded binary bytes.
Return Value: The number of bytes written to your buffer.
Like System.Xml.XmlTextReader.ReadChars(System.Char [ ],System.Int32,System.Int32), this method can be called successively to read large streams of embedded text. It decodes BinHex content and returns the decoded binary bytes (for example, an inline BinHex encoded GIF image) into the buffer. The byte array that serves as the buffer to which the decoded binary bytes are written. The zero-based index into the array specifying where the method should begin to write to the buffer. The number of bytes to write into the buffer.
ReadChars
[C#] public int ReadChars(char[ ] buffer, int index, int count);
[C++] public: int ReadChars(_wchar_t buffer _gc[ ], int index, int count);
[VB] Public Function ReadChars(ByVal buffers As Char, ByVal index As Integer, ByVal count As Integer) As Integer
[JScript] public function ReadChars(buffer: Char[ ], index: int, count: int): int;
Description
Reads the text contents of an element into a character buffer. This method is designed to read large streams of embedded text by calling it successively.
Return Value: The number of characters read. This can be 0 if the reader is not positioned on an element or if there is no more text content to return in the current context.
This is the most efficient way to process very large streams of text embedded in an XML document. Rather than allocating large string objects, ReadChars returns text content a buffer at a time. This method is designed to work only on element nodes. Other node types cause ReadChars to return 0. The array of characters that serves as the buffer to which the text contents are written. The position within buffer where the method should begin writing text contents. The number of characters to write into buffer.
ReadInnerXml
[C#] public override string ReadInnerXml( );
[C++] public: String* ReadInnerXml( );
[VB] Overrides Public Function ReadInnerXml( ) As String
[JScript] public override function ReadInnerXml( ): String;
Description
Reads all the content, including markup, as a string.
Return Value: All the XML content, including markup, in the current node. If the current node has no children, an empty string is returned.
This method returns all the content of the current node including the markup. The current node (start tag) and corresponding end node (end tag) are not returned. For example, if you had the following: this ReadInnerXml returns this This method handles element and attribute nodes in the following way: Node Type Child Content Return Value Position After the Call Element text text After the end tag.
ReadOuterXml
[C#] public override string ReadOuterXml( );
[C++] public: String* ReadOuterXml( );
[VB] Overrides Public Function ReadOuterXml( ) As String
[JScript] public override function ReadOuterXml( ): String;
Description
Reads the content, including markup, representing this node and all its children.
Return Value: If the reader is positioned on an element or an attribute node, this method returns all the XML content, including markup, of the current node and all its children; otherwise, it returns an empty string.
This method is similar to System.Xml.XmlTextReader.ReadInnerXml except it also returns the start and end tags.
ReadString
[C#] public override string ReadString( );
[C++] public: String* ReadString( );
[VB] Overrides Public Function ReadString( ) As String
[JScript] public override function ReadString( ): String;
Description
Reads the contents of an element or a text node as a string.
Return Value: The contents of the element or text node. This can be an empty string if the reader is positioned on something other than an element or text node, or if there is no more text content to return in the current context.
If positioned on an element, ReadString concatenates all text, significant whitespace, whitespace and CData section node types together and returns the concatenated data as the element content. It stops when any markup is encountered. This could occur in a mixed content model, or when an element end tag is read.
ResolveEntity
[C#] public override void ResolveEntity( );
[C++] public: void ResolveEntity( );
[VB] Overrides Public Sub ResolveEntity( )
[JScript] public override function ResolveEntity( );
Description
Resolves the entity reference for EntityReference nodes.
XmlTextReader cannot resolve general entities. Calling this method will throw an exception.
IXmlLineInfo.HasLineInfo
[C#] bool IXmlLineInfo.HasLineInfo( );
[C++] bool IXmlLineInfo::HasLineInfo( );
[VB] Function HasLineInfo( ) As Boolean Implements IXmlLineInfo.HasLineInfo
[JScript] function IXmlLineInfo.HasLineInfo( ): Boolean;
XmlTextWriter class (System.Xml)
ToString
Description
Represents a writer that provides a fast, non-cached, forward-only way of generating streams or files containing XML data that conforms to the W3C Extensible Markup Language (XML) 1.0 and the Namespaces in XML recommendations.
This class implements the System.Xml.XmlWriter class.
XmlTextWriter
Example Syntax:
ToString
[C#] public XmlTextWriter(TextWriter w);
[C++] public: XmlTextWriter(TextWriter* w);
[VB] Public Sub New(ByVal w As TextWriter)
[JScript] public function XmlTextWriter(w: TextWriter);
Description
Creates an instance of the XmlTextWriter class using the specified System.IO.TextWriter. The TextWriter to write to. It is assumed that the TextWriter is already set to the correct encoding.
XmlTextWriter
Example Syntax:
ToString
[C#] public XmlTextWriter(Stream w, Encoding encoding);
[C++] public: XmlTextWriter(Stream* w, Encoding* encoding);

[VB] Public Sub New(ByVal w As Stream, ByVal encoding As Encoding)
[JScript] public function XmlTextWriter(w: Stream, encoding: Encoding); Creates an instance of the XmlTextWriter class.
Description
Creates an instance of the XmlTextWriter class using the specified stream. The stream to which you want to write. The encoding to generate and whether or not to write out any byte order mark. If encoding is null it writes out the stream as UTF-8 and omits the encoding attribute from the ProcessingInstruction.
XmlTextWriter
Example Syntax:
ToString
[C#] public XmlTextWriter(string filename, Encoding encoding);
[C++] public: XmlTextWriter(String* filename, Encoding* encoding);
[VB] Public Sub New(ByVal filename As String, ByVal encoding As Encoding)
[JScript] public function XmlTextWriter(filename: String, encoding: Encoding);
Description
Creates an instance of the XmlTextWriter class using the specified file. The filename to write to. If the file exists, it will truncate it and overwrite it with the new content. The encoding to generate. If encoding is null it writes the file out as UTF-8, and omits the encoding attribute from the ProcessingInstruction.
Formatting
ToString
[C#] public Formatting Formatting {get; set;}
[C++] public: _property Formatting get_Formatting( );public: _property void set_Formatting(Formatting);
[VB] Public Property Formatting As Formatting
[JScript] public function get Formatting( ): Formatting;public function set Formatting(Formatting);
Description
Indicates how the output is formatted.
If the Indented option is set, child elements are indented using the System.Xml.XmlTextWriter.Indentation and System.Xml.XmlTextWriter.IndentChar properties. Only element content will be indented. The following C# code writes out HTML elements including mixed content: XmlTextWriter w=new XmlTextWriter(Console.Out); w.Formatting=Formatting.Indented; w.WriteStartElement ("ol"); w.WriteStartElement("li"); w.WriteString("The big"); //This means "li" now has a mixed content model. w.WriteElementString("b", "E"); w.WriteElementString ("i", "lephant"); w.WriteString("walks slowly."); w.WriteEndElement( ); w.WriteEndElement( ); The above code produces the following output:
The big Elephant walks slowly.
When this is viewed in HTML no whitespace appears between the bold and italic elements. In fact, in this example, if indenting was added between these elements the word "Elephant" would be incorrectly broken.
Indentation
ToString
[C#] public int Indentation {get; set;}
[C++] public: _property int get_Indentation( );public: _property void set_Indentation(int);
[VB] Public Property Indentation As Integer
[JScript] public function get Indentation( ): int;public function set Indentation(int);
Description
Gets or sets how many IndentChars to write for each level in the hierarchy when System.Xml.XmlTextWriter.Formatting is set to Formatting.Indented.
Indentation is performed on following node types: DocumentType, Element, Comment, ProcessingInstruction, and CDATASection. All other node types are not affected. The XmlTextWriter does not indent the internal DTD subset. However, you could do the following to apply formatting to the internal DTD subset.
IndentChar
ToString
[C#] public char IndentChar {get; set;}
[C++] public: _property _wchar_t get_IndentChar( ); public: _property void set_IndentChar(_wchar_t);
[VB] Public Property IndentChar As Char
[JScript] public function get IndentChar( ): Char;public function set IndentChar(Char);
Description
Gets or sets which character to use for indenting when System.Xml.XmlTextWriter.Formatting is set to Formatting. Indented.
Namespaces
ToString
[C#] public bool Namespaces {get; set;}
[C++] public: _property bool get_Namespaces( ); public: _property void set_Namespaces(bool);
[VB] Public Property Namespaces As Boolean
[JScript] public function get Namespaces( ): Boolean;public function set Namespaces(Boolean);
Description
Gets or sets a value indicating whether to do namespace support.
QuoteChar
ToString
[C#] public char QuoteChar {get; set;}
[C++] public: _property _wchar_t get_QuoteChar( ); public: _property void set_QuoteChar(_wchar_t);
[VB] Public Property QuoteChar As Char
[JScript] public function get QuoteChar( ): Char;public function set QuoteChar(Char);
Description
Gets or sets which character to use to quote attribute values.
WriteState
ToString
[C#] public override WriteState WriteState {get;}
[C++] public: _property virtual WriteState get_WriteState( );
[VB] Overrides Public ReadOnly Property WriteState As WriteState
[JScript] public function get WriteState( ): WriteState;
Description
Gets the state of the writer.
XmlLang
ToString
[C#] public override string XmlLang {get;}
[C++] public: _property virtual String* get_XmlLang( );
[VB] Overrides Public ReadOnly Property XmlLang As String
[JScript] public function get XmlLang( ): String;
Description
Gets the current xml:lang scope.
This property allows one component to find out what state another component has left the writer in. For example, perhaps one component wants to tell another which language help text to generate. The language information is communicated by writing an xml:lang attribute.

XmlSpace
ToString
[C#] public override XmlSpace XmlSpace {get;}
[C++] public: _property virtual XmlSpace get_XmlSpace( );
[VB] Overrides Public ReadOnly Property XmlSpace As XmlSpace
[JScript] public function get XmlSpace( ): XmlSpace;
Description
Gets an System.Xml.XmlSpace representing the current xml:space scope.
This allows one component to find out in what state another component has left the writer.
Close
[C#] public override void Close( );
[C++] public: void Close( );
[VB] Overrides Public Sub Close( )
[JScript] public override function Close( );
Description
Closes this stream and the underlying stream.
Any elements or attributes left open will be automatically closed.
Flush
[C#] public override void Flush( );
[C++] public: void Flush( );
[VB] Overrides Public Sub Flush( )
[JScript] public override function Flush( );
Description
Flushes whatever is in the buffer to the underlying streams and also flushes the underlying stream.
This is called instead of System.Xml.XmlTextWriter. Close when you want to write more to the underlying stream without losing what is still in the buffer.
LookupPrefix
[C#] public override string LookupPrefix(string ns);
[C++] public: String* LookupPrefix(String* ns);
[VB] Overrides Public Function LookupPrefix(ByVal ns As String) As String
[JScript] public override function LookupPrefix(ns: String): String;
Description
Returns the closest prefix defined in the current namespace scope for the namespace URI.
Return Value: The matching prefix. Or null if no matching namespace URI is found in the current scope. Namespace URI whose prefix you want to find.
WriteBase64
[C#] public override void WriteBase64(byte[ ] buffer, int index, int count);
[C++] public: void WriteBase64(unsigned char buffer _gc[ ], int index, int count);
[VB] Overrides Public Sub WriteBase64(ByVal buffers As Byte, ByVal index As Integer, ByVal count As Integer)
[JScript] public override function WriteBase64(buffer: Byte[ ], index: int, count: int);
Description
Encodes the specified binary bytes as base64 and writes out the resulting text.
For example, the byte buffer may contain the binary contents of a GIF image. This clearly would not be valid XML. The Base64 encoding is designed to represent arbitrary byte sequences in a text form comprised of the 65 US-ASCII characters ([A-Za-z0-9+/=]) where each character encodes 6 bits of the binary data. See RFC 1521. (You can obtain RFCs which may be located on the World Wide Web (www.), from the Request for Comments Web site at located at rfc-editor. org/.) The following example encodes an input file using WriteBase64 and generates a temporary XML file. The temporary XML file is decoded using the System.Xml.XmlTextReader.ReadBase64(System.Byte[ ],System.Int32,System.Int32) method and compared to the original file. Byte array to encode. The position within the buffer indicating the start of the bytes to write. The number of bytes to write.
WriteBinHex
[C#] public override void WriteBinHex(byte[ ] buffer, int index, int count);
[C++] public: void WriteBinHex(unsigned char buffer _gc[ ], int index, int count);
[VB] Overrides Public Sub WriteBinHex(ByVal buffers As Byte, ByVal index As Integer, ByVal count As Integer)
[JScript] public override function WriteBinHex(buffer: Byte[ ], index: int, count: int);
Description
Encodes the specified binary bytes as binhex and writes out the resulting text. Byte array to encode. The position within the buffer indicating the start of the bytes to write. The number of bytes to write.
WriteCData
[C#] public override void WriteCData(string text);
[C++] public: void WriteCData(String* text);
[VB] Overrides Public Sub WriteCData(ByVal text As String)
[JScript] public override function WriteCData(text: String);
Description
Writes out a block containing the specified text.
If text is either null or String.Empty, this method writes an empty CData block, for example. Text to place inside the CDATA block.
WriteCharEntity
[C#] public override void WriteCharEntity(char ch);
[C++] public: void WriteCharEntity(_wchar_t ch);
[VB] Overrides Public Sub WriteCharEntity(ByVal ch As Char)
[JScript] public override function WriteCharEntity(ch: Char);
Description
Forces the generation of a character entity for the specified Unicode character value.
This method writes the Unicode character in hexidecimal character entity reference format. Unicode character for which to generate a character entity.
WriteChars
[C#] public override void WriteChars(char[ ] buffer, int index, int count);
[C++] public: void WriteChars(_wchar_t buffer _gc[ ], int index, int count);
[VB] Overrides Public Sub WriteChars(ByVal buffers As Char, ByVal index As Integer, ByVal count As Integer)
[JScript] public override function WriteChars(buffer: Char[ ], index: int, count: int);
Description
Writes text a buffer at a time.
This method can be used to write large amounts of text a buffer at a time. Character array containing the text to write. The position within the buffer indicating the start of the text to write. The number of characters to write.
WriteComment
[C#] public override void WriteComment(string text);
[C++] public: void WriteComment(String* text);
[VB] Overrides Public Sub WriteComment(ByVal text As String)
[JScript] public override function WriteComment(text: String);

Description

Writes out a comment containing the specified text.

If text is either null or String.Empty, this method writes a Comment with no data content, for example. Text to place inside the comment.

WriteDocType

[C#] public override void WriteDocType(string name, string pubid, string sysid, string subset);
[C++] public: void WriteDocType(String* name, String* pubid, String* sysid, String* subset);
[VB] Overrides Public Sub WriteDocType(ByVal name As String, ByVal pubid As String, ByVal sysid As String, ByVal subset As String)
[JScript] public override function WriteDocType(name: String, pubid: String, sysid: String, subset: String);
Description Writes the DOCTYPE declaration with the specified name and optional attributes.

This method does not check for invalid characters in pubid, sysid or subset. The name of the DOCTYPE. This must be non-empty. If non-null it also writes PUBLIC "pubid" "sysid" where pubid and sysid are replaced with the value of the given arguments. If pubid is null and sysid is non-null it writes SYSTEM "sysid" where sysid is replaced with the value of this argument. If non-null it writes [subset] where subset is replaced with the value of this argument.

WriteEndAttribute

[C#] public override void WriteEndAttribute( );
[C++] public: void WriteEndAttribute( );
[VB] Overrides Public Sub WriteEndAttribute( )
[JScript] public override function WriteEndAttribute( );
Description Closes the previous System.Xml.XmlTextWriter.WriteStartAttribute(System.String,System.String,System.String) call.

If you call WriteStartAttribute, you can close the attribute with this method.

WriteEndDocument

[C#] public override void WriteEndDocument( );
[C++] public: void WriteEndDocument( );
[VB] Overrides Public Sub WriteEndDocument( )
[JScript] public override function WriteEndDocument( );
Description Closes any open elements or attributes and puts the writer back in the Start state.

WriteEndElement

[C#] public override void WriteEndElement( );
[C++] public: void WriteEndElement( );
[VB] Overrides Public Sub WriteEndElement( )
[JScript] public override function WriteEndElement( );
Description Closes one element and pops the corresponding namespace scope.

If the element contains no content a short end tag "/>" is written; otherwise a full end tag is written.

WriteEntityRef

[C#] public override void WriteEntityRef(string name);
[C++] public: void WriteEntityRef(String* name);
[VB] Overrides Public Sub WriteEntityRef(ByVal name As String)
[JScript] public override function WriteEntityRef(name: String);
Description Writes out an entity reference as follows: & name;. Name of the entity reference.

WriteFullEndElement

[C#] public override void WriteFullEndElement( );
[C++] public: void WriteFullEndElement( );
[VB] Overrides Public Sub WriteFullEndElement( )
[JScript] public override function WriteFullEndElement( );
Description Closes one element and pops the corresponding namespace scope.

This method always writes the full end tag. This is useful when dealing with elements that must include a full end tag. For example, browsers expect HTML script blocks to be closed with " ".

WriteName

[C#] public override void WriteName(string name);
[C++] public: void WriteName(String* name);
[VB] Overrides Public Sub WriteName(ByVal name As String)
[JScript] public override function WriteName(name: String);
Description Writes out the specified name, ensuring it is a valid name according to the W3C XML 1.0 recommendation, which may be located on the World Wide Web (www.) at (w3.org/TR/1998/REC-xml-19980210#NT-Name).

If System.Xml.XmlTextWriter.Namespaces is set to true, WriteName also checks that the name is also valid according to the W3C Namespaces in XML recommendation. Name to write.

WriteNmToken

[C#] public override void WriteNmToken(string name);
[C++] public: void WriteNmToken(String* name);
[VB] Overrides Public Sub WriteNmToken(ByVal name As String)
[JScript] public override function WriteNmToken(name: String);
Description Writes out the specified name, ensuring it is a valid NmToken according to the W3C XML 1.0 recommendation, which may be located on the World Wide Web (www.) (located at w3.org/TR/1998/REC-xml-19980210#NT-Name). Name to write.

WriteProcessingInstruction

[C#] public override void WriteProcessingInstruction(string name, string text);
[C++] public: void WriteProcessingInstruction(String* name, String* text);
[VB] Overrides Public Sub WriteProcessingInstruction(ByVal name As String, ByVal text As String)
[JScript] public override function WriteProcessingInstruction(name: String, text: String);
Description Writes out a processing instruction with a space between the name and text as follows:

If text is either null or String.Empty, this method writes a ProcessingInstruction with no data content, for example. Name of the processing instruction. Text to include in the processing instruction.

WriteQualifiedName

[C#] public override void WriteQualifiedName(string localName, string ns);
[C++] public: void WriteQualifiedName(String* localName, String* ns);
[VB] Overrides Public Sub WriteQualifiedName(ByVal localName As String, ByVal ns As String)
[JScript] public override function WriteQualifiedName(localName: String, ns: String);
Description Writes out the namespace-qualified name. This method looks up the prefix that is in scope for the given namespace.

For example, the following C# code: writer.Formatting=Formatting.Indented; writer.WriteStartElement("root"); writer.WriteAttributeString("xmlns","x", null,"urn:abc"); writer.WriteStartElement("item"); writer.WriteStartAttribute("href",null); writer.WriteString("#"); writer.WriteQualifiedName("test","urn:abc"); writer.WriteEndAttribute( ); writer.WriteEndElement( ); writer.WriteEndElement( ); writer.Close( ); Generates the following output: If ns maps to the current default namespace, no prefix is generated. The local name to write. The namespace URI to associate with the name.

WriteRaw
[C#] public override void WriteRaw(string data);
[C++] public: void WriteRaw(String* data);
[VB] Overrides Public Sub WriteRaw(ByVal data As String)
[JScript] public override function WriteRaw(data: String);
Description
Writes raw markup manually from a string.
This method bypasses the entitization of special characters. String containing the text to write.

WriteRaw
[C#] public override void WriteRaw(char[ ] buffer, int index, int count);
[C++] public: void WriteRaw(_wchar_t buffer _gc[ ], int index, int count);
[VB] Overrides Public Sub WriteRaw(ByVal buffers As Char, ByVal index As Integer, ByVal count As Integer)
[JScript] public override function WriteRaw(buffer: Char[ ], index: int, count: int); Writes raw markup manually.
Description
Writes raw markup manually from a character buffer.
This method bypasses the entitization of special characters. Character array containing the text to write. The position within the buffer indicating the start of the text to write. The number of characters to write.

WriteStartAttribute
[C#] public override void WriteStartAttribute(string prefix, string localName, string ns);
[C++] public: void WriteStartAttribute(String* prefix, String* localName, String* ns);
[VB] Overrides Public Sub WriteStartAttribute(ByVal prefix As String, ByVal localName As String, ByVal ns As String)
[JScript] public override function WriteStartAttribute(prefix: String, localName: String, ns: String); Writes the start of an attribute.
Description
Writes the start of an attribute.
This is a more advanced version of System.Xml.Xmlwriter.WriteAttributeString(System.String,System.String,System.String) that allows you to write an attribute value using multiple write methods, such as System.Xml.XmlTextWriter.WriteString(System.String). Namespace prefix of the attribute. LocalName of the attribute. NamespaceURI of the attribute WriteStartDocument
[C#] public override void WriteStartDocument( );
[C++] public: void WriteStartDocument( );
[VB] Overrides Public Sub WriteStartDocument( )
[JScript] public override function WriteStartDocument( );
Writes the XML declaration with the version "1.0".
Description
Writes the XML declaration with the version "1.0".
The encoding level of the document is determined by how the writer is implemented. For example, if an System.Text.Encoding object is specified in the XmlTextWriter constructor, this determines the value of the encoding attribute. This method does not create a standalone attribute.

WriteStartDocument
[C#] public override void WriteStartDocument(bool standalone);
[C++] public: void WriteStartDocument(bool standalone);
[VB] Overrides Public Sub WriteStartDocument(ByVal standalone As Boolean)
[JScript] public override function WriteStartDocument(standalone: Boolean);
Description
Writes the XML declaration with the version "1.0" and the standalone attribute.
The encoding level of the document is determined by how the writer is implemented. For example, if an System.Text.Encoding object is specified in the XmlTextWriter constructor, this determines the value of the encoding attribute. If true, it writes "standalone=yes"; if false, it writes "standalone=no"

WriteStartElement
[C#] public override void WriteStartElement(string prefix, string localName, string ns);
[C++] public: void WriteStartElement(String* prefix, String* localName, String* ns);
[VB] Overrides Public Sub WriteStartElement(ByVal prefix As String, ByVal localName As String, ByVal ns As String)
[JScript] public override function WriteStartElement(prefix: String, localName: String, ns: String); Writes the specified start tag.
Description
Writes the specified start tag and associates it with the given namespace and prefix.
After calling this method you can either write attributes or create content using System.Xml.XmlTextWriter.WriteComment(System.String), System.Xml.XmlTextWriter.WriteString(System.String), or System.Xml.XmlTextWriter.WriteStartElement(System.String,System.String,System.String) for child elements. You must close this element with System.Xml.XmlTextWriter.WriteEndElement at which time an end tag is written out. The namespace prefix of the element. The local name of the element. The namespace URI to associate with the element. If this namespace is already in scope and has an associated prefix then the writer will automatically write that prefix also.

WriteString
[C#] public override void WriteString(string text);
[C++] public: void WriteString(String* text);
[VB] Overrides Public Sub WriteString(ByVal text As String)
[JScript] public override function WriteString(text: String);
Description
Writes the given text content.
WriteString does the following The characters &, <, and > are replaced with &, <, and >, respectively. Text to write.

WriteSurrogateCharEntity
[C#] public override void WriteSurrogateCharEntity(char lowChar, char highChar);
[C++] public: void WriteSurrogateCharEntity(_wchar_t lowChar, _wchar_t highChar);
[VB] Overrides Public Sub WriteSurrogateCharEntity(ByVal lowChar As Char, ByVal highChar As Char)
[JScript] public override function WriteSurrogateCharEntity (lowChar: Char, highChar: Char);
Description
Generates and writes the surrogate character entity for the surrogate character pair.
The surrogate character entity is written in hexadecimal format. The range for surrogate characters is #x10000 to #x10FFFF. The following formula is used to generate the surrogate character entity: (highChar−0xD800)*0x400+ (lowChar−0xDC00)+0x10000 Applications encode DOM strings using UTF-16. For both HTML and XML, the document character set (and therefore the notation of numeric character references) is based on UCS [ISO-10646]. A single numeric character reference in a source document may therefore in some cases correspond to two 16-bit units in a DOM string (a high surrogate and a low surrogate). These 16-bit units are referred to as a surrogate pair. The low surrogate. This must be a value between 0xDC00 and 0xDFFF. The high surrogate. This must be a value between 0xD800 and 0xDBFF.

WriteWhitespace
[C#] public override void WriteWhitespace(string ws);
[C++] public: void WriteWhitespace(String* ws);
[VB] Overrides Public Sub WriteWhitespace(ByVal ws As String)
[JScript] public override function WriteWhitespace(ws: String);
Description
  Writes out the given whitespace.
  This method is used to manually format your document. Use the System.Xml.XmlTextWriter.Formatting property to have the writer format the output automatically. The string of whitespace characters.
  XmlTokenizedType enumeration (System.Xml)
  WriteWhitespace
Description
  Represents the XML type for the string. This allows the string to be read as a particular XML type, for example a CDATA section type.
  The XML types are based on the W3C Extensible Markup Language (XML) 1.0 recommendation.
  WriteWhitespace
[C#] public const XmlTokenizedType CDATA;
[C++] public: const XmlTokenizedType CDATA;
[VB] Public Const CDATA As XmlTokenizedType
[JScript] public var CDATA: XmlTokenizedType;
Description
  CDATA type.
  WriteWhitespace
[C#] public const XmlTokenizedType ENTITIES;
[C++] public: const XmlTokenizedType ENTITIES;
[VB] Public Const ENTITIES As XmlTokenizedType
[JScript] public var ENTITIES: XmlTokenizedType;
Description
  ENTITIES type.
  WriteWhitespace
[C#] public const XmlTokenizedType ENTITY;
[C++] public: const XmlTokenizedType ENTITY;
[VB] Public Const ENTITY As XmlTokenizedType
[JScript] public var ENTITY: XmlTokenizedType;
Description
  ENTITY type.
  WriteWhitespace
[C#] public const XmlTokenizedType ENUMERATION;
[C++] public: const XmlTokenizedType ENUMERATION;
[VB] Public Const ENUMERATION As XmlTokenizedType
[JScript] public var ENUMERATION: XmlTokenizedType;
Description
  ENUMERATION type.
  WriteWhitespace
[C#] public const XmlTokenizedType ID;
[C++] public: const XmlTokenizedType ID;
[VB] Public Const ID As XmlTokenizedType
[JScript] public var ID: XmlTokenizedType;
Description
  ID type.
  WriteWhitespace

[C#] public const XmlTokenizedType IDREF;
[C++] public: const XmlTokenizedType IDREF;
[VB] Public Const IDREF As XmlTokenizedType
[JScript] public var IDREF: XmlTokenizedType;
Description
  IDREF type.
  WriteWhitespace
[C#] public const XmlTokenizedType IDREFS;
[C++] public: const XmlTokenizedType IDREFS;
[VB] Public Const IDREFS As XmlTokenizedType
[JScript] public var IDREFS: XmlTokenizedType;
Description
  IDREFS type.
  WriteWhitespace
[C#] public const XmlTokenizedType NCName;
[C++] public: const XmlTokenizedType NCName;
[VB] Public Const NCName As XmlTokenizedType
[JScript] public var NCName: XmlTokenizedType;
Description
  NCName type.
  WriteWhitespace
[C#] public const XmlTokenizedType NMTOKEN;
[C++] public: const XmlTokenizedType NMTOKEN;
[VB] Public Const NMTOKEN As XmlTokenizedType
[JScript] public var NMTOKEN: XmlTokenizedType;
Description
  NMTOKEN type.
  WriteWhite space
[C#] public const XmlTokenizedType NMTOKENS;
[C++] public: const XmlTokenizedType NMTOKENS;
[VB] Public Const NMTOKENS As XmlTokenizedType
[JScript] public var NMTOKENS: XmlTokenizedType;
Description
  NMTOKENS type.
  WriteWhitespace
[C#] public const XmlTokenizedType None;
[C++] public: const XmlTokenizedType None;
[VB] Public Const None As XmlTokenizedType
[JScript] public var None: XmlTokenizedType;
Description
  No type.
  WriteWhitespace
[C#] public const XmlTokenizedType NOTATION;
[C++] public: const XmlTokenizedType NOTATION;
[VB] Public Const NOTATION As XmlTokenizedType
[JScript] public var NOTATION: XmlTokenizedType;
Description
  NOTATION type.
  WriteWhitespace
[C#] public const XmlTokenizedType QName;
[C++] public: const XmlTokenizedType QName;
[VB] Public Const QName As XmlTokenizedType
[JScript] public var QName: XmlTokenizedType;
Description
  QName type.
  XmlUrlResolver class (System.Xml)
  ToString
Description
  Resolves external XML resources named by a URI.
  XmlUrlResolver is used to resolve external XML resources such as entities, DTDs or schemas. It is also used to process include and import elements found in Extensible StyleSheet Language (XSL) stylesheets or XML Schema Definition language (XSD) schemas.
  XmlUrlResolver
  Example Syntax:
  ToString

[C#] public XmlUrlResolver( );
[C++] public: XmlUrlResolver( );
[VB] Public Sub New( )
[JScript] public function XmlUrlResolver( ); Creates a new instance of the XmlUrlResolver class.
Description
  Creates a new instance of the XmlUrlResolver class.
  Credentials
  ToString
[C#] ICredentials Credentials {set;}
[C++] public: _property virtual void set_Credentials(ICredentials*);
[VB] Property Credentials As ICredentials
[JScript] public function set Credentials(ICredentials);
Description
  Sets credentials used to authenticate Web requests.
  If the virtual directory is configured to allow anonymous access, this property does not need to be set. Otherwise, the credentials of the user must be supplied. If credentials are needed but not supplied, XmlUrlResolver uses default credentials (CredentialCache.DefaultCredential).
  GetEntity
[C#] public override object GetEntity(Uri absoluteUri, string role, Type of ObjectToReturn);
[C++] public: Object* GetEntity(Uri* absoluteUri, String* role, Type* of ObjectToReturn);
[VB] Overrides Public Function GetEntity(ByVal absoluteUri As Uri, ByVal role As String, ByVal of ObjectToReturn As Type) As Object
[JScript] public override function GetEntity(absoluteUri: Uri, role: String, of ObjectToReturn: Type): Object;
Description
  Maps a URI to an object containing the actual resource. Return Value: A System.IO.Stream object or null if a type other than stream is specified.
  This method is used when the caller wants to map a given URI into an object containing the actual resource that the URI represents. The URI returned from System.Xml.XmlUrlResolver.ResolveUri(System.Uri,System.String) The current implementation does not use this parameter when resolving URIs. This is provided for future extensibility purposes. For example, this can be mapped to the xlink:role and used as an implementation specific argument in other scenarios. The type of object to return. The current implementation only returns System.IO.Stream objects.
  ResolveUri
[C#] public override Uri ResolveUri(Uri baseUri, string relativeUri);
[C++] public: Uri* ResolveUri(Uri* baseUri, String* relativeUri);
[VB] Overrides Public Function ResolveUri(ByVal baseUri As Uri, ByVal relativeUri As String) As Uri
[JScript] public override function ResolveUri(baseUri: Uri, relativeUri: String): Uri;
Description
  Resolves the absolute URI from the base and relative URIs. Return Value: The absolute URI or null if the relative URI can not be resolved.
  The absolute URI may be used as the base URI for any subsequent requests for entities that are relative to this URI. The base URI used to resolve the relative URI The URI to resolve. The URI can be absolute or relative. If absolute, this value effectively replaces the baseUri value. If relative, it combines with the baseUri to make an absolute URI.
  XmlValidatingReader class (System.Xml)
  ToString
Description
  Represents a reader that provides DTD, XML-Data Reduced Language (XDR), and XML Schema Definition language (XSD) schema validation.
  XmlValidatingReader implements the System.Xml.XmlReader class and provides support for data validation. Use the System.Xml.XmlValidatingReader.Schemas property to have the reader validate using schema files cached in an System.Xml.Schema.XmlSchemaCollection. The System.Xml.XmlValidatingReader.ValidationType property specifies what type of validation the reader should perform. Setting the property to ValidationType.None creates a non-validating reader.
  XmlValidatingReader
  Example Syntax:
  ToString
[C#] public XmlValidatingReader(XmlReader reader);
[C++] public: XmlValidatingReader(XmlReader* reader);
[VB] Public Sub New(ByVal reader As XmlReader)
[JScript] public function XmlValidatingReader(reader: XmlReader); Initializes a new instance of the XmlValidatingReader class.
Description
  Initializes a new instance of the XmlValidatingReader class that validates the content returned from the given System.Xml.XmlReader.
  All nodes returned from the given XmlReader are also returned from this validating reader, so there is no information loss in the process. New nodes not returned from the underlying reader may be added by this reader (for example, default attributes and the children of an entity reference). Any properties set on the given XmlTextReader also applies to this validating reader. For example, if the supplied reader had WhitespaceHandling.None set, this validating reader also ignores whitespace. The XmlReader to read from while validating. The current implementation only supports System.Xml.XmlTextReader.
  XmlValidatingReader
  Example Syntax:
  ToString
[C#] public XmlValidatingReader(Stream xmlFragment, XmlNodeType fragType, XmlParserContext context);
[C++] public: XmlValidatingReader(Stream* xmlFragment, XmlNodeType fragType, XmlParserContext* context);
[VB] Public Sub New(ByVal xmlFragment As Stream, ByVal fragType As XmlNodeType, ByVal context As XmlParserContext)
[JScript] public function XmlValidatingReader(xmlFragment: Stream, fragType: XmlNodeType, context: XmlParserContext);
Description
  Initializes a new instance of the XmlValidatingReader class with the specified values.
  This constructor parses the given string as a fragment of XML. If the XML fragment is an element or attribute, you can bypass the root level rules for well-formed XML documents. The stream containing the XML fragment to parse. The System.Xml.XmlNodeTypeof the XML fragment. This determines what the fragment can contain (see table below). The System.Xml.XmlParserContext in which the XML fragment is to be parsed. This includes the System.Xml.XmlNameTable to use, the namespace scope, the current xml:lang and the xml:space scope.
  XmlValidatingReader
  Example Syntax:
  ToString
[C#] public XmlValidatingReader(string xmlFragment, XmlNodeType fragType, XmlParserContext context);

[C++] public: XmlValidatingReader(String* xmlFragment, XmlNodeType fragType, XmlParserContext* context);
[VB] Public Sub New(ByVal xmlFragment As String, ByVal fragType As XmlNodeType, ByVal context As XmlParserContext)
[JScript] public function XmlValidatingReader(xmlFragment: String, fragType: XmlNodeType, context: XmlParserContext);
Description
Initializes a new instance of the XmlValidatingReader class with the specified values.
This constructor parses the given string as a fragment of XML. If the XML fragment is an element or attribute, you can bypass the root level rules for well-formed XML documents. This constructor can handle strings returned from System.Xml.XmlValidatingReader.ReadInnerXml. The string containing the XML fragment to parse. The System.Xml.XmlNodeTypeof the XML fragment. This also determines what the fragment string can contain (see table below). The System.Xml.XmlParserContext in which the XML fragment is to be parsed. This includes the NameTable to use, the namespace scope, the current xml:lang and the xml:space scope.
  AttributeCount
  ToString
[C#] public override int AttributeCount {get;}
[C++] public: _property virtual int get_AttributeCount( );
[VB] Overrides Public ReadOnly Property AttributeCount As Integer
[JScript] public function get AttributeCount( ): int;
Description
Gets the number of attributes on the current node.
This property is relevant to Element, DocumentType and XmlDeclaration nodes only. (Other node types do not have attributes.) The following example reads all the elements on the root node.
  BaseURI
  ToString
[C#] public override string BaseURI {get;}
[C++] public: _property virtual String* get_BaseURI( );
[VB] Overrides Public ReadOnly Property BaseURI As String
[JScript] public function get BaseURI( ): String;
Description
Gets the base URI of the current node.
A networked XML document is comprised of chunks of data aggregated using various W3C standard inclusion mechanisms and therefore contains nodes that come from different places. DTD entities are an example of this, but this is not limited to DTDs. The base URI tells you where these nodes came from. If there is no base URI for the nodes being returned (for example, they were parsed from an in-memory string), String.Empty is returned.
  CanResolveEntity
  ToString
[C#] public override bool CanResolveEntity {get;}
[C++] public: _property virtual bool get_CanResolveEntity( );
[VB] Overrides Public ReadOnly Property CanResolveEntity As Boolean
[JScript] public function get CanResolveEntity( ): Boolean;
Description
Gets a value indicating whether this reader can parse and resolve entities.
  Depth
  ToString

[C#] public override int Depth {get;}
[C++] public: _property virtual int get_Depth( );
[VB] Overrides Public ReadOnly Property Depth As Integer
[JScript] public function get Depth( ): int;
Description
Gets the depth of the current node in the XML document.
  Encoding
  ToString
[C#] public Encoding Encoding {get;}
[C++] public: _property Encoding* get_Encoding( );
[VB] Public ReadOnly Property Encoding As Encoding
[JScript] public function get Encoding( ): Encoding;
Description
Gets the encoding attribute for the document.
When any external reference is read (such as expanding an entity in a DTD file or reading a schema file) the encoding property is set to the encoding value of the external reference. If encoding is not specified in the external reference, and there is no byte-order mark, this defaults to UTF-8.
  EntityHandling
  ToString
[C#] public EntityHandling EntityHandling {get; set;}
[C++] public: _property EntityHandling get_EntityHandling( );public: _property void set_EntityHandling(EntityHandling);
[VB] Public Property EntityHandling As EntityHandling
[JScript] public function get EntityHandling( ): EntityHandling;public function set EntityHandling(EntityHandling);
Description
Gets or sets a value that specifies how the reader handles entities.
This property can be changed on the fly and takes affect after the next System.Xml.XmlValidatingReader.Read call.
  EOF
  ToString
[C#] public override bool EOF {get;}
[C++] public: _property virtual bool get_EOF( );
[VB] Overrides Public ReadOnly Property EOF As Boolean
[JScript] public function get EOF( ): Boolean;
Description
Gets a value indicating whether the reader is positioned at the end of the stream.
  HasAttributes
  HasValue
  ToString
Description
Gets a value indicating whether the current node can have a System.Xml.XmlValidatingReader.Value.
The following table lists node types that have a value to return.
  IsDefault
  ToString
[C#] public override bool IsDefault {get;}
[C++] public: _property virtual bool get_IsDefault( );
[VB] Overrides Public ReadOnly Property IsDefault As Boolean
[JScript] public function get IsDefault( ): Boolean;
Description
Gets a value indicating whether the current node is an attribute that was generated from the default value defined in the DTD or schema.
This property applies only to an attribute node.
  IsEmptyElement
  ToString
[C#] public override bool IsEmptyElement {get;}
[C++] public: _property virtual bool get_IsEmptyElement( );
[VB] Overrides Public ReadOnly Property IsEmptyElement As Boolean

[JScript] public function get IsEmptyElement( ): Boolean;
Description
  Gets a value indicating whether the current node is an empty element (for example,).
  This property enables you to determine the difference between the following: (IsEmptyElement is true).
    Item
    ToString
[C#] public override string this [int i] {get;}
[C++] public: _property virtual String* get_Item(int i);
[VB] Overrides Public Default ReadOnly Property Item(ByVal i As Integer) As String
[JScript] returnValue=XmlValidatingReaderObject.Item(i);
Gets the value of the specified attribute.
Description
  Gets the value of the attribute with the specified index.
  This property does not move the reader. The index of the attribute.
    Item
    ToString
[C#] public override string this[string name] {get;}
[C++] public: _property virtual String* get_Item(String* name);
[VB] Overrides Public Default ReadOnly Property Item(ByVal name As String) As String
[JScript] returnValue=XmlValidatingReaderObject.Item(name);
Description
  Gets the value of the attribute with the specified name.
  This property does not move the reader. The qualified name of the attribute.
    Item
    ToString
[C#] public override string this[string name, string namespaceURI] {get;}
[C++] public: _property virtual String* get_Item(String* name, String* namespaceURI);
[VB] Overrides Public Default ReadOnly Property Item(ByVal name As String, ByVal namespaceURI As String) As String
[JScript] returnValue=XmlValidatingReaderObject.Item(name, namespaceURI);
Description
  Gets the value of the attribute with the specified local name and namespace URI.
  This property does not move the reader. The local name of the attribute. The namespace URI of the attribute.
    LocalName
    ToString
[C#] public override string LocalName {get;}
[C++] public: _property virtual String* get_LocalName( );
[VB] Overrides Public ReadOnly Property LocalName As String
[JScript] public function get LocalName( ): String;
Description
  Gets the local name of the current node.
    Name
    ToString
[C#] public override string Name {get;}
[C++] public: _property virtual String* get_Name( );
[VB] Overrides Public ReadOnly Property Name As String
[JScript] public function get Name( ): String;
Description
  Gets the qualified name of the current node.
    Namespaces
    ToString

[C#] public bool Namespaces {get; set;}
[C++] public: _property bool get_Namespaces( );public: _property void set_Namespaces(bool);
[VB] Public Property Namespaces As Boolean
[JScript] public function get Namespaces( ): Boolean;public function set Namespaces(Boolean);
Description
  Gets or sets a value indicating whether to do namespace support.
    NamespaceURI
    ToString
[C#] public override string NamespaceURI {get;}
[C++] public: _property virtual String* get_NamespaceURI( );
[VB] Overrides Public ReadOnly Property NamespaceURI As String
[JScript] public function get NamespaceURI( ): String;
Description
  Gets the namespace URI (as defined in the W3C Namespace specification) of the node on which the reader is positioned.
  This property is relevant to Element and Attribute nodes only.
    NameTable
    ToString
[C#] public override XmlNameTable NameTable {get;}
[C++] public: _property virtual XmlNameTable* get_NameTable( );
[VB] Overrides Public ReadOnly Property NameTable As XmlNameTable
[JScript] public function get NameTable( ): XmlNameTable;
Description
  Gets the System.Xml.XmlNameTable associated with this implementation.
  All node and attribute names returned from this class are atomized using the NameTable. When the same name is returned multiple times (for example, Customer), then the same String object will be returned for that name. This makes it possible for you to write efficient code that does object comparisons on these strings instead of expensive string comparisons.
    NodeType
    ToString
[C#] public override XmlNodeType NodeType {get;}
[C++] public: _property virtual XmlNodeType get_NodeType( );
[VB] Overrides Public ReadOnly Property NodeType As XmlNodeType
[JScript] public function get NodeType( ): XmlNodeType;
Description
  Gets the type of the current node.
  This property never returns the following XmlNodeType types: Document, DocumentFragment, Entity, or Notation.
    Prefix
    ToString
[C#] public override string Prefix {get;}
[C++] public: _property virtual String* get_Prefix( );
[VB] Overrides Public ReadOnly Property Prefix As String
[JScript] public function get Prefix( ): String;
Description
  Gets the namespace prefix associated with the current node.
    QuoteChar
    ToString
[C#] public override char QuoteChar {get;}
[C++] public: _property virtual _wchar_t get_QuoteChar( );
[VB] Overrides Public ReadOnly Property QuoteChar As Char

[JScript] public function get QuoteChar( ): Char;
Description
    Gets the quotation mark character used to enclose the value of an attribute node.
    This property applies only to an attribute node.
    Reader
    ToString
[C#] public XmlReader Reader {get;}
[C++] public: _property XmlReader* get_Reader( );
[VB] Public ReadOnly Property Reader As XmlReader
[JScript] public function get Reader( ): XmlReader;
Description
    Gets the System.Xml.XmlReader used to construct this XmlValidatingReader.
    This property allows the user to access properties specific to the supplied reader. For example, the user could get the underlying the System.Xml.XmlTextReader.LineNumber and System.Xml.XmlTextReader.LinePosition of the underlying reader. This can be useful when reporting validation errors.
    ReadState
    ToString
[C#] public override ReadState ReadState {get;}
[C++] public: _property virtual ReadState get_ReadState( );
[VB] Overrides Public ReadOnly Property ReadState As ReadState
[JScript] public function get ReadState( ): ReadState;
Description
    Gets the state of the reader.
    Schemas
    ToString
[C#] public XmlSchemaCollection Schemas {get;}
[C++] public: _property XmlSchemaCollection* get_Schemas( );
[VB] Public ReadOnly Property Schemas As XmlSchemaCollection
[JScript] public function get Schemas( ): XmlSchemaCollection;
Description
    Gets a System.Xml.Schema.XmlSchemaCollection to use for validation.
    The XmlSchemaCollection holds pre-loaded XDR and XSD schemas. This property gives the reader access to the cache of schemas and allows it to validate without having to re-load schemas every time. The reader does not add anything to the XmlSchemaCollection.
    SchemaType
    ToString
[C#] public object SchemaType {get;}
[C++] public: _property Object* get_SchemaType( );
[VB] Public ReadOnly Property SchemaType As Object
[JScript] public function get SchemaType( ): Object;
Description
    Gets a schema type object.
    The user needs to test for the returned type. For example object obj=vreader.SchemaType; if (obj is XmlSchemaType) XmlSchemaType st=obj.BaseSchemaType; if (obj is XmlSchemaDataType) Type vt=obj.ValueType; If XSD schema validation is being performed then the XmlSchemaType or XmlSchemaDataType corresponds to the current element being read. If DTD validation is being performed this property returns null.
    ValidationType
    ToString
[C#] public ValidationType ValidationType {get; set;}
[C++] public: _property ValidationType get_ValidationType( );public: _property void set_ValidationType(ValidationType);
[VB] Public Property ValidationType As ValidationType
[JScript] public function get ValidationType( ): ValidationType;public function set ValidationType(ValidationType);
Description
    Gets a value describing what type of validation to perform.
    This property must be set before the first call to System.Xml.XmlValidatingReader.Read. Setting this property to ValidationType.None creates a non-validating reader.
    Value
    ToString
[C#] public override string Value {get;}
[C++] public: _property virtual String* get_Value( );
[VB] Overrides Public ReadOnly Property Value As String
[JScript] public function get Value( ): String;
Description
    Gets the text value of the current node.
    XmlLang
    ToString
[C#] public override string XmlLang {get;}
[C++] public: _property virtual String* get_XmlLang( );
[VB] Overrides Public ReadOnly Property XmlLang As String
[JScript] public function get XmlLang( ): String;
Description
    Gets the current xml:lang scope.
    This property represents the xml:lang scope within which the current node resides. For example, here is an XML fragment with xml:lang set to US English in the root element: Fred When the reader is positioned on the name element, you can use this property to find that it is in the scope of a US English xml:lang attribute.
    XmlResolver
    ToString
[C#] XmlResolver XmlResolver {set;}
[C++] public: _property void set_XmlResolver(XmlResolver*);
[VB] Property XmlResolver As XmlResolver
[JScript] public function set XmlResolver(XmlResolver);
Description
    Sets the System.Xml.XmlResolver used for resolving external DTD and schema location references. The XmlResolver is also used to handle any import or include elements found in XSD schemas.
    The XmlResolver is used to load any DTDs, entities or schemas needed to complete the validation process.
    XmlSpace
    ToString
[C#] public override XmlSpace XmlSpace {get;}
[C++] public: _property virtual XmlSpace get_XmlSpace( );
[VB] Overrides Public ReadOnly Property XmlSpace As XmlSpace
[JScript] public function get XmlSpace( ): XmlSpace;
Description
    Gets the current xml:space scope.
    ToString
[C#] public event ValidationEventHandler ValidationEventHandler;
[C++] public: _event ValidationEventHandler* ValidationEventHandler;
[VB] Public Event ValidationEventHandler As ValidationEventHandler
Description
    Sets an event handler for receiving information about DTD, XDR and XSD schema validation errors.

These events occur during System.Xml.XmlValidatingReader.Read and only if a System.Xml.XmlValidatingReader.ValidationType of DTD, XDR, Schema, or Auto is specified.
Close
[C#] public override void Close( );
[C++] public: void Close( );
[VB] Overrides Public Sub Close( )
[JScript] public override function Close( );
Description
Changes the System.Xml.XmlReader.ReadState to Closed.
This method also releases any resources held while reading. If this reader was constructed using an System.Xml.XmlTextReader, this method also calls Close on the underlying reader. If this reader was constructed using a stream, this method also calls Close on the underlying stream.
GetAttribute
[C#] public override string GetAttribute(int i);
[C++] public: String* GetAttribute(int i);
[VB] Overrides Public Function GetAttribute(ByVal i As Integer) As String
[JScript] public override function GetAttribute(i: int): String;
Gets the value of an attribute.
Description
Gets the value of the attribute with the specified index.
Return Value: The value of the specified attribute.
This method does not move the reader. The index of the attribute. The index is zero-based. (The first attribute has index 0.)
GetAttribute
[C#] public override string GetAttribute(string name);
[C++] public: String* GetAttribute(String* name);
[VB] Overrides Public Function GetAttribute(ByVal name As String) As String
[JScript] public override function GetAttribute(name: String): String;
Description
Gets the value of the attribute with the specified name.
Return Value: The value of the specified attribute. If the attribute is not found, String.Empty is returned.
This method does not move the reader. The qualified name of the attribute.
GetAttribute
[C#] public override string GetAttribute(string localName, string namespaceURI);
[C++] public: String* GetAttribute(String* localName, String* namespaceURI);
[VB] Overrides Public Function GetAttribute(ByVal localName As String, ByVal namespaceURI As String) As String
[JScript] public override function GetAttribute(localName: String, namespaceURI: String): String;
Description
Gets the value of the attribute with the specified local name and namespace URI.
Return Value: The value of the specified attribute. If the attribute is not found, String.Empty is returned. This method does not move the reader.
The following XML contains an attribute in a specific namespace: You can lookup the dt:type attribute using one argument (prefix and local name) or two arguments (local name and namespace URI): String dt=reader.GetAttribute("dt:type"); String dt2=reader.GetAttribute("type","urn:datatypes"); To lookup the xmlns:dt attribute, use one of the following arguments: String dt3=reader.GetAttribute("xmlns:dt"); String dt4=reader.GetAttribute("dt",http://www.w3.org/2000/xmlns/);You can also get this information using the System.Xml.XmlValidatingReader.Prefix property. The local name of the attribute. The namespace URI of the attribute.
LookupNamespace
[C#] public override string LookupNamespace(string prefix);
[C++] public: String* LookupNamespace(String* prefix);
[VB] Overrides Public Function LookupNamespace(ByVal prefix As String) As String
[JScript] public override function LookupNamespace(prefix: String): String;
Description
Resolves a namespace prefix in the current element's scope.
Return Value: The namespace URI to which the prefix maps or null if no matching prefix is found.
In the preceding XML, if the reader is positioned on the href attribute, the prefix a is resolved by calling reader.LookupNamespace("a"). The returned string is urn:456. The prefix whose namespace URI you want to resolve. To match the default namespace, pass an empty string. This string does not have to be atomized.
MoveToAttribute
[C#] public override void MoveToAttribute(int i);
[C++] public: void MoveToAttribute(int i);
[VB] Overrides Public Sub MoveToAttribute(ByVal i As Integer)
[JScript] public override function MoveToAttribute(i: int);
Description
Moves to the attribute with the specified index. The index of the attribute.
MoveToAttribute
[C#] public override bool MoveToAttribute(string name);
[C++] public: bool MoveToAttribute(String* name);
[VB] Overrides Public Function MoveToAttribute(ByVal name As String) As Boolean
[JScript] public override function MoveToAttribute(name: String): Boolean; Moves to the specified attribute.
Description
Moves to the attribute with the specified name.
Return Value: true if the attribute is found; otherwise, false. If false, the position of the reader does not change.
After calling this method, the System.Xml.XmlValidatingReader.Name, System.Xml.XmlValidatingReader.NamespaceURI, and System.Xml.XmlValidatingReader.Prefix properties reflect the properties of that attribute. The qualified name of the attribute.
MoveToAttribute
[C#] public override bool MoveToAttribute(string localName, string namespaceURI);
[C++] public: bool MoveToAttribute(String* localName, String* namespaceURI);
[VB] Overrides Public Function MoveToAttribute(ByVal localName As String, ByVal namespaceURI As String) As Boolean
[JScript] public override function MoveToAttribute(localName: String, namespaceURI: String): Boolean;
Description
Moves to the attribute with the specified local name and namespace URI.
Return Value: true if the attribute is found; otherwise, false. If false, the position of the reader does not change.
After calling this method, the System.Xml.XmlValidatingReader.Name, System.Xml.XmlValidatingReader.NamespaceURI, and System.Xml.XmlValidatingReader.Prefix properties reflect the properties of that attribute. The local name of the attribute. The namespace URI of the attribute.

MoveToElement
[C#] public override bool MoveToElement( );
[C++] public: bool MoveToElement( );
[VB] Overrides Public Function MoveToElement( ) As Boolean
[JScript] public override function MoveToElement( ): Boolean;
Description
Moves to the element that contains the current attribute node.
Return Value: true if the reader is positioned on an attribute (the reader moves to the element that owns the attribute); false if the reader is not positioned on an attribute (the position of the reader does not change).
Use this method to return to an element after navigating through its attributes. This method moves the reader to one of the following node types: Element, DocumentType, or XmlDeclaration.
MoveToFirstAttribute
[C#] public override bool MoveToFirstAttribute( );
[C++] public: bool MoveToFirstAttribute( );
[VB] Overrides Public Function MoveToFirstAttribute( ) As Boolean
[JScript] public override function MoveToFirstAttribute( ): Boolean;
Description
Moves to the first attribute.
Return Value: true if an attribute exists (the reader moves to the first attribute); otherwise, false (the position of the reader does not change).
MoveToNextAttribute
[C#] public override bool MoveToNextAttribute( );
[C++] public: bool MoveToNextAttribute( );
[VB] Overrides Public Function MoveToNextAttribute( ) As Boolean
[JScript] public override function MoveToNextAttribute( ): Boolean;
Description
Moves to the next attribute.
Return Value: true if there is a next attribute; false if there are no more attributes.
If the current node is an element node, this method is equivalent to System.Xml.XmlValidatingReader. MoveToFirstAttribute. If MoveToNextAttribute returns true, the reader moves to the next attribute; otherwise, the position of the reader does not change.
Read
[C#] public override bool Read( );
[C++] public: bool Read( );
[VB] Overrides Public Function Read( ) As Boolean
[JScript] public override function Read( ): Boolean;
Description
Reads the next node from the stream.
Return Value: true if the next node was read successfully; false if there are no more nodes to read.
When a reader is first created and initialized, there is no information available. You must call Read to read the first node.
ReadAttributeValue
[C#] public override bool ReadAttributeValue( );
[C++] public: bool ReadAttributeValue( );
[VB] Overrides Public Function ReadAttributeValue( ) As Boolean
[JScript] public override function ReadAttributeValue( ): Boolean;
Description
Parses the attribute value into one or more Text or EntityReference nodes.
Return Value: true if there are nodes to return.
Use this method after calling System.Xml.XmlValidatingReader.MoveToAttribute(System.String) to read through the text or entity reference nodes that make up the attribute value. The System.Xml.XmlReader.Depth of the attribute value nodes is one plus the depth of the attribute node. The Depth increments and decrements by one when you step into and out of general entity references.
ReadInnerXml
[C#] public override string ReadInnerXml( );
[C++] public: String* ReadInnerXml( );
[VB] Overrides Public Function ReadInnerXml( ) As String
[JScript] public override function ReadInnerXml( ): String;
Description
Reads all the content, including markup, as a string.
Return Value: All the XML content, including markup, in the current node. If the current node has no children, an empty string is returned.
This method returns all the content of the current node including the markup. The current node (start tag) and corresponding end node (end tag) are not returned. For example, if you had the following: this ReadInnerXml returns this This method handles element and attribute nodes in the following way: Node Type Child Content Return Value Position After the Call Element text text After the end tag.
ReadOuterXml
[C#] public override string ReadOuterXml( );
[C++] public: String* ReadOuterXml( );
[VB] Overrides Public Function ReadOuterXml( ) As String
[JScript] public override function ReadOuterXml( ): String;
Description
Reads the content, including markup, representing this node and all its children.
Return Value: If the reader is positioned on an element or an attribute node, this method returns all the XML content, including markup, of the current node and all its children; otherwise, it returns an empty string.
This method is similar to System.Xml.XmlValidatingReader.ReadInnerXml except it also returns the start and end tags.
ReadString
[C#] public override string ReadString( );
[C++] public: String* ReadString( );
[VB] Overrides Public Function ReadString( ) As String
[JScript] public override function ReadString( ): String;
Description
Reads the contents of an element or text node as a string.
Return Value: The contents of the element or text node. This can be an empty string if the reader is positioned on something other than an element or text node, or if there is no more text content to return in the current context.
If positioned on an element, ReadString concatenates all text, significant whitespace, whitespace and CData section node types together and returns the concatenated data as the element content. The reader stops when any markup is encountered. This could occur in a mixed content model, or when an element end tag is read.
ReadTypedValue
[C#] public object ReadTypedValue( );
[C++] public: Object* ReadTypedValue( );
[VB] Public Function ReadTypedValue( ) As Object
[JScript] public function ReadTypedValue( ): Object;

Description
   Gets the common language runtime type for the specified XSD type
   For example, if the type is defined as xsd:int the runtime type int32 is returned for the object. This can be tested using the System.Object.GetType method and cast accordingly. This property always return a subclassed type of object. An object of the type object is never returned.
   ResolveEntity
[C#] public override void ResolveEntity( );
[C++] public: void ResolveEntity( );
[VB] Overrides Public Sub ResolveEntity( )
[JScript] public override function ResolveEntity( );
Description
   Resolves the entity reference for EntityReference nodes.
   If the reader is positioned on an EntityReference node (XmlNodeType.EntityReference), if System.Xml.XmlValidatingReader.Read is called after calling this method, the entity replacement text is parsed. When the entity replacement text is finished, an EndEntity node is returned to close the entity reference scope.
   IXmlLineInfo.HasLineInfo
[C#] bool IXmlLineInfo.HasLineInfo( );
[C++] bool IXmlLineInfo::HasLineInfo( );
[VB] Function HasLineInfo( ) As Boolean Implements IXmlLineInfo.HasLineInfo
[JScript] function IXmlLineInfo.HasLineInfo( ): Boolean;
   XmlWhitespace class (System.Xml)
      ToString
Description
   Represents whitespace in element content. These nodes are created automatically at System.Xml.XmlDocument.Load (System.String) time only if the System.Xml.XmlDocument.PreserveWhitespace flag is true.
   XmlWhitespace
   Example Syntax:
      ToString
[C#] protected internal XmlWhitespace(string strdata, XmlDocument doc);
[C++] internal: XmlWhitespace(String* strData, XmlDocument* doc);
[VB] Protected Friend Sub New(ByVal strData As String, ByVal doc As XmlDocument)
[JScript] package function XmlWhitespace(strData: String, doc: XmlDocument);
Description
   Attributes
   BaseURI
   ChildNodes
   Data
   FirstChild
   HasChildNodes
   InnerText
   InnerXml
   IsReadOnly
   Item
   Item
   LastChild
   Length
   LocalName
      ToString
Description
   Gets the local name of the node.
   Name
      ToString
[C#] public override string Name {get;}
[C++] public: _property virtual String* get_Name( );

[VB] Overrides Public ReadOnly Property Name As String
[JScript] public function get Name( ): String;
Description
   Gets the qualified name of the node.
   NamespaceURI
   NextSibling
   NodeType
      ToString
Description
   Gets the type of the node.
   OuterXml
   OwnerDocument
   ParentNode
   Prefix
   PreviousSibling
   Value
      ToString
Description
   Gets or sets the value of the node.
   CloneNode
[C#] public override XmlNode CloneNode(bool deep);
[C++] public: XmlNode* CloneNode(bool deep);
[VB] Overrides Public Function CloneNode(ByVal deep As Boolean) As XmlNode
[JScript] public override function CloneNode(deep: Boolean): XmlNode;
Description
   Creates a duplicate of this node.
   Return Value: The duplicate node.
   This method serves as a generic copy constructor for nodes. The duplicate node has no parent (ParentNode returns null). true to recursively clone the subtree under the specified node; false to clone only the node itself (and its attributes if the node is an XmlElement).
   WriteContentTo
[C#] public override void WriteContentTo(XmlWriter w);
[C++] public: void WriteContentTo(XmlWriter* w);
[VB] Overrides Public Sub WriteContentTo(ByVal w As XmlWriter)
[JScript] public override function WriteContentTo(w: XmlWriter);
Description
   Saves all the children of the node to the specified XmlWriter. The XmlWriter where you want to save the current node.
   WriteTo
[C#] public override void WriteTo(XmlWriter w);
[C++] public: void WriteTo(XmlWriter* w);
[VB] Overrides Public Sub WriteTo(ByVal w As XmlWriter)
[JScript] public override function WriteTo(w: XmlWriter);
Description
   Saves the node to the specified XmlWriter. The XmlWriter where you want to save the node.
   XmlWriter class (System.Xml)
      WriteTo
Description
   Represents a writer that provides a fast, non-cached, forward-only means of generating streams or files containing XML data that conforms to the W3C Extensible Markup Language (XML) 1.0 and the Namespaces in XML recommendations.
   XmlWriter is implemented in the System.Xml.XmlTextWriter class.
   XmlWriter
   Example Syntax:
      WriteTo

[C#] protected XmlWriter( );
[C++] protected: XmlWriter( );
[VB] Protected Sub New( )
[JScript] protected function XmlWriter( );
   WriteState
   WriteTo
[C#] public abstract WriteState WriteState {get;}
[C++] public: _property virtual WriteState get_WriteState( )=0;
[VB] MustOverride Public ReadOnly Property WriteState As WriteState
[JScript] public abstract function get WriteState( ): WriteState;
Description
   When overridden in a derived class, gets the state of the writer.
   XmlLang
   WriteTo
[C#] public abstract string XmlLang {get;}
[C++] public: _property virtual String* get_XmlLang( )=0;
[VB] MustOverride Public ReadOnly Property XmlLang As String
[JScript] public abstract function get XmlLang( ): String;
Description
   When overridden in a derived class, gets the current xml:lang scope.
   This property allows one component to find out in what state another component has left the writer. For example, perhaps one component wants to tell another which language help text to generate. The language information is communicated by writing an xml:lang attribute.
   XmlSpace
   WriteTo
[C#] public abstract XmlSpace XmlSpace {get;}
[C++] public: _property virtual XmlSpace get_XmlSpace( )=0;
[VB] MustOverride Public ReadOnly Property XmlSpace As XmlSpace
[JScript] public abstract function get XmlSpace( ): XmlSpace;
Description
   When overridden in a derived class, gets an System.Xml.XmlSpace representing the current xml:space scope.
   This allows one component to find out what state another component has left the writer in.
   Close
[C#] public abstract void Close( );
[C++] public: virtual void Close( )=0;
[VB] MustOverride Public Sub Close( )
[JScript] public abstract function Close( );
Description
   When overridden in a derived class, closes this stream and the underlying stream.
   Any elements or attributes left open will be automatically closed.
   Flush
[C#] public abstract void Flush( );
[C++] public: virtual void Flush( )=0;
[VB] MustOverride Public Sub Flush( )
[JScript] public abstract function Flush( );
Description
   When overridden in a derived class, flushes whatever is in the buffer to the underlying streams and also flushes the underlying stream.
   This is called instead of System.Xml.XmlWriter.Close when you want to write more to the underlying stream without losing what is still in the buffer.
   LookupPrefix
[C#] public abstract string LookupPrefix(string ns);
[C++] public: virtual String* LookupPrefix(String* ns)=0;
[VB] MustOverride Public Function LookupPrefix(ByVal ns As String) As String
[JScript] public abstract function LookupPrefix(ns: String): String;
Description
   When overridden in a derived class, returns the closest prefix defined in the current namespace scope for the namespace URI.
Return Value: The matching prefix or null if no matching namespace URI is found in the current scope. The namespace URI whose prefix you want to find.
   WriteAttributes
[C#] public virtual void WriteAttributes(XmlReader reader, bool defattr);
[C++] public: virtual void WriteAttributes(XmlReader* reader, bool defattr);
[VB] Overridable Public Sub WriteAttributes(ByVal reader As XmlReader, ByVal defattr As Boolean)
[JScript] public function WriteAttributes(reader: XmlReader, defattr: Boolean);
Description
   When overridden in a derived class, writes out all the attributes found at the current position in the System.Xml.XmlReader.
   If the reader is positioned on an element node WriteAttributes copies all the contained attributes. If the reader is positioned on an attribute node, this method writes the current attribute, then the rest of the attributes until the element closing tag. If the reader is positioned on an XmlDeclaration node, this method writes all the attributes in the declaration. If the reader is positioned on any other node type this method has no operation. The XmlReader from which to copy the attributes. true to copy the default attributes from the XmlReader; otherwise, false.
   WriteAttributeString
[C#] public void WriteAttributeString(string localName, string value);
[C++] public: void WriteAttributeString(String* localName, String* value);
[VB] Public Sub WriteAttributeString(ByVal localName As String, ByVal value As String)
[JScript] public function WriteAttributeString(localName: String, value: String);
Description
   When overridden in a derived class, writes out the attribute with the specified local name and value.
   WriteAttributeString does the following If the attribute value includes double or single quotes, they are replaced with " and ' respectively. The local name of the attribute. The value of the attribute.
   WriteAttributeString
[C#] public void WriteAttributeString(string localName, string ns, string value);
[C++] public: void WriteAttributeString(String* localName, String* ns, String* value);
[VB] Public Sub WriteAttributeString(ByVal localName As String, ByVal ns As String, ByVal value As String)
[JScript] public function WriteAttributeString(localName: String, ns: String, value: String); When overridden in a derived class, writes an attribute with the specified value.
Description
   When overridden in a derived class, writes an attribute with the specified parameters.

This method writes out the attribute with a user defined namespace prefix and associates it with the given namespace. If localName is "xmlns" then this method also treats this as a namespace declaration. In this case, the ns argument should be null. The local name of the attribute. The namespace URI to associate with the attribute. The value of the attribute.

WriteAttributeString
[C#] public void WriteAttributeString(string prefix, string localName, string ns, string value);
[C++] public: void WriteAttributeString(String* prefix, String* localName, String* ns, String* value);
[VB] Public Sub WriteAttributeString(ByVal prefix As String, ByVal localName As String, ByVal ns As String, ByVal value As String)
[JScript] public function WriteAttributeString(prefix: String, localName: String, ns: String, value: String);
Description When overridden in a derived class, writes out the attribute with the specified prefix, local name, namespace URI and value.

This method writes out the attribute with a user defined namespace prefix and associates it with the given namespace. If the prefix is "xmlns" then this method also treats this as a namespace declaration and associates the declared prefix with the namespace URI provided in the given attribute value. In this case the ns argument should be null. The namespace prefix of the attribute. The local name of the attribute. The namespace URI of the attribute. The value of the attribute.

WriteBase64
[C#] public abstract void WriteBase64(byte[ ] buffer, int index, int count);
[C++] public: virtual void WriteBase64(unsigned char buffer _ gc[ ], int index, int count)=0;
[VB] MustOverride Public Sub WriteBase64(ByVal buffers As Byte, ByVal index As Integer, ByVal count As Integer)
[JScript] public abstract function WriteBase64(buffer: Byte[ ], index: int, count: int);
Description When overridden in a derived class, encodes the specified binary bytes as base64 and writes out the resulting text.

For example, the byte buffer may contain the binary contents of a GIF image. This clearly would not be valid XML. The base64 encoding is designed to represent arbitrary byte sequences in a text form comprised of the 65 US-ASCII characters ([A-Za-z0-9+/=]) where each character encodes 6 bits of the binary data. See RFC 1521. (You can obtain RFCs which may be located on the World Wide Web (www.), from the Request for Comments Web site at located at rfc-editor-.org/.) See System.Xml.XmlTextWriter.WriteBase64(System.Byte[ ],System.Int32,System.Int32) (in the XmlTextWriter class) for an example using this method. Byte array to encode. The position within the buffer indicating the start of the bytes to write. The number of bytes to write.

WriteBinHex
[C#] public abstract void WriteBinHex(byte[ ] buffer, int index, int count);
[C++] public: virtual void WriteBinHex(unsigned char buffer _ gc[ ], int index, int count)=0;
[VB] MustOverride Public Sub WriteBinHex(ByVal buffers As Byte, ByVal index As Integer, ByVal count As Integer)
[JScript] public abstract function WriteBinHex(buffer: Byte[ ], index: int, count: int);
Description When overridden in a derived class, encodes the specified binary bytes as binhex and writes out the resulting text. Byte array to encode. The position within the buffer indicating the start of the bytes to write. The number of bytes to write.

WriteCData
[C#] public abstract void WriteCData(string text);
[C++] public: virtual void WriteCData(String* text)=0;
[VB] MustOverride Public Sub WriteCData(ByVal text As String)
[JScript] public abstract function WriteCData(text: String);
Description When overridden in a derived class, writes out a block containing the specified text.

If text is either null or String.Empty, this method writes an empty CData block, for example. The text to place inside the CDATA block.

WriteCharEntity
[C#] public abstract void WriteCharEntity(char ch);
[C++] public: virtual void WriteCharEntity(_wchar_t ch)=0;
[VB] MustOverride Public Sub WriteCharEntity(ByVal ch As Char)
[JScript] public abstract function WriteCharEntity(ch: Char);
Description When overridden in a derived class, forces the generation of a character entity for the specified Unicode character value.

This method writes the Unicode character in hexidecimal character entity reference format. The Unicode character for which to generate a character entity.

WriteChars
[C#] public abstract void WriteChars(char[ ] buffer, int index, int count);
[C++] public: virtual void WriteChars(_wchar_t buffer _ gc[ ], int index, int count)=0;
[VB] MustOverride Public Sub WriteChars(ByVal buffers As Char, ByVal index As Integer, ByVal count As Integer)
[JScript] public abstract function WriteChars(buffer: Char[ ], index: int, count: int);
Description When overridden in a derived class, writes text a buffer at a time.

This method can be used to write large amounts of text a buffer at a time. Character array containing the text to write. The position within the buffer indicating the start of the text to write. The number of characters to write.

WriteComment
[C#] public abstract void WriteComment(string text);
[C++] public: virtual void WriteComment(String* text)=0;
[VB] MustOverride Public Sub WriteComment(ByVal text As String)
[JScript] public abstract function WriteComment(text: String);
Description When overridden in a derived class, writes out a comment containing the specified text.

If text is either null or String.Empty, this method writes a Comment with no data content, for example. Text to place inside the comment.

WriteDocType
[C#] public abstract void WriteDocType(string name, string pubid, string sysid, string subset);
[C++] public: virtual void WriteDocType(String* name, String* pubid, String* sysid, String* subset)=0;
[VB] MustOverride Public Sub WriteDocType(ByVal name As String, ByVal pubid As String, ByVal sysid As String, ByVal subset As String)
[JScript] public abstract function WriteDocType(name: String, pubid: String, sysid: String, subset: String);
Description When overridden in a derived class, writes the DOCTYPE declaration with the specified name and optional attributes.

This method does not check for invalid characters in pubid, sysid or subset. The name of the DOCTYPE. This must be non-empty. If non-null it also writes PUBLIC "pubid" "sysid" where pubid and sysid are replaced with the value of the given arguments. If pubid is null and sysid is non-null it writes SYSTEM "sysid" where sysid is replaced with the value of this argument. If non-null it writes [subset] where subset is replaced with the value of this argument.

WriteElementString
[C#] public void WriteElementString(string localName, string value);
[C++] public: void WriteElementString(String* localName, String* value);
[VB] Public Sub WriteElementString(ByVal localName As String, ByVal value As String)
[JScript] public function WriteElementString(localName: String, value: String); When overridden in a derived class, writes an element containing a string value.
Description
When overridden in a derived class, writes an element with the specified local name and value. The local name of the element The value of the element WriteElementString
[C#] public void WriteElementString(string localName, string ns, string value);
[C++] public: void WriteElementString(String* localName, String* ns, String* value);
[VB] Public Sub WriteElementString(ByVal localName As String, ByVal ns As String, ByVal value As String)
[JScript] public function WriteElementString(localName: String, ns: String, value: String);
Description
When overridden in a derived class, writes an element with the specified parameters. The local name of the element The namespace URI to associate with the element The value of the element WriteEndAttribute
[C#] public abstract void WriteEndAttribute( );
[C++] public: virtual void WriteEndAttribute( )=0;
[VB] MustOverride Public Sub WriteEndAttribute( )
[JScript] public abstract function WriteEndAttribute( );
Description
When overridden in a derived class, closes the previous System.Xml.Xmlwriter.WriteStartAttribute(System.String, System.String) call.
If you call WriteStartAttribute, you can close the attribute with this method.

WriteEndDocument
[C#] public abstract void WriteEndDocument( );
[C++] public: virtual void WriteEndDocument( )=0;
[VB] MustOverride Public Sub WriteEndDocument( )
[JScript] public abstract function WriteEndDocument( );
Description
When overridden in a derived class, closes any open elements or attributes and puts the writer back in the Start state.

WriteEndElement
[C#] public abstract void WriteEndElement( );
[C++] public: virtual void WriteEndElement( )=0;
[VB] MustOverride Public Sub WriteEndElement( )
[JScript] public abstract function WriteEndElement( );
Description
When overridden in a derived class, closes one element and pops the corresponding namespace scope.
If the element contains no content, a short end tag "/>" is written; otherwise, a full end tag is written.

WriteEntityRef
[C#] public abstract void WriteEntityRef(string name);
[C++] public: virtual void WriteEntityRef(String* name)=0;
[VB] MustOverride Public Sub WriteEntityRef(ByVal name As String)
[JScript] public abstract function WriteEntityRef(name: String);
Description
When overridden in a derived class, writes out an entity reference as follows: & name;. The name of the entity reference.

WriteFullEndElement
[C#] public abstract void WriteFullEndElement( );
[C++] public: virtual void WriteFullEndElement( )=0;
[VB] MustOverride Public Sub WriteFullEndElement( )
[JScript] public abstract function WriteFullEndElement( );
Description
When overridden in a derived class, closes one element and pops the corresponding namespace scope.
This method always writes the full end tag. This is useful when dealing with elements that must include a full end tag. For example, browsers expect HTML script blocks to be closed with " ".

WriteName
[C#] public abstract void WriteName(string name);
[C++] public: virtual void WriteName(String* name)=0;
[VB] MustOverride Public Sub WriteName(ByVal name As String)
[JScript] public abstract function WriteName(name: String);
Description
When overridden in a derived class, writes out the specified name, ensuring it is a valid name according to the W3C XML 1.0 recommendation, which may be located on the World Wide Web (www.) at (w3.org/TR/1998/REC-xml-19980210#NT-Name).
If System.Xml.XmlTextWriter.Namespaces is set to true, WriteName also checks that the name is also valid according to the W3C Namespaces in XML recommendation. The name to write.

WriteNmToken
[C#] public abstract void WriteNmToken(string name);
[C++] public: virtual void WriteNmToken(String* name)=0;
[VB] MustOverride Public Sub WriteNmToken(ByVal name As String)
[JScript] public abstract function WriteNmToken(name: String);
Description
When overridden in a derived class, writes out the specified name, ensuring it is a valid NmToken according to the W3C XML 1.0 recommendation, which may be located on the World Wide Web (www.) at (w3.org/TR/1998/REC-xml-19980210#NT-Name). The name to write.

WriteNode
[C#] public virtual void WriteNode(XmlReader reader, bool defattr);
[C++] public: virtual void WriteNode(XmlReader* reader, bool defattr);
[VB] Overridable Public Sub WriteNode(ByVal reader As XmlReader, ByVal defattr As Boolean)
[JScript] public function WriteNode(reader: XmlReader, defattr: Boolean);
Description
When overridden in a derived class, copies everything from the reader to the writer and moves the reader to the start of the next sibling.
The following table shows the supported node types for this method. The System.Xml.XmlReader to read from. true to copy the default attributes from the XmlReader; otherwise, false.

WriteProcessingInstruction
[C#] public abstract void WriteProcessingInstruction(string name, string text);
[C++] public: virtual void WriteProcessingInstruction (String* name, String* text)=0;
[VB] MustOverride Public Sub WriteProcessingInstruction (ByVal name As String, ByVal text As String)
[JScript] public abstract function WriteProcessingInstruction (name: String, text: String);
Description
When overridden in a derived class, writes out a processing instruction with a space between the name and text as follows:
This method can be used to write the XML declaration (rather than System.Xml.XmlWriter.WriteStartDocument). This could result in the encoding attribute being incorrectly written. For example, the following C# code would result in an invalid XML document. The name of the processing instruction. The text to include in the processing instruction.
WriteQualifiedName
[C#] public abstract void WriteQualifiedName(string localName, string ns);
[C++] public: virtual void WriteQualifiedName(String* localName, String* ns)=0;
[VB] MustOverride Public Sub WriteQualifiedName(ByVal localName As String, ByVal ns As String)
[JScript] public abstract function WriteQualifiedName(localName: String, ns: String);
Description
When overridden in a derived class, writes out the namespace-qualified name. This method looks up the prefix that is in scope for the given namespace.
For example, the following C# code: writer.Formatting=Formatting.Indented; writer.WriteStartElement("root"); writer.WriteAttributeString("xmlns","x", null,"urn:abc"); writer.WriteStartElement("item"); writer.WriteStartAttribute("href",null); writer.WriteString("#"); writer.WriteQualifiedName("test","urn:abc"); writer.WriteEndAttribute( ); writer.WriteEndElement( ); writer.WriteEndElement( ); writer.Close( ); Generates the following output: If ns maps to the current default namespace, no prefix is generated. The local name to write. The namespace URI for the name.
WriteRaw
[C#] public abstract void WriteRaw(string data);
[C++] public: virtual void WriteRaw(String* data)=0;
[VB] MustOverride Public Sub WriteRaw(ByVal data As String)
[JScript] public abstract function WriteRaw(data: String);
Description
When overridden in a derived class, writes raw markup manually from a string.
This method bypasses the entitization of special characters. String containing the text to write.
WriteRaw
[C#] public abstract void WriteRaw(char[ ] buffer, int index, int count);
[C++] public: virtual void WriteRaw(_wchar_t buffer _gc[ ], int index, int count)=0;
[VB] MustOverride Public Sub WriteRaw(ByVal buffers As Char, ByVal index As Integer, ByVal count As Integer)
[JScript] public abstract function WriteRaw(buffer: Char[ ], index: int, count: int); When overridden in a derived class, writes raw markup manually.
Description
When overridden in a derived class, writes raw markup manually from a character buffer.

This method bypasses the entitization of special characters. Character array containing the text to write. The position within the buffer indicating the start of the text to write. The number of characters to write.
WriteStartAttribute
[C#] public void WriteStartAttribute(string localName, string ns);
[C++] public: void WriteStartAttribute(String* localName, String* ns);
[VB] Public Sub WriteStartAttribute(ByVal localName As String, ByVal ns As String)
[JScript] public function WriteStartAttribute(localName: String, ns: String); When overridden in a derived class, writes the start of an attribute.
Description
When overridden in a derived class, writes the start of an attribute.
This is a more advanced version of System.Xml.Xmlwriter.WriteAttributeString(System.String,System.String,System.String) that allows you to write an attribute value using multiple write methods, such as System.Xml.XmlWriter.WriteString(System.String), System.Xml.Xmlwriter.WriteQualifiedName(System.String,System.String), and so on. The local name of the attribute. The namespace URI of the attribute
WriteStartAttribute
[C#] public abstract void WriteStartAttribute(string prefix, string localName, string ns);
[C++] public: virtual void WriteStartAttribute(String* prefix, String* localName, String* ns)=0;
[VB] MustOverride Public Sub WriteStartAttribute(ByVal prefix As String, ByVal localName As String, ByVal ns As String)
[JScript] public abstract function WriteStartAttribute(prefix: String, localName: String, ns: String);
Description
When overridden in a derived class, writes the start of an attribute.
This method allows you to write a value using multiple Write methods. The namespace prefix of the attribute. The local name of the attribute. The namespace URI for the attribute.
WriteStartDocument
[C#] public abstract void WriteStartDocument( );
[C++] public: virtual void WriteStartDocument( )=0;
[VB] MustOverride Public Sub WriteStartDocument( )
[JScript] public abstract function WriteStartDocument( ); When overridden in a derived class, writes the XML declaration.
Description
When overridden in a derived class, writes the XML declaration with the version "1.0".
The encoding level of the document is determined by how the writer is implemented. For example, if an System.Text.Encoding object is specified in the XmlTextWriter constructor, this determines the value of the encoding attribute. This method does not create a standalone attribute.
WriteStartDocument
[C#] public abstract void WriteStartDocument(bool standalone);
[C++] public: virtual void WriteStartDocument(bool standalone)=0;
[VB] MustOverride Public Sub WriteStartDocument(ByVal standalone As Boolean)
[JScript] public abstract function WriteStartDocument(standalone: Boolean);

Description

When overridden in a derived class, writes the XML declaration with the version "1.0" and the standalone attribute.

The encoding level of the document is determined by how the writer is implemented. For example, if an System.Text.Encoding object is specified in the XmlTextWriter constructor, this determines the value of the encoding attribute. If true, it writes "standalone=yes"; if false, it writes "standalone=no"

WriteStartElement

[C#] public void WriteStartElement(string localName);
[C++] public: void WriteStartElement(String* localName);
[VB] Public Sub WriteStartElement(ByVal localName As String)
[JScript] public function WriteStartElement(localName: String);

Description

When overridden in a derived class, writes out a start tag with the specified local name. The local name of the element.

WriteStartElement

[C#] public void WriteStartElement(string localName, string ns);
[C++] public: void WriteStartElement(String* localName, String* ns);
[VB] Public Sub WriteStartElement(ByVal localName As String, ByVal ns As String)
[JScript] public function WriteStartElement(localName: String, ns: String); When overridden in a derived class, writes the specified start tag.

Description

When overridden in a derived class, writes the specified start tag and associates it with the given namespace.

After calling this method you can either write attributes, or create content using System.Xml.XmlWriter.WriteComment (System.String), System.Xml.XmlWriter.WriteString(System.String), or WriteStartElement for child elements. You must close this element with either System.Xml.XmlWriter.WriteEndElement or System.Xml.XmlWriter.WriteFullEndElement. For example, the following C# code writer.WriteStartElement("item",null); writer.WriteString("some text"); writer.WriteEndElement( ); generates the following output: some text See System.Xml.XmlTextwriter.WriteStartElement(System.String,System.String,System.String) (in the XmlTextWriter class) for an example using this method. The local name of the element. The namespace URI to associate with the element. If this namespace is already in scope and has an associated prefix, the writer automatically writes that prefix also.

WriteStartElement

[C#] public abstract void WriteStartElement(string prefix, string localName, string ns);
[C++] public: virtual void WriteStartElement(String* prefix, String* localName, String* ns)=0;
[VB] MustOverride Public Sub WriteStartElement(ByVal prefix As String, ByVal localName As String, ByVal ns As String)
[JScript] public abstract function WriteStartElement(prefix: String, localName: String, ns: String);

Description

When overridden in a derived class, writes the specified start tag and associates it with the given namespace and prefix. The namespace prefix of the element. The local name of the element. The namespace URI to associate with the element.

WriteString

[C#] public abstract void WriteString(string text);
[C++] public: virtual void WriteString(String* text)=0;
[VB] MustOverride Public Sub WriteString(ByVal text As String)
[JScript] public abstract function WriteString(text: String);

Description

When overridden in a derived class, writes the given text content.

WriteString does the following The characters &, <, and > are replaced with &, <, and >, respectively. The text to write.

WriteSurrogateCharEntity

[C#] public abstract void WriteSurrogateCharEntity(char lowChar, char highChar);
[C++] public: virtual void WriteSurrogateCharEntity (_wchar_t lowChar, _wchar_t highChar)=0;
[VB] MustOverride Public Sub WriteSurrogateCharEntity (ByVal lowChar As Char, ByVal highChar As Char)
[JScript] public abstract function WriteSurrogateCharEntity (lowChar: Char, highChar: Char);

Description

When overridden in a derived class, generates and writes the surrogate character entity for the surrogate character pair.

The surrogate character entity is written in hexadecimal format. The range for surrogate characters is #x10000 to #x10FFFF. The following formula is used to generate the surrogate character entity: (highChar−0xD800)*0x400+ (lowChar−0xDC00)+0x10000 Applications encode DOM strings using UTF-16. For both HTML and XML, the document character set (and therefore the notation of numeric character references) is based on UCS [ISO-10646]. A single numeric character reference in a source document may therefore in some cases correspond to two 16-bit units in a DOM string (a high surrogate and a low surrogate). These 16-bit units are referred to as a surrogate pair. The low surrogate. This must be a value between 0xDC00 and 0xDFFF. The high surrogate. This must be a value between 0xD800 and 0xDBFF.

WriteWhitespace

[C#] public abstract void WriteWhitespace(string ws);
[C++] public: virtual void WriteWhitespace(String* ws)=0;
[VB] MustOverride Public Sub WriteWhitespace(ByVal ws As String)
[JScript] public abstract function WriteWhitespace(ws: String);

System.Xml.Schema

This is the namespace for the XML classes that provide standards-based support for XML schemas. The standards may be located on the World Wide Web (www.), and the supported standards are: XML Schemas for Structures—located at w3.org/TR/xmlschema-1/—supports for schema mapping and for validation. See also XmlSchemaCollection which currently provides XSD and XDR schema validation.

Description

This is the namespace for the XML classes that provide standards-based support for XML schemas. The standards may be located on the World Wide Web (www.), and the supported standards are: XML Schemas for Structures—located at w3.org/TR/xmlschema-1/—supports for schema mapping and for validation. See also XmlSchemaCollection which currently provides XSD and XDR schema validation.

ValidationEventArgs class (System.Xml.Schema)

Description

Returns detailed information relating to the ValidationEventhandler.

Properties:

Exception

[C#] public XmlSchemaException Exception {get;}
[C++] public: _property XmlSchemaException* get_Exception( );
[VB] Public ReadOnly Property Exception As XmlSchemaException

[JScript] public function get Exception( ): XmlSchemaException;
Description
Gets the System.Xml.Schema.XmlSchemaException associated with the validation event.
Message
[C#] public string Message {get;}
[C++] public: _property String* get_Message( );
[VB] Public ReadOnly Property Message As String
[JScript] public function get Message( ): String;
Description
Gets the text description corresponding to the validation event.
Severity
[C#] public XmlSeverityType Severity {get;}
[C++] public: _property XmlSeverityType get_Severity( );
[VB] Public ReadOnly Property Severity As XmlSeverityType
[JScript] public function get Severity( ): XmlSeverityType;
Description
Gets the severity of the validation event.
Methods:
ValidationEventHandler delegate (System.Xml.Schema)
ToString
Description
Represents the method that will handle the System.Xml.Schema.ValidationEventArgs.
XmlSchema class (System.Xml.Schema)
ToString
Description
Contains the definition of a schema. The class for schema element. All XML Schema Definition language (XSD) elements are children of the schema element. Represents the W3C schema element.
ToString
[C#] public const string InstanceNamespace;
[C++] public: const String* InstanceNamespace;
[VB] Public Const InstanceNamespace As String
[JScript] public var InstanceNamespace: String;
Description
Provides the instance namespace.
ToString
[C#] public const string Namespace;
[C++] public: const String* Namespace;
[VB] Public Const Namespace As String
[JScript] public var Namespace: String;
Description
Provides the namespace for validation.
Constructors:
XmlSchema
Example Syntax:
ToString
[C#] public XmlSchema( );
[C++] public: XmlSchema( );
[VB] Public Sub New( )
[JScript] public function XmlSchema( );
Description
Constructs a new, empty schema.
Annotation
AttributeFormDefault
ToString
Description
Indicates the form for attributes declared in the target namespace of the schema.
The value must be one of XmlSchemaForm values. The default value is unqualified.

AttributeGroups
ToString
[C#] public XmlSchemaObjectTable AttributeGroups {get;}
[C++] public: _property XmlSchemaObjectTable* get_AttributeGroups( );
[VB] Public ReadOnly Property AttributeGroups As XmlSchemaObjectTable
[JScript] public function get AttributeGroups( ): XmlSchemaObjectTable;
Description
The XmlSchemaObjectTable for all attribute groups in the schema.
Attributes
ToString
[C#] public XmlSchemaObjectTable Attributes {get;}
[C++] public: _property XmlSchemaObjectTable* get_Attributes( );
[VB] Public ReadOnly Property Attributes As XmlSchemaObjectTable
[JScript] public function get Attributes( ): XmlSchemaObjectTable;
Description
The XmlSchemaObjectTable for all attributes in the schema.
BlockDefault
ToString
[C#] public XmlSchemaDerivationMethod BlockDefault {get; set;}
[C++] public: _property XmlSchemaDerivationMethod get_BlockDefault( );public: _property void set_BlockDefault (XmlSchemaDerivationMethod);
[VB] Public Property BlockDefault As XmlSchemaDerivationMethod
[JScript] public function get BlockDefault( ): XmlSchemaDerivationMethod;public function set BlockDefault (XmlSchemaDerivationMethod);
Description
Type of derivation. The BlockDefault attribute sets the default value of the block attribute on element and complex type elements in the target namespace of the schema. The block attribute prevents a complex type (or element) that has the specified type of derivation from being used in place of the inherited complex type (or element).
This value can contain all or a list that is a subset of extension/restriction/substitution.
ElementFormDefault
ToString
[C#] public XmlSchemaForm ElementFormDefault {get; set;}
[C++] public: _property XmlSchemaForm get_ElementFormDefault( );public: _property void set_ElementFormDefault(XmlSchemaForm);
[VB] Public Property ElementFormDefault As XmlSchemaForm
[JScript] public function get ElementFormDefault( ): XmlSchemaForm;public function set ElementFormDefault (XmlSchemaForm);
Description
Indicates the form for elements declared in the target namespace of the schema.
The value must be one of the XmlSchemaForm values. The default value is Unqualified.
Elements
ToString
[C#] public XmlSchemaObjectTable Elements {get;}
[C++] public: _property XmlSchemaObjectTable* get_Elements( );

[VB] Public ReadOnly Property Elements As XmlSchemaObjectTable
[JScript] public function get Elements( ): XmlSchemaObjectTable;
Description
   The XmlSchemaObjectTable for all elements in the schema.
   FinalDefault
   ToString
[C#] public XmlSchemaDerivationMethod FinalDefault {get; set;}
[C++] public: _property XmlSchemaDerivationMethod get_FinalDefault( );public: _property void set_FinalDefault (XmlSchemaDerivationMethod);
[VB] Public Property FinalDefault As XmlSchemaDerivationMethod
[JScript] public function get FinalDefault( ): XmlSchemaDerivationMethod;public function set FinalDefault(XmlSchemaDerivationMethod);
Description
   Type of derivation. The FinalDefault attribute sets the default value of the final attribute on element and complex type elements in the target namespace of this schema. The final attribute prevents the specified type of derivation of a element or complex type.
   This value can contain all or a list that is a subset of extension/restriction.
   Groups
   ToString
[C#] public XmlSchemaObjectTable Groups {get;}
[C++] public: _property XmlSchemaObjectTable* get_Groups( );
[VB] Public ReadOnly Property Groups As XmlSchemaObjectTable
[JScript] public function get Groups( ): XmlSchemaObjectTable;
Description
   The XmlSchemaObjectTable for all groups in the schema.
   Id
   Includes
   ToString
Description
   Collection of included and imported schemas.
   IsCompiled
   ToString
[C#] public bool IsCompiled {get;}
[C++] public: _property bool get_IsCompiled( );
[VB] Public ReadOnly Property IsCompiled As Boolean
[JScript] public function get IsCompiled( ): Boolean;
Description
   Indicates if the schema has been compiled.
   If value is true, the schema has been compiled.
   Items
   ToString
[C#] public XmlSchemaObjectCollection Items {get;}
[C++] public: _property XmlSchemaObjectCollection* get_Items( );
[VB] Public ReadOnly Property Items As XmlSchemaObjectCollection
[JScript] public function get Items( ): XmlSchemaObjectCollection;
Description
   This Items collection is used to add new element types at the schema element level.
   Collection of XmlSchemaAnnotation, XmlSchemaAttribute, XmlSchemaAttributeGroup, XmlSchemaComplexType, XmlSchemaSimpleType, XmlSchemaElement, XmlSchemaGroup, or XmlSchemaNotation.
   LineNumber
   LinePosition
   Notations
   ToString
Description
   The XmlSchemaObjectTable for all notations in the schema.
   SchemaTypes
   ToString
[C#] public XmlSchemaObjectTable SchemaTypes {get;}
[C++] public: _property XmlSchemaObjectTable* get_SchemaTypes( );
[VB] Public ReadOnly Property SchemaTypes As XmlSchemaObjectTable
[JScript] public function get SchemaTypes( ): XmlSchemaObjectTable;
Description
   The XmlSchemaObjectTable for all schema types in the schema.
   SourceUri
   TargetNamespace
   ToString
Description
   Property for the schema target namespace. The URI reference of the namespace of this schema.
   This is the namespace of all schema components in this schema as well as any schema included using the include element. Included schemas must either have the same target namespace as the containing schema or have no target namespace specified.
   UnhandledAttributes
   Version
   ToString
Description
   Version of the schema.
   Optional.
   Compile
[C#] public void Compile(ValidationEventHandler validationEventHandler);
[C++] public: void Compile(ValidationEventHandler* validationEventHandler);
[VB] Public Sub Compile(ByVal validationEventHandler As ValidationEventHandler)
[JScript] public function Compile(validationEventHandler: ValidationEventHandler);
Description
   Compiles the XML Schema Definition language (XSD) Schema Object Model (SOM) into schema information for validation. Used to check the syntactic and semantic structure of the programmatically built SOM. Semantic validation checking is performed before compiling. Validation Event Handler
   Read
[C#] public static XmlSchema Read(Stream stream, ValidationEventHandler validationEventHandler);
[C++] public: static XmlSchema* Read(Stream* stream, ValidationEventHandler* validationEventHandler);
[VB] Public Shared Function Read(ByVal stream As Stream, ByVal validationEventHandler As ValidationEventHandler) As XmlSchema
[JScript] public static function Read(stream: Stream, validationEventHandler: ValidationEventHandler): XmlSchema;

Description
Reads an XML Schema Definition language (XSD) schema from the supplied stream. Data stream Validation Event Handler
Read
[C#] public static XmlSchema Read(TextReader reader, ValidationEventHandler validationEventHandler);
[C++] public: static XmlSchema* Read(TextReader* reader, ValidationEventHandler* validationEventHandler);
[VB] Public Shared Function Read(ByVal reader As TextReader, ByVal validationEventHandler As ValidationEventHandler) As XmlSchema
[JScript] public static function Read(reader: TextReader, validationEventHandler: ValidationEventHandler): XmlSchema; Reads an XML Schema Definition language (XSD) schema.
Description
Reads an XSD schema from the supplied text reader. TextReader Validation Event Handler
Read
[C#] public static XmlSchema Read(XmlReader reader, ValidationEventHandler validationEventHandler);
[C++] public: static XmlSchema* Read(XmlReader* reader, ValidationEventHandler* validationEventHandler);
[VB] Public Shared Function Read(ByVal reader As XmlReader, ByVal validationEventHandler As ValidationEventHandler) As XmlSchema
[JScript] public static function Read(reader: XmlReader, validationEventHandler: ValidationEventHandler): XmlSchema;
Description
Reads an XML Schema Definition language (XSD) schema from the supplied reader. XmlReader Validation Event Handler
Write
[C#] public void Write(Stream stream);
[C++] public: void Write(Stream* stream);
[VB] Public Sub Write(ByVal stream As Stream)
[JScript] public function Write(stream: Stream); Writes out an XML Schema Definition language (XSD) schema.
Description
Writes the XSD schema to the supplied data stream. Data stream
Write
[C#] public void Write(TextWriter writer);
[C++] public: void Write(TextWriter* writer);
[VB] Public Sub Write(ByVal writer As TextWriter)
[JScript] public function Write(writer: TextWriter);
Description
Writes the XML Schema Definition language (XSD) schema to the supplied XmlWriter. XmlWriter
Write
[C#] public void Write(XmlWriter writer);
[C++] public: void Write(XmlWriter* writer);
[VB] Public Sub Write(ByVal writer As XmlWriter)
[JScript] public function Write(writer: XmlWriter);
Description
Writes out the XML Schema Definition language (XSD) schema. XmlWriter
Write
[C#] public void Write(Stream stream, XmlNamespaceManager namespaceManager);
[C++] public: void Write(Stream* stream, XmlNamespaceManager* namespaceManager);
[VB] Public Sub Write(ByVal stream As Stream, ByVal namespaceManager As XmlNamespaceManager)
[JScript] public function Write(stream: Stream, namespaceManager: XmlNamespaceManager);
Description
Writes the XML Schema Definition language (XSD) schema to the supplied TextWriter.
Write
[C#] public void Write(TextWriter writer, XmlNamespaceManager namespaceManager);
[C++] public: void Write(TextWriter* writer, XmlNamespaceManager* namespaceManager);
[VB] Public Sub Write(ByVal writer As TextWriter, ByVal namespaceManager As XmlNamespaceManager)
[JScript] public function Write(writer: TextWriter, namespaceManager: XmlNamespaceManager);
Description
Writes the XML Schema Definition language (XSD) schema to the supplied XmlWriter. TextWriter XmlNamespaceManager
Write
[C#] public void Write(XmlWriter writer, XmlNamespaceManager namespaceManager);
[C++] public: void Write(XmlWriter* writer, XmlNamespaceManager* namespaceManager);
[VB] Public Sub Write(ByVal writer As XmlWriter, ByVal namespaceManager As XmlNamespaceManager)
[JScript] public function Write(writer: XmlWriter, namespaceManager: XmlNamespaceManager);
Description
Writes out the XML Schema Definition language (XSD) schema. XmlWriter XmlNamespaceManager
XmlSchemaAll class (System.Xml.Schema)
Write
Description
Permits the elements in the group to appear in any order in the containing element. Represents the W3C all element (compositor).
XmlSchemaAll
Example Syntax:
Write
[C#] public XmlSchemaAll( );
[C++] public: XmlSchemaAll( );
[VB] Public Sub New( )
[JScript] public function XmlSchemaAll( );
Annotation
Id
Items
Write
Description
Collection of XmlSchemaElement, elements contained within the all compositor.
LineNumber
LinePosition
MaxOccurs
MaxOccursString
MinOccurs
MinOccursString
SourceUri
UnhandledAttributes
XmlSchemaAnnotated class (System.Xml.Schema)
ToString
Description
Class for all element types. The class for any element that can contain annotation elements.
XmlSchemaAnnotated
Example Syntax:
ToString
[C#] public XmlSchemaAnnotated( );
[C++] public: XmlSchemaAnnotated( );
[VB] Public Sub New( )

[JScript] public function XmlSchemaAnnotated( );
    Annotation
    ToString
[C#] public XmlSchemaAnnotation Annotation {get; set;}
[C++] public: _property XmlSchemaAnnotation* get_Annotation( );public: _property void set_Annotation(XmlSchemaAnnotation*);
[VB] Public Property Annotation As XmlSchemaAnnotation
[JScript] public function get Annotation( ): XmlSchemaAnnotation;public function set Annotation(XmlSchemaAnnotation);
Description
    Sets or retrieves the annotation property.
    Id
    ToString
[C#] public string Id {get; set;}
[C++] public: _property String* get_Id( );public: _property void set_Id(String*);
[VB] Public Property Id As String
[JScript] public function get Id( ): String;public function set Id(String);
Description
    Provides the string id.
    The id value must be of type ID and be unique within the document containing this element.
    LineNumber
    LinePosition
    SourceUri
    UnhandledAttributes
    ToString
Description
    Stores qualified attributes that do not belong to the schema target namespace.
    XmlSchemaAnnotation class (System.Xml.Schema)
    ToString
Description
    Defines an annotation. Creates an annotation element. Represents the W3C annotation element.
    An annotation element can contain one or more XmlSchemaAppInfo classes (information for applications) and XmlSchemaDocumentation classes (comments or text for humans).
    XmlSchemaAnnotation
    Example Syntax:
    ToString
[C#] public XmlSchemaAnnotation( );
[C++] public: XmlSchemaAnnotation( );
[VB] Public Sub New( )
[JScript] public function XmlSchemaAnnotation( );
    Items
    ToString
[C#] public XmlSchemaObjectCollection Items {get;}
[C++] public: _property XmlSchemaObjectCollection* get_Items( );
[VB] Public ReadOnly Property Items As XmlSchemaObjectCollection
[JScript] public function get Items( ): XmlSchemaObjectCollection;
Description
    Provides a collection of annotation elements.
    Read-only property.
    LineNumber
    LinePosition
    SourceUri
    XmlSchemaAny class (System.Xml.Schema)
    ToString
Description
    Enables any element from the specified namespace(s) to appear in the containing complexType, sequence, or choice element. Represents the W3C any element.
    XmlSchemaAny
    Example Syntax:
    ToString
[C#] public XmlSchemaAny( );
[C++] public: XmlSchemaAny( );
[VB] Public Sub New( )
[JScript] public function XmlSchemaAny( );
    Annotation
    Id
    LineNumber
    LinePosition
    MaxOccurs
    MaxOccursString
    MinOccurs
    MinOccursString
    Namespace
    ToString
Description
    Namespaces containing the elements that can be used.
    If no namespace is specified, any is the default. If the namespace is specified, it must be one of the following: Namespace Value Description any Elements from any namespace can be present.
    ProcessContents
    ToString
[C#] public XmlSchemaContentProcessing ProcessContents {get; set;}
[C++] public: _property XmlSchemaContentProcessing get_ProcessContents( );public: _property void set_ProcessContents(XmlSchemaContentProcessing);
[VB] Public Property ProcessContents As XmlSchemaContentProcessing
[JScript] public function get ProcessContents( ): XmlSchemaContentProcessing;public function set ProcessContents(XmlSchemaContentProcessing);
Description
    Indicates how an application or XML processor should handle the validation of XML documents for the elements specified by the any element.
    If no processContents attribute is specified, the default is strict. If processContents is specified, it must one of the following: Enum Description Skip The XML processor does not attempt to validate any attributes from the specified namespace.
    SourceUri
    UnhandledAttributes
    XmlSchemaAnyAttribute class (System.Xml.Schema)
    ToString
Description
    Enables any attribute from the specified namespace(s) to appear in the containing complexType element. Represents the W3C anyAttribute element.
    XmlSchemaAnyAttribute
    Example Syntax:
    ToString
[C#] public XmlSchemaAnyAttribute( );
[C++] public: XmlSchemaAnyAttribute( );
[VB] Public Sub New( )
[JScript] public function XmlSchemaAnyAttribute( );
    Annotation
    Id
    LineNumber
    LinePosition
    Namespace
    ToString Description
Namespaces containing the attributes that can be used.
If no namespace is specified, any is the default. If the namespace is specified, it must one of the following. If processContents is specified, it must one of the following: Namespace Value Description any Elements from any namespace can be present.
ProcessContents
ToString
[C#] public XmlSchemaContentProcessing ProcessContents {get; set;}
[C++] public: _property XmlSchemaContentProcessing get_ProcessContents( );public: _property void set_ProcessContents(XmlSchemaContentProcessing);
[VB] Public Property ProcessContents As XmlSchemaContentProcessing
[JScript] public function get ProcessContents( ): XmlSchemaContentProcessing;public function set ProcessContents(XmlSchemaContentProcessing);
Description
Indicates how an application or XML processor should handle the validation of XML documents for the attributes specified by the anyAttribute element.
If no processContents attribute is specified, the default is strict. If processContents is specified, it must one of the following.
SourceUri
UnhandledAttributes
XmlSchemaAppInfo class (System.Xml.Schema)
ToString
Description
Class that specifies information to be used by applications within an annotation. Represents the W3C AppInfo element.
XmlSchemaAppInfo
Example Syntax:
ToString
[C#] public XmlSchemaAppInfo( );
[C++] public: XmlSchemaAppIInfo( );
[VB] Public Sub New( )
[JScript] public function XmlSchemaAppInfo( );
    LineNumber
    LinePosition
    Markup
    ToString
Description
Returns an array of XmlNode that represents the document text markup.
    Source
    ToString
[C#] public string Source {get; set;}
[C++] public: _property String* get_Source( );public: _property void set_Source(String*);
[VB] Public Property Source As String
[JScript] public function get Source( ): String;public function set Source(String);
Description
Provides the source of the application information.
The source must be a URI reference. Optional.
    SourceUri
    XmlSchemaAttribute class (System.Xml.Schema)
    ToString
Description
Class for attribute types. Represents the W3C attribute element.
Attribute declarations can be present as child elements of the schema element (having global scope) or within complex type definitions. For complex types, attribute declarations can be present as local declarations or references to attributes with global scope. Both global and local attribute declarations have the optional type attribute that refers to an existing simple type. If the attribute is not used, then the attribute (global or local) must define a local simple type.
    XmlSchemaAttribute
    Example Syntax:
    ToString
[C#] public XmlSchemaAttribute( );
[C++] public: XmlSchemaAttribute( );
[VB] Public Sub New( )
[JScript] public function XmlSchemaAttribute( );
    Annotation
    AttributeType
    ToString
Description
Name of a built-in data type defined in this schema (or another schema indicated by the specified namespace).
The type must be a QName. The type can include a namespace prefix.
    DefaultValue
    ToString
[C#] public string DefaultValue {get; set;}
[C++] public: _property String* get_DefaultValue( ); public: _ property void set_DefaultValue(String*);
[VB] Public Property DefaultValue As String
[JScript] public function get DefaultValue( ): String;public function set DefaultValue(String);
Description
The default value for the attribute.
The fixed and default properties are mutually exclusive.
    FixedValue
    ToString
[C#] public string FixedValue {get; set;}
[C++] public: _property String* get_FixedValue( ); public: _property void set_FixedValue(String*);
[VB] Public Property FixedValue As String
[JScript] public function get FixedValue( ): String;public function set FixedValue(String);
Description
The fixed value for the attribute.
This is a predetermined and unchangeable value.
    Form
    ToString
[C#] public XmlSchemaForm Form {get; set;}
[C++] public: _property XmlSchemaForm get_Form( );public: _property void set_Form(XmlSchemaForm);
[VB] Public Property Form As XmlSchemaForm
[JScript] public function get Form( ): XmlSchemaForm;public function set Form(XmlSchemaForm);
Description
Form for the attribute.
The default value is the value of the attributeFormDefault attribute of the schema element containing the attribute. The value of XmlSchemaForm is defined as one of the following: Enum Description Qualified Attribute is not required to be qualified with the namespace prefix.
    Id
    LineNumber
    LinePosition
    Name
    ToString
Description
Provides the name of the attribute.
The name must be an NCName as defined in the W3C XML Namespaces specification. When a XML document is validated against a schema, each attribute in the document is validated against an attribute element in the schema. The attribute element with a name attribute that matches the local name of the attribute in the document is used to validate that attribute.
QualifiedName
ToString
[C#] public XmlQualifiedName QualifiedName {get;}
[C++] public: _property XmlQualifiedName* get_QualifiedName( );
[VB] Public ReadOnly Property QualifiedName As XmlQualifiedName
[JScript] public function get QualifiedName( ): XmlQualifiedName;
Description
The qualified name for the attribute.
Optional.
RefName
ToString
[C#] public XmlQualifiedName RefName {get; set;}
[C++] public: _property XmlQualifiedName* get_RefName( );public: _property void set_RefName(XmlQualifiedName*);
[VB] Public Property RefName As XmlQualifiedName
[JScript] public function get RefName( ): XmlQualifiedName;public function set RefName(XmlQualifiedName);
Description
Name of an attribute declared (referenced) in this schema (or another schema indicated by the specified namespace).
The RefName must be a QName. The type can include a namespace prefix.
SchemaType
ToString
[C#] public XmlSchemaSimpleType SchemaType {get; set;}
[C++] public: _property XmlSchemaSimpleType* get_SchemaType( );public: _property void set_SchemaType (XmlSchemaSimpleType*);
[VB] Public Property SchemaType As XmlSchemaSimpleType
[JScript] public function get SchemaType( ): XmlSchemaSimpleType;public function set SchemaType(XmlSchemaSimpleType);
Description
Name of a built-in data type or simple type defined in this schema (or another schema indicated by the specified namespace).
The type must be a QName. The type can include a namespace prefix.
SchemaTypeName
ToString
[C#] public XmlQualifiedName SchemaTypeName {get; set;}
[C++] public: _property XmlQualifiedName* get_SchemaTypeName( );public: _property void set_SchemaTypeName(XmlQualifiedName*);
[VB] Public Property SchemaTypeName As XmlQualifiedName
[JScript] public function get SchemaTypeName( ): XmlQualifiedName;public function set SchemaTypeName (XmlQualifiedName);
Description
Name of the simple type defined in this schema (or another schema indicated by the specified namespace).
The type must be a QName. The type can include a namespace prefix.
SourceUri
UnhandledAttributes
Use
ToString
Description
Indicates how the attribute is used.
If specified, this attribute must have one of the following values: Enum Description None Attribute has no value.
XmlSchemaAttributeGroup class (System.Xml.Schema)
ToString
Description
Class for attribute groups. Groups a set of attribute declarations so that they can be incorporated as a group into complex type definitions. Represents the W3C attributeGroup element.
An attribute group can be defined only as a child of the schema element. In this case, the name attribute must be present and contain the attribute, attributeGroup, or anyAttribute elements that make up the attribute group.
XmlSchemaAttributeGroup
Example Syntax:
ToString
[C#] public XmlSchemaAttributeGroup( );
[C++] public: XmlSchemaAttributeGroup( );
[VB] Public Sub New( )
[JScript] public function XmlSchemaAttributeGroup( );
Annotation
AnyAttribute
ToString
Description
Allows an XmlSchemaAnyAttribute class to be used interchangeably for the attribute.
Attributes
ToString
[C#] public XmlSchemaObjectCollection Attributes {get;}
[C++] public: _property XmlSchemaObjectCollection* get_Attributes( );
[VB] Public ReadOnly Property Attributes As XmlSchemaObjectCollection
[JScript] public function get Attributes( ): XmlSchemaObjectCollection;
Description
Collection of attributes for the attribute group. Contains XmlSchemaAttribute and XmlSchemaAttributeGroupRef elements.
Id
LineNumber
LinePosition
Name
ToString
Description
The name of the attribute group.
The name must be an NCName as defined in the XML Namespaces specification. When a complexType or attributeGroup element includes an attribute group, the name of the attributeGroup element is used for the ref attribute. This value must be a NCName.
SourceUri
UnhandledAttributes
XmlSchemaAttributeGroupRef class (System.Xml.Schema)
ToString
Description
Class for attribute group reference. Represents the W3C AttributeGroupRef element.
XmlSchemaAttributeGroupRef must be present if the attribute group includes an attributeGroup or complexType element.
XmlSchemaAttributeGroupRef Example Syntax:
ToString
[C#] public XmlSchemaAttributeGroupRef( );
[C++] public: XmlSchemaAttributeGroupRef( );
[VB] Public Sub New( )
[JScript] public function XmlSchemaAttributeGroupRef( );
   Annotation
   Id
   LineNumber
   LinePosition
   RefName
   ToString
Description
   The referenced name for the AttributeGroupRef element.
   SourceUri
   UnhandledAttributes
   XmlSchemaChoice class (System.Xml.Schema)
   ToString
Description
   Allows only one of its children to appear in an instance. Represents the W3C choice (compositor) element.
   XmlSchemaChoice
   Example Syntax:
   ToString
[C#] public XmlSchemaChoice( );
[C++] public: XmlSchemaChoice( );
[VB] Public Sub New( )
[JScript] public function XmlSchemaChoice( );
   Annotation
   Id
   Items
   ToString
Description
   Collection of the elements contained with the compositor (choice): XmlSchemaElement, XmlSchemaGroupRef, XmlSchemaChoice, XmlSchemaSequence, or XmlSchemaAny.
   LineNumber
   LinePosition
   MaxOccurs
   MaxOccursString
   MinOccurs
   MinOccursString
   SourceUri
   UnhandledAttributes
   XmlSchemaCollection class (System.Xml.Schema)
   ToString
Description
   Contains a cache of XML Schema Definition language (XSD) and XML-Data Reduced Language (XDR) schemas. This class cannot be inherited.
   Schemas are loaded using the System.Xml.Schema.XmlSchemaCollection.Add(System.String,System.String) method, at which time the schema is associated with a namespace URI. For XSD schemas, this will typically be the schema's targetNamespace property.
   XmlSchemaCollection
   Example Syntax:
   ToString
[C#] public XmlSchemaCollection( );
[C++] public: XmlSchemaCollection( );
[VB] Public Sub New( )
[JScript] public function XmlSchemaCollection( ); Initializes a new instance of the XmlSchemaCollection class.
Description
   Initializes a new instance of the XmlSchemaCollection class.
   XmlSchemaCollection
   Example Syntax:
   ToString
[C#] public XmlSchemaCollection(XmlNameTable nametable);
[C++] public: XmlSchemaCollection(XmlNameTable* nametable);
[VB] Public Sub New(ByVal nametable As XmlNameTable)
[JScript] public function XmlSchemaCollection(nametable: XmlNameTable);
Description
   Initializes a new instance of the XmlSchemaCollection class with the specified System.Xml.XmlNameTable. The XmlNameTable is used when loading schemas. The XmlNameTable to use.
   Count
   ToString
[C#] public int Count {get;}
[C++] public: _property int get_Count( );
[VB] Public ReadOnly Property Count As Integer
[JScript] public function get Count( ): int;
Description
   Gets the number of namespaces defined in this collection.
   Item
   ToString
[C#] public XmlSchema this[string ns] {get;}
[C++] public: _property XmlSchema* get_Item(String* ns);
[VB] Public Default ReadOnly Property Item(ByVal ns As String) As XmlSchema
[JScript] returnValue=XmlSchemaCollectionObject.Item (ns);
Description
   Gets the System.Xml.Schema.XmlSchema associated with the given namespace URI. The namespace URI associated with the schema you want to return. This will typically be the targetNamespace of the schema.
   NameTable
   ToString
[C#] public XmlNameTable NameTable {get;}
[C++] public: _property XmlNameTable* get_NameTable( );
[VB] Public ReadOnly Property NameTable As XmlNameTable
[JScript] public function get NameTable( ): XmlNameTable;
Description
   Gets the default XmlNameTable used by the XmlSchemaCollection when loading new schemas.
   ToString
[C#] public event ValidationEventHandler ValidationEventHandler;
[C++] public: _event ValidationEventHandler* ValidationEventHandler;
[VB] Public Event ValidationEventHandler As ValidationEventHandler
Description
   Sets an event handler for receiving information about the XML-Data Reduced Language (XDR) and XML Schema Definition language (XSD) schema validation errors.
   These events occur when the schemas are added to the collection. If an event handler is not provided, an System.Xml.XmlException is thrown on any validation errors where the System.Xml.Schema.ValidationEventArgs.Severity is XmlSeverityType.Error. To specify an event handler, define a callback function and add it to the ValidationEventHandler.
   Add
[C#] public XmlSchema Add(XmlSchema schema);
[C++] public: XmlSchema* Add(XmlSchema* schema);

[VB] Public Function Add(ByVal schema As XmlSchema) As XmlSchema
[JScript] public function Add(schema: XmlSchema): XmlSchema;
Description
Adds the System.Xml.Schema.XmlSchema to the collection.
Return Value: The XmlSchema object.
The targetNamespace attribute is used to identify this schema. The XmlSchema to add to the collection.
Add
[C#] public void Add(XmlSchemaCollection schema);
[C++] public: void Add(XmlSchemaCollection* schema);
[VB] Public Sub Add(ByVal schema As XmlSchemaCollection)
[JScript] public function Add(schema: XmlSchemaCollection);
Description
Adds all the namespaces defined in the given collection (including their associated schemas) to this collection. The XmlSchemaCollection you want to add to this collection.
Add
[C#] public XmlSchema Add(string ns, string uri);
[C++] public: XmlSchema* Add(String* ns, String* uri);
[VB] Public Function Add(ByVal ns As String, ByVal uri As String) As XmlSchema
[JScript] public function Add(ns: String, uri: String): XmlSchema; Adds the given schema into the schema collection.
Description
Adds the schema located by the given URL into the schema collection.
Return Value: The System.Xml.Schema.XmlSchema added to the schema collection.
If ns has already been associated with another schema in the collection, the schema being added replaces the original schema in the collection. For example, in the following C# code, authors.xsd is removed from the collection and names.xsd is added. The namespace URI associated with the schema. For XML Schema Definition language (XSD) schemas, this will typically be the targetNamespace. The URL that specifies the schema to load.
Add
[C#] public XmlSchema Add(string ns, XmlReader reader);
[C++] public: XmlSchema* Add(String* ns, XmlReader* reader);
[VB] Public Function Add(ByVal ns As String, ByVal reader As XmlReader) As XmlSchema
[JScript] public function Add(ns: String, reader: XmlReader): XmlSchema;
Description
Adds the given schema into the schema collection.
Return Value: The System.Xml.Schema.XmlSchema added to the schema collection.
If ns has already been associated with another schema in the collection, the schema being added replaces the original schema in the collection. The namespace URI associated with the schema. For XML Schema Definition language (XSD) schemas, this will typically be the targetNamespace. System.Xml.XmlReader containing the schema to add.
Contains
[C#] public bool Contains(string ns);
[C++] public: bool Contains(String* ns);
[VB] Public Function Contains(ByVal ns As String) As Boolean
[JScript] public function Contains(ns: String): Boolean;
Description
Gets a value indicating whether the specified schema is in the collection.
Return Value: true if the schema is in the collection; otherwise, false. The namespace URI associated with the schema. For XML Schema Definition language (XSD) schemas, this will typically be the target namespace.
Contains
[C#] public bool Contains(XmlSchema schema);
[C++] public: bool Contains(XmlSchema* schema);
[VB] Public Function Contains(ByVal schema As XmlSchema) As Boolean
[JScript] public function Contains(schema: XmlSchema): Boolean; Gets a value indicating whether the specified schema is in the collection.
Description
Gets a value indicating whether the specified System.Xml.Schema.XmlSchema is in the collection.
Return Value: true if the schema is in the collection; otherwise, false. The name of the schema.
CopyTo
[C#] public void CopyTo(XmlSchema[ ] array, int index);
[C++] public: void CopyTo(XmlSchema* array[ ], int index);
[VB] Public Sub CopyTo(ByVal array( ) As XmlSchema, ByVal index As Integer)
[JScript] public function CopyTo(array: XmlSchema[ ], index: int);
Description
Copies all the XmlSchema objects from this collection into the given array starting at the given index. The array to copy the objects to. The index in array where copying will begin.
GetEnumerator
[C#] public XmlSchemaCollectionEnumerator GetEnumerator( );
[C++] public: XmlSchemaCollectionEnumerator* GetEnumerator( );
[VB] Public Function GetEnumerator( ) As XmlSchemaCollectionEnumerator
[JScript] public function GetEnumerator( ): XmlSchemaCollectionEnumerator;
Description
Provides support for the "for each" style iteration over the collection of schemas.
Return Value: An enumerator for iterating over all schemas in the current collection.
ICollection.CopyTo
[C#] void ICollection.CopyTo(Array array, int index);
[C++] void ICollection::CopyTo(Array* array, int index);
[VB] Sub CopyTo(ByVal array As Array, ByVal index As Integer) Implements ICollection.CopyTo
[JScript] function ICollection.CopyTo(array: Array, index: int);
IEnumerable.GetEnumerator
[C#] IEnumerator IEnumerable.GetEnumerator( );
[C++] IEnumerator* IEnumerable::GetEnumerator( );
[VB] Function GetEnumerator( ) As IEnumerator Implements IEnumerable.GetEnumerator
[JScript] function IEnumerable.GetEnumerator( ): IEnumerator;
XmlSchemaCollectionEnumerator class (System.Xml.Schema)
ToString
Description
Supports a simple iteration over a collection. This class cannot be inherited.
Current
ToString

[C#] public XmlSchema Current {get;}
[C++] public: _property XmlSchema* get_Current( );
[VB] Public ReadOnly Property Current As XmlSchema
[JScript] public function get Current( ): XmlSchema;
Description
  Gets the current System.Xml.Schema.XmlSchema in the collection.
  MoveNext
[C#] public bool MoveNext( );
[C++] public: bool MoveNext( );
[VB] Public Function MoveNext( ) As Boolean
[JScript] public function MoveNext( ): Boolean;
Description
  Advances the enumerator to the next schema in the collection.
Return Value: true if the move was successful; false if the enumerator has passed the end of the collection.
  IEnumerator.MoveNext
[C#] bool IEnumerator.MoveNext( );
[C++] bool IEnumerator::MoveNext( );
[VB] Function MoveNext( ) As Boolean Implements IEnumerator.MoveNext
[JScript] function IEnumerator.MoveNext( ): Boolean;
  IEnumerator.Reset
[C#] void IEnumerator.Reset( );
[C++] void IEnumerator::Reset( );
[VB] Sub Reset( ) Implements IEnumerator.Reset
[JScript] function IEnumerator.Reset( );
  XmlSchemaComplexContent class (System.Xml.Schema)
  ToString
Description
  Class that represents complex content model for complex types. Contains extensions or restrictions on a complex type that has mixed content or elements only.
  XmlSchemaComplexContent
  Example Syntax:
  ToString
[C#] public XmlSchemaComplexContent( );
[C++] public: XmlSchemaComplexContent( );
[VB] Public Sub New( )
[JScript] public function XmlSchemaComplexContent( );
  Annotation
  Content
  ToString
Description
  One of either the XmlSchemaComplexContentRestriction or XmlSchemaComplexContentExtension classes.
  Id
  IsMixed
  ToString
Description
  Indicates that this type has a mixed content model. Character data is allowed to appear between the child elements of the complex type.
  This mixed attribute can override the mixed attribute value on the containing complexType element. The default is false.
  LineNumber
  LinePosition
  SourceUri
  UnhandledAttributes
  XmlSchemaComplexContentExtension class (System.Xml.Schema)
  ToString
Description
  Class for complex types with a simple content model that is extended by extension.

XmlSchemaComplexContentExtension
  Example Syntax:
  ToString
[C#] public XmlSchemaComplexContentExtension( );
[C++] public: XmlSchemaComplexContentExtension( );
[VB] Public Sub New( )
[JScript] public function XmlSchemaComplexContentExtension( );
  Annotation
  AnyAttribute
  ToString
Description
  Allows an XmlSchemaAnyAttribute class to be used for the attribute value.
  Attributes
  ToString
[C#] public XmlSchemaObjectCollection Attributes {get;}
[C++] public: _property XmlSchemaObjectCollection* get_Attributes( );
[VB] Public ReadOnly Property Attributes As XmlSchemaObjectCollection
[JScript] public function get Attributes( ): XmlSchemaObjectCollection;
Description
  Contains XmlSchemaAttribute and XmlSchemaAttributeGroupRef classes. Collection of attributes for the complexType element.
  BaseTypeName
  ToString
[C#] public XmlQualifiedName BaseTypeName {get; set;}
[C++] public: _property XmlQualifiedName* get_BaseTypeName( );public: _property void set_BaseTypeName(XmlQualifiedName*);
[VB] Public Property BaseTypeName As XmlQualifiedName
[JScript] public function get BaseTypeName( ): XmlQualifiedName;public function set BaseTypeName(XmlQualifiedName);
Description
  Name of a built-in data type, simple type, or complex type. This complexType is derived from the type specified by the base value.
  The base value must be a QName.
  Id
  LineNumber
  LinePosition
  Particle
  ToString
Description
  One of the XmlSchemaGroupRef, XmlSchemaChoice, XmlSchemaAll, or XmlSchemaSequence classes.
  SourceUri
  UnhandledAttributes
  XmlSchemaComplexContentRestriction class (System.Xml.Schema)
  ToString
Description
  Class for complex types with complex content model that are extended by restriction. Restricts the contents of the complexType element to a subset of the inherited complexType element.
  XmlSchemaComplexContentRestriction
  Example Syntax:
  ToString
[C#] public XmlSchemaComplexContentRestriction( );
[C++] public: XmlSchemaComplexContentRestriction( );
[VB] Public Sub New( )

[JScript] public function XmlSchemaComplexContentRestriction( );
   Annotation
   AnyAttribute
   ToString
Description
   Allows an XmlSchemaAnyAttribute to be used for the attribute.
   Attributes
   ToString
[C#] public XmlSchemaObjectCollection Attributes {get;}
[C++] public: _property XmlSchemaObjectCollection* get_Attributes( );
[VB] Public ReadOnly Property Attributes As XmlSchemaObjectCollection
[JScript] public function get Attributes( ): XmlSchemaObjectCollection;
Description
   Contains XmlSchemaAttribute and XmlSchemaAttributeGroupRef classes. Collection of attributes for the complex type.
   BaseTypeName
   ToString
[C#] public XmlQualifiedName BaseTypeName {get; set;}
[C++] public: _property XmlQualifiedName* get_BaseTypeName( );public: _property void set_BaseTypeName (XmlQualifiedName*);
[VB] Public Property BaseTypeName As XmlQualifiedName
[JScript] public function get BaseTypeName( ): XmlQualifiedName;public function set BaseTypeName(XmlQualifiedName);
Description
   Name of a built-in data type, simple type, or complex type. The complex type is derived from the type specified by the base value.
   The base value must be a QName.
   Id
   LineNumber
   LinePosition
   Particle
   ToString
Description
   One of the XmlSchemaGroupRef, XmlSchemaChoice, XmlSchemaAll, or XmlSchemaSequence classes.
   SourceUri
   UnhandledAttributes
   XmlSchemaComplexType class (System.Xml.Schema)
   ToString
Description
   Class for complex types. Defines a complex type that determines the set of attributes and content of an element.
   An element can reference a simple type in the type attribute. A complex type is essentially a type definition for elements. An element can be declared with a type attribute that refers to a complexType element that defines the structure, content, and attributes of that element. An element can also take a reference to a simpleType element in its type attribute.
   XmlSchemaComplexType
   Example Syntax:
   ToString
[C#] public XmlSchemaComplexType( );
[C++] public: XmlSchemaComplexType( );
[VB] Public Sub New( )
[JScript] public function XmlSchemaComplexType( );
Description
   Used to create a complexType element.
   Annotation
   AnyAttribute
   ToString
Description
   Complex type can contain any attributes from the specified namespace(s).
   Attributes
   ToString
[C#] public XmlSchemaObjectCollection Attributes {get;}
[C++] public: _property XmlSchemaObjectCollection* get_Attributes( );
[VB] Public ReadOnly Property Attributes As XmlSchemaObjectCollection
[JScript] public function get Attributes( ): XmlSchemaObjectCollection;
Description
   Collection of attributes for the complex type. Contains XmlSchemaAttribute and XmlSchemaAttributeGroupRef classes.
   If the group, sequence, choice, or all element is specified as the child element, these are the attributes for the complex type.
   AttributeUses
   ToString
[C#] public XmlSchemaObjectTable AttributeUses {get;}
[C++] public: _property XmlSchemaObjectTable* get_AttributeUses( );
[VB] Public ReadOnly Property AttributeUses As XmlSchemaObjectTable
[JScript] public function get AttributeUses( ): XmlSchemaObjectTable;
Description
   Uses all the attributes from this complex type and its base derived types.
   For example, a combination of all the attributes from the Attributes property from each type.
   AttributeWildcard
   ToString
[C#] public XmlSchemaAnyAttribute AttributeWildcard {get;}
[C++] public: _property XmlSchemaAnyAttribute* get_AttributeWildcard( );
[VB] Public ReadOnly Property AttributeWildcard As XmlSchemaAnyAttribute
[JScript] public function get AttributeWildcard( ): XmlSchemaAnyAttribute;
Description
   The anyAttribute element from this complex type and its base derived types.
   For example, anyAttribute from the base a nyAttribute property.
   BaseSchemaType
   Block
   ToString
Description
   Indicates the type of derivation. The block attribute prevents a complex type that has the specified type of derivation from being used in place of this complex type.
   The value can contain all or a list that is a subset of extension/restriction.
   BlockResolved
   ToString
[C#] public XmlSchemaDerivationMethod BlockResolved {get;}
[C++] public: _property XmlSchemaDerivationMethod get_BlockResolved( );

[VB] Public ReadOnly Property BlockResolved As XmlSchemaDerivationMethod
[JScript] public function get BlockResolved( ): XmlSchema-DerivationMethod;
Description
The value after an element has been compiled to post-schema infoset. This value indicates how the type is enforced when xsi:type is used in the instance document.
This value is either from the type itself or, if the type is not defined, the type is taken from the schema element. For example, if the value is restricted, only the specifically defined type can be used, not types derived from the specifically defined type.
    ContentModel
    ToString
[C#] public XmlSchemaContentModel ContentModel {get; set;}
[C++] public: _property XmlSchemaContentModel* get_ContentModel( );public: _property void set_ContentModel (XmlSchemaContentModel*);
[VB] Public Property ContentModel As XmlSchemaContentModel
[JScript] public function get ContentModel( ): XmlSchema-ContentModel;public function set ContentModel(XmlSchemaContentModel);
Description
Indicates the content model type. One of the XmlSchemaSimpleContent or XmlSchemaComplexContent classes.
This is mutually exclusive with the System.Xml.Schema. Particle property.
    ContentType
    ToString
[C#] public XmlSchemaContentType ContentType {get;}
[C++] public: _property XmlSchemaContentType get_ContentType( );
[VB] Public ReadOnly Property ContentType As XmlSchemaContentType
[JScript] public function get ContentType( ): XmlSchema-ContentType;
Description
The content model of the complex type.
This is the content in the post-schema Infoset.
    ContentTypeParticle
    ToString
[C#] public XmlSchemaParticle ContentTypeParticle {get;}
[C++] public: _property XmlSchemaParticle* get_ContentTypeParticle( );
[VB] Public ReadOnly Property ContentTypeParticle As XmlSchemaParticle
[JScript] public function get ContentTypeParticle( ): XmlSchemaParticle;
Description
The particle that is determined after the content models of the most derived types and the base complex type have been resolved according to the rules defined in the W3C XML Schema Definition language (XSD) specification.
    Datatype
    DerivedBy
    Final
    FinalResolved
    Id
    IsAbstract
    ToString
Description
Indicates if the complexType element can be used in the instance document.

If true, an element cannot use this complexType element directly and must use a complex type that is derived from this complexType element. The default is false
    IsMixed
    ToString
[C#] public override bool IsMixed {get; set;}
[C++] public: _property virtual bool get_IsMixed( );public: _property virtual void set_IsMixed(bool);
[VB] Overrides Public Property IsMixed As Boolean
[JScript] public function get IsMixed( ): Boolean;public function set IsMixed(Boolean);
Description
Indicates that this type has a mixed content model (markup within the content).
Indicates if character data can appear between the child elements of this complexType. If the simpleContent element is a child element, the mixed attribute is not allowed (false). If the complexContent element is a child element, the mixed attribute can be overriden by the mixed attribute on the complexContent element.
    LineNumber
    LinePosition
    Name
    Particle
    ToString
Description
Indicates the compositor type as one of the XmlSchemaGroupRef, XmlSchemaChoice, XmlSchemaAll, or XmlSchemaSequence classes.
Particles must be one of the following compositors: Element Description group The complex type contains the elements defined in the referenced group.
    QualifiedName
    SourceUri
    UnhandledAttributes
    XmlSchemaContent class (System.Xml.Schema)
    ToString
Description
An abstract class for schema content.
XmlSchemaContent
Example Syntax:
ToString
[C#] protected XmlSchemaContent( );
[C++] protected: XmlSchemaContent( );
[VB] Protected Sub New( )
[JScript] protected function XmlSchemaContent( );
    Annotation
    Id
    LineNumber
    LinePosition
    SourceUri
    UnhandledAttributes
    XmlSchemaContentModel class (System.Xml.Schema)
    ToString
Description
An abstract class for the schema content model.
XmlSchemaContentModel
Example Syntax:
ToString
[C#] protected XmlSchemaContentModel( );
[C++] protected: XmlSchemaContentModel( );
[VB] Protected Sub New( )
[JScript] protected function XmlSchemaContentModel( );
    Annotation
    Content
    ToString Description
   Provides the content of the type.
   Id
   LineNumber
   LinePosition
   SourceUri
   UnhandledAttributes
   XmlSchemaContentProcessing enumeration (System.Xml.Schema)
   ToString
Description
   Provides information about the constraints placed on the replacement elements.
   ToString
[C#] public const XmlSchemaContentProcessing Lax;
[C++] public: const XmlSchemaContentProcessing Lax;
[VB] Public Const Lax As XmlSchemaContentProcessing
[JScript] public var Lax: XmlSchemaContentProcessing;
Description
   Lax. The document should recognize element types but can ignore element types that it does not recognize.
   ToString
[C#] public const XmlSchemaContentProcessing None;
[C++] public: const XmlSchemaContentProcessing None;
[VB] Public Const None As XmlSchemaContentProcessing
[JScript] public var None: XmlSchemaContentProcessing;
Description
   ToString
[C#] public const XmlSchemaContentProcessing Skip;
[C++] public: const XmlSchemaContentProcessing Skip;
[VB] Public Const Skip As XmlSchemaContentProcessing
[JScript] public var Skip: XmlSchemaContentProcessing;
Description
   Skip. The document must consist of well-formed XML and is not validated by the schema.
   ToString
[C#] public const XmlSchemaContentProcessing Strict;
[C++] public: const XmlSchemaContentProcessing Strict;
[VB] Public Const Strict As XmlSchemaContentProcessing
[JScript] public var Strict: XmlSchemaContentProcessing;
Description
   Strict. The document must be schema-valid based on the schema definition derived from the namespace-qualified element name.
   XmlSchemaContentType enumeration (System.Xml.Schema)
   ToString
Description
   Enumerations for the content model of the complex type. This represents the content in the post-schema infoset.
   If the IsMixed property is set to True on the ContentModel property that has the type XmlSchemaComplexContent, the value returned here is Mixed. If the IsMixed property is False, the value is either Empty or ElementOnly.
   ToString
[C#] public const XmlSchemaContentType ElementOnly;
[C++] public: const XmlSchemaContentType ElementOnly;
[VB] Public Const ElementOnly As XmlSchemaContentType
[JScript] public var ElementOnly: XmlSchemaContentType;
Description
   Element only content.
   ToString
[C#] public const XmlSchemaContentType Empty;
[C++] public: const XmlSchemaContentType Empty;
[VB] Public Const Empty As XmlSchemaContentType
[JScript] public var Empty: XmlSchemaContentType;
Description
   Empty content.
   ToString
[C#] public const XmlSchemaContentType Mixed;
[C++] public: const XmlSchemaContentType Mixed;
[VB] Public Const Mixed As XmlSchemaContentType
[JScript] public var Mixed: XmlSchemaContentType;
Description
   Mixed content.
   ToString
[C#] public const XmlSchemaContentType TextOnly;
[C++] public: const XmlSchemaContentType TextOnly;
[VB] Public Const TextOnly As XmlSchemaContentType
[JScript] public var TextOnly: XmlSchemaContentType;
Description
   Text only content.
   XmlSchemaDatatype class (System.Xml.Schema)
   ToString
Description
   Represents the abstract class for mapping XML Schema Definition language (XSD) and common language runtime types.
   XmlSchemaDatatype
   Example Syntax:
   ToString
[C#] protected XmlSchemaDatatype( );
[C++] protected: XmlSchemaDatatype( );
[VB] Protected Sub New( )
[JScript] protected function XmlSchemaDatatype( );
   TokenizedType
   ToString
[C#] public abstract XmlTokenizedType TokenizedType {get;}
[C++] public: _property virtual XmlTokenizedType get_TokenizedType( )=0;
[VB] MustOverride Public ReadOnly Property TokenizedType As XmlTokenizedType
[JScript] public abstract function get TokenizedType( ): XmlTokenizedType;
Description
   Represents the type for the string as specified in the XML 1.0 specification.
   This allows the string to be read as a particular XML type, for example, a CDATA section type.
   ValueType
   ToString
[C#] public abstract Type ValueType {get;}
[C++] public: _property virtual Type* get_ValueType( )=0;
[VB] MustOverride Public ReadOnly Property ValueType As Type
[JScript] public abstract function get ValueType( ): Type;
Description
   Returns the common language runtime type for the specified XML Schema Definition language (XSD) type.
   The table maps the XSD and common language runtime types.
   ParseValue
[C#] public abstract object ParseValue(string s, XmlNameTable nameTable, XmlNamespaceManager nsmgr);
[C++] public: virtual Object* ParseValue(String* s, XmlNameTable* nameTable, XmlNamespaceManager* nsmgr)=0;
[VB] MustOverride Public Function ParseValue(ByVal s As String, ByVal nameTable As XmlNameTable, ByVal nsmgr As XmlNamespaceManager) As Object
[JScript] public abstract function ParseValue(s: String, nameTable: XmlNameTable, nsmgr: XmlNamespaceManager): Object;

Description
   Parses values from the XmlNameTable. string Xml-NameTableXmlNamespaceManager
   XmlSchemaDerivationMethod enumeration (System.Xml.Schema)
   ToString
Description
   Prevents derivations by restriction from replacing the complex type in an instance.
   XmlSchemaBlock does not prevent the replacement of complex types that are derived by extension.
   ToString
[C#] public const XmlSchemaDerivationMethod All;
[C++] public: const XmlSchemaDerivationMethod All;
[VB] Public Const All As XmlSchemaDerivationMethod
[JScript] public var All: XmlSchemaDerivationMethod;
Description
   No restrictions on derivations from this type.
   ToString
[C#] public const XmlSchemaDerivationMethod Empty;
[C++] public: const XmlSchemaDerivationMethod Empty;
[VB] Public Const Empty As XmlSchemaDerivationMethod
[JScript] public var Empty: XmlSchemaDerivationMethod;
Description
   Sets a derived setting to an empty string that allows any extension or restriction regardless of the schema element's default setting.
   ToString
[C#] public const XmlSchemaDerivationMethod Extension;
[C++] public: const XmlSchemaDerivationMethod Extension;
[VB] Public Const Extension As XmlSchemaDerivationMethod
[JScript] public var Extension: XmlSchemaDerivationMethod;
Description
   Can only be derived by Extension.
   ToString
[C#] public const XmlSchemaDerivationMethod List;
[C++] public: const XmlSchemaDerivationMethod List;
[VB] Public Const List As XmlSchemaDerivationMethod
[JScript] public var List: XmlSchemaDerivationMethod;
Description
   Can only be derived by List.
   ToString
[C#] public const XmlSchemaDerivationMethod None;
[C++] public: const XmlSchemaDerivationMethod None;
[VB] Public Const None As XmlSchemaDerivationMethod
[JScript] public var None: XmlSchemaDerivationMethod;
Description
   The normal default setting that can be overridden by the schema element's default setting.
   ToString
[C#] public const XmlSchemaDerivationMethod Restriction;
[C++] public: const XmlSchemaDerivationMethod Restriction;
[VB] Public Const Restriction As XmlSchemaDerivationMethod
[JScript] public var Restriction: XmlSchemaDerivationMethod;
Description
   Can only be derived by Restriction.
   ToString
[C#] public const XmlSchemaDerivationMethod Substitution;
[C++] public: const XmSSchemaDerivationMethod Substitution;
[VB] Public Const Substitution As XmlSchemaDerivationMethod
[JScript] public var Substitution: XmlSchemaDerivationMethod;
Description
   Can only be derived by Substitution.
   ToString
[C#] public const XmlSchemaDerivationMethod Union;
[C++] public: const XmlSchemaDerivationMethod Union;
[VB] Public Const Union As XmlSchemaDerivationMethod
[JScript] public var Union: XmlSchemaDerivationMethod;
Description
   Can only be derived by Union.
   XmlSchemaDocumentation class (System.Xml.Schema)
   ToString
Description
   Class that specifies information to be read or used by humans within an annotation. Represents the W3C documentation element.
   Information supplied within the XmlSchemaDocumentation class is not used in validation. However, it provides a standardized way to supply information that can be retrieved by tools.
   XmlSchemaDocumentation
   Example Syntax:
   ToString
[C#] public XmlSchemaDocumentation( );
[C++] public: XmlSchemaDocumentation( );
[VB] Public Sub New( )
[JScript] public function XmlSchemaDocumentation( );
   Language
   ToString
[C#] public string Language {get; set;}
[C++] public: _property String* get_Language( );public: _property void set_Language(String*);
[VB] Public Property Language As String
[JScript] public function get Language( ): String;public function set Language(String);
Description
   Provides the xml:lang attribute.
   LineNumber
   LinePosition
   Markup
   ToString
Description
   Returns an array of XmlNodes that represents the document text markup.
   Source
   ToString
[C#] public string Source {get; set;}
[C++] public: _property String* get_Source( );public: _property void set_Source(String*);
[VB] Public Property Source As String
[JScript] public function get Source( ): String;public function set Source(String);
Description
   Provides the URI source of the application information.
   Source must be a URI reference.
   SourceUri
   XmlSchemaElement class (System.Xml.Schema)
   ToString
Description
   Class for elements.
   XmlSchemaElement
   Example Syntax:
   ToString

[C#] public XmlSchemaElement( );
[C++] public: XmlSchemaElement( );
[VB] Public Sub New( )
[JScript] public function XmlSchemaElement( );
  Annotation
  Block
  ToString
Description
  Attribute used to block a type derivation.
  This attribute can contain the following values: Enum Description None The normal default block setting can be overridden by the schema element blockDefault setting.
  BlockResolved
  ToString
[C#] public XmlSchemaDerivationMethod BlockResolved {get;}
[C++] public: _property XmlSchemaDerivationMethod get_BlockResolved( );
[VB] Public ReadOnly Property BlockResolved As XmlSchemaDerivationMethod
[JScript] public function get BlockResolved( ): XmlSchemaDerivationMethod;
Description
  The value after an element has been compiled to post-schema infoset. This value is either from the type itself or, if not defined on the type, taken from the schema element.
  This value indicates how the type is enforced when xsi:type is used in the instance document. For example, if the value is restricted, then only the specific defined type can be used, not types derived from the specific defined type.
  Constraints
  ToString
[C#] public XmlSchemaObjectCollection Constraints {get;}
[C++] public: _property XmlSchemaObjectCollection* get_Constraints( );
[VB] Public ReadOnly Property Constraints As XmlSchemaObjectCollection
[JScript] public function get Constraints( ): XmlSchemaObjectCollection;
Description
  Returns a collection of constraints on the element.
  Returns a collection of constraints on the element. Can be any of XmlSchemaKey, XmlSchemaKeyref, or XmlSchemaUnique.
  DefaultValue
  ToString
[C#] public string DefaultValue {get; set;}
[C++] public: _property String* get_DefaultValue( ); public: _ property void set_DefaultValue(String*);
[VB] Public Property DefaultValue As String
[JScript] public function get DefaultValue( ): String;public function set DefaultValue(String);
Description
  Provides the default value of the element if its content is a simple type or the element's content is textOnly.
  The fixed and default attributes are mutually exclusive. If the element contains a simple type, this value must be a valid value of that type.
  ElementType
  ToString
[C#] public object ElementType {get;}
[C++] public: _property Object* get_ElementType( );
[VB] Public ReadOnly Property ElementType As Object
[JScript] public function get ElementType( ): Object;
Description
  Returns the correct common runtime library object based upon the SchemaType for the element.
  Final
  ToString
[C#] public XmlSchemaDerivationMethod Final {get; set;}
[C++] public: _property XmlSchemaDerivationMethod get_Final( );public: _property void set_Final(XmlSchemaDerivationMethod);
[VB] Public Property Final As XmlSchemaDerivationMethod
[JScript] public function get Final( ): XmlSchemaDerivationMethod;public function set Final(XmlSchemaDerivationMethod);
Description
  Indicates that no further derivations are allowed.
  This attribute can contain the following values: Enum Description None The normal default final setting can be overridden by the schema element finalDefault setting.
  FinalResolved
  ToString
[C#] public XmlSchemaDerivationMethod FinalResolved {get;}
[C++] public: _property XmlSchemaDerivationMethod get_FinalResolved( );
[VB] Public ReadOnly Property FinalResolved As XmlSchemaDerivationMethod
[JScript] public function get FinalResolved( ): XmlSchemaDerivationMethod;
Description
  The value after an element has been compiled to post-schema infoset. This value is either from the type itself or, if not defined on the type, taken from the schema element.
  This value indicates how the type is restricted when the type is extended through restriction. If the type is marked as final, then this type cannot be extended.
  FixedValue
  ToString
[C#] public string FixedValue {get; set;}
[C++] public: _property String* get_FixedValue( );public: _property void set_FixedValue(String*);
[VB] Public Property FixedValue As String
[JScript] public function get FixedValue( ): String;public function set FixedValue(String);
Description
  Provides the fixed value.
  If the content is a simple type or its content is textOnly, then the value is predetermined and cannot change its value. The fixed and default attributes are mutually exclusive.
  Form
  ToString
[C#] public XmlSchemaForm Form {get; set;}
[C++] public: _property XmlSchemaForm get_Form( );public: _property void set_Form(XmlSchemaForm);
[VB] Public Property Form As XmlSchemaForm
[JScript] public function get Form( ): XmlSchemaForm;public function set Form(XmlSchemaForm);
Description
  Form for the element.
  The default value is the value of the elementFormDefault attribute for the schema element containing the attribute. The default is Unqualified.
  Id
  IsAbstract
  ToString
Description
  Indicates abstract type. Indicates whether the element can be used in an instance document.

If this value is true, the element cannot appear in the instance document. The default is false.
    IsNillable
    ToString
[C#] public bool IsNillable {get; set;}
[C++] public: _property bool get_IsNillable( );public: _property void set_IsNillable(bool);
[VB] Public Property IsNillable As Boolean
[JScript] public function get IsNillable( ): Boolean;public function set IsNillable(Boolean);
Description
    Indicates that xsi:null can occur in the instance data. Indicates if an explicit null value can be assigned to the element.
    This applies to element content and not the attributes of the element. The default is false.
    LineNumber
    LinePosition
    MaxOccurs
    MaxOccursString
    MinOccurs
    MinOccursString
    Name
    ToString
Description
    Provides the name of the element.
    The name must be an NCName as defined in the XML Namespaces specification.
    QualifiedName
    ToString
[C#] public XmlQualifiedName QualifiedName {get;}
[C++] public: _property XmlQualifiedName* get_QualifiedName( );
[VB] Public ReadOnly Property QualifiedName As XmlQualifiedName
[JScript] public function get QualifiedName( ): XmlQualifiedName;
Description
    Returns the qualified name of the element. Name of the a simpleType or complexType element defined in this schema (or another schema indicated by the specified namespace).
    RefName
    ToString
[C#] public XmlQualifiedName RefName {get; set;}
[C++] public: _property XmlQualifiedName* get_RefName( );public: _property void set_RefName(XmlQualifiedName*);
[VB] Public Property RefName As XmlQualifiedName
[JScript] public function get RefName( ): XmlQualifiedName;public function set RefName(XmlQualifiedName);
Description
    Provides the reference name of an element declared in this schema (or another schema indicated by the specified namespace).
    The RefName must be a QName. The RefName can include a namespace prefix. The type and refName attributes are mutually exclusive. To declare an element using an existing element definition, use the RefName attribute to specify the existing element definition.
    SchemaType
    ToString
[C#] public XmlSchemaType SchemaType {get; set;}
[C++] public: _property XmlSchemaType* get_SchemaType( );public: _property void set_SchemaType(XmlSchemaType*);
[VB] Public Property SchemaType As XmlSchemaType
[JScript] public function get SchemaType( ): XmlSchemaType;public function set SchemaType(XmlSchemaType);

Description
    Returns the type of the element. This can either be a complex type or a simple type.
    The SchemaType and RefName attributes are mutually exclusive. To declare an element using an existing simpleType or complexType definition, use the type attribute to specify the existing type.
    SchemaTypeName
    ToString
[C#] public XmlQualifiedName SchemaTypeName {get; set;}
[C++] public: _property XmlQualifiedName* get_SchemaTypeName( );public: _property void set_SchemaTypeName(XmlQualifiedName*);
[VB] Public Property SchemaTypeName As XmlQualifiedName
[JScript] public function get SchemaTypeName( ): XmlQualifiedName;public function set SchemaTypeName(XmlQualifiedName);
Description
    Name of a built-in data type defined in this schema or another schema indicated by the specified namespace.
    SourceUri
    SubstitutionGroup
    ToString
Description
    Name of an element that can be a substitute for this element.
    This element must have the same type or a type derived from the type of the specified element. This value must be a QName.
    UnhandledAttributes
    XmlSchemaEnumerationFacet class (System.Xml.Schema)
    ToString
Description
    Class for defining enumeration facets.
    XmlSchemaEnumerationFacet
    Example Syntax:
    ToString
[C#] public XmlSchemaEnumerationFacet( );
[C++] public: XmlSchemaEnumerationFacet( );
[VB] Public Sub New( )
[JScript] public function XmlSchemaEnumerationFacet( );
    Annotation
    Id
    IsFixed
    LineNumber
    LinePosition
    SourceUri
    UnhandledAttributes
    Value
    XmlSchemaException class (System.Xml.Schema)
    ToString
Description
    Returns detailed information about the schema exception.
    XmlSchemaException
    Example Syntax:
    ToString
[C#] protected XmlSchemaException(SerializationInfo info, StreamingContext context);
[C++] protected: XmlSchemaException(SerializationInfo* info, StreamingContext context);
[VB] Protected Sub New(ByVal info As SerializationInfo, ByVal context As StreamingContext)
[JScript] protected function XmlSchemaException(info: SerializationInfo, context: StreamingContext); Streams all the XmlSchemaException properties into the Serialization-Info class for the given StreamingContext.
Description
  Constructs a new XmlSchemaException object with the given SerializationInfo and StreamingContext information that contains all the properties of the XmlSchemaException.
  XmlSchemaException
  Example Syntax:
  ToString
[C#] public XmlSchemaException(string message, Exception innerException);
[C++] public: XmlSchemaException(String* message, Exception* innerException);
[VB] Public Sub New(ByVal message As String, ByVal innerException As Exception)
[JScript] public function XmlSchemaException(message: String, innerException: Exception);
Description
  The formatted error message describing the error code.
  HelpLink
  HResult
  InnerException
  LineNumber
  ToString
Description
  Gets the line number indicating where the error occurred.
  LinePosition
  ToString
[C#] public int LinePosition {get;}
[C++] public: _property int get_LinePosition( );
[VB] Public ReadOnly Property LinePosition As Integer
[JScript] public function get LinePosition( ): int;
Description
  Gets the line position indicating where the error occurred.
  Message
  ToString
[C#] public override string Message {get;}
[C++] public: _property virtual String* get_Message( );
[VB] Overrides Public ReadOnly Property Message As String
[JScript] public function get Message( ): String;
Description
  Gets the formatted error message describing the System.Xml.Schema.XmlSchemaException.ErrorCode.
  Source
  SourceSchemaObject
  ToString
Description
  The XmlSchemaObject that produced the XmlSchemaException.
  This can be queried for the LineNumber, LinePosition, and SourceUri of the XML Schema Definition language (XSD) schema file. A return value of nill indicates a syntactic parsing validation error in the Schema Object Model (SOM).
  SourceUri
  ToString
[C#] public string SourceUri {get;}
[C++] public: _property String* get_SourceUri( );
[VB] Public ReadOnly Property SourceUri As String
[JScript] public function get SourceUri( ): String;
Description
  The location of the file used to load the schema.
  StackTrace
  TargetSite
  GetObjectData
[C#] public override void GetObjectData(SerializationInfo info, StreamingContext context);
[C++] public: void GetObjectData(SerializationInfo* info, StreamingContext context);
[VB] Overrides Public Sub GetObjectData(ByVal info As SerializationInfo, ByVal context As StreamingContext)
[JScript] public override function GetObjectData(info: SerializationInfo, context: StreamingContext);
Description
  Streams all the XmlSchemaException properties into the SerializationInfo class for the given StreamingContext.
  XmlSchemaExternal class (System.Xml.Schema)
  ToString
Description
  An abstract class. Provides information about the included schema.
  XmlSchemaExternal
  Example Syntax:
  ToString
[C#] protected XmlSchemaExternal( );
[C++] protected: XmlSchemaExternal( );
[VB] Protected Sub New( )
[JScript] protected function XmlSchemaExternal( );
  Annotation
  Id
  LineNumber
  LinePosition
  Schema
  ToString
Description
  Returns the XmlSchema for the referenced schema.
  SchemaLocation
  ToString
[C#] public string SchemaLocation {get; set;}
[C++] public: _property String* get_SchemaLocation( );public: _property void set_SchemaLocation (String*);
[VB] Public Property SchemaLocation As String
[JScript] public function get SchemaLocation( ): String;public function set SchemaLocation(String);
Description
  Provides the URI location for the schema, which tells the schema processor where the schema physically resides.
  Imported schemas that do not have this attribute allow the imported schema's namespace to be determined by the XML document that is an instance of the containing schema or the application that is processing the schema.
  SourceUri
  UnhandledAttributes
  XmlSchemaFacet class (System.Xml.Schema)
  ToString
Description
  Abstract class for all facets that are used when simple types are extended by restriction.
  A facet is defined as an element. Each facet element has a fixed attribute that is a Boolean value.
  XmlSchemaFacet
  Example Syntax:
  ToString
[C#] protected XmlSchemaFacet( );
[C++] protected: XmlSchemaFacet( );
[VB] Protected Sub New( )
[JScript] protected function XmlSchemaFacet( );
  Annotation
  Id
  IsFixed
  ToString
Description
  Indicates that this facet is fixed.
  If True, value is fixed. If False, value is not fixed.

LineNumber
LinePosition
SourceUri
UnhandledAttributes
Value
ToString
Description
  Provides the value attribute of the facet.
  XmlSchemaForm enumeration (System.Xml.Schema)
  ToString
Description
  Indicates if form is qualified or unqualified.
  ToString
[C#] public const XmlSchemaForm None;
[C++] public: const XmlSchemaForm None;
[VB] Public Const None As XmlSchemaForm
[JScript] public var None: XmlSchemaForm;
Description
  Attribute can be qualified with the namespace prefix.
  ToString
[C#] public const XmlSchemaForm Qualified;
[C++] public: const XmlSchemaForm Qualified;
[VB] Public Const Qualified As XmlSchemaForm
[JScript] public var Qualified: XmlSchemaForm;
Description
  Attribute is not required to be qualified with the namespace prefix.
  ToString
[C#] public const XmlSchemaForm Unqualified;
[C++] public: const XmlSchemaForm Unqualified;
[VB] Public Const Unqualified As XmlSchemaForm
[JScript] public var Unqualified: XmlSchemaForm;
Description
  Attribute must be qualified with the namespace prefix.
  XmlSchemaFractionDigitsFacet class (System.Xml.Schema)
  ToString
Description
  Class for defining fractionDigits facets.
  XmlSchemaFractionDigitsFacet
  Example Syntax:
  ToString
[C#] public XmlSchemaFractionDigitsFacet( );
[C++] public: XmlSchemaFractionDigitsFacet( );
[VB] Public Sub New( )
[JScript] public function XmlSchemaFractionDigitsFacet( );
  Annotation
  Id
  IsFixed
  LineNumber
  LinePosition
  SourceUri
  UnhandledAttributes
  Value
  XmlSchemaGroup class (System.Xml.Schema)
  ToString
Description
  Class that defines groups at the schema level that are referenced from the complex types. Groups a set of element declarations so that they can be incorporated as a group into complex type definitions.
  XmlSchemaGroup
  Example Syntax:
  ToString
[C#] public XmlSchemaGroup( );
[C++] public: XmlSchemaGroup( );
[VB] Public Sub New( )
[JScript] public function XmlSchemaGroup( );
  Annotation
  Id
  LineNumber
  LinePosition
  Name
  ToString
Description
  Provides the name of the schema group.
  The name must be an NCName as defined in the XML Namespaces specification.
  Particle
  ToString
[C#] public XmlSchemaGroupBase Particle {get; set;}
[C++] public: _property XmlSchemaGroupBase* get_Particle( );public: _property void set_Particle(XmlSchemaGroupBase*);
[VB] Public Property Particle As XmlSchemaGroupBase
[JScript] public function get Particle( ): XmlSchemaGroupBase;public function set Particle(XmlSchemaGroupBase);
Description
  One of XmlSchemaChoice, XmlSchemaAll, or XmlSchemaSequence classes.
  SourceUri
  UnhandledAttributes
  XmlSchemaGroupBase class (System.Xml.Schema)
  ToString
Description
  An abstract class for XmlSchemaChoice, XmlSchemaAll, or XmlSchemaSequence.
  XmlSchemaGroupBase
  Example Syntax:
  ToString
[C#] protected XmlSchemaGroupBase( );
[C++] protected: XmlSchemaGroupBase( );
[VB] Protected Sub New( )
[JScript] protected function XmlSchemaGroupBase( );
  Annotation
  Id
  Items
  ToString
Description
  This collection is used to add new element types at the schema level.
  LineNumber
  LinePosition
  MaxOccurs
  MaxOccursString
  MinOccurs
  MinOccursString
  SourceUri
  UnhandledAttributes
  XmlSchemaGroupRef class (System.Xml.Schema)
  ToString
Description
  Class that defines groups at the schema level that are referenced from complex types. Groups a set of element declarations so that they can be incorporated as a group into complex type definitions.
  XmlSchemaGroupRef
  Example Syntax:
  ToString
[C#] public XmlSchemaGroupRef( );
[C++] public: XmlSchemaGroupRef( );
[VB] Public Sub New( )
[JScript] public function XmlSchemaGroupRef( );

Annotation
Id
LineNumber
LinePosition
MaxOccurs
MaxOccursString
MinOccurs
MinOccurs String
Particle
ToString
Description
RefName
ToString
[C#] public XmlQualifiedName RefName {get; set;}
[C++] public: _property XmlQualifiedName* get_Ref Name( );public: _property void set_RefName(XmlQualifiedName*);
[VB] Public Property RefName As XmlQualifiedName
[JScript] public function get RefName( ): XmlQualifiedName;public function set RefName(XmlQualifiedName);
Description
  Name of a group defined in this schema (or another schema indicated by the specified namespace).
  The RefName value must be a QName. The RefName can include a namespace prefix. To include a group in a complexType element, use the RefName attribute to specify the group to include in this schema.
  SourceUri
  UnhandledAttributes
  XmlSchemaIdentityConstraint class (System.Xml.Schema)
  ToString
Description
  Class for the identity constraints: key, keyref, unique elements.
  An association between a name and one of several varieties of identity constraint related to uniqueness and reference.
  XmlSchemaIdentityConstraint
  Example Syntax:
  ToString
[C#] public XmlSchemaIdentityConstraint( );
[C++] public: XmlSchemaIdentityConstraint( );
[VB] Public Sub New( )
[JScript] public function XmlSchemaIdentityConstraint( );
  Annotation
  Fields
  ToString
Description
  Collection of fields that apply as children for the XML Path Language (XPath) expression selector.
  An identity constraint must contain one or more field elements. The collection specifies an System.Xml.Schema.XmlSchemaXPath expression that specifies the value (or one of the values) used to enforce an identity constraint (unique, key, keyref).
  Id
  LineNumber
  LinePosition
  Name
  ToString
Description
  The name of the identity constraint.
  Selector
  ToString
[C#] public XmlSchemaXPath Selector {get; set;}
[C++] public: _property XmlSchemaXPath* get_Selector( );public: _property void set_Selector(XmlSchemaXPath*);
[VB] Public Property Selector As XmlSchemaXPath
[JScript] public function get Selector( ): XmlSchemaXPath;public function set Selector(XmlSchemaXPath);
Description
  The XML Path Language (XPath) expression selector element.
  An XPath expression that is relative to the element being declared. This expression identifies the child elements that the identity constraint applies to.
  SourceUri
  UnhandledAttributes
  XmlSchemaImport class (System.Xml.Schema)
  ToString
Description
  The class to import schema components from any schema.
  XmlSchemaImport allows references to schema components from other schemas with different target namespaces.
  XmlSchemaImport
  Example Syntax:
  ToString
[C#] public XmlSchemaImport( );
[C++] public: XmlSchemaImport( );
[VB] Public Sub New( )
[JScript] public function XmlSchemaImport( );
  Annotation
  Id
  LineNumber
  LinePosition
  Namespace
  ToString
Description
  Provides the target namespace for the imported schema as a URI reference.
  The namespace attribute indicates that the containing schema document may contain qualified references to schema components in that namespace through one or more prefixes that are declared with xmlns attributes. If this attribute is absent, the containing schema can contain unqualified references to components in the imported namespace.
  Schema
  SchemaLocation
  SourceUri
  UnhandledAttributes
  XmlSchemaInclude class (System.Xml.Schema)
  ToString
Description
  Class to include declarations and definitions from an external schema. Allows them to be available for processing in the containing schema.
  The included schema document must meet one of the following conditions: The included schema must have the same target namespace as the containing schema document.
  XmlSchemaInclude
  Example Syntax:
  ToString
[C#] public XmlSchemaInclude( );
[C++] public: XmlSchemaInclude( );
[VB] Public Sub New( )
[JScript] public function XmlSchemaInclude( );
  Annotation
  Id
  LineNumber
  LinePosition Schema
SchemaLocation
SourceUri
UnhandledAttributes
XmlSchemaKey class (System.Xml.Schema)
ToString
Description
Identifies a key constraint.
Specifies that an attribute or element value (or set of values) must be a key within the specified scope. A key must be unique, non-nillable/non-nullable, and always present.
XmlSchemaKey
Example Syntax:
ToString
[C#] public XmlSchemaKey( );
[C++] public: XmlSchemaKey( );
[VB] Public Sub New( )
[JScript] public function XmlSchemaKey( );
Annotation
Fields
Id
LineNumber
LinePosition
Name
Selector
SourceUri
UnhandledAttributes
XmlSchemaKeyref class (System.Xml.Schema)
ToString
Description
Identifies a keyref constraint.
Specifies that an attribute or element value (or set of values) have a correspondence with those of the specified key or unique element. The name must be unique within a schema.
XmlSchemaKeyref
Example Syntax:
ToString
[C#] public XmlSchemaKeyref( );
[C++] public: XmlSchemaKeyref( );
[VB] Public Sub New( )
[JScript] public function XmlSchemaKeyref( );
Annotation
Fields
Id
LineNumber
LinePosition
Name
Refer
ToString
Description
The foreign key that this constraint refers to in another simple or complex type.
Name of a key or unique element defined in this schema (or another schema indicated by the specified namespace). The refer value must be a QName. The type can include a namespace prefix.
Selector
SourceUri
UnhandledAttributes
XmlSchemaLengthFacet class (System.Xml.Schema)
ToString
Description
Class for defining length facets.
XmlSchemaLengthFacet
Example Syntax:
ToString
[C#] public XmlSchemaLengthFacet( );
[C++] public: XmlSchemaLengthFacet( );
[VB] Public Sub New( )
[JScript] public function XmlSchemaLengthFacet( );
Annotation
Id
IsFixed
LineNumber
LinePosition
SourceUri
UnhandledAttributes
Value
XmlSchemaMaxExclusiveFacet class (System.Xml.Schema)
ToString
Description
Class for defining maxExclusive facets.
XmlSchemaMaxExclusiveFacet
Example Syntax:
ToString
[C#] public XmlSchemaMaxExclusiveFacet( );
[C++] public: XmlSchemaMaxExclusiveFacet( );
[VB] Public Sub New( )
[JScript] public function XmlSchemaMaxExclusiveFacet( );
Annotation
Id
IsFixed
LineNumber
LinePosition
SourceUri
UnhandledAttributes
Value
XmlSchemaMaxInclusiveFacet class (System.Xml.Schema)
ToString
Description
Class for defining maxInclusive facets.
XmlSchemaMaxInclusiveFacet
Example Syntax:
ToString
[C#] public XmlSchemaMaxInclusiveFacet( );
[C++] public: XmlSchemaMaxInclusiveFacet( );
[VB] Public Sub New( )
[JScript] public function XmlSchemaMaxInclusiveFacet( );
Annotation
Id
IsFixed
LineNumber
LinePosition
SourceUri
UnhandledAttributes
Value
XmlSchemaMaxLengthFacet class (System.Xml.Schema)
ToString
Description
Class for defining maxLength facets.
XmlSchemaMaxLengthFacet
Example Syntax:
ToString
[C#] public XmlSchemaMaxLengthFacet( );
[C++] public: XmlSchemaMaxLengthFacet( );
[VB] Public Sub New( )
[JScript] public function XmlSchemaMaxLengthFacet( );
Annotation
Id
IsFixed
LineNumber LinePosition
SourceUri
UnhandledAttributes
Value
XmlSchemaMinExclusiveFacet class (System.Xml.Schema)
ToString
Description
   Class for defining minExclusive facets.
   XmlSchemaMinExclusiveFacet
   Example Syntax:
   ToString
[C#] public XmlSchemaMinExclusiveFacet( );
[C++] public: XmlSchemaMinExclusiveFacet( );
[VB] Public Sub New( )
[JScript] public function XmlSchemaMinExclusiveFacet( );
   Annotation
   Id
   IsFixed
   LineNumber
   LinePosition
   SourceUri
   UnhandledAttributes
   Value
XmlSchemaMinInclusiveFacet class (System.Xml.Schema)
   ToString
Description
   Class for defining minInclusive facets.
   XmlSchemaMinInclusiveFacet
   Example Syntax:
   ToString
[C#] public XmlSchemaMinInclusiveFacet( );
[C++] public: XmlSchemaMinInclusiveFacet( );
[VB] Public Sub New( )
[JScript] public function XmlSchemaMinInclusiveFacet( );
   Annotation
   Id
   IsFixed
   LineNumber
   LinePosition
   SourceUri
   UnhandledAttributes
   Value
XmlSchemaMinLengthFacet class (System.Xml.Schema)
   ToString
Description
   Class for defining minLength facets.
   XmlSchemaMinLengthFacet
   Example Syntax:
   ToString
[C#] public XmlSchemaMinLengthFacet( );
[C++] public: XmlSchemaMinLengthFacet( );
[VB] Public Sub New( )
[JScript] public function XmlSchemaMinLengthFacet( );
   Annotation
   Id
   IsFixed
   LineNumber
   LinePosition
   SourceUri
   UnhandledAttributes
   Value
XmlSchemaNotation class (System.Xml.Schema)
   ToString
Description
   Class for the definition of a notation.
   XmlSchemaNotation
   Example Syntax:
   ToString
[C#] public XmlSchemaNotation( );
[C++] public: XmlSchemaNotation( );
[VB] Public Sub New( )
[JScript] public function XmlSchemaNotation( );
   Annotation
   Id
   LineNumber
   LinePosition
   Name
   ToString
Description
   The name of the notation.
   Public
   ToString
[C#] public string Public {get; set;}
[C++] public: _property String* get_Public( );public: _property void set_Public(String*);
[VB] Public Property Public As String
[JScript] public function get Public( ): String;public function set Public(String);
Description
   The public attribute.
   SourceUri
   System
   ToString
Description
   The system attribute.
   The default value is String.Empty.
   UnhandledAttributes
XmlSchemaNumericFacet class (System.Xml.Schema)
   ToString
Description
   Abstract class for defining numeric facets.
   XmlSchemaNumericFacet
   Example Syntax:
   ToString
[C#] protected XmlSchemaNumericFacet( );
[C++] protected: XmlSchemaNumericFacet( );
[VB] Protected Sub New( )
[JScript] protected function XmlSchemaNumericFacet( );
   Annotation
   Id
   IsFixed
   LineNumber
   LinePosition
   SourceUri
   UnhandledAttributes
   Value
XmlSchemaObject class (System.Xml.Schema)
   ToString
Description
   Creates an empty schema.
   XmlSchemaObject
   Example Syntax:
   ToString
[C#] protected XmlSchemaObject( );
[C++] protected: XmlSchemaObject( );
[VB] Protected Sub New( )
[JScript] protected function XmlSchemaObject( );
   LineNumber
   ToString
[C#] public int LineNumber {get; set;}
[C++] public: _property int get_LineNumber( );public: _property void set_LineNumber(int);

[VB] Public Property LineNumber As Integer
[JScript] public function get LineNumber( ): int;public function set LineNumber(int);
Description
   Line number in the file that the schema element refers to.
   LineNumber is used to store the line number when a schema is read from file. This is reported through System.Xml.Schema.XmlSchemaException for error handling.
   LinePosition
   ToString
[C#] public int LinePosition {get; set;}
[C++] public: _property int get_LinePosition( );public: _property void set_LinePosition(int);
[VB] Public Property LinePosition As Integer
[JScript] public function get LinePosition( ): int;public function set LinePosition(int);
Description
   Line position in the file that the schema element refers to.
   This is used to store the line position when a schema is read from file. This is reported through System.Xml.Schema.XmlSchemaException for error handling.
   SourceUri
   ToString
[C#] public string SourceUri {get; set;}
[C++] public: _property String* get_SourceUri( );public: _property void set_SourceUri(String*);
[VB] Public Property SourceUri As String
[JScript] public function get SourceUri( ): String;public function set SourceUri(String);
Description
   Identifies the source location for the file that loaded the schema.
   Provides information for exception handling.
   XmlSchemaObjectCollection class (System.Xml.Schema)
   ToString
Description
   An object collection class to handle XmlSchemaObjects when collections are returned from method calls.
   XmlSchemaObjectCollection
   Example Syntax:
   ToString
[C#] public XmlSchemaObjectCollection( );
[C++] public: XmlSchemaObjectCollection( );
[VB] Public Sub New( )
[JScript] public function XmlSchemaObjectCollection( );
Initializes a new instance of the XmlSchemaObjectCollection class.
Description
   Initializes a new instance of the XmlSchemaObjectCollection class.
   XmlSchemaObjectCollection
   Example Syntax:
   ToString
[C#] public XmlSchemaObjectCollection(XmlSchemaObject parent);
[C++] public: XmlSchemaObjectCollection(XmlSchemaObject* parent);
[VB] Public Sub New(ByVal parent As XmlSchemaObject)
[JScript] public function XmlSchemaObjectCollection(parent: XmlSchemaObject);
Description
   Initializes a new instance of the XmlSchemaObjectCollection class that takes an XmlSchemaObject. XmlSchemaObject
   Count
   InnerList
   Item
   ToString
Description
   Looks up the qualified name using the supplied XmlQualifiedName and returns the XmlSchemaObject—the XSD element for this qualified name. int
   List
   Add
[C#] public int Add(XmlSchemaObject item);
[C++] public: int Add(XmlSchemaObject* item);
[VB] Public Function Add(ByVal item As XmlSchemaObject) As Integer
[JScript] public function Add(item: XmlSchemaObject): int;
Description
   Adds an XmlSchemaObject to the XmlSchemaObjectCollection.
   XmlSchemaObject
   Contains
[C#] public bool Contains(XmlSchemaObject item);
[C++] public: bool Contains(XmlSchemaObject* item);
[VB] Public Function Contains(ByVal item As XmlSchemaObject) As Boolean
[JScript] public function Contains(item: XmlSchemaObject): Boolean;
Description
   Indicates if specified qualified name is located in the XmlSchemaObjectCollection.
   Return Value: Returns true if the specified qualified name is in the collection. Otherwise returns false. If null is supplied then false is returned since there is no qualified name with a null name. XmlSchemaObject
   CopyTo
[C#] public void CopyTo(XmlSchemaObject[ ] array, int index);
[C++] public: void CopyTo(XmlSchemaObject* array[ ], int index);
[VB] Public Sub CopyTo(ByVal array( ) As XmlSchemaObject, ByVal index As Integer)
[JScript] public function CopyTo(array: XmlSchemaObject[ ], index: int);
Description
   Copies an XmlSchemaObject to the XmlSchemaObjectCollection.
   XmlSchemaObject[ ] int
   GetEnumerator
[C#] public new XmlSchemaObjectEnumerator GetEnumerator( );
[C++] public: XmlSchemaObjectEnumerator* GetEnumerator( );
[VB] Shadows Public Function GetEnumerator( ) As XmlSchemaObjectEnumerator
[JScript] public hide function GetEnumerator( ): XmlSchemaObjectEnumerator;
Description
   Returns an enumerator for iterating through the XmlSchemaObjects contained in the XmlSchemaObjectCollection.
   Return Value: The iterator returns XmlSchemaObject.
   IndexOf
[C#] public int IndexOf(XmlSchemaObject item);
[C++] public: int IndexOf(XmlSchemaObject* item);
[VB] Public Function IndexOf(ByVal item As XmlSchemaObject) As Integer
[JScript] public function IndexOf(item: XmlSchemaObject): int;
Description
   Gets the index of the specified XmlSchemaObject within the collection of the specified item. XmlSchemaObject
   Insert

[C#] public void Insert(int index, XmlSchemaObject item);
[C++] public: void Insert(int index, XmlSchemaObject* item);
[VB] Public Sub Insert(ByVal index As Integer, ByVal item As XmlSchemaObject)
[JScript] public function Insert(index: int, item: XmlSchemaObject);
Description
  Inserts an XmlSchemaObject to the XmlSchemaObjectCollection.
XmlSchemaObject
  OnClear
[C#] protected override void OnClear( );
[C++] protected: void OnClear( );
[VB] Overrides Protected Sub OnClear( )
[JScript] protected override function OnClear( );
Description
  OnClear is invoked before the standard Clear behavior.
  OnInsert
[C#] protected override void OnInsert(int index, object item);
[C++] protected: void OnInsert(int index, Object* item);
[VB] Overrides Protected Sub OnInsert(ByVal index As Integer, ByVal item As Object)
[JScript] protected override function OnInsert(index: int, item: Object);
Description
  OnInsert is invoked before the standard Insert behavior. int object
  OnRemove
[C#] protected override void OnRemove(int index, object item);
[C++] protected: void OnRemove(int index, Object* item);
[VB] Overrides Protected Sub OnRemove(ByVal index As Integer, ByVal item As Object)
[JScript] protected override function OnRemove(index: int, item: Object);
Description
  OnRemove is invoked before the standard Remove behavior. int object
  OnSet
[C#] protected override void OnSet(int index, object oldValue, object newValue);
[C++] protected: void OnSet(int index, Object* oldValue, Object* newValue);
[VB] Overrides Protected Sub OnSet(ByVal index As Integer, ByVal oldValue As Object, ByVal newValue As Object)
[JScript] protected override function OnSet(index: int, oldValue: Object, newValue: Object);
Description
  OnSet is invoked before the standard Set behavior. int object object
  Remove
[C#] public void Remove(XmlSchemaObject item);
[C++] public: void Remove(XmlSchemaObject* item);
[VB] Public Sub Remove(ByVal item As XmlSchemaObject)
[JScript] public function Remove(item: XmlSchemaObject);
Description
  Removes an XmlSchemaObject from the XmlSchemaObjectCollection.
XmlSchemaObject
  XmlSchemaObjectEnumerator class (System.Xml.Schema)
    ToString
Description
  An enumerator class to walk the XmlSchemaObjectCollection collections.
  Current
  ToString
[C#] public XmlSchemaObject Current {get;}
[C++] public: _property XmlSchemaObject* get_Current( );
[VB] Public ReadOnly Property Current As XmlSchemaObject
[JScript] public function get Current( ): XmlSchemaObject;
Description
  Returns the XmlSchemaObject for the current enumerator's position.
  MoveNext
[C#] public bool MoveNext( );
[C++] public: bool MoveNext( );
[VB] Public Function MoveNext( ) As Boolean
[JScript] public function MoveNext( ): Boolean;
Description
  Moves to the next item in the collection.
Return Value: False at the end of the collection.
  Reset
[C#] public void Reset( );
[C++] public: void Reset( );
[VB] Public Sub Reset( )
[JScript] public function Reset( );
Description
  Reset the enumerator to the start of the collection.
  IEnumerator.MoveNext
[C#] bool IEnumerator.MoveNext( );
[C++] bool IEnumerator::MoveNext( );
[VB] Function MoveNext( ) As Boolean Implements IEnumerator.MoveNext
[JScript] function IEnumerator.MoveNext( ): Boolean;
  IEnumerator.Reset
[C#] void IEnumerator.Reset( );
[C++] void IEnumerator::Reset( );
[VB] Sub Reset( ) Implements IEnumerator.Reset
[JScript] function IEnumerator.Reset( );
  XmlSchemaObjectTable class (System.Xml.Schema)
    ToString
Description
  A collection class that provides read-only helpers for XmlSchemaObject objects. This class is used to provide the collections for contained elements that are within the schema as collections that are accessed from the XmlSchema class (for example, Attributes, AttributeGroups, Elements, and so on).
  Count
  ToString
[C#] public int Count {get;}
[C++] public: _property int get_Count( );
[VB] Public ReadOnly Property Count As Integer
[JScript] public function get Count( ): int;
Description
  Count.
  Item
  ToString
[C#] public XmlSchemaObject this[XmlQualifiedName name] {get;}
[C++] public: _property XmlSchemaObject* get_Item(XmlQualifiedName* name);
[VB] Public Default ReadOnly Property Item(ByVal name As XmlQualifiedName) As XmlSchemaObject
[JScript] returnValue=XmlSchemaObjectTableObject.Item(name);

Description
   Looks up the qualified name by the supplied XmlQualifiedName and returns the XmlSchemaObject which is the XML Schema Definition language (XSD) element for this qualified name.
   Returns null if there is qualified name associated with the given name.
   Names
   ToString
[C#] public ICollection Names {get;}
[C++] public: _property ICollection* get_Names( );
[VB] Public ReadOnly Property Names As ICollection
[JScript] public function get Names( ): ICollection;
Description
   Returns a collection of all the named elements in the collection as XmlSchemaObject.
   Values
   ToString
[C#] public ICollection Values {get;}
[C++] public: _property ICollection* get_Values( );
[VB] Public ReadOnly Property Values As ICollection
[JScript] public function get Values( ): ICollection;
Description
   Returns a collection of the values for all the elements in the collection as XmlSchemaObject.
   Contains
[C#] public bool Contains(XmlQualifiedName name);
[C++] public: bool Contains(XmlQualifiedName* name);
[VB] Public Function Contains(ByVal name As XmlQualifiedName) As Boolean
[JScript] public function Contains(name: XmlQualifiedName): Boolean;
Description
   Returns true if the specified qualified name is in the collection.
   Returns false if a null value is supplied because there is not a qualified name for a null name. For more information, see System.Xml.XmlQualifiedName.
   GetEnumerator
[C#] public IDictionaryEnumerator GetEnumerator( );
[C++] public: IDictionaryEnumerator* GetEnumerator( );
[VB] Public Function GetEnumerator( ) As IDictionaryEnumerator
[JScript] public function GetEnumerator( ): IDictionaryEnumerator;
Description
   Returns an enumerator for the XmlSchemaObject contained in the collection.
Return Value: Returns the XmlSchemaObject objects.
   XmlSchemaParticle class (System.Xml.Schema)
   ToString
Description
   Base class for all particles types.
   Particle types are usually interchangeable. A local element declaration or reference to a global element declaration (element), a compositor (sequence, choice, or all), a reference to a named content model group (group), or an element wildcard (any).
   XmlSchemaParticle
   Example Syntax:
   ToString
[C#] protected XmlSchemaParticle( );
[C++] protected: XmlSchemaParticle( );
[VB] Protected Sub New( )
[JScript] protected function XmlSchemaParticle( );
   Annotation
   Id
   LineNumber
   LinePosition
   MaxOccurs
   ToString
Description
   Maximum number of times the particle can occur.
   The value can be an integer greater than or equal to zero. The default value is 1.
   MaxOccursString
   ToString
[C#] public string MaxOccursString {get; set;}
[C++] public: _property String* get_MaxOccursString( );public: _property void set_MaxOccursString (String*);
[VB] Public Property MaxOccursString As String
[JScript] public function get MaxOccursString( ): String; public function set MaxOccursString(String);
Description
   Provides the number as a string value. Maximum number of times the particle can occur.
   To set no limit on the maximum number, use the string "unbounded".
   MinOccurs
   ToString
[C#] public decimal MinOccurs {get; set;}
[C++] public: _property Decimal get_MinOccurs( ); public: _property void set_MinOccurs(Decimal);
[VB] Public Property MinOccurs As Decimal
[JScript] public function get MinOccurs( ): Decimal;public function set MinOccurs(Decimal);
Description
   Minimum number of times the particle can occur.
   The value can be an integer greater than or equal to zero. Set this attribute to zero to indicate that the attribute is optional. The default value is 1.
   MinOccursString
   ToString
[C#] public string MinOccursString {get; set;}
[C++] public: _property String* get_MinOccursString( );public: _property void set_MinOccursString (String*);
[VB] Public Property MinOccursString As String
[JScript] public function get MinOccursString( ): String;public function set MinOccursString(String);
Description
   Provides the number as a string value. Minimum number of times the particle can occur.
   SourceUri
   UnhandledAttributes
   XmlSchemaPatternFacet class (System.Xml.Schema)
   ToString
Description
   Class for defining pattern facets.
   XmlSchemaPatternFacet
   Example Syntax:
   ToString
[C#] public XmlSchemaPatternFacet( );
[C++] public: XmlSchemaPatternFacet( );
[VB] Public Sub New( )
[JScript] public function XmlSchemaPatternFacet( );
   Annotation
   Id
   IsFixed
   LineNumber
   LinePosition
   SourceUri
   UnhandledAttributes
   Value
   XmlSchemaRedefine class (System.Xml.Schema)
   ToString Description
    Allows simple and complex types, groups, and attribute groups from external schema files to be redefined in the current schema. This class provides versioning for the schema elements.
    This class does the following: The redefine element requires that the external elements exist in the same target namespace as the redefining schema. Schemas without a namespace can also be redefined using the redefine element in which case, the redefined components become part of the schema's target namespace.
    XmlSchemaRedefine
    Example Syntax:
    ToString
[C#] public XmlSchemaRedefine( );
[C++] public: XmlSchemaRedefine( );
[VB] Public Sub New( )
[JScript] public function XmlSchemaRedefine( );
    Annotation
    AttributeGroups
    ToString
Description
    The XmlSchemaObjectTable for all attributes in the schema.
    Groups
    ToString
[C#] public XmlSchemaObjectTable Groups {get;}
[C++] public: _property XmlSchemaObjectTable* get_Groups( );
[VB] Public ReadOnly Property Groups As XmlSchemaObjectTable
[JScript] public function get Groups( ): XmlSchemaObjectTable;
Description
    The XmlSchemaObjectTable for all groups in the schema.
    Id
    Items
    ToString
Description
    Collection of the following classes: XmlSchemaAnnotation, XmlSchemaAttribute, XmlSchemaAttributeGroup, XmlSchemaComplexType, XmlSchemaSimpleType, XmlSchemaElement, XmlSchemaGroup, and XmlSchemaNotation.
    LineNumber
    LinePosition
    Schema
    SchemaLocation
    SchemaTypes
    ToString
Description
    The XmlSchemaObjectTable for all schema types in the schema.
    SourceUri
    UnhandledAttributes
    XmlSchemaSequence class (System.Xml.Schema)
    ToString
Description
    Requires the elements in the group to appear in the specified sequence within the containing element. Represents the W3C sequence (compositor) element.
    XmlSchemaSequence
    Example Syntax:
    ToString
[C#] public XmlSchemaSequence( );
[C++] public: XmlSchemaSequence( );
[VB] Public Sub New( )
[JScript] public function XmlSchemaSequence( );
    Annotation
    Id
    Items
    ToString
Description
    The elements contained within the compositor. Collection of XmlSchemaElement, XmlSchemaGroupRef, XmlSchemaChoice, XmlSchemaSequence, or XmlSchemaAny.
    LineNumber
    LinePosition
    MaxOccurs
    MaxOccursString
    MinOccurs
    MinOccursString
    SourceUri
    UnhandledAttributes
    XmlSchemaSimpleContent class (System.Xml.Schema)
    ToString
Description
    Class for simple types and complex types with a simple content model.
    Contains extensions or restrictions on a complex type with character data or on a simple type as content and contains no elements.
    XmlSchemaSimpleContent
    Example Syntax:
    ToString
[C#] public XmlSchemaSimpleContent( );
[C++] public: XmlSchemaSimpleContent( );
[VB] Public Sub New( )
[JScript] public function XmlSchemaSimpleContent( );
    Annotation
    Content
    ToString
Description
    One of XmlSchemaSimpleContentRestriction or XmlSchemaSimpleContentExtension.
    The simpleContent element enables you to specify an element as containing a simple type with no elements and restrict the value of the element's content or extend the content with attributes.
    Id
    LineNumber
    LinePosition
    SourceUri
    UnhandledAttributes
    XmlSchemaSimpleContentExtension class (System.Xml.Schema)
    ToString
Description
    Class for simple types that are extended by extension. Extends the simple type content of the element by adding attributes.
    XmlSchemaSimpleContentExtension
    Example Syntax:
    ToString
[C#] public XmlSchemaSimpleContentExtension( );
[C++] public: XmlSchemaSimpleContentExtension( );
[VB] Public Sub New( )
[JScript] public function XmlSchemaSimpleContentExtension( );
    Annotation
    AnyAttribute
    ToString Description
  Allows an XmlSchemaAnyAttribute to be used for the attribute value.
  Attributes
  ToString
[C#] public XmlSchemaObjectCollection Attributes {get;}
[C++] public: _property XmlSchemaObjectCollection* get_Attributes( );
[VB] Public ReadOnly Property Attributes As XmlSchemaObjectCollection
[JScript] public function get Attributes( ): XmlSchemaObjectCollection;
Description
  Contains XmlSchemaAttribute and XmlSchemaAttributeGroupRef. Collection of attributes for the simpleType element.
  BaseTypeName
  ToString
[C#] public XmlQualifiedName BaseTypeName {get; set;}
[C++] public: _property XmlQualifiedName* get_BaseTypeName( );public: _property void set_BaseTypeName(XmlQualifiedName*);
[VB] Public Property BaseTypeName As XmlQualifiedName
[JScript] public function get BaseTypeName( ): XmlQualifiedName;public function set BaseTypeName(XmlQualifiedName);
Description
  Name of a built-in data type, simple type, or complex type.
  Id
  LineNumber
  LinePosition
  SourceUri
  UnhandledAttributes
  XmlSchemaSimpleContentRestriction class (System.Xml.Schema)
  ToString
Description
  Class for simple types that are extended by restriction. Restricts the range of values for the element to a subset of the inherited simple types.
  XmlSchemaSimpleContentRestriction
  Example Syntax:
  ToString
[C#] public XmlSchemaSimpleContentRestriction( );
[C++] public: XmlSchemaSimpleContentRestriction( );
[VB] Public Sub New( )
[JScript] public function XmlSchemaSimpleContentRestriction( );
  Annotation
  AnyAttribute
  ToString
Description
  Allows an XmlSchemaAnyAttribute to be used for the attribute value.
  Attributes
  ToString
[C#] public XmlSchemaObjectCollection Attributes {get;}
[C++] public: _property XmlSchemaObjectCollection* get_Attributes( );
[VB] Public ReadOnly Property Attributes As XmlSchemaObjectCollection
[JScript] public function get Attributes( ): XmlSchemaObjectCollection;
Description
  Contains XmlSchemaAttribute and XmlSchemaAttributeGroupRef. Collection of attributes for the simple type.
  BaseType
  ToString
[C#] public XmlSchemaSimpleType BaseType {get; set;}
[C++] public: _property XmlSchemaSimpleType* get_BaseType( );public: _property void set_BaseType(XmlSchemaSimpleType*);
[VB] Public Property BaseType As XmlSchemaSimpleType
[JScript] public function get BaseType( ): XmlSchemaSimpleType;public function set BaseType(XmlSchemaSimpleType);
Description
  Derived from the type specified by the base value. The base value must be a QName.
  BaseTypeName
  ToString
[C#] public XmlQualifiedName BaseTypeName {get; set;}
[C++] public: _property XmlQualifiedName* get_BaseTypeName( );public: _property void set_BaseTypeName(XmlQualifiedName*);
[VB] Public Property BaseTypeName As XmlQualifiedName
[JScript] public function get BaseTypeName( ): XmlQualifiedName;public function set BaseTypeName(XmlQualifiedName);
Description
  Name of the built-in data type, simple type, or complex type.
  Facets
  ToString
[C#] public XmlSchemaObjectCollection Facets {get;}
[C++] public: _property XmlSchemaObjectCollection* get_Facets( );
[VB] Public ReadOnly Property Facets As XmlSchemaObjectCollection
[JScript] public function get Facets( ): XmlSchemaObjectCollection;
Description
  One or more of the following classes: XmlSchemaLengthFacet, XmlSchemaMinLengthFacet, XmlSchemaMaxLengthFacet, XmlSchemaPatternFacet, XmlSchemaEnumerationFacet, XmlSchemaMaxInclusiveFacet, XmlSchemaMaxExclusiveFacet, XmlSchemaMinInclusiveFacet, XmlSchemaMinExclusiveFacet, XmlSchemaFractionDigitsFacet, XmlSchemaTotalDigitsFacet.
  Id
  LineNumber
  LinePosition
  SourceUri
  UnhandledAttributes
  XmlSchemaSimpleType class (System.Xml.Schema)
  ToString
Description
  Class defines a simple type that determines the information and constraints for the values of attributes or elements with text-only content.
  Simple types are defined by deriving them from existing simple types (built-in data types and derived simple types). A simple type cannot contain elements and cannot have attributes.
  XmlSchemaSimpleType
  Example Syntax:
  ToString
[C#] public XmlSchemaSimpleType( );
[C++] public: XmlSchemaSimpleType( );
[VB] Public Sub New( )
[JScript] public function XmlSchemaSimpleType( );
  Annotation
  BaseSchemaType Content
ToString
Description
  One of XmlSchemaSimpleTypeUnion, XmlSchemaSimpleTypeList, or XmlSchemaSimpleTypeRestriction.
  Simple types can be defined in one of the following ways.
  Datatype
  DerivedBy
  Final
  FinalResolved
  Id
  IsMixed
  LineNumber
  LinePosition
  Name
  QualifiedName
  SourceUri
  UnhandledAttributes
  XmlSchemaSimpleTypeContent class (System.Xml.Schema)
  ToString
Description
  Abstract class for simple type content classes.
  XmlSchemaSimpleTypeContent
  Example Syntax:
  ToString
[C#] protected XmlSchemaSimpleTypeContent( );
[C++] protected: XmlSchemaSimpleTypeContent( );
[VB] Protected Sub New( )
[JScript] protected function XmlSchemaSimpleTypeContent( );
  Annotation
  Id
  LineNumber
  LinePosition
  SourceUri
  UnhandledAttributes
  XmlSchemaSimpleTypeList class (System.Xml.Schema)
  ToString
Description
  Class for the list of simpleType elements. Defines a simpleType element as a list of values of a specified data type.
  When a data type is derived from a list data type, the following constraining facets can be used: length, maxLength, and minLength enumerations.
  XmlSchemaSimpleTypeList
  Example Syntax:
  ToString
[C#] public XmlSchemaSimpleTypeList( );
[C++] public: XmlSchemaSimpleTypeList( );
[VB] Public Sub New( )
[JScript] public function XmlSchemaSimpleTypeList( );
  Annotation
  Id
  ItemType
  ToString
Description
  This simpleType element is derived from the type specified by the base value.
  The base value must be a QName.
  ItemTypeName
  ToString
[C#] public XmlQualifiedName ItemTypeName {get; set;}
[C++] public: _property XmlQualifiedName* get_ItemTypeName( );public: _property void set_ItemTypeName(XmlQualifiedName*);
[VB] Public Property ItemTypeName As XmlQualifiedName
[JScript] public function get ItemTypeName( ): XmlQualifiedName;public function set ItemTypeName(XmlQualifiedName);
Description
  The type name of simple type list. Name of a built-in data type or simpleType element defined in this schema (or another schema indicated by the specified namespace).
  The simpleType element containing the list element is derived from the simple type specified by the list value. The list value must be a QName.
  LineNumber
  LinePosition
  SourceUri
  UnhandledAttributes
  XmlSchemaSimpleTypeRestriction class (System.Xml.Schema)
  ToString
Description
  Class for the restriction of simpleType elements.
  XmlSchemaSimpleTypeRestriction
  Example Syntax:
  ToString
[C#] public XmlSchemaSimpleTypeRestriction( );
[C++] public: XmlSchemaSimpleTypeRestriction( );
[VB] Public Sub New( )
[JScript] public function XmlSchemaSimpleTypeRestriction( );
  Annotation
  BaseType
  ToString
Description
  Provides the information on the base type.
  BaseTypeName
  ToString
[C#] public XmlQualifiedName BaseTypeName {get; set;}
[C++] public: _property XmlQualifiedName* get_BaseTypeName( );public: _property void set_BaseTypeName(XmlQualifiedName*);
[VB] Public Property BaseTypeName As XmlQualifiedName
[JScript] public function get BaseTypeName( ): XmlQualifiedName;public function set BaseTypeName(XmlQualifiedName);
Description
  The name of the qualified base type.
  Facets
  ToString
[C#] public XmlSchemaObjectCollection Facets {get;}
[C++] public: _property XmlSchemaObjectCollection* get_Facets( );
[VB] Public ReadOnly Property Facets As XmlSchemaObjectCollection
[JScript] public function get Facets( ): XmlSchemaObjectCollection;
Description
  One or more of the following classes: XmlSchemaLengthFacet, XmlSchemaMinLengthFacet, XmlSchemaMaxLengthFacet, XmlSchemaPatternFacet, XmlSchemaEnumerationFacet, XmlSchemaMaxInclusiveFacet, XmlSchemaMaxExclusiveFacet, XmlSchemaMinInclusiveFacet, XmlSchemaMinExclusiveFacet, XmlSchemaFractionDigitsFacet, XmlSchemaTotalDigitsFacet.
  Id
  LineNumber
  LinePosition
  SourceUri
  UnhandledAttributes XmlSchemaSimpleTypeUnion class (System.Xml.Schema)
 ToString
Description
 Class for the union of simpleType elements. Defines a simpleType element as a list of values of a specified data type.
 A union type enables an element or attribute value to be one or more instances of one type drawn from the union of multiple atomic and list types.
  XmlSchemaSimpleTypeUnion
  Example Syntax:
  ToString
[C#] public XmlSchemaSimpleTypeUnion( );
[C++] public: XmlSchemaSimpleTypeUnion( );
[VB] Public Sub New( )
[JScript] public function XmlSchemaSimpleTypeUnion( );
  Annotation
  BaseTypes
  ToString
Description
  Collection of base types.
  Id
  LineNumber
  LinePosition
  MemberTypesSource
  ToString
Description
  List of members of built-in data types or simpleType elements defined in this schema (or another schema indicated by the specified namespace).
  The simpleType element containing the union element is derived from the simple types specified by the union value. The values in memberTypes property must be QNames.
  SourceUri
  UnhandledAttributes
XmlSchemaTotalDigitsFacet class (System.Xml.Schema)
 ToString
Description
 Class for defining totalDigits facets.
  XmlSchemaTotalDigitsFacet
  Example Syntax:
  ToString
[C#] public XmlSchemaTotalDigitsFacet( );
[C++] public: XmlSchemaTotalDigitsFacet( );
[VB] Public Sub New( )
[JScript] public function XmlSchemaTotalDigitsFacet( );
  Annotation
  Id
  IsFixed
  LineNumber
  LinePosition
  SourceUri
  UnhandledAttributes
  Value
XmlSchemaType class (System.Xml.Schema)
 ToString
Description
 The base class for all simple types and complex types.
  XmlSchemaType
  Example Syntax:
  ToString
[C#] public XmlSchemaType( );
[C++] public: XmlSchemaType( );
[VB] Public Sub New( )
[JScript] public function XmlSchemaType( );
  Annotation
  BaseSchemaType
  ToString
Description
 Name of a built-in XSD data type, simpleType element, or complexType element.
 This complexType element is derived from the type specified by the base value. The base value must be a QName.
  Datatype
  ToString
[C#] public XmlSchemaDatatype Datatype {get;}
[C++] public: _property XmlSchemaDatatype* get_Datatype( );
[VB] Public ReadOnly Property Datatype As XmlSchemaDatatype
[JScript] public function get Datatype( ): XmlSchemaDatatype;
Description
 Indicates the data type.
  DerivedBy
  ToString
[C#] public XmlSchemaDerivationMethod DerivedBy {get;}
[C++] public: _property XmlSchemaDerivationMethod get_DerivedBy( );
[VB] Public ReadOnly Property DerivedBy As XmlSchemaDerivationMethod
[JScript] public function get DerivedBy( ): XmlSchemaDerivationMethod;
Description
 Indicates the how elements can derive from this element.
 The value can contain #all or a list that is a subset of extension/restriction/substitution.
  Final
  ToString
[C#] public XmlSchemaDerivationMethod Final {get; set;}
[C++] public: _property XmlSchemaDerivationMethod get_Final( );public: _property void set_Final(XmlSchemaDerivationMethod);
[VB] Public Property Final As XmlSchemaDerivationMethod
[JScript] public function get Final( ): XmlSchemaDerivationMethod;public function set Final(XmlSchemaDerivationMethod);
  FinalResolved
  ToString
[C#] public XmlSchemaDerivationMethod FinalResolved {get;}
[C++] public: _property XmlSchemaDerivationMethod get_FinalResolved( );
[VB] Public ReadOnly Property FinalResolved As XmlSchemaDerivationMethod
[JScript] public function get FinalResolved( ): XmlSchemaDerivationMethod;
Description
 The value after element has been compiled to post-schema infoset. This value indicates how the type is restricted when the type is extended through restriction. If the type is marked as final then this type cannot be extended.
 This value is either from the type itself or if not defined on the type taken from the schema element.
  Id
  IsMixed
  ToString
Description
 Indicates that this type has a mixed content model (character data is allowed to appear between the child elements of this complexType element).

Default is false. This virtual method is overridden in derived classes.
    LineNumber
    LinePosition
    Name
    ToString
Description
    Name of the type.
    The name must be an NCName as defined in the XML Namespaces specification. Optional. If specified, the name must be unique among all simpleType and complexType elements.
    QualifiedName
    ToString
[C#] public XmlQualifiedName QualifiedName {get;}
[C++] public: _property XmlQualifiedName* get_QualifiedName( );
[VB] Public ReadOnly Property QualifiedName As XmlQualifiedName
[JScript] public function get QualifiedName( ): XmlQualifiedName;
Description
    Qualified name for the type built from the Name attribute of this type.
    SourceUri
    UnhandledAttributes
    XmlSchemaUnique class (System.Xml.Schema)
    ToString
Description
    Identifies a unique constraint among a set of elements.
    Specifies that an attribute or element value (or a combination of attribute or element values) must be unique within the specified scope. The name must be unique within a schema.
    XmlSchemaUnique
    Example Syntax:
    ToString
[C#] public XmlSchemaUnique( );
[C++] public: XmlSchemaUnique( );
[VB] Public Sub New( )
[JScript] public function XmlSchemaUnique( );
    Annotation
    Fields
    Id
    LineNumber
    LinePosition
    Name
    Selector
    SourceUri
    UnhandledAttributes
    XmlSchemaUse enumeration (System.Xml.Schema)
    ToString
Description
    Indicator of how the attribute is used.
    Optional.
    ToString
[C#] public const XmlSchemaUse None;
[C++] public: const XmlSchemaUse None;
[VB] Public Const None As XmlSchemaUse
[JScript] public var None: XmlSchemaUse;
Description
    Attribute has no value.
    ToString
[C#] public const XmlSchemaUse Optional;
[C++] public: const XmlSchemaUse Optional;
[VB] Public Const Optional As XmlSchemaUse
[JScript] public var Optional: XmlSchemaUse;
Description
    Attribute is optional and may have any value.
    ToString
[C#] public const XmlSchemaUse Prohibited;
[C++] public: const XmlSchemaUse Prohibited;
[VB] Public Const Prohibited As XmlSchemaUse
[JScript] public var Prohibited: XmlSchemaUse;
Description
    Attribute cannot be used.
    ToString
[C#] public const XmlSchemaUse Required;
[C++] public: const XmlSchemaUse Required;
[VB] Public Const Required As XmlSchemaUse
[JScript] public var Required: XmlSchemaUse;
Description
    Attribute must appear once.
    XmlSchemaWhiteSpaceFacet class (System.Xml.Schema)
    ToString
Description
    Class for defining whitespace facets.
    XmlSchemaWhiteSpaceFacet
    Example Syntax:
    ToString
[C#] public XmlSchemaWhiteSpaceFacet( );
[C++] public: XmlSchemaWhiteSpaceFacet( );
[VB] Public Sub New( )
[JScript] public function XmlSchemaWhiteSpaceFacet( );
    Annotation
    Id
    IsFixed
    LineNumber
    LinePosition
    SourceUri
    UnhandledAttributes
    Value
    XmlSchemaXPath class (System.Xml.Schema)
    ToString
Description
    Class for XML Path Language (XPath) expressions.
    XmlSchemaXPath
    Example Syntax:
    ToString
[C#] public XmlSchemaXPath( );
[C++] public: XmlSchemaXPath( );
[VB] Public Sub New( )
[JScript] public function XmlSchemaXPath( );
    Annotation
    Id
    LineNumber
    LinePosition
    SourceUri
    UnhandledAttributes
    XPath
    ToString
Description
    Attribute for the XML Path Language (XPath) expression.
    An XPath expression that is relative to each element that is selected by the selector of the identity constraint. This expression must identify a single element or attribute whose content or value is used for the constraint. If the expression identifies an element, that element must be a simple type.
    XmlSeverityType enumeration (System.Xml.Schema)
    ToString
Description
    Represents the severity of the validation event.
    ToString

[C#] public const XmlSeverityType Error;
[C++] public: const XmlSeverityType Error;
[VB] Public Const Error As XmlSeverityType
[JScript] public var Error: XmlSeverityType; Errors that can be recovered from.
Description
Indicates a validation error occurred when validating the instance document. This applies to DTDs and XML-Data Reduced Language (XDR) and XML Schema Definition language (XSD) schemas. The W3C validity constraints are considered fatal errors.
ToString
[C#] public const XmlSeverityType Warning;
[C++] public: const XmlSeverityType Warning;
[VB] Public Const Warning As XmlSeverityTy
System.Xml.Serialization
The namespace contains classes that are used to serialize objects into XML format documents or streams.
Description
The System.Xml.Serialization namespace contains classes that are used to serialize objects into XML format documents or streams.
   CodeIdentifier class (System.Xml.Serialization)
   Constructors:
   CodeIdentifier
   Example Syntax:
   Methods:
   MakeCamel
[C#] public static string MakeCamel(string identifier);
[C++] public: static String* MakeCamel(String* identifier);
[VB] Public Shared Function MakeCamel(ByVal identifier As String) As String
[JScript] public static function MakeCamel(identifier: String): String;
Description
   MakePascal
[C#] public static string MakePascal(string identifier);
[C++] public: static String* MakePascal(String* identifier);
[VB] Public Shared Function MakePascal(ByVal identifier As String) As String
[JScript] public static function MakePascal(identifier: String): String;
Description
   MakeValid
[C#] public static string MakeValid(string identifier);
[C++] public: static String* MakeValid(String* identifier);
[VB] Public Shared Function MakeValid(ByVal identifier As String) As String
[JScript] public static function MakeValid(identifier: String): String;
Description
   CodeIdentifiers class (System.Xml.Serialization)
   ToString
   CodeIdentifiers
   Example Syntax:
   ToString
   Properties:
   UseCamelCasing
   ToString
Description
   Add
[C#] public void Add(string identifier, object value);
[C++] public: void Add(String* identifier, Object* value);
[VB] Public Sub Add(ByVal identifier As String, ByVal value As Object)
[JScript] public function Add(identifier: String, value: Object);

Description
   AddReserved
[C#] public void AddReserved(string identifier);
[C++] public: void AddReserved(String* identifier);
[VB] Public Sub AddReserved(ByVal identifier As String)
[JScript] public function AddReserved(identifier: String);
Description
   AddUnique
[C#] public string AddUnique(string identifier, object value);
[C++] public: String* AddUnique(String* identifier, Object* value);
[VB] Public Function AddUnique(ByVal identifier As String, ByVal value As Object) As String
[JScript] public function AddUnique(identifier: String, value: Object): String;
Description
   Clear
[C#] public void Clear( );
[C++] public: void Clear( );
[VB] Public Sub Clear( )
[JScript] public function Clear( );
Description
   IsInUse
[C#] public bool IsInUse(string identifier);
[C++] public: bool IsInUse(String* identifier);
[VB] Public Function IsInUse(ByVal identifier As String) As Boolean
[JScript] public function IsInUse(identifier: String): Boolean;
Description
   MakeRightCase
[C#] public string MakeRightCase(string identifier);
[C++] public: String* MakeRightCase(String* identifier);
[VB] Public Function MakeRightCase(ByVal identifier As String) As String
[JScript] public function MakeRightCase(identifier: String): String;
Description
   MakeUnique
[C#] public string MakeUnique(string identifier);
[C++] public: String* MakeUnique(String* identifier);
[VB] Public Function MakeUnique(ByVal identifier As String) As String
[JScript] public function MakeUnique(identifier: String): String;
Description
   Remove
[C#] public void Remove(string identifier);
[C++] public: void Remove(String* identifier);
[VB] Public Sub Remove(ByVal identifier As String)
[JScript] public function Remove(identifier: String);
Description
   RemoveReserved
[C#] public void RemoveReserved(string identifier);
[C++] public: void RemnoveReserved(String* identifier);
[VB] Public Sub RemoveReserved(ByVal identifier As String)
[JScript] public function RemoveReserved(identifier: String);
Description
   ToArray
[C#] public object ToArray(Type type);
[C++] public: Object* ToArray(Type* type);
[VB] Public Function ToArray(ByVal type As Type) As Object
[JScript] public function ToArray(type: Type): Object;

Description
   XmlSerializationReader.CollectionFixup class (System.Xml.Serialization)
      ToString
Description
   XmlSerializationReader.CollectionFixup
      Example Syntax:
      ToString
[C#] public XmlSerializationReader.CollectionFixup(object collection, XmlSerializationCollectionFixupCallback callback, object collectionItems);
[C++] public: CollectionFixup(Object* collection, XmlSerializationCollectionFixupCallback* callback, Object* collectionItems);
[VB] Public Sub New(ByVal collection As Object, ByVal callback As XmlSerializationCollectionFixupCallback, ByVal collectionItems As Object)
[JScript] public function XmlSerializationReader.CollectionFixup(collection: Object, callback: XmlSerializationCollectionFixupCallback, collectionItems: Object);
Description
   Callback
      ToString
[C#] public XmlSerializationCollectionFixupCallback Callback {get;}
[C++] public: _property XmlSerializationCollectionFixupCallback* get_Callback( );
[VB] Public ReadOnly Property Callback As XmlSerializationCollectionFixupCallback
[JScript] public function get Callback( ): XmlSerializationCollectionFixupCallback;
Description
   Collection
      ToString
[C#] public object Collection {get;}
[C++] public: _property Object* get_Collection( );
[VB] Public ReadOnly Property Collection As Object
[JScript] public function get Collection( ): Object;
Description
   CollectionItems
      ToString
[C#] public object CollectionItems {get;}
[C++] public: _property Object* get_CollectionItems( );
[VB] Public ReadOnly Property CollectionItems As Object
[JScript] public function get CollectionItems( ): Object;
Description
   XmlSerializationReader.Fixup class (System.Xml.Serialization)
      ToString
Description
   XmlSerializationReader.Fixup
      Example Syntax:
      ToString
[C#] public XmlSerializationReader.Fixup(object o, XmlSerializationFixupCallback callback, int count);
[C++] public: Fixup(Object* o, XmlSerializationFixupCallback* callback, int count);
[VB] Public Sub New(ByVal o As Object, ByVal callback As XmlSerializationFixupCallback, ByVal count As Integer)
[JScript] public function XmlSerializationReader.Fixup(o: Object, callback: XmlSerializationFixupCallback, count: int);
Description
   XmlSerializationReader.Fixup
      Example Syntax:
      ToString
[C#] public XmlSerializationReader.Fixup(object o, XmlSerializationFixupCallback callback, string[ ] ids);
[C++] public: Fixup(Object* o, XmlSerializationFixupCallback* callback, String* ids _gc[ ]);
[VB] Public Sub New(ByVal o As Object, ByVal callback As XmlSerializationFixupCallback, ByVal ids( ) As String)
[JScript] public function XmlSerializationReader.Fixup(o: Object, callback: XmlSerializationFixupCallback, ids: String[ ]);
Description
   Callback
      ToString
[C#] public XmlSerializationFixupCallback Callback {get;}
[C++] public: _property XmlSerializationFixupCallback* get_Callback( );
[VB] Public ReadOnly Property Callback As XmlSerializationFixupCallback
[JScript] public function get Callback( ): XmlSerializationFixupCallback;
Description
   Ids
      ToString
[C#] public string[ ] Ids {get;}
[C++] public: _property String* get_Ids( );
[VB] Public ReadOnly Property Ids As String( )
[JScript] public function get Ids ( ): String[ ];
Description
   Source
      ToString
[C#] public object Source {get; set;}
[C++] public: _property Object* get_Source( );public: _property void set_Source(Object*);
[VB] Public Property Source As Object
[JScript] public function get Source( ): Object;public function set Source(Object);
Description
   IXmlSerializable interface (System.Xml.Serialization)
      ToString
Description
   Provides a custom serialization format for a serializable object.
   Examples of classes that implement this interface are System.Data.DataSet and System.Xml.XmlDocument. This is different from the System.Runtime.Serialization.ISerializable interface in that it is totally XML-centric and stream based in the sense that large amounts of XML can be incrementally streamed through the System.Data.DataSet.ReadXml and System.Data.DataSet.WriteXml methods.
      GetSchema
[C#] XmlSchema GetSchema( );
[C++] XmlSchema* GetSchema( );
[VB] Function GetSchema( ) As XmlSchema
[JScript] function GetSchema( ): XmlSchema;
Return Value: An System.Xml.Schema.XmlSchema object that represents the XML schema.
   This optional method is used by webserviceutil to create a callable web service client class from the returned System.Xml.Schema.XmlSchema object. This method is not needed to do simple runtime XML serialization.
      ReadXml
[C#] void ReadXml(XmlReader reader);
[C++] void ReadXml(XmlReader* reader);
[VB] Sub ReadXml(ByVal reader As XmlReader)
[JScript] function ReadXml(reader: XmlReader);
Description
   Converts an XML document into an object using the specified reader.

The reader is positioned within the stream at the point that you began writing (in System.Xml.Serialization.IXmlSerializable.WriteXml(System.Xml.XmlWriter)). It is your responsibility to read everything you wrote, no less and no more. The System.Xml.XmlReader used to read the XML document.
  WriteXml
[C#] void WriteXml(XmlWriter writer);
[C++] void WriteXml(XmlWriter* writer);
[VB] Sub WriteXml(ByVal writer As XmlWriter)
[JScript] function WriteXml(writer: XmlWriter);
Description
  Converts the serializable members of an object into an XML document.
  You must write enough information to be able to implement the System.Xml.Serialization.IXmlSerializable.ReadXml(System.Xml.XmlReader) method correctly. For example, if you are writing a list of elements, you provide a way to know how many you wrote so that System.Xml.Serialization.IXmlSerializable.ReadXml(System.Xml.XmlReader) knows how when to stop reading. There are three ways to do this: Method Example Write an initial count in the XML-instance document. The XmlWriter used to write the XML-document instance.
  SoapAttributeAttribute class (System.Xml.Serialization)
  WriteXml
Description
  Specifies that the System.Xml.Serialization.XmlSerializer should serialize the class member as a SOAP attribute.
  Apply the System.Xml.Serialization.SoapAttributeAttribute to a public field to specify that the System.Xml.Serialization.XmlSerializer serializes the field as a SOAP attribute. You can specify an alternative name of the attribute by setting the System.Xml.Serialization.SoapAttributeAttribute.AttributeName property. Set the System.Xml.Serialization.SoapAttributeAttribute.DataType if the attribute must be given a specific type different from the field's type. If the attribute belongs to a specific XML namespace, set the System.Xml.Serialization.SoapAttributeAttribute.Namespace property.
  SoapAttributeAttribute
  Example Syntax:
  WriteXml
[C#] public SoapAttributeAttribute( );
[C++] public: SoapAttributeAttribute( );
[VB] Public Sub New( )
[JScript] public function SoapAttributeAttribute( ); Initializes a new instance of the System.Xml.Serialization.SoapAttributeAttribute class.
Description
  Initializes a new instance of the System.Xml.Serialization.SoapAttributeAttribute class.
  SoapAttributeAttribute
  Example Syntax:
  WriteXml
[C#] public SoapAttributeAttribute(string attrName);
[C++] public: SoapAttributeAttribute(String* attrName);
[VB] Public Sub New(ByVal attrName As String)
[JScript] public function SoapAttributeAttribute(attrName: String);
Description
  Initializes a new instance of the System.Xml.Serialization.SoapAttributeAttribute class using the specified value as the name of the XML attribute. The name of the XML attribute.
  AttributeName
  WriteXml
[C#] public string AttributeName {get; set;}
[C++] public: _property String* get_AttributeName( );public: _property void set_AttributeName(String*);
[VB] Public Property AttributeName As String
[JScript] public function get AttributeName( ): String;public function set AttributeName(String);
Description
  Gets or sets the name of the SOAP attribute generated by the System.Xml.Serialization.XmlSerializer.
  DataType
  WriteXml
[C#] public string DataType {get; set;}
[C++] public: _property String* get_DataType( );public: _property void set_DataType(String*);
[VB] Public Property DataType As String
[JScript] public function get DataType( ): String;public function set DataType(String);
Description
  Gets or sets the XML data type of the SOAP attribute generated by the System.Xml.Serialization.XmlSerializer.
  Namespace
  WriteXml
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);
Description
  The XML namespace of the SOAP attribute generated by the System.Xml.Serialization.XmlSerializer.
  TypeId
  SoapAttributeOverrides class (System.Xml.Serialization)
  ToString
Description
  Allows you to override property, field, and class attributes when you use the System.Xml.Serialization.XmlSerializer to serialize or deserialize an object using the SOAP protocol.
  SoapAttributeOverrides
  Example Syntax:
  ToString
[C#] public SoapAttributeOverrides( );
[C++] public: SoapAttribute Overrides( );
[VB] Public Sub New( )
[JScript] public function SoapAttributeOverrides( );
  Item
  ToString
[C#] public SoapAttributes this[Type type] {get;}
[C++] public: _property SoapAttributes* get_Item(Type* type);
[VB] Public Default ReadOnly Property Item(ByVal type As Type) As SoapAttributes
[JScript] returnValue=SoapAttributeOverridesObject.Item (type); Gets an object that represents the collection of overriding SOAP attributes.
Description
  Gets the object associated with the specified (base-class) type. The base-class System.Type that is associated with the collection of attributes you want to override.
  Item
  ToString
[C#] public SoapAttributes this[Type type, string member] {get;}
[C++] public: _property SoapAttributes* get_Item(Type* type, String* member);
[VB] Public Default ReadOnly Property Item(ByVal type As Type, ByVal member As String) As SoapAttributes

[JScript] returnValue=SoapAttributeOverridesObject.Item (type, member);
Description
Gets the object associated with the specified (base-class) type. The member parameter specifies the base-class member that is overridden. The base-class class System.Type that is associated with the collection of attributes you want to override. The name of the overridden member that specifies the System.Xml.Serialization.SoapAttributes to return.
Add
[C#] public void Add(Type type, SoapAttributes attributes);
[C++] public: void Add(Type* type, SoapAttributes* attributes);
[VB] Public Sub Add(ByVal type As Type, ByVal attributes As SoapAttributes)
[JScript] public function Add(type: Type, attributes: SoapAttributes); Adds a System.Xml.Serialization.SoapAttributes object to the collection of collection of System.Xml.Serialization.SoapAttributes objects.
Description
Adds a System.Xml.Serialization.SoapAttributes object to the collection of collection of System.Xml.Serialization.SoapAttributes objects. The type parameter specifies an object to be overridden by the System.Xml.Serialization.SoapAttributes object. The System.Type of the object that will be overridden. A System.Xml.Serialization.SoapAttributes object that represents the overriding attributes.
Add
[C#] public void Add(Type type, string member, SoapAttributes attributes);
[C++] public: void Add(Type* type, String* member, SoapAttributes* attributes);
[VB] Public Sub Add(ByVal type As Type, ByVal member As String, ByVal attributes As SoapAttributes)
[JScript] public function Add(type: Type, member: String, attributes SoapAttributes);
Description
Adds a System.Xml.Serialization.SoapAttributes object to the collection of collection of System.Xml.Serialization.SoapAttributes objects. The type parameter specifies an object to be overridden by the System.Xml.Serialization.SoapAttributes object. The member parameter specifies the name of a member that will be overridden.
The System.Xml.Serialization.SoapAttributes object contains a union of attribute objects that cause the System.Xml.Serialization.XmlSerializer to override its default serialization behavior for a set of objects. You choose the attribute objects to place in the System.Xml.Serialization.SoapAttributes object, depending on the particular behaviors you want to override. For example, the System.Xml.Serialization.XmlSerializer serializes a class member as an XML element by default. If you want the member to be serialized as an System.Xml.Serialization.SoapAttribute instead, you would create an System.Xml.Serialization.SoapAttributeAttribute, assign it to the System.Xml.Serialization.SoapAttributes.SoapAttribute property of an System.Xml.Serialization.SoapAttributes, and add the System.Xml.Serialization.SoapAttributes object to the System.Xml.Serialization.XmlAttributeOverrides object. The System.Type of the object to override. The name of the member to override. An System.Xml.Serialization.SoapAttributes object that represents the overriding attributes.
SoapAttributes class (System.Xml.Serialization)
ToString
Description
Represents a collection of attribute objects that control how the System.Xml.Serialization.XmlSerializer serializes and deserializes SOAP methods.
SoapAttributes
Example Syntax:
ToString
[C#] public SoapAttributes( );
[C++] public: SoapAttribute so;
[VB] Public Sub New( )
[JScript] public function SoapAttributes( ); Initializes a new instance of the System.Xml.Serialization.SoapAttributes class.
Description
Initializes a new instance of the System.Xml.Serialization.SoapAttributes class.
SoapAttributes
Example Syntax:
ToString
[C#] public SoapAttributes(ICustomAttributeProvider provider);
[C++] public: SoapAttributes(ICustomAttributeProvider* provider);
[VB] Public Sub New(ByVal provider As ICustomAttributeProvider)
[JScript] public function SoapAttributes(provider: ICustomAttributeProvider);
Description
Initializes a new instance of the System.Xml.Serialization.SoapAttributes class using the specified custom type. Any object that implements the System.Reflection.ICustomAttributeProvider interface, such as the System.Type class.
SoapAttribute
ToString
[C#] public SoapAttributeAttribute SoapAttribute {get; set;}
[C++] public: _property SoapAttributeAttribute* get_SoapAttribute( );public: _property void set_SoapAttribute(SoapAttributeAttribute*);
[VB] Public Property SoapAttribute As SoapAttributeAttribute
[JScript] public function get SoapAttribute( ): SoapAttributeAttribute;public function set SoapAttribute(SoapAttributeAttribute);
Description
Gets or sets the System.Xml.Serialization.SoapAttributeAttribute to override.
SoapDefaultValue
ToString
[C#] public object SoapDefaultValue {get; set;}
[C++] public: _property Object* get_SoapDefaultValue( );public: _property void set_SoapDefaultValue(Object*);
[VB] Public Property SoapDefaultValue As Object
[JScript] public function get SoapDefaultValue( ): Object; public function set SoapDefaultValue(Object);
Description
Gets or sets the default value of an XML element or attribute.
SoapElement
ToString
[C#] public SoapElementAttribute SoapElement {get; set;}
[C++] public: _property SoapElementAttribute* get_SoapElement( );public: _property void set_SoapElement(SoapElementAttribute*);
[VB] Public Property SoapElement As SoapElementAttribute

[JScript] public function get SoapElement( ): SoapElementAttribute;public function set SoapElement(SoapElementAttribute);
Description
Gets or sets a System.Xml.Serialization. SoapElementAttribute to override.
SoapEnum
ToString
[C#] public SoapEnumAttribute SoapEnum {get; set;}
[C++] public: _property SoapEnumAttribute* get_SoapEnum( );public: _property void set_SoapEnum(SoapEnumAttribute*);
[VB] Public Property SoapEnum As SoapEnumAttribute
[JScript] public function get SoapEnum( ): SoapEnumAttribute;public function set SoapEnum(SoapEnumAttribute);
Description
Gets or sets an object that specifies how the System.Xml.Serialization.XmlSerializer serializes a SOAP enumeration.
SoapIgnore
ToString
[C#] public bool SoapIgnore {get; set;}
[C++] public: _property bool get_SoapIgnore( );public: _property void set_SoapIgnore(bool);
[VB] Public Property SoapIgnore As Boolean
[JScript] public function get SoapIgnore( ): Boolean;public function set SoapIgnore(Boolean);
Description
Gets or sets a value that specifies whether the XmlSerializer serializes a public field or property with SOAP.
SoapType
ToString
[C#] public SoapTypeAttribute SoapType {get; set;}
[C++] public: _property SoapTypeAttribute* get_SoapType( );public: _property void set_SoapType(SoapTypeAttribute*);
[VB] Public Property SoapType As SoapTypeAttribute
[JScript] public function get SoapType( ): SoapTypeAttribute;public function set SoapType(SoapTypeAttribute);
Description
Gets or sets the SOAP attribute type.
SoapCodeExporter class (System.Xml.Serialization)
ToString
Description
SoapCodeExporter
Example Syntax:
ToString
[C#] public SoapCodeExporter(CodeNamespace codeNamespace);
[C++] public: SoapCodeExporter(CodeNamespace* codeNamespace);
[VB] Public Sub New(ByVal codeNamespace As CodeNamespace)
[JScript] public function SoapCodeExporter(codeNamespace: CodeNamespace);
Description
SoapCodeExporter
Example Syntax:
ToString
[C#] public SoapCodeExporter(CodeNamespace codeNamespace, CodeCompileUnit codeCompileUnit);
[C++] public: SoapCodeExporter(CodeNamespace* codeNamespace, CodeCompileUnit* codeCompileUnit);
[VB] Public Sub New(ByVal codeNamespace As CodeNamespace, ByVal codeCompileUnit As CodeCompileUnit)

[JScript] public function SoapCodeExporter(codeNamespace: CodeNamespace, codeCompileUnit: CodeCompileUnit);
IncludeMetadata
ToString
[C#] public CodeAttributeDeclarationCollection IncludeMetadata {get;}
[C++] public: _property CodeAttributeDeclarationCollection* get_IncludeMetadata( );
[VB] Public ReadOnly Property IncludeMetadata As CodeAttributeDeclarationCollection
[JScript] public function get IncludeMetadata( ): CodeAttributeDeclarationCollection;
Description
AddMappingMetadata
[C#] public void AddMappingMetadata(CodeAttributeDeclarationCollection metadata, XmlMemberMapping member);
[C++] public: void AddMappingMetadata(CodeAttributeDeclarationCollection* metadata, XmlMemberMapping* member);
[VB] Public Sub AddMappingMetadata(ByVal metadata As CodeAttributeDeclarationCollection, ByVal member As XmlMemberMapping)
[JScript] public function AddMappingMetadata(metadata: CodeAttributeDeclarationCollection, member: XmlMemberMapping);
Description
AddMappingMetadata
[C#] public void AddMappingMetadata(CodeAttributeDeclarationCollection metadata, XmlMemberMapping member, bool forceUseMemberName);
[C++] public: void AddMappingMetadata(CodeAttributeDeclarationCollection* metadata, XmlMemberMapping* member, bool forceUseMemberName);
[VB] Public Sub AddMappingMetadata(ByVal metadata As CodeAttributeDeclarationCollection, ByVal member As XmlMemberMapping, ByVal forceUseMemberName As Boolean)
[JScript] public function AddMappingMetadata(metadata: CodeAttributeDeclarationCollection, member: XmlMemberMapping, forceUseMemberName: Boolean);
Description
ExportMembersMapping
[C#] public void ExportMembersMapping(XmlMembersMapping xmlMembersMapping);
[C++] public: void ExportMembersMapping(XmlMembersMapping* xmlMembersMapping);
[VB] Public Sub ExportMembersMapping(ByVal xmlMembersMapping As XmlMembersMapping)
[JScript] public function ExportMembersMapping(xmlMembersMapping: XmlMembersMapping);
Description
ExportTypeMapping
[C#] public void ExportTypeMapping(XmlTypeMapping xmlTypeMapping);
[C++] public: void ExportTypeMapping(XmlTypeMapping* xmlTypeMapping);
[VB] Public Sub ExportTypeMapping(ByVal xmlTypeMapping As XmlTypeMapping)
[JScript] public function ExportTypeMapping(xmlTypeMapping: XmlTypeMapping);
Description
SoapElementAttribute class (System.Xml.Serialization)
ToString Description
Specifies that the public member value be serialized by the System.Xml.Serialization.XmlSerializer using the Simple Access Object Protocol (SOAP) as a SOAP element.

The SoapElementAttribute is used in two cases. First, it can be applied to public member of a class when creating an .asmx file. Second, you can apply the attribute to members in a class that is serialized by an XmlSerializer object.
SoapElementAttribute
Example Syntax:
ToString
[C#] public SoapElementAttribute( );
[C++] public: SoapElementAttribute( );
[VB] Public Sub New( )
[JScript] public function SoapElementAttribute( ); Initializes a new instance of the System.Xml.Serialization. SoapElementAttribute class.
Description
Initializes a new instance of the System.Xml.Serialization. SoapElementAttribute class.
SoapElementAttribute
Example Syntax:
ToString
[C#] public SoapElementAttribute(string elementName);
[C++] public: SoapElementAttribute(String* elementName);
[VB] Public Sub New(ByVal elementName As String)
[JScript] public function SoapElementAttribute(elementName: String);
Description
Initializes a new instance of the System.Xml.Serialization. SoapElementAttribute class and species the name of the XML element. The XML-element name of the serialized member.
DataType
ToString
[C#] public string DataType {get; set;}
[C++] public: _property String* get_DataType( );public: _property void set_DataType(String*);
[VB] Public Property DataType As String
[JScript] public function get DataType( ): String;public function set DataType(String);
Description
Gets or sets the XML data type of the generated XML element.

The following table lists the XML data types with their .NET equivalents. For the XML date and time data types, the .NET data type consists of a System.DateTime to which the System.Xml.Serialization.SoapElementAttribute has been applied with the System.Xml.Serialization. SoapElementAttribute.DataType set to "date" and "time", respectively.
ElementName
ToString
[C#] public string ElementName {get; set;}
[C++] public: _property String* get_ElementName( ); public: _ property void set_ElementName(String*);
[VB] Public Property ElementName As String
[JScript] public function get ElementName( ): String;public function set ElementName(String);
Description
Gets or sets the name of the generated XML element.
IsNullable
ToString
[C#] public bool IsNullable {get; set;}
[C++] public: _property bool get_IsNullable( );public: _ property void set_IsNullable(bool);
[VB] Public Property IsNullable As Boolean
[JScript] public function get IsNullable( ): Boolean;public function set IsNullable(Boolean);
TypeId
SoapEnumAttribute class (System.Xml.Serialization)
ToString
Description
Controls how the System.Xml.Serialization.XmlSerializer serializes an enumeration member.
SoapEnumAttribute
Example Syntax:
ToString
[C#] public SoapEnumAttribute( );
[C++] public: Soap EnumAttribute( );
[VB] Public Sub New( )
[JScript] public function SoapEnumAttribute( ); Initializes a new instance of the System.Xml.Serialization.SoapEnumAttribute class.
Description
Initializes a new instance of the System.Xml.Serialization. SoapEnumAttribute class.
SoapEnumAttribute
Example Syntax:
ToString
[C#] public SoapEnumAttribute(string name);
[C++] public: Soap EnumAttribute(String* name);
[VB] Public Sub New(ByVal name As String)
[JScript] public function SoapEnumAttribute(name: String);
Description
Initializes a new instance of the System.Xml.Serialization. SoapEnumAttribute class, using the specified element name. The XML element name generated by the System.Xml.Serialization.XmlSerializer.
Name
ToString
[C#] public string Name {get; set;}
[C++] public: _property String* get_Name( );public: _property void set_Name(String*);
[VB] Public Property Name As String
[JScript] public function get Name( ): String;public function set Name(String);
Description
Gets or sets the value generated in an XML-document instance when the System.Xml.Serialization.XmlSerializer serializes an enumeration, or the value recognized when it deserializes the enumeration member.
TypeId SoapIgnoreAttribute class (System.Xml.Serialization)
ToString
Description
Instructs the System.Xml.Serialization.XmlSerializer not to serialize the public field or public read/write property value.

The System.Xml.Serialization.SoapIgnoreAttribute belongs to a family of attributes that controls how the System.Xml.Serialization.XmlSerializer. serializes, or deserializes, an object. If you apply the System.Xml.Serialization.SoapIgnoreAttribute to any member of a class, the System.Xml.Serialization.XmlSerializer ignores the member when serializing or deserializing an instance of the class. For a complete list of similar attributes, see the System.Xml.Serialization.XmlSerializer class.
SoapIgnoreAttribute
Example Syntax:
ToString
[C#] public SoapIgnoreAttribute( );
[C++] public: SoapIgnoreAttribute( );
[VB] Public Sub New( )

[JScript] public function SoapIgnoreAttribute( );
Description
　　Initializes a new instance of the System.Xml.Serialization.
SoapIgnoreAttribute class.
　　TypeId
　　SoapIncludeAttribute class (System.Xml.Serialization)
　　ToString
Description
　　Allows the System.Xml.Serialization.XmlSerializer to recognize a derived class when it serializes or deserializes an object.
　　SoapIncludeAttribute
　　Example Syntax:
　　ToString
[C#] public SoapIncludeAttribute(Type type);
[C++] public: SoapIncludeAttribute(Type* type);
[VB] Public Sub New(ByVal type As Type)
[JScript] public function SoapIncludeAttribute(type: Type);
Description
　　Initializes a new instance of the System.Xml.Serialization.
SoapIncludeAttribute class using the specified type. The System.Type of the derived class to include.
　　Type
　　ToString
[C#] public Type Type {get; set;}
[C++] public: _property Type* get_Type( );public: _property void set_Type(Type*);
[VB] Public Property Type As Type
[JScript] public function get Type( ): Type;public function set Type(Type);
Description
　　Gets or sets the type of the derived class that should be used when serializing or deserializing an object.
　　TypeId
　　SoapReflectionImporter class (System.Xml.Serialization)
　　ToString
Description
　　SoapReflectionImporter
　　Example Syntax:
　　ToString
[C#] public SoapReflectionImporter( );
[C++] public: Soap ReflectionImporter( );
[VB] Public Sub New( )
[JScript] public function SoapReflectionImporter( );
Description
　　SoapReflectionImporter
　　Example Syntax:
　　ToString
[C#] public SoapReflectionImporter(SoapAttributeOverrides attributeOverrides);
[C++] public: Soap ReflectionImporter(SoapAttribute Overrides* attributeOverrides);
[VB] Public Sub New(ByVal attributeOverrides As SoapAttributeOverrides)
[JScript] public function SoapReflectionImporter(attributeOverrides SoapAttributeOverrides);
Description
　　SoapReflectionImporter
　　Example Syntax:
　　ToString
[C#] public SoapReflectionImporter(string defaultNamespace);
[C++] public: Soap ReflectionImporter(String* defaultNamespace);
[VB] Public Sub New(ByVal defaultNamespace As String)
[JScript] public function SoapReflectionImporter(defaultNamespace: String);

Description
　　SoapReflectionImporter
　　Example Syntax:
　　ToString
[C#] public SoapReflectionImporter(SoapAttributeOverrides attributeOverrides, string defaultNamespace);
[C++] public: SoapReflectionImporter(SoapAttributeOverrides* attributeOverrides, String* defaultNamespace);
[VB] Public Sub New(ByVal attributeOverrides As SoapAttributeOverrides, ByVal defaultNamespace As String)
[JScript] public function SoapReflectionImporter(attributeOverrides SoapAttributeOverrides, defaultNamespace: String);
Description
　　ImportMembersMapping
[C#] public XmlMembersMapping ImportMembersMapping(string elementName, string ns, XmlReflectionMember[ ] members);
[C++] public: XmlMembersMapping* ImportMembersMapping(String* elementName, String* ns, XmlReflectionMember* members[ ]);
[VB] Public Function ImportMembersMapping(ByVal elementName As String, ByVal ns As String, ByVal members( ) As XmlReflectionMember) As XmlMembersMapping
[JScript] public function ImportMembersMapping(elementName: String, ns: String, members: XmlReflectionMember[ ]): XmlMembersMapping;
Description
　　ImportMembersMapping
[C#] public XmlMembersMapping ImportMembersMapping(string elementName, string ns, XmlReflectionMember[ ] members, bool hasWrapperElement, bool writeAccessors);
[C++] public: XmlMembersMapping* ImportMembersMapping(String* elementName, String* ns, XmlReflectionMember* members[ ], bool hasWrapperElement, bool writeAccessors);
[VB] Public Function ImportMembersMapping(ByVal elementName As String, ByVal ns As String, ByVal members( ) As XmlReflectionMember, ByVal hasWrapperElement As Boolean, ByVal writeAccessors As Boolean) As XmlMembersMapping
[JScript] public function ImportMembersMapping(elementName: String, ns: String, members: XmlReflectionMember[ ], hasWrapperElement: Boolean, writeAccessors: Boolean): XmlMembersMapping;
Description
　　ImportMembersMapping
[C#] public XmlMembersMapping ImportMembersMapping(string elementName, string ns, XmlReflectionMember[ ] members, bool hasWrapperElement, bool writeAccessors, bool validate);
[C++] public: XmlMembersMapping* ImportMembersMapping(String* elementName, String* ns, XmlReflectionMember* members[ ], bool hasWrapperElement, bool writeAccessors, bool validate);
[VB] Public Function ImportMembersMapping(ByVal elementName As String, ByVal ns As String, ByVal members( ) As XmlReflectionMember, ByVal hasWrapperElement As Boolean, ByVal writeAccessors As Boolean, ByVal validate As Boolean) As XmlMembersMapping
[JScript] public function ImportMembersMapping(elementName: String, ns: String, members: XmlReflectionMember[ ], hasWrapperElement: Boolean, writeAccessors: Boolean, validate: Boolean): XmlMembersMapping;

ImportTypeMapping
[C#] public XmlTypeMapping ImportTypeMapping(Type type);
[C++] public: XmlTypeMapping* ImportTypeMapping (Type* type);
[VB] Public Function ImportTypeMapping(ByVal type As Type) As XmlTypeMapping
[JScript] public function ImportTypeMapping(type: Type): XmlTypeMapping;
Description
   ImportTypeMapping
[C#] public XmlTypeMapping ImportTypeMapping(Type type, string defaultNamespace);
[C++] public: XmlTypeMapping* ImportTypeMapping (Type* type, String* defaultNamespace);
[VB] Public Function ImportTypeMapping(ByVal type As Type, ByVal defaultNamespace As String) As XmlTypeMapping
[JScript] public function ImportTypeMapping(type: Type, defaultNamespace String): XmlTypeMapping;
Description
   IncludeType
[C#] public void IncludeType(Type type);
[C++] public: void IncludeType(Type* type);
[VB] Public Sub IncludeType(ByVal type As Type)
[JScript] public function IncludeType(type: Type);
Description
   IncludeTypes
[C#] public void IncludeTypes(ICustomAttributeProvider provider);
[C++] public: void IncludeTypes(ICustomAttributeProvider* provider);
[VB] Public Sub IncludeTypes(ByVal provider As ICustomAttributeProvider)
[JScript] public function IncludeTypes(provider: ICustomAttributeProvider);
Description
   SoapSchemaExporter class (System.Xml.Serialization)
   ToString
Description
   SoapSchemaExporter
   Example Syntax:
   ToString
[C#] public SoapSchemaExporter(XmlSchemas schemas);
[C++] public: SoapSchemaExporter(XmlSchemas* schemas);
[VB] Public Sub New(ByVal schemas As XmlSchemas)
[JScript] public function SoapSchemaExporter(schemas: XmlSchemas);
Description
   ExportMembersMapping
[C#] public void ExportMembersMapping(XmlMembersMapping xmlMembersMapping);
[C++] public: void ExportMembersMapping(XmlMembersMapping* xmlMembersMapping);
[VB] Public Sub ExportMembersMapping(ByVal xmlMembersMapping As XmlMembersMapping)
[JScript] public function ExportMembersMapping(xmlMembersMapping: XmlMembersMapping);
Description
   ExportMembersMapping
[C#] public void ExportMembersMapping(XmlMembersMapping xmlMembersMapping, bool exportEnclosingType);
[C++] public: void ExportMembersMapping(XmlMembersMapping* xmlMembersMapping, bool exportEnclosingType);
[VB] Public Sub ExportMembersMapping(ByVal xmlMembersMapping As XmlMembersMapping, ByVal exportEnclosingType As Boolean)
[JScript] public function ExportMembersMapping(xmlMembersMapping: XmlMembersMapping, exportEnclosingType: Boolean);
   ExportTypeMapping
[C#] public void ExportTypeMapping(XmlTypeMapping xmlTypeMapping);
[C++] public: void ExportTypeMapping(XmlTypeMapping* xmlTypeMapping);
[VB] Public Sub ExportTypeMapping(ByVal xmlTypeMapping As XmlTypeMapping)
[JScript] public function ExportTypeMapping(xmlTypeMapping: XmlTypeMapping);
   SoapSchemaImporter class (System.Xml.Serialization)
   ToString
Description
   SoapSchemaImporter
   Example Syntax:
   ToString
[C#] public SoapSchemaImporter(XmlSchemas schemas);
[C++] public: SoapSchemaImporter(XmlSchemas* schemas);
[VB] Public Sub New(ByVal schemas As XmlSchemas)
[JScript] public function SoapSchemaImporter(schemas: XmlSchemas);
Description
   SoapSchemaImporter
   Example Syntax:
   ToString
[C#] public SoapSchemaImporter(XmlSchemas schemas, CodeIdentifiers typeIdentifiers);
[C++] public: SoapSchemaImporter(XmlSchemas* schemas, CodeIdentifiers* typeIdentifiers);
[VB] Public Sub New(ByVal schemas As XmlSchemas, ByVal typeIdentifiers As CodeIdentifiers)
[JScript] public function SoapSchemaImporter(schemas: XmlSchemas, typeIdentifiers: CodeIdentifiers);
Description
   ImportDerivedTypeMapping
[C#] public XmlTypeMapping ImportDerivedTypeMapping (XmlQualifiedName name, Type baseType, bool baseTypeCanBeIndirect);
[C++] public: XmlTypeMapping* ImportDerivedTypeMapping(XmlQualifiedName* name, Type* baseType, bool baseTypeCanBeIndirect);
[VB] Public Function ImportDerivedTypeMapping(ByVal name As XmlQualifiedName, ByVal baseType As Type, ByVal baseTypeCanBeIndirect As Boolean) As XmlTypeMapping
[JScript] public function ImportDerivedTypeMapping(name: XmlQualifiedName, baseType: Type, baseTypeCanBeIndirect: Boolean): XmlTypeMapping;
Description
   ImportMembersMapping
[C#] public XmlMembersMapping ImportMembersMapping(string name, string ns, SoapSchemaMember member);
[C++] public: XmlMembersMapping* ImportMembersMapping(String* name, String* ns, SoapSchemaMember* member);
[VB] Public Function ImportMembersMapping(ByVal name As String, ByVal ns As String, ByVal member As SoapSchemaMember) As XmlMembersMapping
[JScript] public function ImportMembersMapping(name: String, ns: String, member: SoapSchemaMember): XmlMembersMapping;

Description
  ImportMembersMapping
[C#] public XmlMembersMapping ImportMembersMapping(string name, string ns, SoapSchemaMember[ ] members);
[C++] public: XmlMembersMapping* ImportMembersMapping(String* name, String* ns, SoapSchemaMember* members[ ]);
[VB] Public Function ImportMembersMapping(ByVal name As String, ByVal ns As String, ByVal members( ) As SoapSchemaMember) As XmlMembersMapping
[JScript] public function ImportMembersMapping(name: String, ns: String, members: SoapSchemaMember[ ]): XmlMembersMapping;
Description
  ImportMembersMapping
[C#] public XmlMembersMapping ImportMembersMapping(string name, string ns, SoapSchemaMember[ ] members, bool hasWrapperElement);
[C++] public: XmlMembersMapping* ImportMembersMapping(String* name, String* ns, SoapSchemaMember* members[ ], bool hasWrapperElement);
[VB] Public Function ImportMembersMapping(ByVal name As String, ByVal ns As String, ByVal members( ) As SoapSchemaMember, ByVal hasWrapperElement As Boolean) As XmlMembersMapping
[JScript] public function ImportMembersMapping(name: String, ns: String, members: SoapSchemaMember[ ], hasWrapperElement: Boolean): XmlMembersMapping;
Description
  ImportMembersMapping
[C#] public XmlMembersMapping ImportMembersMapping(string name, string ns, SoapSchemaMember[ ] members, bool hasWrapperElement, Type baseType, bool baseTypeCanBeIndirect);
[C++] public: XmlMembersMapping* ImportMembersMapping(String* name, String* ns, SoapSchemaMember* members[ ], bool hasWrapperElement, Type* baseType, bool baseTypeCanBeIndirect);
[VB] Public Function ImportMembersMapping(ByVal name As String, ByVal ns As String, ByVal members( ) As SoapSchemaMember, ByVal hasWrapperElement As Boolean, ByVal baseType As Type, ByVal baseTypeCanBeIndirect As Boolean) As XmlMembersMapping
[JScript] public function ImportMembersMapping(name: String, ns: String, members: SoapSchemaMember[ ], hasWrapperElement: Boolean, baseType Type, baseTypeCanBeIndirect: Boolean): XmlMembersMapping;
  SoapSchemaMember class (System.Xml.Serialization)
    ToString
Description
  SoapSchemaMember
  Example Syntax:
    ToString
[C#] public SoapSchemaMember( );
[C++] public: SoapSchemaMember( );
[VB] Public Sub New( )
[JScript] public function SoapSchemaMember( );
  MemberName
    ToString
[C#] public string MemberName {get; set;}
[C++] public: _property String* get_MemberName( );public: _property void set_MemberName(String*);
[VB] Public Property MemberName As String
[JScript] public function get MemberName( ): String;public function set MemberName(String);
Description
  MemberType
    ToString
[C#] public XmlQualifiedName MemberType {get; set;}
[C++] public: _property XmlQualifiedName* get_MemberType( );public: _property void set_MemberType(XmlQualifiedName*);
[VB] Public Property MemberType As XmlQualifiedName
[JScript] public function get MemberType( ): XmlQualifiedName;public function set MemberType(XmlQualifiedName);
Description
  SoapTypeAttribute class (System.Xml.Serialization)
    ToString
Description
  Specifies that the class should be serialized by the XmlSerializer as a complex type XML element.
  The System.Xml.Serialization.SoapTypeAttribute belongs to a family of attributes that controls how the System.Xml.Serialization.XmlSerializer serializes or deserializes an object. For a complete list of similar attributes, see the System.Xml.Serialization.XmlSerializer class.
  SoapTypeAttribute
  Example Syntax:
    ToString
[C#] public SoapTypeAttribute( );
[C++] public: SoapTypeAttribute( );
[VB] Public Sub New( )
[JScript] public function SoapTypeAttribute( ); Initializes a new instance of the System.Xml.Serialization.SoapTypeAttribute class.
Description
  Initializes a new instance of the System.Xml.Serialization.SoapTypeAttribute class.
  SoapTypeAttribute
  Example Syntax:
    ToString
[C#] public SoapTypeAttribute(string typeName);
[C++] public: Soap TypeAttribute(String* typeName);
[VB] Public Sub New(ByVal typeName As String)
[JScript] public function SoapTypeAttribute(typeName: String);
Description
  Initializes a new instance of the System.Xml.Serialization.SoapTypeAttribute class specifying the name of the XML type.
  SoapTypeAttribute
  Example Syntax:
    ToString
[C#] public SoapTypeAttribute(string typeName, string ns);
[C++] public: SoapTypeAttribute(String* typeName, String* ns);
[VB] Public Sub New(ByVal typeName As String, ByVal ns As String)
[JScript] public function SoapTypeAttribute(typeName: String, ns: String);
Description
  Initializes a new instance of the System.Xml.Serialization.SoapTypeAttribute class specifying the name, and XML namespace, of the type.
  IncludeInSchema
    ToString
[C#] public bool IncludeInSchema {get; set;}
[C++] public: _property bool get_IncludeInSchema( );public: _property void set_IncludeInSchema(bool);
[VB] Public Property IncludeInSchema As Boolean
[JScript] public function get IncludeInSchema( ): Boolean; public function set IncludeInSchema(Boolean);

Description
Gets or sets a value indicating whether to include the type in SOAP-encoded XML schema documents.
Apply the System.Xml.Serialization.SoapTypeAttribute to a class to specify the XML type's namespace, the XML type name, and whether to include the type in the XML schema document. To see the results of setting the System.Xml.Serialization.XmlTypeAttribute class's properties, compile your application as an executable or DLL, and pass the resulting file to the XML Schema Definition tool (XSD.exe). The tool writes the schema—including the type definition.
Namespace
ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);
Description
Gets or sets the namespace of the XML type.
TypeId
TypeName
ToString
Description
Gets or sets the name of the XML type.
UnreferencedObjectEventArgs class (System.Xml.Serialization)
ToString
UnreferencedObjectEventArgs
Example Syntax:
ToString
UnreferencedId
ToString
UnreferencedObject
ToString
UnreferencedObjectEventHandler delegate (System.Xml.Serialization)
ToString
XmlAnyAttributeAttribute class (System.Xml.Serialization)
ToString
Description
Specifies that the member, usually a field that returns an array, captures all XML attributes found in a XML document.
The System.Xml.Serialization.XmlAnyAttributeAttribute can be applied to a field, parameter, property, or return value of type System.Xml.XmlElement or System.Xml.XmlNode.
XmlAnyAttributeAttribute
Example Syntax:
ToString
[C#] public XmlAnyAttributeAttribute( );
[C++] public: XmlAnyAttributeAttribute( );
[VB] Public Sub New( )
[JScript] public function XmlAnyAttributeAttribute( ); Constructs a new instance of the System.Xml.Serialization.XmlAnyAttributeAttribute class.
Description
Constructs a new instance of the System.Xml.Serialization.XmlAnyAttributeAttribute class.
XmlAnyAttributeAttribute
Example Syntax:
ToString
[C#] public XmlAnyAttributeAttribute(string name);
[C++] public: XmlAnyAttributeAttribute(String* name);
[VB] Public Sub New(ByVal name As String)
[JScript] public function XmlAnyAttributeAttribute(name: String);
Description
Constructs a new instance of the System.Xml.Serialization.XmlAnyAttributeAttribute class using the specified name. The name of the XML attribute.
XmlAnyAttributeAttribute
Example Syntax:
ToString
[C#] public XmlAnyAttributeAttribute(string name, string ns);
[C++] public: XmlAnyAttributeAttribute(String* name, String* ns);
[VB] Public Sub New(ByVal name As String, ByVal ns As String)
[JScript] public function XmlAnyAttributeAttribute(name: String, ns: String);
Description
Constructs a new instance of the System.Xml.Serialization.XmlAnyAttributeAttribute class; specifies the name and namespace to be generated in the XML document. The name of the XML attribute. The XML namespace of the XML attribute.
Name
ToString
[C#] public string Name {get; set;}
[C++] public: _property String* get_Name( );public: _property void set_Name(String*);
[VB] Public Property Name As String
[JScript] public function get Name( ): String;public function set Name(String);
Description
Gets or sets the name of the XML attribute generated in the XML document.
Namespace
ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);
Description
Gets or sets the XML namespace of the XML attribute generated in the XML document.
TypeId
XmlAnyElementAttribute class (System.Xml.Serialization)
ToString
Description
Specifies that the member, usually a field that returns an array, captures all XML elements found in a XML document being deserialized.
Apply the System.Xml.Serialization.XmlAnyElementAttribute to a field that returns an array of System.Xml.XmlElement objects.
XmlAnyElementAttribute
Example Syntax:
ToString
[C#] public XmlAnyElementAttribute( );
[C++] public: XmlAnyElementAttribute( );
[VB] Public Sub New( )
[JScript] public function XmlAnyElementAttribute( ); Initializes a new instance of the System.Xml.Serialization.XmlAnyElementAttribute class.

Description
Initializes a new instance of the System.Xml.Serialization.XmlAnyElementAttribute class.
XmlAnyElementAttribute
Example Syntax:
ToString
[C#] public XmlAnyElementAttribute(string name);
[C++] public: XmlAnyElementAttribute(String* name);
[VB] Public Sub New(ByVal name As String)
[JScript] public function XmlAnyElementAttribute(name: String);
Description
Initializes a new instance of the System.Xml.Serialization.XmlAnyElementAttribute class; specifies the XML element name generated in the XML-document instance. The name of the XML element that the System.Xml.Serialization.XmlSerializer generates.
XmlAnyElementAttribute
Example Syntax:
ToString
[C#] public XmlAnyElementAttribute(string name, string ns);
[C++] public: XmlAnyElementAttribute(String* name, String* ns);
[VB] Public Sub New(ByVal name As String, ByVal ns As String)
[JScript] public function XmlAnyElementAttribute(name: String, ns: String);
Description
Initializes a new instance of the System.Xml.Serialization.XmlAnyElementAttribute class; specifies the XML element name generated in the XML-document instance and its XML namespace. The name of the XML element that the System.Xml.Serialization.XmlSerializer generates. The XML namespace of the XML element.
Name
ToString
[C#] public string Name {get; set;}
[C++] public: _property String* get_Name( );public: _property void set_Name(String*);
[VB] Public Property Name As String
[JScript] public function get Name( ): String;public function set Name(String);
Description
Gets or sets the XML element name.
Namespace
ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);
Description
Gets or sets the XML namespace generated in the XML document.
TypeId
XmlAnyElementAttributes class (System.Xml.Serialization)
ToString
Description
Represents a collection of System.Xml.Serialization.XmlAnyElementAttribute objects.
Use the System.Xml.Serialization.XmlAnyElementAttributes to override the behavior of a set of System.Xml.Serialization.XmlAnyElementAttribute objects.
XmlAnyElementAttributes
Example Syntax:
ToString
[C#] public XmlAnyElementAttributes( );
[C++] public: XmlAnyElementAttributes( );
[VB] Public Sub New( )
[JScript] public function XmlAnyElementAttributes( );
Count
InnerList
Item
ToString
Description
Gets or sets the System.Xml.Serialization.XmlAnyElementAttribute at the specified index. The index of the System.Xml.Serialization.XmlAnyElementAttribute.
List
Add
[C#] public int Add(XmlAnyElementAttribute attribute);
[C++] public: int Add(XmlAnyElementAttribute* attribute);
[VB] Public Function Add(ByVal attribute As XmlAnyElementAttribute) As Integer
[JScript] public function Add(attribute: XmlAnyElementAttribute): int;
Description
Adds an System.Xml.Serialization.XmlAnyElementAttribute to the collection.
Return Value: The index of the newly added System.Xml.Serialization.XmlAnyElementAttribute. The System.Xml.Serialization.XmlAnyElementAttribute to add.
Contains
[C#] public bool Contains(XmlAnyElementAttribute attribute);
[C++] public: bool Contains(XmlAnyElementAttribute* attribute);
[VB] Public Function Contains(ByVal attribute As XmlAnyElementAttribute) As Boolean
[JScript] public function Contains(attribute: XmlAnyElementAttribute): Boolean;
Description
Gets a value indicating whether the specified System.Xml.Serialization.XmlAnyElementAttribute exists in the collection.
Return Value: true if the System.Xml.Serialization.XmlAnyElementAttribute exists in the collection; otherwise, false. The System.Xml.Serialization.XmlAnyElementAttribute you are interested in.
CopyTo
[C#] public void CopyTo(XmlAnyElementAttribute[ ] array, int index);
[C++] public: void CopyTo(XmlAnyElementAttribute* array[ ], int index);
[VB] Public Sub CopyTo(ByVal array( ) As XmlAnyElementAttribute, ByVal index As Integer)
[JScript] public function CopyTo(array: XmlAnyElementAttribute[ ], index: int);
Description
IndexOf
[C#] public int IndexOf(XmlAnyElementAttribute attribute);
[C++] public: int IndexOf(XmlAnyElementAttribute* attribute);
[VB] Public Function IndexOf(ByVal attribute As XmlAnyElementAttribute) As Integer
[JScript] public function IndexOf(attribute: XmlAnyElementAttribute): int;
Description
Gets the index of the specified System.Xml.Serialization.XmlAnyElementAttribute.

Return Value: The index of the specified System.Xml.Serialization.XmlAnyElementAttribute. The System.Xml.Serialization.XmlAnyElementAttribute whose index you want.
Insert
[C#] public void Insert(int index, XmlAnyElementAttribute attribute);
[C++] public: void Insert(int index, XmlAnyElementAttribute* attribute);
[VB] Public Sub Insert(ByVal index As Integer, ByVal attribute As XmlAnyElementAttribute)
[JScript] public function Insert(index: int, attribute: XmlAnyElementAttribute);
Description
Inserts an System.Xml.Serialization.XmlAnyElementAttribute into the collection at the specified index. The index where the System.Xml.Serialization.XmlAnyElementAttribute will be inserted. The System.Xml.Serialization.XmlAnyElementAttribute to insert.
Remove
[C#] public void Remove(XmlAnyElementAttribute attribute);
[C++] public: void Remove(XmlAnyElementAttribute* attribute);
[VB] Public Sub Remove(ByVal attribute As XmlAnyElementAttribute)
[JScript] public function Remove(attribute: XmlAnyElementAttribute);
Description
Removes the specified System.Xml.Serialization.XmlAnyElementAttribute from the collection. The System.Xml.Serialization.XmlAnyElementAttribute to remove.
XmlArrayAttribute class (System.Xml.Serialization)
ToString
Description
Specifies that the System.Xml.Serialization.XmlSerializer should serialize a particular class member as an array of XML elements.
The System.Xml.Serialization.XmlArrayAttribute belongs to a family of attributes that controls how the System.Xml.Serialization.XmlSerializer serializes, or deserializes, an object. For a complete list of similar attributes, see the System.Xml.Serialization.XmlSerializer class.
XmlArrayAttribute
Example Syntax:
ToString
[C#] public XmlArrayAttribute( );
[C++] public: XmlArrayAttribute( );
[VB] Public Sub New( )
[JScript] public function XmlArrayAttribute( ); Initializes a new instance of the System.Xml.Serialization.XmlArrayAttribute class.
Description
Initializes a new instance of the System.Xml.Serialization.XmlArrayAttribute class.
For more information about using attributes, see.
XmlArrayAttribute
Example Syntax:
ToString
[C#] public XmlArrayAttribute(string elementName);
[C++] public: XmlArrayAttribute(String* elementName);
[VB] Public Sub New(ByVal elementName As String)
[JScript] public function XmlArrayAttribute(elementName: String);
Description
Initializes a new instance of the System.Xml.Serialization.XmlArrayAttribute class; specifies the XML element name generated in the XML-document instance.

For more information about using attributes, see. The name of the XML element that the System.Xml.Serialization.XmlSerializer generates.
ElementName
ToString
[C#] public string ElementName {get; set;}
[C++] public: _property String* get_ElementName( ); public: _ property void set_ElementName(String*);
[VB] Public Property ElementName As String
[JScript] public function get ElementName( ): String;public function set ElementName(String);
Description
Gets or sets the XML element name given to the serialized array.
Specify an System.Xml.Serialization.XmlArrayAttribute.ElementName when you want the generated XML element name to differ from the member's identifier.
Form
ToString
[C#] public XmlSchemaForm Form {get; set;}
[C++] public: _property XmlSchemaForm get_Form( ); public: _property void set_Form(XmlSchemaForm);
[VB] Public Property Form As XmlSchemaForm
[JScript] public function get Form( ): XmlSchemaForm;public function set Form(XmlSchemaForm);
Description
Gets or sets a value indicating whether the XML element name generated by the System.Xml.Serialization.XmlSerializer is qualified or unqualified.
The System.Xml.Serialization.XmlAttributeAttribute.Form property determines whether an XML element name is qualified or unqualified. The System.Xml.Serialization.XmlAttributeAttribute.Form property conforms to the 1999 specification Namespaces in XML which may be located on the World Wide Web (www.) at w3.org.
IsNullable
ToString
[C#] public bool IsNullable {get; set;}
[C++] public: _property bool get_IsNullable( ); public: _Property void set_IsNullable(bool);
[VB] Public Property IsNullable As Boolean
[JScript] public function get IsNullable( ): Boolean;public function set IsNullable(Boolean);
Description
Gets or sets a value indicating whether the System.Xml.Serialization.XmlSerializer should serialize a member that is set to null into the xsi:nil attribute set to true.
The XML schema specification for structures allows an XML document to explicitly signal that an element's content is missing. Such an element contains the attribute xsi:nil set to true. For more information which may be located on the World Wide Web (www.), see the specification located at w3.org/TR/xmlschema-1/ named XML Schema Part 1: Structures.
Namespace
ToString
[C#] public string Namespace {get; set;}
[C++] public: _property String* get_Namespace( ); public: _property void set_Namespace(String*);
[VB] Public Property Namespace As String
[JScript] public function get Namespace( ): String;public function set Namespace(String);
Description
Gets or set the namespace of the XML element.
The System.Xml.Serialization.XmlArrayAttribute.Namespace property allows you to create qualified XML element names. The System.Xml.Serialization. XmlArrayAttribute.Namespace property conforms to the rules for creating an XML namespace may be located on the World Wide Web (www.), and may be found in the document Namespaces in XML located at w3.org.

TypeId
XmlArrayItemAttribute class (System.Xml.Serialization)
ToString

Description

Specifies the derived types that the System.Xml.Serialization.XmlSerializer can place in a serialized array.

The System.Xml.Serialization.XmlArrayItemAttribute belongs to a family of attributes that controls how the System.Xml.Serialization.XmlSerializer serializes, or deserializes, an object. For a complete list of similar attributes, see the System.Xml.Serialization.XmlSerializer class.

XmlArrayItemAttribute
Example Syntax:
ToString
[C#] public XmlArrayItemAttribute( );
[C++] public: XmlArrayItemAttribute( );
[VB] Public Sub New( )
[JScript] public function XmlArrayItemAttribute( ); Initializes a new instance of the System.Xml.Serialization.XmlArrayItemAttribute class.

Description

Initializes a new instance of the System.Xml.Serialization.XmlArrayItemAttribute class.

XmlArrayItemAttribute
Example Syntax:
ToString
[C#] public XmlArrayItemAttribute(string elementName);
[C++] public: XmlArrayItemAttribute(String* elementName);
[VB] Public Sub New(ByVal elementName As String)
[JScript] public function XmlArrayItemAttribute(elementName: String);

Description

Initializes a new instance of the System.Xml.Serialization. XmlArrayItemAttribute class; specifies the name of the XML element generated in the XML-document instance.

This overload sets the System.Xml.Serialization.XmlArrayItemAttribute.ElementName property. The name of the XML element.

XmlArrayItemAttribute
Example Syntax:
ToString
[C#] public XmlArrayItemAttribute(Type type);
[C++] public: XmlArrayItemAttribute(Type* type);
[VB] Public Sub New(ByVal type As Type)
[JScript] public function XmlArrayItemAttribute(type: Type);

Description

Initializes a new instance of the System.Xml.Serialization. XmlArrayItemAttribute class; specifies the System.Type that can be inserted into the serialized array. The System.Type of the object to serialize.

XmlArrayItemAttribute
Example Syntax:
ToString
[C#] public XmlArrayItemAttribute(string elementName, Type type);
[C++] public: XmlArrayItemAttribute(String* elementName, Type* type);
[VB] Public Sub New(ByVal elementName As String, ByVal type As Type)
[JScript] public function XmlArrayItemAttribute(elementName: String, type: Type);

Description

Initializes a new instance of the System.Xml.Serialization. XmlArrayItemAttribute class; specifies the name of the XML element generated in the XML-document instance, and the System.Type that can be inserted into the generated XML-document instance.

This overload sets the System.Xml.Serialization.XmlArrayItemAttribute.ElementName and the System.Xml.Serialization.XmlArrayItemAttribute.Type properties. The name of the XML element. The System.Type of the object to serialize.

DataType
ToString
[C#] public string DataType {get; set;}
[C++] public: _property String* get_DataType( );public: _property void set_DataType(String*);
[VB] Public Property DataType As String
[JScript] public function get DataType( ): String;public function set DataType(String);

Description

Gets or sets the XML data type of the generated XML element.

The following table lists the XML data types with their .NET equivalents. For the XML date and time data types, the .NET data type consists of a System.DateTime to which the System.Xml.Serialization.XmlElementAttribute has been applied with the System.Xml.Serialization.XmlElementAttribute.DataType set to "date" and "time", respectively.

ElementName
ToString
[C#] public string ElementName {get; set;}
[C++] public: _property String* get_ElementName( ); public: _property void set_ElementName(String*);
[VB] Public Property ElementName As String
[JScript] public function get ElementName( ): String;public function set ElementName(String);

Description

Gets or sets the name of the generated XML element.
Specify an System.Xml.Serialization.XmlArrayItemAttribute.ElementName if you want the name of the generated XML element to differ from the member's identifier.

Form
ToString
[C#] public XmlSchemaForm Form {get; set;}
[C++] public: _property XmlSchemaForm get_Form( );public: _property void set_Form(XmlSchemaForm);
[VB] Public Property Form As XmlSchemaForm
[JScript] public function get Form( ): XmlSchemaForm;public function set Form(XmlSchemaForm);

Description

Gets or sets a value indicating whether the name of the generated XML element is qualified.

The System.Xml.Serialization.XmlAttributeAttribute.Form property determines whether an XML element name is qualified, based on the specification Namespaces in XML, which may be located on the World Wide Web (www.) at w3.org.

IsNullable
ToString
[C#] public bool IsNullable {get; set;}
[C++] public: _property bool get_IsNullable( );public: _property void set_IsNullable(bool);

[VB] Public Property IsNullable As Boolean
[JScript] public function get IsNullable( ): Boolean;public function set IsNullable(Boolean);
Description
Gets or sets a value indicating whether the System.Xml.Serialization.XmlSerializer should serialize a member that is set to null into the xsi:nil attribute set to true.

The XML schema specification for structures allows an XML document to explicitly signal that an element's content is missing. Such an element contains the attribute xsi:nil set to true. For more information which may be located on the World Wide Web (www.), see the specification located at w3.org/TR/xmlschema-1/ named XML Schema Part 1: Structures.
Namespace
ToString
[C#] public string Namespace {get; set;}
[C++] public: _property String* get_Namespace( ); public: _property void set_Namespace(String*);
[VB] Public Property Namespace As String
[JScript] public function get Namespace( ): String;public function set Namespace(String);
Description
Gets or sets the namespace of the generated XML element.
The System.Xml.Serialization.XmlArrayItemAttribute.Namespace property conforms to the specification Namespaces in XML which may be located on the World Wide Web (www.) at w3.org.
NestingLevel
ToString
[C#] public int NestingLevel {get; set;}
[C++] public: _property int get_NestingLevel( ); public: _property void set_NestingLevel(int);
[VB] Public Property NestingLevel As Integer
[JScript] public function get NestingLevel( ): int;public function set NestingLevel(int);
Description
Gets or sets the level in a hierarchy of XML elements that the System.Xml.Serialization.XmlArrayItemAttribute affects.

An XML document can contain hierarchies of XML elements. To represent such a hierarchy, an array of arrays is used. In such an array, each index represents a level in the hierarchy. Therefore, the System.Xml.Serialization.XmlArrayItemAttribute.NestingLevel property is only used when applying an System.Xml.Serialization.XmlArrayItemAttribute to a field that returns an array of arrays.
Type
ToString
[C#] public Type Type {get; set;}
[C++] public: _property Type* get_Type( );public: _property void set_Type(Type*);
[VB] Public Property Type As Type
[JScript] public function get Type( ): Type;public function set Type(Type);
Description
Gets or sets the type of the elements in the generated XML array.
Use the System.Xml.Serialization.XmlElementAttribute.Type property to specify an overridden type for a public field or public read/write property value.
TypeId
XmlArrayItemAttributes class (System.Xml.Serialization)
ToString
Description
Represents a collection of System.Xml.Serialization.XmlArrayItemAttribute objects.
The System.Xml.Serialization.XmlArrayItemAttributes class allows you to specify the derived types that can be inserted into an array returned by a public field or public read/write property.
XmlArrayItemAttributes
Example Syntax:
ToString
[C#] public XmlArrayItemAttributes( );
[C++] public: XmlArrayItemAttributes( );
[VB] Public Sub New( )
[JScript] public function XmlArrayItemAttributes( );
Count
InnerList
Item
ToString
Description
Gets or sets the item at the specified index. The zero-based index of the collection member to get or set.
List
Add
[C#] public int Add(XmlArrayItemAttribute attribute);
[C++] public: int Add(XmlArrayItemAttribute* attribute);
[VB] Public Function Add(ByVal attribute As XmlArrayItemAttribute) As Integer
[JScript] public function Add(attribute: XmlArrayItemAttribute): int;
Description
Adds an System.Xml.Serialization.XmlArrayItemAttribute to the collection.
Return Value: The index of the added item. The System.Xml.Serialization.XmlArrayItemAttribute to add to the collection.
Contains
[C#] public bool Contains(XmlArrayItemAttribute attribute);
[C++] public: bool Contains(XmlArrayItemAttribute* attribute);
[VB] Public Function Contains(ByVal attribute As XmlArrayItemAttribute) As Boolean
[JScript] public function Contains(attribute: XmlArrayItemAttribute): Boolean;
Description
CopyTo
[C#] public void CopyTo(XmlArrayItemnAttribute[ ] array, int index);
[C++] public: void CopyTo(XmlArrayItemAttribute* array[ ], int index);
[VB] Public Sub CopyTo(ByVal array( ) As XmlArrayItemAttribute, ByVal index As Integer)
[JScript] public function CopyTo(array: XmlArrayItemAttribute[ ], index: int);
Description
IndexOf
[C#] public int IndexOf(XmlArrayItemAttribute attribute);
[C++] public: int IndexOf(XmlArrayItemAttribute* attribute);
[VB] Public Function IndexOf(ByVal attribute As XmlArrayItemAttribute) As Integer
[JScript] public function IndexOf(attribute: XmlArrayItemAttribute): int;
Description
Insert
[C#] public void Insert(int index, XmlArrayItemAttribute attribute);
[C++] public: void Insert(int index, XmlArrayItemAttribute* attribute);

[VB] Public Sub Insert(ByVal index As Integer, ByVal attribute As XmlArrayItemAttribute)
[JScript] public function Insert(index: int, attribute: XmlArrayItemAttribute);
Description
  Remove
[C#] public void Remove(XmlArrayItemAttribute attribute);
[C++] public: void Remove(XmlArrayItemAttribute* attribute);
[VB] Public Sub Remove(ByVal attribute As XmlArrayItemAttribute)
[JScript] public function Remove(attribute: XmlArrayItemAttribute);
Description
  XmlAttributeAttribute class (System.Xml.Serialization)
  ToString
Description
  Specifies that the System.Xml.Serialization.XmlSerializer should serialize the class member as an XML attribute.
  The System.Xml.Serialization.XmlAttributeAttribute belongs to a family of attributes that controls how the System.Xml.Serialization.XmlSerializer serializes, or deserializes, an object. For a complete list of similar attributes, see the System.Xml.Serialization.XmlSerializer class.
  XmlAttributeAttribute
  Example Syntax:
  ToString
[C#] public XmlAttributeAttribute( );
[C++] public: XmlAttributeAttribute( );
[VB] Public Sub New( )
[JScript] public function XmlAttributeAttribute( ); Initializes a new instance of the System.Xml.Serialization.XmlAttributeAttribute class.
Description
  Initializes a new instance of the System.Xml.Serialization.XmlAttributeAttribute class.
  XmlAttributeAttribute
  Example Syntax:
  ToString
[C#] public XmlAttributeAttribute(string attributeName);
[C++] public: XmlAttributeAttribute(String* attributeName);
[VB] Public Sub New(ByVal attributeName As String)
[JScript] public function XmlAttributeAttribute(attributeName: String);
Description
  Initializes a new instance of the System.Xml.Serialization.XmlAttributeAttribute class and specifies the name of the generated XML attribute. The name of the XML attribute that the System.Xml.Serialization.XmlSerializer generates.
  XmlAttributeAttribute
  Example Syntax:
  ToString
[C#] public XmlAttributeAttribute(Type type);
[C++] public: XmlAttributeAttribute(Type* type);
[VB] Public Sub New(ByVal type As Type)
[JScript] public function XmlAttributeAttribute(type: Type);
Description
  Initializes a new instance of the System.Xml.Serialization.XmlAttributeAttribute class. The System.Type used to store the attribute.
  XmlAttributeAttribute
  Example Syntax:
  ToString
[C#] public XmlAttributeAttribute(string attributeName, Type type);
[C++] public: XmlAttributeAttribute(String* attributeName, Type* type);
[VB] Public Sub New(ByVal attributeName As String, ByVal type As Type)
[JScript] public function XmlAttributeAttribute(attributeName: String, type: Type);
Description
  Initializes a new instance of the System.Xml.Serialization.XmlAttributeAttribute class. The name of the XML attribute that is generated. The System.Type used to store the attribute.
  AttributeName
  ToString
[C#] public string AttributeName {get; set;}
[C++] public: _property String* get_AttributeName( );public: _property void set_AttributeName(String*);
[VB] Public Property AttributeName As String
[JScript] public function get AttributeName( ): String;public function set AttributeName(String);
Description
  Gets or sets the name of the XML attribute.
  Use the System.Xml.Serialization.XmlAttributeAttribute.AttributeName property to specify an XML attribute name when the default value cannot be used. For example, if the XML attribute name is illegal as a member identifier, you can use a legal name for the identifier while setting the System.Xml.Serialization.XmlAttributeAttribute.AttributeName to an illegal name.
  DataType
  ToString
[C#] public string DataType {get; set;}
[C++] public: _property String* get_DataType( );public: _property void set_DataType(String*);
[VB] Public Property DataType As String
[JScript] public function get DataType( ): String;public function set DataType(String);
Description
  Gets or sets the XML data type of the XML attribute generated by the System.Xml.Serialization.XmlSerializer.
  The following table lists the XML data types with their .NET equivalents. For the XML date and time data types, the .NET data type consists of a System.DateTime to which the System.Xml.Serialization.XmlElementAttribute has been applied with the System.Xml.Serialization.XmlElementAttribute.DataType set to "date" and "time", respectively.
  Form
  ToString
[C#] public XmlSchemaForm Form {get; set;}
[C++] public: _property XmlSchemaForm get_Form( );public: _property void set_Form(XmlSchemaForm);
[VB] Public Property Form As XmlSchemaForm
[JScript] public function get Form( ): XmlSchemaForm;public function set Form(XmlSchemaForm);
Description
  Gets or sets a value indicating whether the XML attribute name generated by the System.Xml.Serialization.XmlSerializer is qualified.
  The System.Xml.Serialization.XmlAttributeAttribute.Form property determines whether an XML element is qualified or unqualified. The System.Xml.Serialization.XmlAttributeAttribute.Form property conforms to the 1999 specification Namespaces in XML which may be located on the World Wide Web (www.) at w3.org.
  Namespace
  ToString

[C#] public string Namespace {get; set;}
[C++] public: _property String* get_Namespace( );
public: _property void set_Namespace(String*);
[VB] Public Property Namespace As String
[JScript] public function get Namespace( ): String;public function set Namespace(String);
Description
  Gets or sets the XML namespace of the XML attribute.
  The System.Xml.Serialization.XmlAttributeAttribute.Namespace property conforms to the specification Namespaces in XML which may be located on the World Wide Web (www.) at w3.org.
  Type
  ToString
[C#] public Type Type {get; set;}
[C++] public: _property Type* get_Type( );public: _property void set_Type(Type*);
[VB] Public Property Type As Type
[JScript] public function get Type( ): Type;public function set Type(Type);
Description
  Gets or sets the complex type of the XML attribute.
  TypeId
  XmlAttributeEventArgs
  class (System.Xml.Serialization)
  ToString
Description
  Provides data for the System.Xml.Serialization.XmlSerializer.UnknownAttribute event.
  For more information about handling events, see.
  Attr
  ToString
[C#] public XmlAttribute Attr {get;}
[C++] public: _property XmlAttribute* get_Attr( );
[VB] Public ReadOnly Property Attr As XmlAttribute
[JScript] public function get Attr( ): XmlAttribute;
Description
  Gets an object that represents the unknown XML attribute.
  LineNumber
  ToString
[C#] public int LineNumber {get;}
[C++] public: _property int get_LineNumber( );
[VB] Public ReadOnly Property LineNumber As Integer
[JScript] public function get LineNumber( ): int;
Description
  Gets the line number of the unknown XML attribute.
  LinePosition
  ToString
[C#] public int LinePosition {get;}
[C++] public: _property int get_LinePosition( );
[VB] Public ReadOnly Property LinePosition As Integer
[JScript] public function get LinePosition( ): int;
Description
  Gets the position in the line of the unknown XML attribute.
  ObjectBeingDeserialized
  ToString
[C#] public object ObjectBeingDeserialized {get;}
[C++] public: _property Object* get_ObjectBeingDeserialized( );
[VB] Public ReadOnly Property ObjectBeingDeserialized As Object
[JScript] public function get ObjectBeingDeserialized( ): Object;
Description
  Gets the object being deserialized.
  XmlAttributeEventHandler delegate (System.Xml.Serialization)
  ToString
Description
  Represents the method that will handle the System.Xml.Serialization.XmlSerializer.UnknownAttribute
  The source of the event. An System.Xml.Serialization.XmlAttributeEventArgs that contains the event data.
  When you create an System.Xml.Serialization.XmlAttributeEventHandler delegate, you identify the method that will handle the event. To associate the event with your event handler, add an instance of the delegate to the event. The event handler is called whenever the event occurs, unless you remove the delegate. For more information about event handler delegates, see.
  XmlAttributeOverrides class (System.Xml.Serialization)
  ToString
Description
  Allows you to override property, field, and class attributes when you use the System.Xml.Serialization.XmlSerializer to serialize or deserialize an object.
  The System.Xml.Serialization.XmlAttributeOverrides enables the System.Xml.Serialization.XmlSerializer to override the default way of serializing a set of objects. Overriding serialization in this way has two uses: first, you can control and augment the serialization of objects found in a DLL—even if you don't have access to the source; second, you can create one set of serializable classes, but serialize the objects in multiple ways. For example, instead of serializing members of a class instance as XML elements, you can serialize them as XML attributes, resulting in a more efficient document to transport.
  XmlAttributeOverrides
  Example Syntax:
  ToString
[C#] public XmlAttributeOverrides( );
[C++] public: XmlAttributeOverrides( );
[VB] Public Sub New( )
[JScript] public function XmlAttributeOverrides( );
  Item
  ToString
[C#] public XmlAttributes this[Type type] {get;}
[C++] public: _property XmlAttributes* get_Item(Type* type);
[VB] Public Default ReadOnly Property Item(ByVal type As Type) As XmlAttributes
[JScript] returnValue=XmlAttributeOverridesObject.Item (type); Gets an object that represents the collection of overriding attributes.
Description
  Gets the object associated with the specified, base-class, type.
  Use this overload to return an System.Xml.Serialization.XmlAttributes object that contains attributes for an System.Xml.Serialization.XmlRootAttribute or System.Xml.Serialization.XmlTypeAttribute object. The base-class class System.Type that is associated with the collection of attributes you want.
  Item
  ToString
[C#] public XmlAttributes this[Type type, string member] {get;}
[C++] public: _property XmlAttributes* get_Item(Type* type, String* member);
[VB] Public Default ReadOnly Property Item(ByVal type As Type, ByVal member As String) As XmlAttributes
[JScript] returnValue=XmlAttributeOverridesObject.Item (type, member);

Description

Gets the object associated with the specified (base-class) type. The member parameter specifies the base-class member that is overridden.

Use this overload to return an System.Xml.Serialization.XmlAttributes object that contains objects that override an System.Xml.Serialization.XmlArrayAttribute, System.Xml.Serialization.XmlArrayItemAttribute, System.Xml.Serialization.XmlAttributeAttribute, System.Xml.Serialization.XmlElementAttribute, or System.Xml.Serialization.XmlEnumAttribute. If the System.Xml.Serialization.XmlAttributes object contains for an System.Xml.Serialization.XmlRootAttribute or System.Xml.Serialization.XmlTypeAttribute, you must use the overload that specifies only the overridden type. The base-class class System.Type that is associated with the collection of attributes you want. The name of the overridden member that specifies the System.Xml.Serialization.XmlAttributes to return.

Add

[C#] public void Add(Type type, XmlAttributes attributes);
[C++] public: void Add(Type* type, XmlAttributes* attributes);
[VB] Public Sub Add(ByVal type As Type, ByVal attributes As XmlAttributes)
[JScript] public function Add(type: Type, attributes: XmlAttributes); Adds an System.Xml.Serialization.XmlAttributes object to the collection of System.Xml.Serialization.XmlAttributes objects.

Description

Adds an System.Xml.Serialization.XmlAttributes object to the collection of System.Xml.Serialization.XmlAttributes objects. The type parameter specifies an object to be overridden by the System.Xml.Serialization.XmlAttributes object.

The System.Xml.Serialization.XmlAttributes object contains a union of attribute objects that cause the System.Xml.Serialization.XmlSerializer to override its default serialization behavior for a set of objects. You choose the attribute objects to place in the System.Xml.Serialization.XmlAttributes object, depending on the particular behaviors you want to override. For example, the XmlSerializer serializes a class member as an XML element by default. If you want the member to be serialized as an XmlAttribute instead, you would create an System.Xml.Serialization.XmlAttributeAttribute, assign it to the System.Xml.Serialization.XmlAttributes.XmlAttribute property of an System.Xml.Serialization.XmlAttributes, and add the System.Xml.Serialization.XmlAttributes object to the System.Xml.Serialization.XmlAttributeOverrides object. The System.Type of the object that will be overridden. An System.Xml.Serialization.XmlAttributes object that represents the overriding attributes.

Add

[C#] public void Add(Type type, string member, XmlAttributes attributes);
[C++] public: void Add(Type* type, String* member, XmlAttributes* attributes);
[VB] Public Sub Add(ByVal type As Type, ByVal member As String, ByVal attributes As XmlAttributes)
[JScript] public function Add(type: Type, member: String, attributes: XmlAttributes);

Description

Adds an System.Xml.Serialization.XmlAttributes object to the collection of System.Xml.Serialization.XmlAttributes objects. The type parameter specifies an object to be overridden. The member parameter specifies the name of a member that will be overridden.

The System.Xml.Serialization.XmlAttributes object contains a union of attribute objects that cause the System.Xml.Serialization.XmlSerializer to override its default serialization behavior for a set of objects. You choose the attribute objects to place in the System.Xml.Serialization.XmlAttributes object, depending on the particular behaviors you want to override. For example, the XmlSerializer serializes a class member as an XML element by default. If you want the member to be serialized as an XmlAttribute instead, you would create an System.Xml.Serialization.XmlAttributeAttribute, assign it to the System.Xml.Serialization.XmlAttributes.XmlAttribute property of an System.Xml.Serialization.XmlAttributes, and add the System.Xml.Serialization.XmlAttributes object to the System.Xml.Serialization.XmlAttributeOverrides object. The System.Type of the object to override. The name of the member to override. An System.Xml.Serialization.XmlAttributes object that represents the overriding attributes.

XmlAttributes class (System.Xml.Serialization)
ToString
Description

Represents a collection of attribute objects that control how the System.Xml.Serialization.XmlSerializer serializes and deserializes an object.

Creating the System.Xml.Serialization.XmlAttributes is part of a process that overrides the default way the System.Xml.Serialization.XmlSerializer serializes class instances. For example, suppose you want to serialize an object that is created from a DLL which has an inaccessible source. By using the System.Xml.Serialization.XmlAttributeOverrides, you can augment or otherwise control how the object is serialized.

XmlAttributes
Example Syntax:
ToString
[C#] public XmlAttributes( );
[C++] public: XmlAttributes( );
[VB] Public Sub New( )
[JScript] public function XmlAttributes( ); Initializes a new instance of the System.Xml.Serialization.XmlAttributes class.

Description

Initializes a new instance of the System.Xml.Serialization.XmlAttributes class.

XmlAttributes
Example Syntax:
ToString
[C#] public XmlAttributes(ICustomAttributeProvider provider);
[C++] public: XmlAttributes(ICustomAttributeProvider* provider);
[VB] Public Sub New(ByVal provider As ICustomAttributeProvider)
[JScript] public function XmlAttributes(provider: ICustomAttributeProvider);

Description

XmlAnyAttribute
ToString
[C#] public XmlAnyAttributeAttribute XmlAnyAttribute {get; set;}
[C++] public: _property XmlAnyAttributeAttribute* get_XmlAnyAttribute( );public: _property void set_XmlAnyAttribute(XmlAnyAttributeAttribute*);
[VB] Public Property XmlAnyAttribute As XmlAnyAttributeAttribute

[JScript] public function get XmlAnyAttribute( ): XmlAnyAttributeAttribute;public function set XmlAnyAttribute (XmlAnyAttributeAttribute);
Description
Gets or sets the System.Xml.Serialization.XmlAnyAttributeAttribute to override.
XmlAnyElements
ToString
[C#] public XmlAnyElementAttributes XmlAnyElements {get;}
[C++] public: _property XmlAnyElementAttributes* get_XmlAnyElements( );
[VB] Public ReadOnly Property XmlAnyElements As XmlAnyElementAttributes
[JScript] public function get XmlAnyElements( ): XmlAnyElementAttributes;
Description
Gets the collection of System.Xml.Serialization.XmlAnyElementAttribute objects to override.
XmlArray
ToString
[C#] public XmlArrayAttribute XmlArray {get; set;}
[C++] public: _property XmlArrayAttribute* get_XmlArray( );public: _property void set_XmlArray(XmlArrayAttribute*);
[VB] Public Property XmlArray As XmlArrayAttribute
[JScript] public function get XmlArray( ): XmlArrayAttribute;public function set XmlArray(XmlArrayAttribute);
Description
Gets or sets an object that specifies how the System.Xml.Serialization.XmlSerializer serializes a public field or read/write property that returns an array.
There are two ways in which a public field or public read/write property that returns an array is serialized by the System.Xml.Serialization.XmlSerializer: (1) the default serialization, and (2) the controlled serialization.
XmlArrayItems
ToString
[C#] public XmlArrayItemAttributes XmlArrayItems {get;}
[C++] public: _property XmlArrayItemAttributes* get_XmlArrayItems( );
[VB] Public ReadOnly Property XmlArrayItems As XmlArrayItemAttributes
[JScript] public function get XmlArrayItems( ): XmlArrayItemAttributes;
Description
Gets or sets a collection of objects that specify how the System.Xml.Serialization.XmlSerializer serializes items inserted into an array returned by a public field or read/write property.
The System.Xml.Serialization.XmlAttributes.XmlArrayItems property allows you to specify the derived types that can be inserted into an array returned by a public field or public read/write property. For each new type you want the field or property to accept, create an System.Xml.Serialization.XmlArrayItemAttribute object and System.Xml.Serialization.XmlArrayItemAttributes.Add (System.Xml.Serialization.XmlArrayItemAttribute) it to the System.Xml.Serialization.XmlArrayItemAttributes) returned by the System.Xml.Serialization.XmlAttributes.XmlArrayItems property. (The new type must be derived from the type already accepted by the field or property.) System.Xml.Serialization.XmlAttributeOverrides.Add(System.Type,System.Xml.Serialization.XmlAttributes) the System.Xml.Serialization.XmlAttributes object to an System.Xml.Serialization.XmlAttributeOverrides object, specifying the type of the object containing the field or property, and the name of the field or property. Construct an System.Xml.Serialization.XmlSerializer with the System.Xml.Serialization.XmlAttributeOverrides object before calling System.Xml.Serialization.XmlSerializer.Serialize (System.IO.Textwriter,System.Object) or System.Xml.Serialization.XmlSerializer.Deserialize(System.IO.Stream) method.
XmlAttribute
ToString
[C#] public XmlAttributeAttribute XmlAttribute {get; set;}
[C++] public: _property XmlAttributeAttribute* get_XmlAttribute( );public: _property void set_XmlAttribute(XmlAttributeAttribute*);
[VB] Public Property XmlAttribute As XmlAttributeAttribute
[JScript] public function get XmlAttribute( ): XmlAttributeAttribute;public function set XmlAttribute(XmlAttributeAttribute);
Description
Gets or sets an object that specifies how the System.Xml.Serialization.XmlSerializer serializes a public field or public read/write property as an XML attribute.
By default, if no attribute is applied to a public field or public read/write property, it will be serialized as an XML element. You can also instruct the System.Xml.Serialization.XmlSerializer to generate an XML attribute by applying an System.Xml.Serialization.XmlAttributeAttribute to the field or property.
XmlChoiceIdentifier
ToString
[C#] public XmlChoiceIdentifierAttribute XmlChoiceIdentifier {get;}
[C++] public: _property XmlChoiceIdentifierAttribute* get_XmlChoiceIdentifier( );
[VB] Public ReadOnly Property XmlChoiceIdentifier As XmlChoiceIdentifierAttribute
[JScript] public function get XmlChoiceIdentifier( ) XmlChoiceIdentifierAttribute;
XmlDefaultValue
ToString
[C#] public object XmlDefaultValue {get; set;}
[C++] public: _property Object* get_XmlDefaultValue( );public: _property void set_XmlDefaultValue(Object*);
[VB] Public Property XmlDefaultValue As Object
[JScript] public function get XmlDefaultValue( ): Object; public function set XmlDefaultValue(Object);
Description
Gets or sets the default value of an XML element or attribute.
You can specify the default value of an XML element or XML attribute by applying a System.ComponentModel.DefaultValueAttribute to a member. To examine the result of applying the value, compile the application into a DLL or executable, and pass the resulting file as an argument to the XML Schema Definition tool (XSD.exe). In the XML schema document, a default value is assigned to the default attribute. In the example below, the default for the Animal element is "Dogs." To override the default value, create an System.Object and assign it to the System.Xml.Serialization.XmlAttributes.XmlDefaultValue.
XmlElements
ToString
[C#] public XmlElementAttributes XmlElements {get;}
[C++] public: _property XmlElementAttributes* get_XmlElements( );

[VB] Public ReadOnly Property XmlElements As XmlElementAttributes
[JScript] public function get XmlElements( ): XmlElementAttributes;
Description
Gets or sets a collection of objects that specify how the System.Xml.Serialization.XmlSerializer serializes a public field or read/write property as an XML element.

For each overridden member that is serialized as an XML element, you must add a new System.Xml.Serialization.XmlElementAttribute to an System.Xml.Serialization.XmlElementAttributes by calling the System.Xml.Serialization.XmlElementAttributes.Add (System.Xml.Serialization.XmlElementAttribute) method. By default, an System.Xml.Serialization.XmlElementAttributes object is created and assigned to the System.Xml.Serialization.XmlAttributes.XmlElements property.

XmlEnum
ToString
[C#] public XmlEnumAttribute XmlEnum {get; set;}
[C++] public: _property XmlEnumAttribute* get_XmlEnum( );public: _property void set_XmlEnum(XmlEnumAttribute*);
[VB] Public Property XmlEnum As XmlEnumAttribute
[JScript] public function get XmlEnum( ): XmlEnumAttribute;public function set XmlEnum(XmlEnumAttribute);
Description
Gets or sets an object that specifies how the System.Xml.Serialization.XmlSerializer serializes an enumeration member.

For each identifier you want to override, you must create an System.Xml.Serialization.XmlAttributes object, and set the System.Xml.Serialization.XmlAttributes.XmlEnum property to an System.Xml.Serialization.XmlEnumAttribute that overrides the identifier. Add the System.Xml.Serialization.XmlAttributes object to the System.Xml.Serialization.XmlAttributeOverrides object, specifying both the System.Type of the class that contains the enumeration, and the overridden member name.

XmlIgnore
ToString
[C#] public bool XmlIgnore {get; set;}
[C++] public: _property bool get_XmlIgnore( );public: _property void set_XmlIgnore(bool);
[VB] Public Property XmlIgnore As Boolean
[JScript] public function get XmlIgnore( ): Boolean;public function set XmlIgnore(Boolean);
Description
Gets or sets a value that specifies whether or not the System.Xml.Serialization.XmlSerializer serializes a public field or public read/write property.

By default, all public fields and public read/write properties are serialized by the System.Xml.Serialization.XmlSerializer. That is, the value of each public field or property is persisted as an XML element or XML attribute in an XML-document instance.

XmlRoot
ToString
[C#] public XmlRootAttribute XmlRoot {get; set;}
[C++] public: _property XmlRootAttribute* get_XmlRoot( );public: _property void set_XmlRoot(XmlRootAttribute*);
[VB] Public Property XmlRoot As XmlRootAttribute
[JScript] public function get XmlRoot( ): XmlRootAttribute;public function set XmlRoot(XmlRootAttribute);

Description
Gets or sets an object that specifies how the System.Xml.Serialization.XmlSerializer serializes a class as an XML root element.

XmlText
ToString
[C#] public XmlTextAttribute XmlText {get; set;}
[C++] public: _property XmlTextAttribute* get_XmlText( );public: _property void set_XmlText(XmlTextAttribute*);
[VB] Public Property XmlText As XmlTextAttribute
[JScript] public function get XmlText( ): XmlTextAttribute;public function set XmlText(XmlTextAttribute);
Description
Gets or sets an object that instructs the System.Xml.Serialization.XmlSerializer to serialize a public field or public read/write property as XML text.

By default, a public field or public read/write property will be serialized as an XML element by the System.Xml.Serialization.XmlSerializer. However, can force the field or property to be serialized as XML text by applying an System.Xml.Serialization.XmlTextAttribute to the field or property.

XmlType
ToString
[C#] public XmlTypeAttribute XmlType {get; set;}
[C++] public: _property XmlTypeAttribute* get_XmlType( );public: _property void set_XmlType(XmlTypeAttribute*);
[VB] Public Property XmlType As XmlTypeAttribute
[JScript] public function get XmlType( ): XmlTypeAttribute;public function set XmlType(XmlTypeAttribute);
Description
Gets or sets an object that specifies how the System.Xml.Serialization.XmlSerializer serializes a class to which the System.Xml.Serialization.XmlTypeAttribute has been applied.

XmlChoiceIdentifierAttribute class (System.Xml.Serialization)
ToString
Description
Specifies that the member can be further disambiguated by using an enumeration.

The XML schema element definition named xsi:choice is used to define a complex element that can contain only one child in an instance (maxoccurs=1). That child can be one of several types, and it can have one of several names. Each name is associated with a specific type; however, several names can be associated with the same type. Because of this, an instance of such an element is ambiguous. For example, consider the following schema fragment that defines such an ambiguous element named MyChoices: The System.Xml.Serialization.XmlChoiceIdentifierAttribute allows you to assign a special enumeration value to each instance of the member. You must either create the enumeration yourself, or it can be generated by the tool. The C# code below shows how the System.Xml.Serialization.XmlChoiceIdentifierAttribute is applied to an Item field; the System.Xml.Serialization.XmlChoiceIdentifierAttribute.MemberName property identifies the field that contains the enumeration that is further used to disambiguate the choice: public class MyChoice{[XmlChoice("itemType")] public string Item; //Do not serialize this next field: [XmlIgnore] public ItemChoiceType ItemType;} //Do not include this enumeration in the XML schema. [XmlType(IncludeInSchema=false)] public enum ItemChoiceType {None, ChoiceOne, ChoiceTwo,} When this code is in place, you can serialize and deserialize this class by setting the itemType field to an appropriate enumeration. For example to serialize the class, the C# code resembles the following: MyChoice mc=new MyChoice( ); mc.Item="Item Choice One"; mc.ItemType=ItemChoiceType.ChoiceOne; When deserializing, the C# code might resemble the following: MyChoice mc=(MyChoice) myXmlSerializer.Deserialize(myReader);
if(mc.ItemType==ItemChoiceType.ChoiceOne) {//Handle choice one.}
if(mc.ItemType==ItemChoiceType.ChoiceTwo) {//Handle choice two.} if(mc.ItemType !=null) {throw CreateUnknownTypeException(mc.Item);} There is a second scenario when the System.Xml.Serialization.XmlChoiceIdentifierAttribute is used. In the schema below, the member is a field that returns an array of items (maxOccurs="unbounded"). The array can contain objects of the first choice ("D-a-t-a"), and of the second choice ("MoreData"): The resulting class, then, uses a field to return an array of items. And for each item in the array, a corresponding ItemChoiceType enumeration must also be found. The matching enumerations are contained in the array returned by ItemsElementName field: public class MyChoice {[System.Xml.Serialization.XmlElementAttribute("D-a-t-a", typeof(string), IsNullable=false)]
[System.Xml.Serialization.XmlElementAttribute("MoreData", typeof(string), IsNullable=false)]
[System.Xml.Serialization.XmlChoiceIdentifierAttribute ("ItemsElementName")] public string[ ] Items;
[System.Xml.Serialization.XmlElementAttribute (IsNullable=false)]
[System.Xml.Serialization.XmlIgnoreAttribute( )] public ItemsChoiceType[ ] ItemsElementName;}
[System.Xml.Serialization.XmlTypeAttribute (IncludeInSchema=false)] public enum ItemsChoiceType {[System.Xml.Serialization.XmlEnumAttribute("D-a-t-a")] Data, MoreData,}

XmlChoiceIdentifierAttribute
 Example Syntax:
 ToString
[C#] public XmlChoiceIdentifierAttribute( );
[C++] public: XmlChoiceIdentifierAttribute( );
[VB] Public Sub New( )
[JScript] public function XmlChoiceIdentifierAttribute( );
Initializes a new instance of the System.Xml.Serialization.XmlChoiceIdentifierAttribute class.
Description
 Initializes a new instance of the System.Xml.Serialization.XmlChoiceIdentifierAttribute class.
 XmlChoiceIdentifierAttribute
 Example Syntax:
 ToString
[C#] public XmlChoiceIdentifierAttribute(string name);
[C++] public: XmlChoiceIdentifierAttribute(String* name);
[VB] Public Sub New(ByVal name As String)
[JScript] public function XmlChoiceIdentifierAttribute (name: String);
Description
 Initializes a new instance of the System.Xml.Serialization.XmlChoiceIdentifierAttribute class, and uses the specified value as the name of the member that returns the disambiguating enumeration. The name of the member that will return the enumeration.
 MemberName
 ToString
[C#] public string MemberName {get; set;}
[C++] public: _property String* get_MemberName( );public: _property void set_MemberName(String*);
[VB] Public Property MemberName As String
[JScript] public function get MemberName( ): String;public function set MemberName(String);
Description
 Gets or sets the name of the field that returns the enumeration to use when disambiguating types.
 TypeId
 XmlCodeExporter class (System.Xml.Serialization)
 ToString
 XmlCodeExporter
 Example Syntax:
 ToString
Description
 XmlCodeExporter
 Example Syntax:
 ToString
[C#] public XmlCodeExporter(CodeNamespace codeNamespace, CodeCompileUnit codeCompileUnit);
[C++] public: XmlCodeExporter(CodeNamespace* codeNamespace, CodeCompileUnit* codeCompileUnit);
[VB] Public Sub New(ByVal codeNamespace As CodeNamespace, ByVal codeCompileUnit As CodeCompileUnit)
[JScript] public function XmlCodeExporter(codeNamespace: CodeNamespace, codeCompileUnit: CodeCompileUnit);
 IncludeMetadata
 ToString
[C#] public CodeAttributeDeclarationCollection IncludeMetadata {get;}
[C++] public: _property CodeAttributeDeclarationCollection* get_IncludeMetadata( );
[VB] Public ReadOnly Property IncludeMetadata As CodeAttributeDeclarationCollection
[JScript] public function get IncludeMetadata( ): CodeAttributeDeclarationCollection;
Description
 AddMappingMetadata
[C#] public void AddMappingMetadata(CodeAttributeDeclarationCollection metadata, XmlMemberMapping member, string ns);
[C++] public: void AddMappingMetadata(CodeAttributeDeclarationCollection* metadata, XmlMemberMapping* member, String* ns);
[VB] Public Sub AddMappingMetadata(ByVal metadata As CodeAttributeDeclarationCollection, ByVal member As XmlMemberMapping, ByVal ns As String)
[JScript] public function AddMappingMetadata(metadata: CodeAttributeDeclarationCollection, member: XmlMemberMapping, ns: String);
Description
 AddMappingMetadata
[C#] public void AddMappingMetadata(CodeAttributeDeclarationCollection metadata, XmlTypeMapping mapping, string ns);
[C++] public: void AddMappingMetadata(CodeAttributeDeclarationCollection* metadata, XmlTypeMapping* mapping, String* ns);
[VB] Public Sub AddMappingMetadata(ByVal metadata As CodeAttributeDeclarationCollection, ByVal mapping As XmlTypeMapping, ByVal ns As String)
[JScript] public function AddMappingMetadata(metadata: CodeAttributeDeclarationCollection, mapping: XmlTypeMapping, ns: String);
Description
 AddMappingMetadata
[C#] public void AddMappingMetadata(CodeAttributeDeclarationCollection metadata, XmlMemberMapping member, string ns, bool forceUseMemberName);

[C++] public: void AddMappingMetadata(CodeAttributeDeclarationCollection* metadata, XmlMemberMapping* member, String* ns, bool forceUseMemberName);
[VB] Public Sub AddMappingMetadata(ByVal metadata As CodeAttributeDeclarationCollection, ByVal member As XmlMemberMapping, ByVal ns As String, ByVal forceUseMemberName As Boolean)
[JScript] public function AddMappingMetadata(metadata: CodeAttributeDeclarationCollection, member: XmlMemberMapping, ns: String, forceUseMemberName: Boolean);
Description
 ExportMembersMapping
[C#] public void ExportMembersMapping(XmlMembersMapping xmlMembersMapping);
[C++] public: void ExportMembersMapping(XmlMembersMapping* xmlMembersMapping);
[VB] Public Sub ExportMembersMapping(ByVal xmlMembersMapping As XmlMembersMapping)
[JScript] public function ExportMembersMapping(xmlMembersMapping: XmlMembersMapping);
Description
 ExportTypeMapping
[C#] public void ExportTypeMapping(XmlTypeMapping xmlTypeMapping);
[C++] public: void ExportTypeMapping(XmlTypeMapping* xmlTypeMapping);
[VB] Public Sub ExportTypeMapping(ByVal xmlTypeMapping As XmlTypeMapping)
[JScript] public function ExportTypeMapping(xmlTypeMapping: XmlTypeMapping);
Description
 XmlElementAttribute class (System.Xml.Serialization)
 ToString
Description
Indicates that a public field or property represents an XML element—when the System.Xml.Serialization.XmlSerializer serializes or deserializes the containing object.
The System.Xml.Serialization.XmlElementAttribute belongs to a family of attributes that controls how the System.Xml.Serialization.XmlSerializer serializes, or deserializes, an object. For a complete list of similar attributes, see the System.Xml.Serialization.XmlSerializer class.
 XmlElementAttribute
 Example Syntax:
 ToString
[C#] public XmlElementAttribute( );
[C++] public: XmlElementAttribute( );
[VB] Public Sub New( )
[JScript] public function XmlElementAttribute( ); Initializes a new instance of the System.Xml.Serialization.XmlElementAttribute class.
Description
Initializes a new instance of the System.Xml.Serialization.XmlElementAttribute class.
 XmlElementAttribute
 Example Syntax:
 ToString
[C#] public XmlElementAttribute(string elementName);
[C++] public: XmlElementAttribute(String* elementName);
[VB] Public Sub New(ByVal elementName As String)
[JScript] public function XmlElementAttribute(elementName: String);
Description
Initializes a new instance of the System.Xml.Serialization.XmlElementAttribute class and specifies the name of the XML element.

By default, the System.Xml.Serialization.XmlSerializer uses the member name as the XML element name when serializing a class instance. For example, a field named Vehicle generates an XML element named Vehicle. However, if you need a different element, such as Cars, pass it in the elementName parameter. The XML-element name of the serialized member.
 XmlElementAttribute
 Example Syntax:
 ToString
[C#] public XmlElementAttribute(Type type);
[C++] public: XmlElementAttribute(Type* type);
[VB] Public Sub New(ByVal type As Type)
[JScript] public function XmlElementAttribute(type: Type);
Description
Initializes a new instance of the System.Xml.Serialization.XmlElementAttribute class, and specifies a derived type for the member to which the System.Xml.Serialization.XmlElementAttribute is applied—used by the System.Xml.Serialization.XmlSerializer when serializing or deserializing a containing object.

Use the type parameter to specify a type that is derived from a base class. For example, suppose a property named MyAnimal returns an Animal object. You want to enhance the object, so you create a new class named Mammal that inherits from the Animal class. To instruct the System.Xml.Serialization.XmlSerializer to accept the Mammal class when it serializes the MyAnimal property, pass the System.Type of the Mammal class to the constructor. The System.Type of an object derived from the member's type.
 XmlElementAttribute
 Example Syntax:
 ToString
[C#] public XmlElementAttribute(string elementName, Type type);
[C++] public: XmlElementAttribute(String* elementName, Type* type);
[VB] Public Sub New(ByVal elementName As String, ByVal type As Type)
[JScript] public function XmlElementAttribute(elementName: String, type: Type);
Description
Initializes a new instance of the System.Xml.Serialization.XmlElementAttribute and specifies the name of the XML element and a derived type for the member to which the System.Xml.Serialization.XmlElementAttribute is applied—used when the System.Xml.Serialization.XmlSerializer serializes a containing object.

By default, the System.Xml.Serialization.XmlSerializer uses the member name as the XML element name when serializing a class instance. For example, a field named Vehicle generates an XML element named Vehicle. However, if you need a different element, such as Cars, pass it in the elementName parameter. The XML-element name of the serialized member. The System.Type of an object derived from the member's type.
 DataType
 ToString
[C#] public string DataType {get; set;}
[C++] public: _property String* get_DataType( );public: _property void set_DataType(String*);
[VB] Public Property DataType As String
[JScript] public function get DataType( ): String;public function set DataType(String);
Description
Gets or sets the XML data type of the generated XML element.

The following table lists the XML data types with their .NET equivalents. For the XML date and time data types, the .NET data type consists of a System.DateTime to which the System.Xml.Serialization.XmlElementAttribute has been applied with the System.Xml.Serialization.XmlElementAttribute.DataType set to "date" and "time", respectively.

ElementName
ToString
[C#] public string ElementName {get; set;}
[C++] public: _property String* get_ElementName( ); public: _ property void set_ElementName(String*);
[VB] Public Property ElementName As String
[JScript] public function get ElementName( ): String;public function set ElementName(String);
Description
Gets or sets the name of the generated XML element.
Specify an System.Xml.Serialization.XmlArrayItemAttribute.ElementName if you want the name of the generated XML element to differ from the member's identifier.

Form
ToString
[C#] public XmlSchemaForm Form {get; set;}
[C++] public: _property XmlSchemaForm get_Form( );public: _property void set_Form(XmlSchemaForm);
[VB] Public Property Form As XmlSchemaForm
[JScript] public function get Form( ): XmlSchemaForm;public function set Form(XmlSchemaForm);
Description
Gets or sets a value indicating whether the element is qualified.
The System.Xml.Serialization.XmlAttributeAttribute.Form property determines whether an XML element is qualified or unqualified. The System.Xml.Serialization.XmlAttributeAttribute.Form property conforms to the 1999 specification "Namespaces in XML" which may be located on the World Wide Web (www.) w3.org.

IsNullable
ToString
[C#] public bool IsNullable {get; set;}
[C++] public: _property bool get_IsNullable( );public: _property void set_IsNullable(bool);
[VB] Public Property IsNullable As Boolean
[JScript] public function get IsNullable( ): Boolean;public function set IsNullable(Boolean);
Description
Gets or sets a value indicating whether the System.Xml.Serialization.XmlSerializer should serialize a member that is set to null into the xsi:nil attribute set to true.
The XML schema specification for structures allows an XML document to explicitly signal that an element's content is missing. Such an element contains the attribute xsi:nil set to true. For more information which may be located on the World Wide Web (www.), see the specification located at w3.org/TR/xmlschema-1/ named XML Schema Part 1: Structures.

Namespace
ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);
Description
Gets or sets the namespace assigned to the XML element that results when the class is serialized.
The System.Xml.Serialization.XmlArrayItemAttribute.Namespace property conforms to the specification Namespaces in XML which may be located on the World Wide Web (www.) at w3.org.

Type
ToString
[C#] public Type Type {get; set;}
[C++] public: _property Type* get_Type( );public: _property void set_Type(Type*);
[VB] Public Property Type As Type
[JScript] public function get Type( ): Type;public function set Type(Type);
Description
Gets or sets the object type used to represent the XML element.
Use the System.Xml.Serialization.XmlElementAttribute.Type property specify a derived type for a field or property.

TypeId
XmlElementAttributes class (System.Xml.Serialization)
ToString
Description
Represents a collection of System.Xml.Serialization.XmlElementAttribute, which the System.Xml.Serialization.XmlSerializer uses to override the default way it serializes a class.
The System.Xml.Serialization.XmlElementAttributes is returned by the System.Xml.Serialization.XmlAttributes.XmlElements property of the System.Xml.Serialization.XmlAttributes class. By using the System.Xml.Serialization.XmlAttributeOverrides and the System.Xml.Serialization.XmlAttributes class, you can override the default way that the System.Xml.Serialization.XmlSerializer serializes a class.

XmlElementAttributes
Example Syntax:
ToString
[C#] public XmlElementAttributes( );
[C++] public: XmlElementAttributes( );
[VB] Public Sub New( )
[JScript] public function XmlElementAttributes( );
Count
InnerList
Item
ToString
Description
Gets or sets an System.Xml.Serialization.XmlElementAttribute from the collection. The zero-based index of the collection member to get or set.
List
Add
[C#] public int Add(XmlElementAttribute attribute);
[C++] public: int Add(XmlElementAttribute* attribute);
[VB] Public Function Add(ByVal attribute As XmlElementAttribute) As Integer
[JScript] public function Add(attribute: XmlElementAttribute): int;
Description
Adds an System.Xml.Serialization.XmlElementAttribute to the collection.
Return Value: The zero-based index of the newly added item. The System.Xml.Serialization.XmlElementAttribute to add.
Contains
[C#] public bool Contains(XmlElementAttribute attribute);

[C++] public: bool Contains(XmlElementAttribute* attribute);
[VB] Public Function Contains(ByVal attribute As XmlElementAttribute) As Boolean
[JScript] public function Contains(attribute: XmlElementAttribute): Boolean;
Description
Gets a value that specifies whether the collections contains the specified object.
Return Value: true, if the object exists in the collection; otherwise, false. The XmlElementAttribute in question.
CopyTo
[C#] public void CopyTo(XmlElementAttribute[ ] array, int index);
[C++] public: void CopyTo(XmlElementAttribute* array[ ], int index);
[VB] Public Sub CopyTo(ByVal array( ) As XmlElementAttribute, ByVal index As Integer)
[JScript] public function CopyTo(array: XmlElementAttribute[ ], index: int);
Description
Copies the XmlElementAttributes, or a portion of it to a one-dimensional array. The System.Xml.Serialization.XmlElementAttribute array to copy to.
The zero-based index in array at which copying begins.
IndexOf
[C#] public int IndexOf(XmlElementAttribute attribute);
[C++] public: int IndexOf(XmlElementAttribute* attribute);
[VB] Public Function IndexOf(ByVal attribute As XmlElementAttribute) As Integer
[JScript] public function IndexOf(attribute: XmlElementAttribute): int;
Description
Gets the index of the specified System.Xml.Serialization.XmlElementAttribute.
Return Value: The zero-based index of the System.Xml.Serialization.XmlElementAttribute.
Insert
[C#] public void Insert(int index, XmlElementAttribute attribute);
[C++] public: void Insert(int index, XmlElementAttribute* attribute);
[VB] Public Sub Insert(ByVal index As Integer, ByVal attribute As XmlElementAttribute)
[JScript] public function Insert(index: int, attribute: XmlElementAttribute);
Description
Inserts an System.Xml.Serialization.XmlElementAttribute into the collection. The zero-based index where the member will be added. The System.Xml.Serialization.XmlElementAttribute to insert.
Remove
[C#] public void Remove(XmlElementAttribute attribute);
[C++] public: void Remove(XmlElementAttribute* attribute);
[VB] Public Sub Remove(ByVal attribute As XmlElementAttribute)
[JScript] public function Remove(attribute: XmlElementAttribute);
Description
Removes the specified object from the collection. The XmlElementAttribute to remove from the collection.
XmlElementEventArgs class (System.Xml.Serialization)
ToString
Element
ToString
LineNumber
ToString
LinePosition
ToString
ObjectBeingDeserialized
ToString
XmlElementEventHandler delegate (System.Xml.Serialization)
ToString
XmlEnumAttribute class (System.Xml.Serialization)
ToString
Description
Controls how the System.Xml.Serialization.XmlSerializer serializes an enumeration member.
The System.Xml.Serialization.XmlEnumAttribute belongs to a family of attributes that controls how the System.Xml.Serialization.XmlSerializer serializes, or deserializes, an object. For a complete list of similar attributes, see the System.Xml.Serialization.XmlSerializer class.
XmlEnumAttribute
Example Syntax:
ToString
[C#] public XmlEnumAttribute( );
[C++] public: XmlEnumAttribute( );
[VB] Public Sub New( )
[JScript] public function XmlEnumAttribute( ); Initializes a new instance of the System.Xml.Serialization.XmlEnumAttribute class.
Description
Initializes a new instance of the System.Xml.Serialization.XmlEnumAttribute class.
You can use the System.Xml.Serialization.XmlEnumAttribute.#ctor to override an existing enumeration.
XmlEnumAttribute
Example Syntax:
ToString
[C#] public XmlEnumAttribute(string name);
[C++] public: XmlEnumAttribute(String* name);
[VB] Public Sub New(ByVal name As String)
[JScript] public function XmlEnumAttribute(name: String);
Description
Initializes a new instance of the System.Xml.Serialization.XmlEnumAttribute class, and specifies the XML value that the System.Xml.Serialization.XmlSerializer generates or recognizes (when it serializes or deserializes the enumeration, respectively).
In your code you can use the word XmlEnum instead of the longer System.Xml.Serialization.XmlEnumAttribute. The overriding name of the enumeration member.
Name
ToString
[C#] public string Name {get; set;}
[C++] public: _property String* get_Name( );public: _property void set_Name(String*);
[VB] Public Property Name As String
[JScript] public function get Name( ): String;public function set Name(String);
Description
Gets or sets the value generated in an XML-document instance when the System.Xml.Serialization.XmlSerializer serializes an enumeration, or the value recognized when it deserializes the enumeration member.
Specify the System.Xml.Serialization.XmlEnumAttribute.Name when you want the generated XML data to differ from the enumeration identifier.
TypeId
XmlIgnoreAttribute class (System.Xml.Serialization)
ToString Description
   Instructs the System.Xml.Serialization.XmlSerializer.Serialize(System.IO.Textwriter,System.Object) method of the System.Xml.Serialization.XmlSerializer not to serialize the public field or public read/write property value.
   The System.Xml.Serialization.XmlIgnoreAttribute belongs to a family of attributes that controls how the System.Xml.Serialization.XmlSerializer serializes, or deserializes, an object. If you apply the System.Xml.Serialization.XmlIgnoreAttribute to any member of a class, the System.Xml.Serialization.XmlSerializer ignores the member when serializing or deserializing an instance of the class. For a complete list of similar attributes, see the System.Xml.Serialization.XmlSerializer class.
   XmlIgnoreAttribute
   Example Syntax:
   ToString
[C#] public XmlIgnoreAttribute( );
[C++] public: XmlIgnoreAttribute( );
[VB] Public Sub New( )
[JScript] public function XmlIgnoreAttribute( );
Description
   Initializes a new instance of the System.Xml.Serialization.XmlIgnoreAttribute class.
   TypeId
   XmlIncludeAttribute class (System.Xml.Serialization)
   ToString
Description
   Allows the System.Xml.Serialization.XmlSerializer to recognize a derived class when it serializes or deserializes an object.
   Use the System.Xml.Serialization.XmlIncludeAttribute when you call the System.Xml.Serialization.XmlSerializer.Serialize(System.IO.Textwriter,System.Object) or System.Xml.Serialization.XmlSerializer.Deserialize(System.IO.Stream) method of the System.Xml.Serialization.XmlSerializer class.
   XmlIncludeAttribute
   Example Syntax:
   ToString
[C#] public XmlIncludeAttribute(Type type);
[C++] public: XmlIncludeAttribute(Type* type);
[VB] Public Sub New(ByVal type As Type)
[JScript] public function XmlIncludeAttribute(type: Type);
Description
   Initializes a new instance of the System.Xml.Serialization.XmlIncludeAttribute class. The System.Type of the object to include.
   Type
   ToString
[C#] public Type Type {get; set;}
[C++] public: _property Type* get_Type( );public: _property void set_Type(Type*);
[VB] Public Property Type As Type
[JScript] public function get Type( ): Type;public function set Type(Type);
Description
   Gets or sets the type of the object to include.
   TypeId
   XmlMapping class (System.Xml.Serialization)
   ToString
Description
   XmlMemberMapping class (System.Xml.Serialization)
   ToString
Description
   Any
   ToString
[C#] public bool Any {get;}
[C++] public: _property bool get_Any( );
[VB] Public ReadOnly Property Any As Boolean
[JScript] public function get Any( ): Boolean;
Description
   ElementName
   ToString
[C#] public string ElementName {get;}
[C++] public: _property String* get_ElementName( );
[VB] Public ReadOnly Property ElementName As String
[JScript] public function get ElementName( ): String;
Description
   MemberName
   ToString
[C#] public string MemberName {get;}
[C++] public: _property String* get_MemberName( );
[VB] Public ReadOnly Property MemberName As String
[JScript] public function get MemberName( ): String;
Description
   Namespace
   ToString
[C#] public string Namespace {get;}
[C++] public: _property String* get_Namespace( );
[VB] Public ReadOnly Property Namespace As String
[JScript] public function get Namespace( ): String;
Description
   TypeFullName
   ToString
[C#] public string TypeFullName {get;}
[C++] public: _property String* get_TypeFullName( );
[VB] Public ReadOnly Property TypeFullName As String
[JScript] public function get TypeFullName( ): String;
Description
   TypeName
   ToString
[C#] public string TypeName {get;}
[C++] public: _property String* get_TypeName( );
[VB] Public ReadOnly Property TypeName As String
[JScript] public function get TypeName( ): String;
Description
   TypeNamespace
   ToString
[C#] public string TypeNamespace {get;}
[C++] public: _property String* get_TypeNamespace( );
[VB] Public ReadOnly Property TypeNamespace As String
[JScript] public function get TypeNamespace( ): String;
Description
   XmlMembersMapping class (System.Xml.Serialization)
   ToString
Description
   Count
   ToString
[C#] public int Count {get;}
[C++] public: _property int get_Count( );
[VB] Public ReadOnly Property Count As Integer
[JScript] public function get Count( ): int;
Description
   ElementName
   ToString
[C#] public string ElementName {get;}
[C++] public: _property String* get_ElementName( );
[VB] Public ReadOnly Property ElementName As String
[JScript] public function get ElementName( ): String;
Description
   Item
   ToString

[C#] public XmlMemberMapping this[int index] {get;}
[C++] public: _property XmlMemberMapping* get_Item(int index);
[VB] Public Default ReadOnly Property Item(ByVal index As Integer) As XmlMemberMapping
[JScript] returnValue=XmlMembersMappingObject.Item(index);
Description
   Namespace
   ToString
[C#] public string Namespace {get;}
[C++] public: _property String* get_Namespace( );
[VB] Public ReadOnly Property Namespace As String
[JScript] public function get Namespace( ): String;
Description
   TypeName
   ToString
[C#] public string TypeName {get;}
[C++] public: _property String* get_TypeName( );
[VB] Public ReadOnly Property TypeName As String
[JScript] public function get TypeName( ): String;
   TypeNamespace
   ToString
[C#] public string TypeNamespace {get;}
[C++] public: _property String* get_TypeNamespace( );
[VB] Public ReadOnly Property TypeNamespace As String
[JScript] public function get TypeNamespace( ): String;
   XmlNodeEventArgs class (System.Xml.Serialization)
   ToString
Description
   Provides data for the System.Xml.Serialization.XmlSerializer.UnknownNode event.
   For more information about handling events, see.
   LineNumber
   ToString
[C#] public int LineNumber {get;}
[C++] public: _property int get_LineNumber( );
[VB] Public ReadOnly Property LineNumber As Integer
[JScript] public function get LineNumber( ): int;
Description
   Gets the line number of the unknown XML node.
   LinePosition
   ToString
[C#] public int LinePosition {get;}
[C++] public: _property int get_LinePosition( );
[VB] Public ReadOnly Property LinePosition As Integer
[JScript] public function get LinePosition( ): int;
Description
   Gets the position in the line of the unknown XML node.
   LocalName
   ToString
[C#] public string LocalName {get;}
[C++] public: _property String* get_LocalName( );
[VB] Public ReadOnly Property LocalName As String
[JScript] public function get LocalName( ): String;
Description
   Gets the XML local name of the XML node being deserialized.
   The System.Xml.Serialization.XmlNodeEventArgs.LocalName property returns the local name (also known as a local part) of an XML qualified name. The System.Xml.Serialization.XmlNodeEventArgs.LocalName property conforms to the 1999 specification Namespaces in XML which may be located on the World Wide Web (www.) at w3.org.
   Name
   ToString
[C#] public string Name {get;}
[C++] public: _property String* get_Name( );
[VB] Public ReadOnly Property Name As String
[JScript] public function get Name( ): String;
Description
   Gets the name of the XML node being deserialized.
   NamespaceURI
   ToString
[C#] public string NamespaceURI {get;}
[C++] public: _property String* get_NamespaceURI( );
[VB] Public ReadOnly Property NamespaceURI As String
[JScript] public function get NamespaceURI( ): String;
Description
   Gets the namespace URI that is associated with the XML node being deserialized.
   NodeType
   ToString
[C#] public XmlNodeType NodeType {get;}
[C++] public: _property XmlNodeType get_NodeType( );
[VB] Public ReadOnly Property NodeType As XmlNodeType
[JScript] public function get NodeType( ): XmlNodeType;
Description
   Gets the type of the XML node being deserialized.
   The System.Xml.XmlNodeType enumeration returns a description of the node being deserialized. For example, it returns "Comment" if the node is a comment.
   ObjectBeingDeserialized
   ToString
[C#] public object ObjectBeingDeserialized {get;}
[C++] public: _property Object* get_ObjectBeingDeserialized( );
[VB] Public ReadOnly Property ObjectBeingDeserialized As Object
[JScript] public function get ObjectBeingDeserialized( ): Object;
Description
   Gets the object being deserialized.
   Text
   ToString
[C#] public string Text {get;}
[C++] public: _property String* get_Text( );
[VB] Public ReadOnly Property Text As String
[JScript] public function get Text( ): String;
Description
   Gets the text of the XML node being deserialized.
   XmlNodeEventHandler delegate (System.Xml.Serialization)
   ToString
Description
   Represents the method that will handle the System.Xml.Serialization.XmlSerializer.UnknownNode event of an System.Xml.Serialization.XmlSerializer. The source of the event. An System.Xml.Serialization.XmlNodeEventArgs that contains the event data.
   When you create an System.Xml.Serialization.XmlNodeEventHandler delegate, you identify the method that will handle the event. To associate the event with your event handler, add an instance of the delegate to the event. The event handler is called whenever the event occurs, unless you remove the delegate. For more information about event handler delegates, see.
   XmlReflectionImporter class (System.Xml.Serialization)
   ToString
Description
   XmlReflectionImporter
   Example Syntax:

ToString
[C#] public XmlReflectionImporter( );
[C++] public: XmlReflectionImporter( );
[VB] Public Sub New( )
[JScript] public function XmlReflectionImporter( );
Description
    XmlReflectionImporter
    Example Syntax:
    ToString
[C#] public XmlReflectionImporter(string defaultNamespace);
[C++] public: XmlReflectionImporter(String* defaultNamespace);
[VB] Public Sub New(ByVal defaultNamespace As String)
[JScript] public function XmlReflectionImporter(defaultNamespace: String);
Description
    XmlReflectionImporter
    Example Syntax:
    ToString
[C#] public XmlReflectionImporter(XmlAttributeOverrides attributeOverrides);
[C++] public: XmlReflectionImporter(XmlAttributeOverrides* attributeOverrides);
[VB] Public Sub New(ByVal attributeOverrides As XmlAttributeOverrides)
[JScript] public function XmlReflectionImporter(attributeOverrides: XmlAttributeOverrides);
Description
    XmlReflectionImporter
    Example Syntax:
    ToString
[C#] public XmlReflectionImporter(XmlAttributeOverrides attributeOverrides, string defaultNamespace);
[C++] public: XmlReflectionImporter(XmlAttributeOverrides* attributeOverrides, String* defaultNamespace);
[VB] Public Sub New(ByVal attributeOverrides As XmlAttributeOverrides, ByVal defaultNamespace As String)
[JScript] public function XmlReflectionImporter(attributeOverrides: XmlAttributeOverrides, defaultNamespace: String);
Description
    ImportMembersMapping
[C#] public XmlMembersMapping ImportMembersMapping(string elementName, string ns, XmlReflectionMember[ ] members, bool hasWrapperElement);
[C++] public: XmlMembersMapping* ImportMembersMapping(String* elementName, String* ns, XmlReflectionMember* members[ ], bool hasWrapperElement);
[VB] Public Function ImportMembersMapping(ByVal elementName As String, ByVal ns As String, ByVal members( ) As XmlReflectionMember, ByVal hasWrapperElement As Boolean) As XmlMembersMapping
[JScript] public function ImportMembersMapping(elementName: String, ns: String, members: XmlReflectionMember[ ], hasWrapperElement: Boolean): XmlMembersMapping;
Description
    ImportTypeMapping
[C#] public XmlTypeMapping ImportTypeMapping(Type type);
[C++] public: XmlTypeMapping* ImportTypeMapping(Type* type);
[VB] Public Function ImportTypeMapping(ByVal type As Type) As XmlTypeMapping
[JScript] public function ImportTypeMapping(type: Type): XmlTypeMapping;
Description
    ImportTypeMapping
[C#] public XmlTypeMapping ImportTypeMapping(Type type, string defaultNamespace);
[C++] public: XmlTypeMapping* ImportTypeMapping(Type* type, String* defaultNamespace);
[VB] Public Function ImportTypeMapping(ByVal type As Type, ByVal defaultNamespace As String) As XmlTypeMapping
[JScript] public function ImportTypeMapping(type: Type, defaultNamespace: String): XmlTypeMapping;
Description
    ImportTypeMapping
[C#] public XmlTypeMapping ImportTypeMapping(Type type, XmlRootAttribute root);
[C++] public: XmlTypeMapping* ImportTypeMapping(Type* type, XmlRootAttribute* root);
[VB] Public Function ImportTypeMapping(ByVal type As Type, ByVal root As XmlRootAttribute) As XmlTypeMapping
[JScript] public function ImportTypeMapping(type: Type, root: XmlRootAttribute): XmlTypeMapping;
Description
    ImportTypeMapping
[C#] public XmlTypeMapping ImportTypeMapping(Type type, XmlRootAttribute root, string defaultNamespace);
[C++] public: XmlTypeMapping* ImportTypeMapping(Type* type, XmlRootAttribute* root, String* defaultNamespace);
[VB] Public Function ImportTypeMapping(ByVal type As Type, ByVal root As XmlRootAttribute, ByVal defaultNamespace As String) As XmlTypeMapping
[JScript] public function ImportTypeMapping(type: Type, root: XmlRootAttribute, defaultNamespace: String): XmlTypeMapping;
Description
    IncludeType
[C#] public void IncludeType(Type type);
[C++] public: void IncludeType(Type* type);
[VB] Public Sub IncludeType(ByVal type As Type)
[JScript] public function IncludeType(type: Type);
Description
    IncludeTypes
[C#] public void IncludeTypes(ICustomAttributeProvider provider);
[C++] public: void IncludeTypes(ICustomAttributeProvider* provider);
[VB] Public Sub IncludeTypes(ByVal provider As ICustomAttributeProvider)
[JScript] public function IncludeTypes(provider: ICustomAttributeProvider);
Description
    XmlReflectionMember class (System.Xml.Serialization)
    ToString
Description
    XmlReflectionMember
    Example Syntax:
    ToString
[C#] public XmlReflectionMember( );
[C++] public: XmlReflectionMember( );
[VB] Public Sub New( )
[JScript] public function XmlReflectionMember( );
    IsReturnValue
    ToString
[C#] public bool IsReturnValue {get; set;}
[C++] public: _property bool get_IsReturnValue( );public: _property void set_IsReturnValue(bool);
[VB] Public Property IsReturnValue As Boolean

[JScript] public function get IsReturnValue( ): Boolean;public function set IsReturnValue(Boolean);
Description
   MemberName
      ToString
[C#] public string MemberName {get; set;}
[C++] public: _property String* get_MemberName( );public: _property void set_MemberName(String*);
[VB] Public Property MemberName As String
[JScript] public function get MemberName( ): String;public function set MemberName(String);
Description
   MemberType
      ToString
[C#] public Type MemberType {get; set;}
[C++] public: _property Type* get_MemberType( );public: _property void set_MemberType(Type*);
[VB] Public Property MemberType As Type
[JScript] public function get MemberType( ): Type;public function set MemberType(Type);
Description
   OverrideIsNullable
      ToString
[C#] public bool OverrideIsNullable {get; set;}
[C++] public: _property bool get_OverrideIsNullable( );public: _property void set_OverrideIsNullable(bool);
[VB] Public Property OverrideIsNullable As Boolean
[JScript] public function get OverrideIsNullable( ): Boolean; public function set OverrideIsNullable(Boolean);
   SoapAttributes
      ToString
[C#] public SoapAttributes SoapAttributes {get; set;}
[C++] public: _property SoapAttributes* get_SoapAttributes( );public: _property void set_SoapAttributes(SoapAttributes*);
[VB] Public Property SoapAttributes As SoapAttributes
[JScript] public function get SoapAttributes( ): SoapAttributes;public function set SoapAttributes(SoapAttributes);
Description
   XmlAttributes
      ToString
[C#] public XmlAttributes XmlAttributes {get; set;}
[C++] public: _property XmlAttributes* get_XmlAttributes( );public: _property void set_XmlAttributes(XmlAttributes*);
[VB] Public Property XmlAttributes As XmlAttributes
[JScript] public function get XmlAttributes( ): XmlAttributes;public function set XmlAttributes(XmlAttributes);
Description
   XmlRootAttribute class (System.Xml.Serialization)
      ToString
Description
   Identifies a class, structure, enumeration, or interface as the root (or top-level) element of an XML-document instance.
   The System.Xml.Serialization.XmlRootAttribute belongs to a family of attributes that controls how the System.Xml.Serialization.XmlSerializer serializes, or deserializes, an object. For a complete list of similar attributes, see the System.Xml.Serialization.XmlSerializer class.
   XmlRootAttribute
   Example Syntax:
      ToString
[C#] public XmlRootAttribute( );
[C++] public: XmlRootAttribute( );
[VB] Public Sub New( )

[JScript] public function XmlRootAttribute( ); Initializes a new instance of the System.Xml.Serialization.XmlRootAttribute class, and uses the class name as the name of the XML root element.
Description
   Initializes a new instance of the System.Xml.Serialization. XmlRootAttribute class.
   XmlRootAttribute
   Example Syntax:
      ToString
[C#] public XmlRootAttribute(string elementName);
[C++] public: XmlRootAttribute(String* elementName);
[VB] Public Sub New(ByVal elementName As String)
[JScript] public function XmlRootAttribute(elementName: String);
Description
   Initializes a new instance of the System.Xml.Serialization. XmlRootAttribute class, and specifies the name of the XML root element. The name of the XML root element.
   DataType
      ToString
[C#] public string DataType {get; set;}
[C++] public: _property String* get_DataType( );public: _property void set_DataType(String*);
[VB] Public Property DataType As String
[JScript] public function get DataType( ): String;public function set DataType(String);
Description
   Gets or sets the XML data type of the XML root element.
   The following table lists the XML data types with their .NET equivalents. For the XML date and time data types, the .NET data type consists of a System.DateTime to which the System.Xml.Serialization.XmlElementAttribute has been applied with the System.Xml.Serialization.XmlElementAttribute.DataType set to "date" and "time", respectively.
   ElementName
      ToString
[C#] public string ElementName {get; set;}
[C++] public: _property String* get_ElementName( ); public: _property void set_ElementName(String*);
[VB] Public Property ElementName As String
[JScript] public function get ElementName( ): String;public function set ElementName(String);
Description
   Gets or sets the name of the XML element that is generated and recognized by the System.Xml.Serialization.XmlSerializer class's System.Xml.Serialization.XmlSerializer.Serialize(System.IO.Textwriter,System.Object) and System.Xml.Serialization.XmlSerializer.Deserialize(System.IO.Stream) methods, respectively.
   Specify an System.Xml.Serialization.XmlArrayItemAttribute.ElementName if you want the name of the generated XML element to differ from the member's identifier.
   Form
      ToString
[C#] public XmlSchemaForm Form {get; set;}
[C++] public: _property XmlSchemaForm get_Form( );public: _property void set_Form(XmlSchemaForm);
[VB] Public Property Form As XmlSchemaForm
[JScript] public function get Form( ): XmlSchemaForm;public function set Form(XmlSchemaForm);
Description
   Gets or sets a value indicating whether the name of the XML root element is qualified.

The System.Xml.Serialization.XmlAttributeAttribute.Form property determines whether an XML element name is qualified, based on the specification Namespaces in XML, which may be located on the World Wide Web (www.) at w3.org.
   IsNullable
   ToString
[C#] public bool IsNullable {get; set;}
[C++] public: _property bool get_IsNullable( );public: _property void set_IsNullable(bool);
[VB] Public Property IsNullable As Boolean
[JScript] public function get IsNullable( ): Boolean;public function set IsNullable(Boolean);
Description
   Gets or sets a value indicating whether the System.Xml.Serialization.XmlSerializer should serialize a member that is set to null into the xsi:nil attribute set to true.
   The XML schema specification for structures allows an XML document to explicitly signal that an element's content is missing. Such an element contains the attribute xsi:nil set to true. For more information which may be located on the World Wide Web (www.), see the specification located at w3.org/TR/xmlschema-1/ named XML Schema Part 1: Structures.
   Namespace
   ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);
Description
   Gets or sets the namespace for the XML root element.
   The System.Xml.Serialization.XmlArrayItemAttribute.Namespace property conforms to the specification Namespaces in XML which may be located on the World Wide Web (www.) at w3.org.
   TypeId
   XmlSchemaExporter class (System.Xml.Serialization)
   ToString
Description
   XmlSchemaExporter
   Example Syntax:
   ToString
[C#] public XmlSchemaExporter(XmlSchemas schemas);
[C++] public: XmlSchemaExporter(XmlSchemas* schemas);
[VB] Public Sub New(ByVal schemas As XmlSchemas)
[JScript] public function XmlSchemaExporter(schemas: XmlSchemas);
Description
   ExportAnyType
[C#] public string ExportAnyType(string ns);
[C++] public: String* ExportAnyType(String* ns);
[VB] Public Function ExportAnyType(ByVal ns As String) As String
[JScript] public function ExportAnyType(ns: String): String;
   ExportMembersMapping
[C#] public void ExportMembersMapping(XmlMembersMapping xmlMembersMapping);
[C++] public: void ExportMembersMapping(XmlMembersMapping* xmlMembersMapping);
[VB] Public Sub ExportMembersMapping(ByVal xmlMembersMapping As XmlMembersMapping)
[JScript] public function ExportMembersMapping(xmlMembersMapping: XmlMembersMapping);
Description
   ExportTypeMapping
[C#] public XmlQualifiedName ExportTypeMapping(XmlMembersMapping xmlMembersMapping);
[C++] public: XmlQualifiedName* ExportTypeMapping(XmlMembersMapping* xmlMembersMapping);
[VB] Public Function ExportTypeMapping(ByVal xmlMembersMapping As XmlMembersMapping) As XmlQualifiedName
[JScript] public function ExportTypeMapping(xmlMembersMapping: XmlMembersMapping): XmlQualifiedName;
   ExportTypeMapping
[C#] public void ExportTypeMapping(XmlTypeMapping xmlTypeMapping);
[C++] public: void ExportTypeMapping(XmlTypeMapping* xmlTypeMapping);
[VB] Public Sub ExportTypeMapping(ByVal xmlTypeMapping As XmlTypeMapping)
[JScript] public function ExportTypeMapping(xmlTypeMapping: XmlTypeMapping);
Description
   XmlSchemaImporter class (System.Xml.Serialization)
   ToString
Description
   XmlSchemaImporter
   Example Syntax:
   ToString
[C#] public XmlSchemaImporter(XmlSchemas schemas);
[C++] public: XmlSchemaImporter(XmlSchemas* schemas);
[VB] Public Sub New(ByVal schemas As XmlSchemas)
[JScript] public function XmlSchemaImporter(schemas: XmlSchemas);
Description
   XmlSchemaImporter
   Example Syntax:
   ToString
[C#] public XmlSchemaImporter(XmlSchemas schemas, CodeIdentifiers typeIdentifiers);
[C++] public: XmlSchemaImporter(XmlSchemas* schemas, CodeIdentifiers* typeIdentifiers);
[VB] Public Sub New(ByVal schemas As XmlSchemas, ByVal typeIdentifiers As CodeIdentifiers)
[JScript] public function XmlSchemaImporter(schemas: XmlSchemas, typeIdentifiers: CodeIdentifiers);
Description
   ImportAnyType
[C#] public XmlMembersMapping ImportAnyType(XmlQualifiedName typeName, string elementName);
[C++] public: XmlMembersMapping* ImportAnyType(XmlQualifiedName* typeName, String* elementName);
[VB] Public Function ImportAnyType(ByVal typeName As XmlQualifiedName, ByVal elementName As String) As XmlMembersMapping
[JScript] public function ImportAnyType(typeName: XmlQualifiedName, elementName: String): XmlMembersMapping;
   ImportDerivedTypeMapping
[C#] public XmlTypeMapping ImportDerivedTypeMapping(XmlQualifiedName name, Type baseType);
[C++] public: XmlTypeMapping* ImportDerivedTypeMapping(XmlQualifiedName* name, Type* baseType);
[VB] Public Function ImportDerivedTypeMapping(ByVal name As XmlQualifiedName, ByVal baseType As Type) As XmlTypeMapping
[JScript] public function ImportDerivedTypeMapping(name: XmlQualifiedName, baseType: Type): XmlTypeMapping;

Description
   ImportDerivedTypeMapping
[C#] public XmlTypeMapping ImportDerivedTypeMapping(XmlQualifiedName name, Type baseType, bool baseTypeCanBeIndirect);
[C++] public: XmlTypeMapping* ImportDerivedTypeMapping(XmlQualifiedName* name, Type* baseType, bool baseTypeCanBeIndirect);
[VB] Public Function ImportDerivedTypeMapping(ByVal name As XmlQualifiedName, ByVal baseType As Type, ByVal baseTypeCanBeIndirect As Boolean) As XmlTypeMapping
[JScript] public function ImportDerivedTypeMapping(name: XmlQualifiedName, baseType: Type, baseTypeCanBeIndirect: Boolean): XmlTypeMapping;
   ImportMembersMapping
[C#] public XmlMembersMapping ImportMembersMapping(XmlQualifiedName name);
[C++] public: XmlMembersMapping* ImportMembersMapping(XmlQualifiedName* name);
[VB] Public Function ImportMembersMapping(ByVal name As XmlQualifiedName) As XmlMembersMapping
[JScript] public function ImportMembersMapping(name: XmlQualifiedName): XmlMembersMapping;
Description
   ImportMembersMapping
[C#] public XmlMembersMapping ImportMembersMapping(XmlQualifiedName[ ] names);
[C++] public: XmlMembersMapping* ImportMembersMapping(XmlQualifiedName* names[ ]);
[VB] Public Function ImportMembersMapping(ByVal names( ) As XmlQualifiedName) As XmlMembersMapping
[JScript] public function ImportMembersMapping(names: XmlQualifiedName[ ]): XmlMembersMapping;
Description
   ImportMembersMapping
[C#] public XmlMembersMapping ImportMembersMapping(XmlQualifiedName[ ] names, Type baseType, bool baseTypeCanBeIndirect);
[C++] public: XmlMembersMapping* ImportMembersMapping(XmlQualifiedName* names[ ], Type* baseType, bool baseTypeCanBeIndirect);
[VB] Public Function ImportMembersMapping(ByVal names( ) As XmlQualifiedName, ByVal baseType As Type, ByVal baseTypeCanBeIndirect As Boolean) As XmlMembersMapping
[JScript] public function ImportMembersMapping(names: XmlQualifiedName[ ], baseType: Type, baseTypeCanBeIndirect: Boolean): XmlMembersMapping;
   ImportTypeMapping
[C#] public XmlTypeMapping ImportTypeMapping(XmlQualifiedName name);
[C++] public: XmlTypeMapping* ImportTypeMapping(XmlQualifiedName* name);
[VB] Public Function ImportTypeMapping(ByVal name As XmlQualifiedName) As XmlTypeMapping
[JScript] public function ImportTypeMapping(name: XmlQualifiedName): XmlTypeMapping;
Description
   XmlSchemas class (System.Xml.Serialization)
   ToString
Description
   Represents the collection of XML schemas.
   XmlSchemas
   Example Syntax:
   ToString
[C#] public XmlSchemas( );
[C++] public: XmlSchemas( );
[VB] Public Sub New( )
[JScript] public function XmlSchemas( );
   Count
   InnerList
   Item
   ToString
Description
   Item
   ToString
[C#] public XmlSchema this[string ns] {get;}
[C++] public: _property XmlSchema* get_Item(String* ns);
[VB] Public Default ReadOnly Property Item(ByVal ns As String) As XmlSchema
[JScript] returnValue=XmlSchemasObject.Item(ns);
Description
   List
   Add
[C#] public int Add(XmlSchema schema);
[C++] public: int Add(XmlSchema* schema);
[VB] Public Function Add(ByVal schema As XmlSchema) As Integer
[JScript] public function Add(schema: XmlSchema): int;
Description
   Add
[C#] public void Add(XmlSchemas schemas);
[C++] public: void Add(XmlSchemas* schemas);
[VB] Public Sub Add(ByVal schemas As XmlSchemas)
[JScript] public function Add(schemas: XmlSchemas);
Description
   Contains
[C#] public bool Contains(XmlSchema schema);
[C++] public: bool Contains(XmlSchema* schema);
[VB] Public Function Contains(ByVal schema As XmlSchema) As Boolean
[JScript] public function Contains(schema: XmlSchema): Boolean;
Description
   CopyTo
[C#] public void CopyTo(XmlSchema[ ] array, int index);
[C++] public: void CopyTo(XmlSchema* array[ ], int index);
[VB] Public Sub CopyTo(ByVal array( ) As XmlSchema, ByVal index As Integer)
[JScript] public function CopyTo(array: XmlSchema[ ], index: int);
Description
   Find
[C#] public object Find(XmlQualifiedName name, Type type);
[C++] public: Object* Find(XmlQualifiedName* name, Type* type);
[VB] Public Function Find(ByVal name As XmlQualifiedName, ByVal type As Type) As Object
[JScript] public function Find(name: XmlQualifiedName, type: Type): Object;
Description
   IndexOf
[C#] public int IndexOf(XmlSchema schema);
[C++] public: int IndexOf(XmlSchema* schema);
[VB] Public Function IndexOf(ByVal schema As XmlSchema) As Integer
[JScript] public function IndexOf(schema: XmlSchema): int;
Description
   Insert
[C#] public void Insert(int index, XmlSchema schema);
[C++] public: void Insert(int index, XmlSchema* schema);

[VB] Public Sub Insert(ByVal index As Integer, ByVal schema As XmlSchema)
[JScript] public function Insert(index: int, schema: XmlSchema);
Description
    IsDataSet
[C#] public static bool IsDataSet(XmlSchema schema);
[C++] public: static bool IsDataSet(XmlSchema* schema);
[VB] Public Shared Function IsDataSet(ByVal schema As XmlSchema) As Boolean
[JScript] public static function IsDataSet(schema: XmlSchema): Boolean;
Description
    OnClear
[C#] protected override void OnClear( );
[C++] protected: void OnClear( );
[VB] Overrides Protected Sub OnClear( )
[JScript] protected override function OnClear( );
Description
    OnInsert
[C#] protected override void OnInsert(int index, object value);
[C++] protected: void OnInsert(int index, Object* value);
[VB] Overrides Protected Sub OnInsert(ByVal index As Integer, ByVal value As Object)
[JScript] protected override function OnInsert(index: int, value: Object);
Description
    OnRemove
[C#] protected override void OnRemove(int index, object value);
[C++] protected: void OnRemove(int index, Object* value);
[VB] Overrides Protected Sub OnRemove(ByVal index As Integer, ByVal value As Object)
[JScript] protected override function OnRemove(index: int, value: Object);
Description
    OnSet
[C#] protected override void OnSet(int index, object oldValue, object newValue);
[C++] protected: void OnSet(int index, Object* oldValue, Object* newValue);
[VB] Overrides Protected Sub OnSet(ByVal index As Integer, ByVal oldValue As Object, ByVal newValue As Object)
[JScript] protected override function OnSet(index: int, oldValue: Object, newValue: Object);
Description
    Remove
[C#] public void Remove(XmlSchema schema);
[C++] public: void Remove(XmlSchema* schema);
[VB] Public Sub Remove(ByVal schema As XmlSchema)
[JScript] public function Remove(schema: XmlSchema);
Description
    XmlSerializationCollectionFixupCallback delegate (System.Xml.Serialization)
    ToString
Description
    XmlSerializationFixupCallback delegate (System.Xml.Serialization)
    ToString
Description
    XmlSerializationReadCallback delegate (System.Xml.Serialization)
    ToString
Description
    XmlSerializationReader class (System.Xml.Serialization)
    ToString
Description
    XmlSerializationReader
    Example Syntax:
    ToString
[C#] protected XmlSerializationReader( );
[C++] protected: XmlSerializationReader( );
[VB] Protected Sub New( )
[JScript] protected function XmlSerializationReader( );
    Document
    ToString
[C#] protected XmlDocument Document {get;}
[C++] protected: _property XmlDocument* get_Document( );
[VB] Protected ReadOnly Property Document As XmlDocument
[JScript] protected function get Document( ): XmlDocument;
Description
    Reader
    ToString
[C#] protected XmlReader Reader {get;}
[C++] protected: _property XmlReader* get_Reader( );
[VB] Protected ReadOnly Property Reader As XmlReader
[JScript] protected function get Reader( ): XmlReader;
Description
    AddFixup
[C#] protected void AddFixup(XmlSerializationReader.CollectionFixup fixup);
[C++] protected: void AddFixup(XmlSerializationReader.CollectionFixup* fixup);
[VB] Protected Sub AddFixup(ByVal fixup As XmlSerializationReader.CollectionFixup)
[JScript] protected function AddFixup(fixup: XmlSerializationReader.CollectionFixup);
Description
    AddFixup
[C#] protected void AddFixup(XmlSerializationReader.Fixup fixup);
[C++] protected: void AddFixup(XmlSerializationReader.Fixup* fixup);
[VB] Protected Sub AddFixup(ByVal fixup As XmlSerializationReader.Fixup)
[JScript] protected function AddFixup(fixup: XmlSerializationReader.Fixup);
Description
    AddReadCallback
[C#] protected void AddReadCallback(string name, string ns, Type type, XmlSerializationReadCallback read);
[C++] protected: void AddReadCallback(String* name, String* ns, Type* type, XmlSerializationReadCallback* read);
[VB] Protected Sub AddReadCallback(ByVal name As String, ByVal ns As String, ByVal type As Type, ByVal read As XmlSerializationReadCallback)
[JScript] protected function AddReadCallback(name: String, ns: String, type: Type, read: XmlSerializationReadCallback);
Description
    AddTarget
[C#] protected void AddTarget(string id, object o);
[C++] protected: void AddTarget(String* id, Object* o);
[VB] Protected Sub AddTarget(ByVal id As String, ByVal o As Object)
[JScript] protected function AddTarget(id: String, o: Object);
Description
    CreateAbstractTypeException
[C#] protected Exception CreateAbstractTypeException (string name, string ns);

[C++] protected: Exception* CreateAbstractTypeException (String* name, String* ns);
[VB] Protected Function CreateAbstractTypeException(ByVal name As String, ByVal ns As String) As Exception
[JScript] protected function CreateAbstractTypeException (name: String, ns: String): Exception;
Description
    CreateReadOnlyCollectionException
[C#] protected Exception CreateReadOnlyCollectionException(string name);
[C++] protected: Exception* CreateReadOnlyCollectionException(String* name);
[VB] Protected Function CreateReadOnlyCollectionException(ByVal name As String) As Exception
[JScript] protected function CreateReadOnlyCollectionException(name: String): Exception;
Description
    CreateUnknownConstantException
[C#] protected Exception CreateUnknownConstantException(string value, Type enumType);
[C++] protected: Exception* CreateUnknownConstantException(String* value, Type* enumType);
[VB] Protected Function CreateUnknownConstantException (ByVal value As String, ByVal enumType As Type) As Exception
[JScript] protected function CreateUnknownConstantException(value: String, enumType: Type): Exception;
Description
    CreateUnknownNodeException
[C#] protected Exception CreateUnknownNodeException( );
[C++] protected: Exception* CreateUnknownNodeException( );
[VB] Protected Function CreateUnknownNodeException( ) As Exception
[JScript] protected function CreateUnknownNodeException( ): Exception;
Description
    CreateUnknownTypeException
[C#] protected Exception CreateUnknownTypeException (XmlQualifiedName type);
[C++] protected: Exception* CreateUnknownTypeException (XmlQualifiedName* type);
[VB] Protected Function CreateUnknownTypeException (ByVal type As XmlQualifiedName) As Exception
[JScript] protected function CreateUnknownTypeException (type: XmlQualifiedName): Exception;
Description
    EnsureArrayIndex
[C#] protected Array EnsureArrayIndex(Array a, int index, Type elementType);
[C++] protected: Array* EnsureArrayIndex(Array* a, int index, Type* elementType);
[VB] Protected Function EnsureArrayIndex(ByVal a As Array, ByVal index As Integer, ByVal elementType As Type) As Array
[JScript] protected function EnsureArrayIndex(a: Array, index: int, elementType: Type): Array;
Description
    FixupArrayRefs
[C#] protected void FixupArrayRefs(object fixup);
[C++] protected: void FixupArrayRefs(Object* fixup);
[VB] Protected Sub FixupArrayRefs(ByVal fixup As Object)
[JScript] protected function FixupArrayRefs(fixup: Object);
Description
    GetArrayLength
[C#] protected int GetArrayLength(string name, string ns);
[C++] protected: int GetArrayLength(String* name, String* ns);
[VB] Protected Function GetArrayLength(ByVal name As String, ByVal ns As String) As Integer
[JScript] protected function GetArrayLength(name: String, ns: String): int;
Description
    GetNullAttr
[C#] protected bool GetNullAttr( );
[C++] protected: bool GetNullAttr( );
[VB] Protected Function GetNullAttr( ) As Boolean
[JScript] protected function GetNullAttr( ): Boolean;
Description
    GetTarget
[C#] protected object GetTarget(string id);
[C++] protected: Object* GetTarget(String* id);
[VB] Protected Function GetTarget(ByVal id As String) As Object
[JScript] protected function GetTarget(id: String): Object;
Description
    GetXsiType
[C#] protected XmlQualifiedName GetXsiType( );
[C++] protected: XmlQualifiedName* GetXsiType;
[VB] Protected Function GetXsiType( ) As XmlQualifiedName
[JScript] protected function GetXsiType( ): XmlQualifiedName;
Description
    InitCallbacks
[C#] protected abstract void InitCallbacks( );
[C++] protected: virtual void InitCallbacks( )=0;
[VB] MustOverride Protected Sub InitCallbacks( )
[JScript] protected abstract function InitCallbacks( );
Description
    InitIDs
[C#] protected abstract void InitIDs( );
[C++] protected: virtual void InitIDs( )=0;
[VB] MustOverride Protected Sub InitIDs( )
[JScript] protected abstract function InitIDs( );
Description
    IsXmlnsAttribute
[C#] protected bool IsXmlnsAttribute(string name);
[C++] protected: bool IsXmlnsAttribute(String* name);
[VB] Protected Function IsXmlnsAttribute(ByVal name As String) As Boolean
[JScript] protected function IsXmlnsAttribute(name: String): Boolean;
Description
    ParseWsdlArrayType
[C#] protected void ParseWsdlArrayType(XmlAttribute attr);
[C++] protected: void ParseWsdlArrayType(XmlAttribute* attr);
[VB] Protected Sub ParseWsdlArrayType(ByVal attr As XmlAttribute)
[JScript] protected function ParseWsdlArrayType(attr: XmlAttribute);
Description
    ReadElementQualifiedName
[C#] protected XmlQualifiedName ReadElementQualifiedName( );
[C++] protected: XmlQualifiedName(* ReadElementQualifiedName;
[VB] Protected Function ReadElementQualifiedName( ) As XmlQualifiedName
[JScript] protected function ReadElementQualifiedName( ): XmlQualifiedName;

Description
    ReadEndElement
[C#] protected void ReadEndElement( );
[C++] protected: void ReadEndElement( );
[VB] Protected Sub ReadEndElement( )
[JScript] protected function ReadEndElement( );
Description
    ReadNull
[C#] protected bool ReadNull( );
[C++] protected: bool ReadNull( );
[VB] Protected Function ReadNull( ) As Boolean
[JScript] protected function ReadNull( ): Boolean;
Description
    ReadNullableQualifiedName
[C#] protected XmlQualifiedName ReadNullableQualifiedName( );
[C++] protected: XmlQualifiedName* ReadNullableQualifiedName( );
[VB] Protected Function ReadNullableQualifiedName( ) As XmlQualifiedName
[JScript] protected function ReadNullableQualifiedName( ): XmlQualifiedName;
Description
    ReadNullableString
[C#] protected string ReadNullableString( );
[C++] protected: String* ReadNullableString( );
[VB] Protected Function ReadNullableString( ) As String
[JScript] protected function ReadNullableString( ): String;
Description
    ReadReference
[C#] protected bool ReadReference(out string fixupReference);
[C++] protected: bool ReadReference(String** fixupReference);
[VB] Protected Function ReadReference(ByRef fixupReference As String) As Boolean
[JScript] protected function ReadReference(fixupReference: String): Boolean;
Description
    ReadReferencedElement
[C#] protected object ReadReferencedElement( );
[C++] protected: Object* ReadReferencedElement( );
[VB] Protected Function ReadReferencedElement( ) As Object
[JScript] protected function ReadReferencedElement( ): Object;
Description
    ReadReferencedElement
[C#] protected object ReadReferencedElement(string name, string ns);
[C++] protected: Object* ReadReferencedElement(String* name, String* ns);
[VB] Protected Function ReadReferencedElement(ByVal name As String, ByVal ns As String) As Object
[JScript] protected function ReadReferencedElement(name: String, ns: String): Object;
Description
    ReadReferencedElements
[C#] protected void ReadReferencedElements( );
[C++] protected: void ReadReferencedElements( );
[VB] Protected Sub ReadReferencedElements( )
[JScript] protected function ReadReferencedElements( );
Description
    ReadReferencingElement
[C#] protected object ReadReferencingElement(out string fixupReference);
[C++] protected: Object* ReadReferencingElement (String** fixupReference);
[VB] Protected Function ReadReferencingElement(ByRef fixupReference As String) As Object
[JScript] protected function ReadReferencingElement(fixupReference: String): Object;
Description
    ReadReferencingElement
[C#] protected object ReadReferencingElement(string name, string ns, out string fixupReference);
[C++] protected: Object* ReadReferencingElement(String* name, String* ns, String** fixupReference);
[VB] Protected Function ReadReferencingElement(ByVal name As String, ByVal ns As String, ByRef fixupReference As String) As Object
[JScript] protected function ReadReferencingElement(name: String, ns: String, fixupReference: String): Object;
Description
    ReadSerializable
[C#] protected IXmlSerializable ReadSerializable(IXmlSerializable serializable);
[C++] protected: IXmlSerializable* ReadSerializable (IXmlSerializable* serializable);
[VB] Protected Function ReadSerializable(ByVal serializable As IXmlSerializable) As IXmlSerializable
[JScript] protected function ReadSerializable(serializable: IXmlSerializable): IXmlSerializable;
Description
    ReadString
[C#] protected string ReadString(string value);
[C++] protected: String* ReadString(String* value);
[VB] Protected Function ReadString(ByVal value As String) As String
[JScript] protected function ReadString(value: String): String;
Description
    ReadTypedPrimitive
[C#] protected object ReadTypedPrimitive(XmlQualifiedName type);
[C++] protected: Object* ReadTypedPrimitive(XmlQualifiedName* type);
[VB] Protected Function ReadTypedPrimitive(ByVal type As XmlQualifiedName) As Object
[JScript] protected function ReadTypedPrimitive(type: XmlQualifiedName): Object;
Description
    ReadXmlNode
[C#] protected XmlNode ReadXmlNode(bool wrapped);
[C++] protected: XmlNode* ReadXmlNode(bool wrapped);
[VB] Protected Function ReadXmlNode(ByVal wrapped As Boolean) As XmlNode
[JScript] protected function ReadXmlNode(wrapped: Boolean): XmlNode;
Description
    ShrinkArray
[C#] protected Array ShrinkArray(Array a, int length, Type elementType, bool is Nullable);
[C++] protected: Array* ShrinkArray(Array* a, int length, Type* elementType, bool is Nullable);
[VB] Protected Function ShrinkArray(ByVal a As Array, ByVal length As Integer, ByVal elementType As Type, ByVal is Nullable As Boolean) As Array
[JScript] protected function ShrinkArray(a: Array, length: int, elementType: Type, is Nullable: Boolean): Array;
Description
    ToByteArray
[C#] protected static byte[ ] ToByteArray(string value);

[C++] protected: static unsigned char ToByteArray(String* value) _gc[ ];
[VB] Protected Shared Function ToByteArray(ByVal value As String) As Byte( )
[JScript] protected static function ToByteArray(value: String): Byte[ ];
Description
   ToByteArrayBase64
[C#] protected static byte[ ] ToByteArrayBase64(string value);
[C++] protected: static unsigned char ToByteArrayBase64 (String* value) _gc[ ];
[VB] Protected Shared Function ToByteArrayBase64(ByVal value As String) As Byte( )
[JScript] protected static function ToByteArrayBase64 (value: String): Byte[ ];
Description
   ToByteArrayHex
[C#] protected static byte[ ] ToByteArrayHex(string value);
[C++] protected: static unsigned char ToByteArrayHex (String* value) _gc[ ];
[VB] Protected Shared Function ToByteArrayHex(ByVal value As String) As Byte( )
[JScript] protected static function ToByteArrayHex(value: String): Byte[ ];
Description
   ToChar
[C#] protected static char ToChar(string value);
[C++] protected: static _wchar_t ToChar(String* value);
[VB] Protected Shared Function ToChar(ByVal value As String) As Char
[JScript] protected static function ToChar(value: String): Char;
Description
   ToDate
[C#] protected static DateTime ToDate(string value);
[C++] protected: static DateTime ToDate(String* value);
[VB] Protected Shared Function ToDate(ByVal value As String) As DateTime
[JScript] protected static function ToDate(value: String): DateTime;
Description
   ToDateTime
[C#] protected static DateTime ToDateTime(string value);
[C++] protected: static DateTime ToDateTime(String* value);
[VB] Protected Shared Function ToDateTime(ByVal value As String) As DateTime
[JScript] protected static function ToDateTime(value: String): DateTime;
Description
   ToEnum
[C#] protected static long ToEnum(string value, Hashtable h, string typeName);
[C++] protected: static _int64 ToEnum(String* value, Hashtable* h, String* typeName);
[VB] Protected Shared Function ToEnum(ByVal value As String, ByVal h As Hashtable, ByVal typeName As String) As Long
[JScript] protected static function ToEnum(value: String, h: Hashtable, typeName: String): long;
Description
   ToTime
[C#] protected static DateTime ToTime(string value);
[C++] protected: static DateTime ToTime(String* value);
[VB] Protected Shared Function ToTime(ByVal value As String) As DateTime

[JScript] protected static function ToTime(value: String): DateTime;
Description
   ToXmlQualifiedName
[C#] protected XmlQualifiedName ToXmlQualifiedName (string value);
[C++] protected: XmlQualifiedName* ToXmlQualified- Name(String* value);
[VB] Protected Function ToXmlQualifiedName(ByVal value As String) As XmlQualifiedName
[JScript] protected function ToXmlQualifiedName(value: String): XmlQualifiedName;
Description
   UnknownAttribute
[C#] protected void UnknownAttribute(object o, XmlAttribute attr);
[C++] protected: void UnknownAttribute(Object* o, XmlAttribute* attr);
[VB] Protected Sub UnknownAttribute(ByVal o As Object, ByVal attr As XmlAttribute)
[JScript] protected function UnknownAttribute(o: Object, attr: XmlAttribute);
Description
   UnknownElement
[C#] protected void UnknownElement(object o, XmlElement elem);
[C++] protected: void UnknownElement(Object* o, XmlElement* elem);
[VB] Protected Sub UnknownElement(ByVal o As Object, ByVal elem As XmlElement)
[JScript] protected function UnknownElement(o: Object, elem: XmlElement);
   UnknownNode
[C#] protected void UnknownNode(object o);
[C++] protected: void UnknownNode(Object* o);
[VB] Protected Sub UnknownNode(ByVal o As Object)
[JScript] protected function UnknownNode(o: Object);
Description
   UnreferencedObject
[C#] protected void UnreferencedObject(string id, object o);
[C++] protected: void UnreferencedObject(String* id, Object* o);
[VB] Protected Sub UnreferencedObject(ByVal id As String, ByVal o As Object)
[JScript] protected function UnreferencedObject(id: String, o: Object);
   XmlSerializationWriteCallback delegate (System.Xml.Serialization)
   UnreferencedObject
Description
   XmlSerializationWriter class (System.Xml.Serialization)
   UnreferencedObject
Description
   XmlSerializationWriter
   Example Syntax:
   UnreferencedObject
[C#] protected XmlSerializationWriter( );
[C++] protected: XmlSerializationWriter( );
[VB] Protected Sub New( )
[JScript] protected function XmlSerializationWriter( );
   Namespaces
   UnreferencedObject
[C#] protected ArrayList Namespaces {get; set;}
[C++] protected: _property ArrayList* get_ Namespaces( );protected: _property void set_Namespaces (ArrayList*);
[VB] Protected Property Namespaces As ArrayList

[JScript] protected function get Namespaces( ): ArrayList; protected function set Namespaces(ArrayList);
Description
  Writer
    UnreferencedObject
[C#] protected XmlWriter Writer {get; set;}
[C++] protected: _property XmlWriter* get_Writer( );protected: _Property void set_Writer(XmlWriter*);
[VB] Protected Property Writer As XmlWriter
[JScript] protected function get Writer( ): XmlWriter;protected function set Writer(XmlWriter);
Description
  AddWriteCallback
[C#] protected void AddWriteCallback(Type type, string typeName, string typeNs, XmlSerializationWriteCallback callback);
[C++] protected: void AddWriteCallback(Type* type, String* typeName, String* typeNs, XmlSerializationWriteCallback* callback);
[VB] Protected Sub AddWriteCallback(ByVal type As Type, ByVal typeName As String, ByVal typeNs As String, ByVal callback As XmlSerializationWriteCallback)
[JScript] protected function AddWriteCallback(type: Type, typeName: String, typeNs: String, callback: XmlSerializationWriteCallback);
Description
  CreateMismatchChoiceException
[C#] protected Exception CreateMismatchChoiceException(string value, string elementName, string enumValue);
[C++] protected: Exception* CreateMismatchChoiceException(String* value, String* elementName, String* enumValue);
[VB] Protected Function CreateMismatchChoiceException(ByVal value As String, ByVal elementName As String, ByVal enumValue As String) As Exception
[JScript] protected function CreateMismatchChoiceException(value: String, elementName: String, enumValue: String): Exception;
  CreateUnknownTypeException
[C#] protected Exception CreateUnknownTypeException(object o);
[C++] protected: Exception* CreateUnknownTypeException(Object* o);
[VB] Protected Function CreateUnknownTypeException(ByVal o As Object) As Exception
[JScript] protected function CreateUnknownTypeException(o: Object): Exception;
Description
  CreateUnknownTypeException
[C#] protected Exception CreateUnknownTypeException(Type type);
[C++] protected: Exception* CreateUnknownTypeException(Type* type);
[VB] Protected Function CreateUnknownTypeException(ByVal type As Type) As Exception
[JScript] protected function CreateUnknownTypeException(type: Type): Exception;
Description
  FromByteArray
[C#] protected static string FromByteArray(byte[ ] value);
[C++] protected: static String* FromByteArray(unsigned char value _gc[ ]);
[VB] Protected Shared Function FromByteArray(ByVal value( ) As Byte) As String
[JScript] protected static function FromByteArray(value: Byte[ ]): String;

Description
  FromByteArrayBase64
[C#] protected static string FromByteArrayBase64(byte[ ] value);
[C++] protected: static String* FromByteArrayBase64(unsigned char value _gc[ ]);
[VB] Protected Shared Function FromByteArrayBase64(ByVal value( ) As Byte) As String
[JScript] protected static function FromByteArrayBase64(value: Byte[ ]): String;
  FromByteArrayHex
[C#] protected static string FromByteArrayHex(byte[ ] value);
[C++] protected: static String* FromByteArrayHex(unsigned char value _gc[ ]);
[VB] Protected Shared Function FromByteArrayHex(ByVal value( ) As Byte) As String
[JScript] protected static function FromByteArrayHex(value: Byte[ ]): String;
  FromChar
[C#] protected static string FromChar(char value);
[C++] protected: static String* FromChar(_wchar_t value);
[VB] Protected Shared Function FromChar(ByVal value As Char) As String
[JScript] protected static function FromChar(value: Char): String;
  FromDate
[C#] protected static string FromDate(DateTime value);
[C++] protected: static String* FromDate(DateTime value);
[VB] Protected Shared Function FromDate(ByVal value As DateTime) As String
[JScript] protected static function FromDate(value: DateTime): String;
  FromDateTime
[C#] protected static string FromDateTime(DateTime value);
[C++] protected: static String* FromDateTime(DateTime value);
[VB] Protected Shared Function FromDateTime(ByVal value As DateTime) As String
[JScript] protected static function FromDateTime(value: DateTime): String;
  FromEnum
[C#] protected static string FromEnum(long value, string[ ] values, long[ ] ids);
[C++] protected: static String* FromEnum(_int64 value, String* values _gc[ ], _int64 ids _gc[ ]);
[VB] Protected Shared Function FromEnum(ByVal value As Long, ByVal values( ) As String, ByVal ids( ) As Long) As String
[JScript] protected static function FromEnum(value: long, values: String[ ], ids long[ ]): String;
  FromTime
[C#] protected static string FromTime(DateTime value);
[C++] protected: static String* FromTime(DateTime value);
[VB] Protected Shared Function FromTime(ByVal value As DateTime) As String
[JScript] protected static function FromTime(value: DateTime): String;
  FromXmlQualifiedName
[C#] protected string FromXmlQualifiedName(XmlQualifiedName xmlQualifiedName);
[C++] protected: String* FromXmlQualifiedName(XmlQualifiedName* xmlQualifiedName);
[VB] Protected Function FromXmlQualifiedName(ByVal xmlQualifiedName As XmlQualifiedName) As String
[JScript] protected function FromXmlQualifiedName(xmlQualifiedName: XmlQualifiedName): String;

Description
   InitCallbacks
[C#] protected abstract void InitCallbacks( );
[C++] protected: virtual void InitCallbacks( )=0;
[VB] MustOverride Protected Sub InitCallbacks( )
[JScript] protected abstract function InitCallbacks( );
Description
   TopLevelElement
[C#] protected void TopLevelElement( );
[C++] protected: void TopLevelElement( );
[VB] Protected Sub TopLevelElement( )
[JScript] protected function TopLevelElement( );
   WriteAttribute
[C#] protected void WriteAttribute(string localName, string value);
[C++] protected: void WriteAttribute(String* localName, String* value);
[VB] Protected Sub WriteAttribute(ByVal localName As String, ByVal value As String)
[JScript] protected function WriteAttribute(localName: String, value: String);
Description
   WriteAttribute
[C#] protected void WriteAttribute(string localName, string ns, string value);
[C++] protected: void WriteAttribute(String* localName, String* ns, String* value);
[VB] Protected Sub WriteAttribute(ByVal localName As String, ByVal ns As String, ByVal value As String)
[JScript] protected function WriteAttribute(localName: String, ns: String, value: String);
Description
   WriteAttribute
[C#] protected void WriteAttribute(string prefix, string localName, string ns, string value);
[C++] protected: void WriteAttribute(String* prefix, String* localName, String* ns, String* value);
[VB] Protected Sub WriteAttribute(ByVal prefix As String, ByVal localName As String, ByVal ns As String, ByVal value As String)
[JScript] protected function WriteAttribute(prefix: String, localName: String, ns: String, value: String);
Description
   WriteElementEncoded
[C#] protected void WriteElementEncoded(XmlNode node, string name, string ns, bool is Nullable, bool any);
[C++] protected: void WriteElementEncoded(XmlNode* node, String* name, String* ns, bool is Nullable, bool any);
[VB] Protected Sub WriteElementEncoded(ByVal node As XmlNode, ByVal name As String, ByVal ns As String, ByVal is Nullable As Boolean, ByVal any As Boolean)
[JScript] protected function WriteElementEncoded(node: XmlNode, name: String, ns: String, is Nullable: Boolean, any: Boolean);
   WriteElementLiteral
[C#] protected void WriteElementLiteral(XmlNode node, string name, string ns, bool is Nullable, bool any);
[C++] protected: void WriteElementLiteral(XmlNode* node, String* name, String* ns, bool is Nullable, bool any);
[VB] Protected Sub WriteElementLiteral(ByVal node As XmlNode, ByVal name As String, ByVal ns As String, ByVal is Nullable As Boolean, ByVal any As Boolean)
[JScript] protected function WriteElementLiteral(node: XmlNode, name: String, ns: String, is Nullable: Boolean, any: Boolean);

WriteElementQualifiedName
[C#] protected void WriteElementQualifiedName(string localName, XmlQualifiedName value);
[C++] protected: void WriteElementQualifiedName(String* localName, XmlQualifiedName* value);
[VB] Protected Sub WriteElementQualifiedName(ByVal localName As String, ByVal value As XmlQualifiedName)
[JScript] protected function WriteElementQualifiedName (localName: String, value: XmlQualifiedName);
Description
   WriteElementQualifiedName
[C#] protected void WriteElementQualifiedName(string localName, string ns, XmlQualifiedName value);
[C++] protected: void WriteElementQualifiedName(String* localName, String* ns, XmlQualifiedName* value);
[VB] Protected Sub WriteElementQualifiedName(ByVal localName As String, ByVal ns As String, ByVal value As XmlQualifiedName)
[JScript] protected function WriteElementQualifiedName (localName: String, ns: String, value: XmlQualifiedName);
   WriteElementQualifiedName
[C#] protected void WriteElementQualifiedName(string localName, XmlQualifiedName value, XmlQualifiedName xsiType);
[C++] protected: void WriteElementQualifiedName(String* localName, XmlQualifiedName* value, XmlQualifiedName* xsiType);
[VB] Protected Sub WriteElementQualifiedName(ByVal localName As String, ByVal value As XmlQualifiedName, ByVal xsiType As XmlQualifiedName)
[JScript] protected function WriteElementQualifiedName (localName: String, value: XmlQualifiedName, xsiType: XmlQualifiedName);
   WriteElementQualifiedName
[C#] protected void WriteElementQualifiedName(string localName, string ns, XmlQualifiedName value, XmlQualifiedName xsiType);
[C++] protected: void WriteElementQualifiedName(String* localName, String* ns, XmlQualifiedName* value, XmlQualifiedName* xsiType);
[VB] Protected Sub WriteElementQualifiedName(ByVal localName As String, ByVal ns As String, ByVal value As XmlQualifiedName, ByVal xsiType As XmlQualifiedName)
[JScript] protected function WriteElementQualifiedName (localName: String, ns: String, value: XmlQualifiedName, xsiType: XmlQualifiedName);
   WriteElementString
[C#] protected void WriteElementString(string localName, string value);
[C++] protected: void WriteElementString(String* localName, String* value);
[VB] Protected Sub WriteElementString(ByVal localName As String, ByVal value As String)
[JScript] protected function WriteElementString(localName: String, value: String);
Description
   WriteElementString
[C#] protected void WriteElementString(string localName, string ns, string value);
[C++] protected: void WriteElementString(String* localName, String* ns, String* value);
[VB] Protected Sub WriteElementString(ByVal localName As String, ByVal ns As String, ByVal value As String)
[JScript] protected function WriteElementString(localName: String, ns: String, value: String);

Description
  WriteElementString
[C#] protected void WriteElementString(string localName, string value, XmlQualifiedName xsiType);
[C++] protected: void WriteElementString(String* localName, String* value, XmlQualifiedName* xsiType);
[VB] Protected Sub WriteElementString(ByVal localName As String, ByVal value As String, ByVal xsiType As XmlQualifiedName)
[JScript] protected function WriteElementString(localName: String, value: String, xsiType: XmlQualifiedName);
  WriteElementString
[C#] protected void WriteElementString(string localName, string ns, string value, XmlQualifiedName xsiType);
[C++] protected: void WriteElementString(String* localName, String* ns, String* value, XmlQualifiedName* xsiType);
[VB] Protected Sub WriteElementString(ByVal localName As String, ByVal ns As String, ByVal value As String, ByVal xsiType As XmlQualifiedName)
[JScript] protected function WriteElementString(localName: String, ns: String, value: String, xsiType: XmlQualifiedName);
  WriteElementStringRaw
[C#] protected void WriteElementStringRaw(string localName, string value);
[C++] protected: void WriteElementStringRaw(String* localName, String* value);
[VB] Protected Sub WriteElementStringRaw(ByVal localName As String, ByVal value As String)
[JScript] protected function WriteElementStringRaw(localName: String, value: String);
  WriteElementStringRaw
[C#] protected void WriteElementStringRaw(string localName, string ns, string value);
[C++] protected: void WriteElementStringRaw(String* localName, String* ns, String* value);
[VB] Protected Sub WriteElementStringRaw(ByVal localName As String, ByVal ns As String, ByVal value As String)
[JScript] protected function WriteElementStringRaw(localName: String, ns: String, value: String);
  WriteElementStringRaw
[C#] protected void WriteElementStringRaw(string localName, string value, XmlQualifiedName xsiType);
[C++] protected: void WriteElementStringRaw(String* localName, String* value, XmlQualifiedName* xsiType);
[VB] Protected Sub WriteElementStringRaw(ByVal localName As String, ByVal value As String, ByVal xsiType As XmlQualifiedName)
[JScript] protected function WriteElementStringRaw(localName: String, value: String, xsiType: XmlQualifiedName);
  WriteElementStringRaw
[C#] protected void WriteElementStringRaw(string localName, string ns, string value, XmlQualifiedName xsiType);
[C++] protected: void WriteElementStringRaw(String* localName, String* ns, String* value, XmlQualifiedName* xsiType);
[VB] Protected Sub WriteElementStringRaw(ByVal localName As String, ByVal ns As String, ByVal value As String, ByVal xsiType As XmlQualifiedName)
[JScript] protected function WriteElementStringRaw(localName: String, ns: String, value: String, xsiType: XmlQualifiedName);
  WriteEmptyTag
[C#] protected void WriteEmptyTag(string name, string ns);
[C++] protected: void WriteEmptyTag(String* name, String* ns);
[VB] Protected Sub WriteEmptyTag(ByVal name As String, ByVal ns As String)
[JScript] protected function WriteEmptyTag(name: String, ns: String);
Description
  WriteEndElement
[C#] protected void WriteEndElement( );
[C++] protected: void WriteEndElement( );
[VB] Protected Sub WriteEndElement( )
[JScript] protected function WriteEndElement( );
  WriteEndElement
[C#] protected void WriteEndElement(object o);
[C++] protected: void WriteEndElement(Object* o);
[VB] Protected Sub WriteEndElement(ByVal o As Object)
[JScript] protected function WriteEndElement(o: Object);
  WriteId
[C#] protected void WriteId(object o);
[C++] protected: void WriteId(Object* o);
[VB] Protected Sub WriteId(ByVal o As Object)
[JScript] protected function WriteId(o: Object);
Description
  WriteNullableQualifiedNameEncoded
[C#] protected void WriteNullableQualifiedNameEncoded(string name, string ns, XmlQualifiedName value, XmlQualifiedName xsiType);
[C++] protected: void WriteNullableQualifiedNameEncoded(String* name, String* ns, XmlQualifiedName* value, XmlQualifiedName* xsiType);
[VB] Protected Sub WriteNullableQualifiedNameEncoded(ByVal name As String, ByVal ns As String, ByVal value As XmlQualifiedName, ByVal xsiType As XmlQualifiedName)
[JScript] protected function WriteNullableQualifiedNameEncoded(name: String, ns: String, value: XmlQualifiedName, xsiType: XmlQualifiedName);
  WriteNullableQualifiedNameLiteral
[C#] protected void WriteNullableQualifiedNameLiteral(string name, string ns, XmlQualifiedName value);
[C++] protected: void WriteNullableQualifiedNameLiteral(String* name, String* ns, XmlQualifiedName* value);
[VB] Protected Sub WriteNullableQualifiedNameLiteral(ByVal name As String, ByVal ns As String, ByVal value As XmlQualifiedName)
[JScript] protected function WriteNullableQualifiedNameLiteral(name: String, ns: String, value: XmlQualifiedName);
  WriteNullableStringEncoded
[C#] protected void WriteNullableStringEncoded(string name, string ns, string value, XmlQualifiedName xsiType);
[C++] protected: void WriteNullableStringEncoded(String* name, String* ns, String* value, XmlQualifiedName* xsiType);
[VB] Protected Sub WriteNullableStringEncoded(ByVal name As String, ByVal ns As String, ByVal value As String, ByVal xsiType As XmlQualifiedName)
[JScript] protected function WriteNullableStringEncoded(name: String, ns: String, value: String, xsiType: XmlQualifiedName);
  WriteNullableStringEncodedRaw
[C#] protected void WriteNullableStringEncodedRaw(string name, string ns, string value, XmlQualifiedName xsiType);
[C++] protected: void WriteNullableStringEncodedRaw(String* name, String* ns, String* value, XmlQualifiedName* xsiType);
[VB] Protected Sub WriteNullableStringEncodedRaw(ByVal name As String, ByVal ns As String, ByVal value As String, ByVal xsiType As XmlQualifiedName)

[JScript] protected function WriteNullableStringEncodedRaw(name: String, ns: String, value: String, xsiType: XmlQualifiedName);
    WriteNullableStringLiteral
[C#] protected void WriteNullableStringLiteral(string name, string ns, string value);
[C++] protected: void WriteNullableStringLiteral(String* name, String* ns, String* value);
[VB] Protected Sub WriteNullableStringLiteral(ByVal name As String, ByVal ns As String, ByVal value As String)
[JScript] protected function WriteNullableStringLiteral(name: String, ns: String, value: String);
    WriteNullableStringLiteralRaw
[C#] protected void WriteNullableStringLiteralRaw(string name, string ns, string value);
[C++] protected: void WriteNullableStringLiteralRaw(String* name, String* ns, String* value);
[VB] Protected Sub WriteNullableStringLiteralRaw(ByVal name As String, ByVal ns As String, ByVal value As String)
[JScript] protected function WriteNullableStringLiteralRaw(name: String, ns: String, value: String);
    WriteNullTagEncoded
[C#] protected void WriteNullTagEncoded(string name);
[C++] protected: void WriteNullTagEncoded(String* name);
[VB] Protected Sub WriteNullTagEncoded(ByVal name As String)
[JScript] protected function WriteNullTagEncoded(name: String);
    WriteNullTagEncoded
[C#] protected void WriteNullTagEncoded(string name, string ns);
[C++] protected: void WriteNullTagEncoded(String* name, String* ns);
[VB] Protected Sub WriteNullTagEncoded(ByVal name As String, ByVal ns As String)
[JScript] protected function WriteNullTagEncoded(name: String, ns: String);
    WriteNullTagLiteral
[C#] protected void WriteNullTagLiteral(string name);
[C++] protected: void WriteNullTagLiteral(String* name);
[VB] Protected Sub WriteNullTagLiteral(ByVal name As String)
[JScript] protected function WriteNullTagLiteral(name: String);
    WriteNullTagLiteral
[C#] protected void WriteNullTagLiteral(string name, string ns);
[C++] protected: void WriteNullTagLiteral(String* name, String* ns);
[VB] Protected Sub WriteNullTagLiteral(ByVal name As String, ByVal ns As String)
[JScript] protected function WriteNullTagLiteral(name: String, ns: String);
Description
    WritePotentiallyReferencingElement
[C#] protected void WritePotentiallyReferencingElement(string n, string ns, object o);
[C++] protected: void WritePotentiallyReferencingElement(String* n, String* ns, Object* o);
[VB] Protected Sub WritePotentiallyReferencingElement(ByVal n As String, ByVal ns As String, ByVal o As Object)
[JScript] protected function WritePotentiallyReferencingElement(n: String, ns: String, o: Object);
Description
    WritePotentiallyReferencingElement
[C#] protected void WritePotentiallyReferencingElement(string n, string ns, object o, Type ambientType);

[C++] protected: void WritePotentiallyReferencingElement(String* n, String* ns, Object* o, Type* ambientType);
[VB] Protected Sub WritePotentiallyReferencingElement(ByVal n As String, ByVal ns As String, ByVal o As Object, ByVal ambientType As Type)
[JScript] protected function WritePotentiallyReferencingElement(n: String, ns: String, o: Object, ambientType: Type);
Description
    WritePotentiallyReferencingElement
[C#] protected void WritePotentiallyReferencingElement(string n, string ns, object o, Type ambientType, bool suppressReference);
[C++] protected: void WritePotentiallyReferencingElement(String* n, String* ns, Object* o, Type* ambientType, bool suppressReference);
[VB] Protected Sub WritePotentiallyReferencingElement(ByVal n As String, ByVal ns As String, ByVal o As Object, ByVal ambientType As Type, ByVal suppressReference As Boolean)
[JScript] protected function WritePotentiallyReferencingElement(n: String, ns: String, o: Object, ambientType: Type, suppressReference: Boolean);
    WritePotentiallyReferencingElement
[C#] protected void WritePotentiallyReferencingElement(string n, string ns, object o, Type ambientType, bool suppressReference, bool is Nullable);
[C++] protected: void WritePotentiallyReferencingElement(String* n, String* ns, Object* o, Type* ambientType, bool suppressReference, bool is Nullable);
[VB] Protected Sub WritePotentiallyReferencingElement(ByVal n As String, ByVal ns As String, ByVal o As Object, ByVal ambientType As Type, ByVal suppressReference As Boolean, ByVal is Nullable As Boolean)
[JScript] protected function WritePotentiallyReferencingElement(n: String, ns: String, o: Object, ambientType: Type, suppressReference: Boolean, is Nullable Boolean);
    WriteReferencedElements
[C#] protected void WriteReferencedElements( );
[C++] protected: void WriteReferencedElements( );
[VB] Protected Sub WriteReferencedElements( )
[JScript] protected function WriteReferencedElements( );
Description
    WriteReferencingElement
[C#] protected void WriteReferencingElement(string n, string ns, object o);
[C++] protected: void WriteReferencingElement(String* n, String* ns, Object* o);
[VB] Protected Sub WriteReferencingElement(ByVal n As String, ByVal ns As String, ByVal o As Object)
[JScript] protected function WriteReferencingElement(n: String, ns: String, o: Object);
Description
    WriteReferencingElement
[C#] protected void WriteReferencingElement(string n, string ns, object o, bool is Nullable);
[C++] protected: void WriteReferencingElement(String* n, String* ns, Object* o, bool is Nullable);
[VB] Protected Sub WriteReferencingElement(ByVal n As String, ByVal ns As String, ByVal o As Object, ByVal is Nullable As Boolean)
[JScript] protected function WriteReferencingElement(n: String, ns: String, o: Object, is Nullable: Boolean);
    WriteSerializable
[C#] protected void WriteSerializable(IXmlSerializable serializable, string name, string ns, bool is Nullable);

[C++] protected: void WriteSerializable(IXmlSerializable* serializable, String* name, String* ns, bool is Nullable);
[VB] Protected Sub WriteSerializable(ByVal serializable As IXmlSerializable, ByVal name As String, ByVal ns As String, ByVal is Nullable As Boolean)
[JScript] protected function WriteSerializable(serializable: IXmlSerializable, name: String, ns: String, is Nullable: Boolean);
Description
    WriteStartDocument
[C#] protected void WriteStartDocument( );
[C++] protected: void WriteStartDocument( );
[VB] Protected Sub WriteStartDocument( )
[JScript] protected function WriteStartDocument( );
Description
    WriteStartElement
[C#] protected void WriteStartElement(string name);
[C++] protected: void WriteStartElement(String* name);
[VB] Protected Sub WriteStartElement(ByVal name As String)
[JScript] protected function WriteStartElement(name: String);
Description
    WriteStartElement
[C#] protected void WriteStartElement(string name, string ns);
[C++] protected: void WriteStartElement(String* name, String* ns);
[VB] Protected Sub WriteStartElement(ByVal name As String, ByVal ns As String)
[JScript] protected function WriteStartElement(name: String, ns: String);
Description
    WriteStartElement
[C#] protected void WriteStartElement(string name, string ns, bool writePrefixed);
[C++] protected: void WriteStartElement(String* name, String* ns, bool writePrefixed);
[VB] Protected Sub WriteStartElement(ByVal name As String, ByVal ns As String, ByVal writePrefixed As Boolean)
[JScript] protected function WriteStartElement(name: String, ns: String, writePrefixed: Boolean);
    WriteStartElement
[C#] protected void WriteStartElement(string name, string ns, object o);
[C++] protected: void WriteStartElement(String* name, String* ns, Object* o);
[VB] Protected Sub WriteStartElement(ByVal name As String, ByVal ns As String, ByVal o As Object)
[JScript] protected function WriteStartElement(name: String, ns: String, o: Object);
    WriteStartElement
[C#] protected void WriteStartElement(string name, string ns, object o, bool writePrefixed);
[C++] protected: void WriteStartElement(String* name, String* ns, Object* o, bool writePrefixed);
[VB] Protected Sub WriteStartElement(ByVal name As String, ByVal ns As String, ByVal o As Object, ByVal writePrefixed As Boolean)
[JScript] protected function WriteStartElement(name: String, ns: String, o: Object, writePrefixed: Boolean);
    WriteTypedPrimitive
[C#] protected void WriteTypedPrimitive(string name, string ns, object o, bool xsiType);
[C++] protected: void WriteTypedPrimitive(String* name, String* ns, Object* o, bool xsiType);
[VB] Protected Sub WriteTypedPrimitive(ByVal name As String, ByVal ns As String, ByVal o As Object, ByVal xsiType As Boolean)
[JScript] protected function WriteTypedPrimitive(name: String, ns: String, o: Object, xsiType: Boolean);
Description
    WriteXmlAttribute
[C#] protected void WriteXmlAttribute(XmlNode node);
[C++] protected: void WriteXmlAttribute(XmlNode* node);
[VB] Protected Sub WriteXmlAttribute(ByVal node As XmlNode)
[JScript] protected function WriteXmlAttribute(node: XmlNode);
    WriteXsiType
[C#] protected void WriteXsiType(string name, string ns);
[C++] protected: void WriteXsiType(String* name, String* ns);
[VB] Protected Sub WriteXsiType(ByVal name As String, ByVal ns As String)
[JScript] protected function WriteXsiType(name: String, ns: String);
Description
    XmlSerializer class (System.Xml.Serialization)
    WriteXsiType
Description
    Serializes and deserializes objects into and from XML-document instances. The System.Xml.Serialization.XmlSerializer enables you to control how objects are encoded into XML. Optionally, you can use the to generate classes that the serializer can encode into XML that adheres to a given XSD schema document.
    XML serialization is the process of converting an object's public properties and fields to a serial format (in this case, XML) for storage or transport. Deserialization recreates the object—in its original state—from the XML output. You can thus think of serialization as a way of saving the state of an object into a stream or buffer. For example, ASP.Net web services uses the System.Xml.Serialization.XmlSerializer to encode web service messages.
    XmlSerializer
    Example Syntax:
    WriteXsiType
[C#] protected XmlSerializer( );
[C++] protected: XmlSerializer( );
[VB] Protected Sub New( )
[JScript] protected function XmlSerializer( ); Constructs a new instance of the System.Xml.Serialization.XmlSerializer class.
Description
    Constructs a new instance of the System.Xml.Serialization.XmlSerializer class.
    XmlSerializer
    Example Syntax:
    WriteXsiType
[C#] public XmlSerializer(Type type);
[C++] public: XmlSerializer(Type* type);
[VB] Public Sub New(ByVal type As Type)
[JScript] public function XmlSerializer(type: Type);
Description
    Initializes a new instance of the System.Xml.Serialization.XmlSerializer class that can serialize objects of the specified type into XML-document instances, and vice versa.
    Commonly, an application defines several classes that the System.Xml.Serialization.XmlSerializer converts into a single XML-instance document. However, the System.Xml.Serialization.XmlSerializer needs only to know only one type—the type of the class that represents the XML root element. The System.Xml.Serialization.XmlSerializer automatically serializes all subordinate class instances. Similarly, only the type of the XML root element is needed for deserialization. The type of the object that this System.Xml.Serialization.XmlSerializer can serialize.
  XmlSerializer
  Example Syntax:
  WriteXsiType
[C#] public XmlSerializer(XmlTypeMapping xmlTypeMapping);
[C++] public: XmlSerializer(XmlTypeMapping* xmlTypeMapping);
[VB] Public Sub New(ByVal xmlTypeMapping As XmlTypeMapping)
[JScript] public function XmlSerializer(xmlTypeMapping: XmlTypeMapping); The System.Xml.Serialization.XmlTypeMapping.
  XmlSerializer
  Example Syntax:
  WriteXsiType
[C#] public XmlSerializer(Type type, string defaultNamespace);
[C++] public: XmlSerializer(Type* type, String* defaultNamespace);
[VB] Public Sub New(ByVal type As Type, ByVal defaultNamespace As String)
[JScript] public function XmlSerializer(type: Type, defaultNamespace: String);
Description
  Initializes a new instance of the System.Xml.Serialization.XmlSerializer class that can serialize objects of the specified type into XML-document instances, and vice versa. Specifies the default namespace for all the XML elements. The type of the object that this System.Xml.Serialization.XmlSerializer can serialize. The default namespace to use for all the XML elements.
  XmlSerializer
  Example Syntax:
  WriteXsiType
[C#] public XmlSerializer(Type type, Type[ ] extraTypes);
[C++] public: XmlSerializer(Type* type, Type* extraTypes[ ]);
[VB] Public Sub New(ByVal type As Type, ByVal extraTypes( ) As Type)
[JScript] public function XmlSerializer(type: Type, extraTypes: Type[ ]);
Description
  Initializes a new instance of the System.Xml.Serialization.XmlSerializer class that can serialize objects of the specified type into XML-document instances, and vice versa. If a property or field returns an array, the extraTypes parameter specifies objects that can be inserted into the array.
  By default, if a public property or field returns an object, or array of objects, the object types will be automatically serialized. However, if a class contains a field or property that returns an array of type System.Object, any object can be inserted into that array. In that case, the System.Xml.Serialization.XmlSerializer must be instructed to expect all of the possible object types that will be inserted into the System.Object array. To do this, use the extraTypes parameter to specify the extra object types to serialize or deserialize. The type of the object that this System.Xml.Serialization.XmlSerializer can serialize. A System.Type array of additional object types to serialize. See Remarks below.
  XmlSerializer
  Example Syntax:
  WriteXsiType

[C#] public XmlSerializer(Type type, XmlAttributeOverrides overrides);
[C++] public: XmlSerializer(Type* type, XmlAttributeOverrides* overrides);
[VB] Public Sub New(ByVal type As Type, ByVal overrides As XmlAttributeOverrides)
[JScript] public function XmlSerializer(type: Type, overrides: XmlAttributeOverrides);
Description
  Initializes a new instance of the System.Xml.Serialization.XmlSerializer class that can serialize objects of the specified type into XML-document instances, and vice versa. Each object to be serialized can itself contain instances of classes, which this overload can override with other classes.
  The overrides parameter can be used to control how fields and properties are encoded in XML. These settings override any attributes that already exist on the objects. This can be useful when the source code can not be modified or multiple encodings are desired for the same classes. The type of the object to serialize. An System.Xml.Serialization.XmlAttributeOverrides.
  XmlSerializer
  Example Syntax:
  WriteXsiType
[C#] public XmlSerializer(Type type, XmlRootAttribute root);
[C++] public: XmlSerializer(Type* type, XmlRootAttribute* root);
[VB] Public Sub New(ByVal type As Type, ByVal root As XmlRootAttribute)
[JScript] public function XmlSerializer(type: Type, root: XmlRootAttribute);
Description
  Initializes a new instance of the System.Xml.Serialization.XmlSerializer class that can serialize objects of the specified type into XML-document instances, and vice versa. Specifies the class to use as the XML root element.
  The root element of an XML document encloses all the other elements. By default, the object specified by the type parameter is serialized as the root element. Properties, such as the XML element name of the root element are taken from the type object. However, the root parameter allows you to supplant the default object's information by specifying an System.Xml.Serialization.XmlRootAttribute; the object allows you to set a different namespace, element name, and so on. The type of the object that this System.Xml.Serialization.XmlSerializer can serialize. An System.Xml.Serialization.XmlRootAttribute that represents the XML root element.
  XmlSerializer
  Example Syntax:
  WriteXsiType
[C#] public XmlSerializer(Type type, XmlAttributeOverrides overrides, Type[ ] extraTypes, XmlRootAttribute root, string defaultNamespace);
[C++] public: XmlSerializer(Type* type, XmlAttributeOverrides* overrides, Type* extraTypes[ ], XmlRootAttribute* root, String* defaultNamespace);
[VB] Public Sub New(ByVal type As Type, ByVal overrides As XmlAttributeOverrides, ByVal extraTypes( ) As Type, ByVal root As XmlRootAttribute, ByVal defaultNamespace As String)
[JScript] public function XmlSerializer(type: Type, overrides: XmlAttributeOverrides, extraTypes: Type[ ], root: XmlRootAttribute, defaultNamespace: String); Initializes a new instance of the System.Xml.Serialization.XmlSerializer class.

Description

Initializes a new instance of the System.Xml.Serialization.XmlSerializer class that can serialize objects of the object type into XML document instances, and vice versa. Each object to be serialized can itself contain instances of classes, which this overload can override with other classes. This overload also specifies the default namespace for all the XML elements, and the class to use as the XML root element.

The overrides parameter allows for the creation of a serializer that serializes an overriding class. For example, given a DLL it's possible to create a class that inherits from the DLL. To serialize the overriding class, you must use an System.Xml.Serialization.XmlAttributeOverrides object when constructing the System.Xml.Serialization.XmlSerializer. For more details, see System.Xml.Serialization.XmlAttributeOverrides. The type of the object that this System.Xml.Serialization.XmlSerializer can serialize. An System.Xml.Serialization.XmlAttributeOverrides. See Remarks below. A System.Type array of additional object types to serialize. See Remarks below. An System.Xml.Serialization.XmlRootAttribute that defines the XML root element properties. The default namespace of all XML elements in the XML-document instance.

WriteXsiType
[C#] public event XmlAttributeEventHandler UnknownAttribute;
[C++] public: _event XmlAttributeEventHandler* UnknownAttribute;
[VB] Public Event UnknownAttribute As XmlAttributeEventHandler
Description Occurs when the System.Xml.Serialization.XmlSerializer encounters an XML attribute of unknown type during deserialization.

By default, after calling the System.Xml.Serialization.XmlSerializer.Deserialize(System.IO.Stream) method, the System.Xml.Serialization.XmlSerializer ignores XML attributes of unknown types. However, you can use this event to handle such node types.

WriteXsiType
[C#] public event XmlElementEventHandler UnknownElement;
[C++] public: _event XmlElementEventHandler* UnknownElement;
[VB] Public Event UnknownElement As XmlElementEventHandler
Description Occurs when the System.Xml.Serialization.XmlSerializer encounters an XML element of unknown type during deserialization.

By default, after calling the System.Xml.Serialization.XmlSerializer.Deserialize(System.IO.Stream) method, the System.Xml.Serialization.XmlSerializer ignores XML attributes of unknown types. However, you can use this event to handle such node types.

WriteXsiType
[C#] public event XmlNodeEventHandler UnknownNode;
[C++] public: _event XmlNodeEventHandler* UnknownNode;
[VB] Public Event UnknownNode As XmlNodeEventHandler
Description Occurs when the System.Xml.Serialization.XmlSerializer encounters an XML node of unknown type during deserialization.

By default, after calling the System.Xml.Serialization.XmlSerializer.Deserialize(System.IO.Stream) method, the System.Xml.Serialization.XmlSerializer ignores XML nodes of unknown types. However, you can use this event to handle such node types.

WriteXsiType
[C#] public event UnreferencedObjectEventHandler UnreferencedObject;
[C++] public: _event UnreferencedObjectEventHandler* UnreferencedObject;
[VB] Public Event UnreferencedObject As UnreferencedObjectEventHandler
Description CanDeserialize
[C#] public virtual bool CanDeserialize(XmlReader xmlReader);
[C++] public: virtual bool CanDeserialize(XmlReader* xmlReader);
[VB] Overridable Public Function CanDeserialize(ByVal xmlReader As XmlReader) As Boolean
[JScript] public function CanDeserialize(xmlReader: XmlReader): Boolean;
Description Gets a value indicating whether this System.Xml.Serialization.XmlSerializer can deserialize a specified XML-document instance.

Return Value: true if an this System.Xml.Serialization.XmlSerializer can deserialize the object which the System.Xml.XmlReader points to; otherwise, false. An System.Xml.XmlReader that points to the document to deserialize.

CreateReader
[C#] protected virtual XmlSerializationReader CreateReader( );
[C++] protected: virtual XmlSerializationReader* CreateReader( );
[VB] Overridable Protected Function CreateReader( ) As XmlSerializationReader
[JScript] protected function CreateReader( ): XmlSerializationReader;
Description Returns an object used to read the XML-document instance to be serialized.

Return Value: An XmlSerializationReader used to read the XML-document instance.

CreateWriter
[C#] protected virtual XmlSerializationWriter CreateWriter( );
[C++] protected: virtual XmlSerializationWriter* CreateWriter( );
[VB] Overridable Protected Function CreateWriter( ) As XmlSerializationWriter
[JScript] protected function CreateWriter( ): XmlSerializationWriter;
Description Deserialize
[C#] public object Deserialize(Stream stream);
[C++] public: Object* Deserialize(Stream* stream);
[VB] Public Function Deserialize(ByVal stream As Stream) As Object
[JScript] public function Deserialize(stream: Stream): Object; Deserializes an XML-document instance.
Description Deserializes the XML-document instance contained by the specified System.IO.Stream.

Return Value: The System.Object being deserialized.

Deserialization is the process of reading an XML-document instance and constructing an object that is strongly typed to the XML schema of the document. The System.IO.Stream containing the XML-document instance to deserialize.

Deserialize
[C#] public object Deserialize(TextReader textReader);
[C++] public: Object* Deserialize(TextReader* textReader);
[VB] Public Function Deserialize(ByVal textReader As TextReader) As Object
[JScript] public function Deserialize(textReader: TextReader): Object;
Description
Deserializes the XML-document instance contained by the specified System.IO.TextReader.
Return Value: The System.Object being deserialized.
Deserialization is the process of reading an XML instance document and constructing an object that is strongly typed to the XML schema of the document. The System.IO.TextReader containing the XML-document instance to deserialize.

Deserialize
[C#] public object Deserialize(XmlReader xmlReader);
[C++] public: Object* Deserialize(XmlReader* xmlReader);
[VB] Public Function Deserialize(ByVal xmlReader As XmlReader) As Object
[JScript] public function Deserialize(xmlReader: XmlReader): Object;
Description
Deserializes the XML-document instance contained by the specified System.xml.XmlReader.
Return Value: The System.Object being deserialized.
Deserialization is the process of reading an XML instance document and constructing an object that is strongly typed to the XML schema of the document. The System.xml.XmlReader containing the XML-document instance to deserialize.

Deserialize
[C#] protected virtual object Deserialize(XmlSerializationReader reader);
[C++] protected: virtual Object* Deserialize(XmlSerializationReader* reader);
[VB] Overridable Protected Function Deserialize(ByVal reader As XmlSerializationReader) As Object
[JScript] protected function Deserialize(reader: XmlSerializationReader): Object;
Description
   FromMappings
[C#] public static XmlSerializer[ ] FromMappings(XmlMapping[ ] mappings);
[C++] public: static XmlSerializer* FromMappings(XmlMapping* mappings[ ]) [ ];
[VB] Public Shared Function FromMappings(ByVal mappings( ) As XmlMapping) As XmlSerializer( )
[JScript] public static function FromMappings(mappings: XmlMapping[ ]): XmlSerializer[ ];
Description
   FromTypes
[C#] public static XmlSerializer[ ] FromTypes(Type[ ] types);
[C++] public: static XmlSerializer* FromTypes(Type* types[ ])[ ]
[VB] Public Shared Function FromTypes(ByVal types( ) As Type) As XmlSerializer( )
[JScript] public static function FromTypes(types: Type[ ]): XmlSerializer[ ];
Description
Returns an array of System.Xml.Serialization.XmlSerializer objects created from an array of types.
Return Value: An array of System.Xml.Serialization.XmlSerializer objects.
The System.Xml.Serialization.XmlSerializer.FromTypes (System.Type[ ]) method allows you to efficiently create an array of System.Xml.Serialization.XmlSerializer objects for processing an array of System.Type objects. An array of System.Type objects.
   Serialize
[C#] protected virtual void Serialize(object o, XmlSerializationWriter writer);
[C++] protected: virtual void Serialize(Object* o, XmlSerializationWriter* writer);
[VB] Overridable Protected Sub Serialize(ByVal o As Object, ByVal writer As XmlSerializationWriter)
[JScript] protected function Serialize(o: Object, writer: XmlSerializationWriter);
Description
   Serialize
[C#] public void Serialize(Stream stream, object o);
[C++] public: void Serialize(Stream* stream, Object* o);
[VB] Public Sub Serialize(ByVal stream As Stream, ByVal o As Object)
[JScript] public function Serialize(stream: Stream, o: Object);
Description
Serializes the specified System.Object and writes the XML-document instance to a file using the specified System.IO.Stream
The System.Xml.Serialization.XmlSerializer.Serialize (System.IO.Textwriter,System.Object) method converts the public fields and read/write properties of an object into Extensible Markup Language (XML). It does not convert methods, indexers, private fields, or read-only properties. To serialize all of an object's fields and properties, both public and private, use the System.Runtime.Serialization. Formatters.Binary.BinaryFormatter. The System.IO.Stream used to write the XML-document instance. The System.Object to serialize.
   Serialize
[C#] public void Serialize(TextWriter textWriter, object o);
[C++] public: void Serialize(TextWriter* textWriter, Object* o);
[VB] Public Sub Serialize(ByVal textWriter As TextWriter, ByVal o As Object)
[JScript] public function Serialize(textWriter: TextWriter, o: Object); Serializes an object into an XML-document instance.
Description
Serializes the specified System.Object and writes the XML-document instance to a file using the specified System.IO.TextWriter.
The System.Xml.Serialization.XmlSerializer.Serialize (System.IO.Textwriter,System.Object) method converts the public fields and read/write properties of an object into Extensible Markup Language (XML). It does not convert methods, indexers, private fields, or read-only properties. To serialize all of an object's fields and properties, both public and private, use the System.Runtime.Serialization. Formatters.Binary.BinaryFormatter. The System.IO.TextWriter used to write the XML-document instance. The System.Object to serialize.
   Serialize
[C#] public void Serialize(XmlWriter xmlWriter, object o);
[C++] public: void Serialize(XmlWriter* xmlWriter, Object* o);
[VB] Public Sub Serialize(ByVal xmlWriter As XmlWriter, ByVal o As Object)

[JScript] public function Serialize(xmlWriter: XmlWriter, o: Object);
Description
Serializes the specified System.Object and writes the XML-document instance to a file using the specified System.Xml.XmlWriter.
The System.Xml.Serialization.XmlSerializer.Serialize (System.IO.Textwriter,System.Object) method converts the public fields and read/write properties of an object into Extensible Markup Language (XML). It does not convert methods, indexers, private fields, or read-only properties. To serialize all of an object's fields and properties, both public and private, use the System.Runtime.Serialization. Formatters.Binary.BinaryFormatter. The System.xml.XmlWriter used to write the XML-document instance. The System.Object to serialize.
Serialize
[C#] public void Serialize(Stream stream, object o, XmlSerializerNamespaces namespaces);
[C++] public: void Serialize(Stream* stream, Object* o, XmlSerializerNamespaces* namespaces);
[VB] Public Sub Serialize(ByVal stream As Stream, ByVal o As Object, ByVal namespaces As XmlSerializerNamespaces)
[JScript] public function Serialize(stream: Stream, o: Object, namespaces: XmlSerializerNamespaces);
Description
Serializes the specified System.Object and writes the XML-document instance to a file using the specified System.IO.Stream, referencing the specified namespaces.
When the Serialize method is invoked the public fields and read/write properties of an object are converted into Extensible Markup Language (XML). Methods, indexers, private fields, and read-only properties are not serialized. To serialize all fields and properties, both public and private, use the System.Runtime.Serialization. Formatters.Binary.BinaryFormatter. The System.IO.Stream used to write the XML-document instance. The System.Object to serialize. The System.Xml.Serialization.XmlSerializerNamespaces referenced by the object.
Serialize
[C#] public void Serialize(TextWriter textWriter, object o, XmlSerializerNamespaces namespaces);
[C++] public: void Serialize(TextWriter* textWriter, Object* o, XmlSerializerNamespaces* namespaces);
[VB] Public Sub Serialize(ByVal textWriter As TextWriter, ByVal o As Object, ByVal namespaces As XmlSerializerNamespaces)
[JScript] public function Serialize(textWriter: TextWriter, o: Object, namespaces: XmlSerializerNamespaces);
Description
Serializes the specified System.Object and writes the XML-document instance to a file using the specified System.IO.TextWriter, referencing the specified namespaces.
When the System.Xml.Serialization.XmlSerializer.Serialize(System.IO.Textwriter,System.Object) method is invoked the public fields and read/write properties of an object are converted into Extensible Markup Language (XML). Methods, indexers, private fields, and read-only properties are not serialized. To serialize all fields and properties, both public and private, use the System.Runtime.Serialization.Formatters.Binary.BinaryFormatter. The System.IO.TextWriter used to write the XML-document instance. The System.Object to serialize. The System.Xml.Serialization.XmlSerializerNamespaces containing namespaces for the generated XML document.
Serialize
[C#] public void Serialize(XmlWriter xmlWriter, object o, XmlSerializerNamespaces namespaces);
[C++] public: void Serialize(XmlWriter* xmlWriter, Object* o, XmlSerializerNamespaces* namespaces);
[VB] Public Sub Serialize(ByVal xmlWriter As XmlWriter, ByVal o As Object, ByVal namespaces As XmlSerializerNamespaces)
[JScript] public function Serialize(xmlWriter: XmlWriter, o: Object, namespaces: XmlSerializerNamespaces);
Description
Serializes the specified System.Object and writes the XML-document instance to a file using the specified System.Xml.XmlWriter, referencing the specified namespaces.
When the System.Xml.Serialization.XmlSerializer.Serialize(System.IO.Textwriter,System.Object) method is invoked the public fields and read/write properties of an object are converted into Extensible Markup Language (XML). Methods, indexers, private fields, and read-only properties are not serialized. To serialize all fields and properties, both public and private, use the System.Runtime.Serialization.Formatters.Binary.BinaryFormatter. The System.xml.XmlWriter used to write the XML-document instance. The System.Object to serialize. The System.Xml.Serialization.XmlSerializerNamespaces referenced by the object.
XmlSerializerNamespaces class (System.Xml.Serialization)
ToString
Description
Contains the XML namespaces and prefixes that the System.Xml.Serialization.XmlSerializer uses to generate qualified names in an XML-document instance.
The System.Xml.Serialization.XmlSerializerNamespaces contains a collection of XML namespaces, each with an associated prefix. The System.Xml.Serialization.XmlSerializer uses an instance of the System.Xml.Serialization.XmlSerializerNamespaces class to create qualified names in an XML-document instance.
XmlSerializerNamespaces
Example Syntax:
ToString
[C#] public XmlSerializerNamespaces( );
[C++] public: XmlSerializerNamespaces( );
[VB] Public Sub New( )
[JScript] public function XmlSerializerNamespaces( ); Initializes a new instance of the System.Xml.Serialization.XmlSerializerNamespaces class.
Description
Initializes a new instance of the System.Xml.Serialization.XmlSerializerNamespaces class.
XmlSerializerNamespaces
Example Syntax:
ToString
[C#] public XmlSerializerNamespaces(XmlQualifiedName [ ] name spaces);
[C++] public: XmlSerializerNamespaces(XmlQualifiedName[ ] namespaces[ ]);
[VB] Public Sub New(ByVal namespaces( ) As XmlQualifiedName)
[JScript] public function XmlSerializerNamespaces (namespaces: XmlQualifiedName[ ]);
Description
Initializes a new instance of the System.Xml.Serialization.XmlSerializerNamespaces class, using the specified array of System.Xml.XmlQualifiedName objects to create a collection of prefix-namespace pairs. An array of System.Xml.XmlQualifiedName objects.
Count
ToString
[C#] public int Count {get;}
[C++] public: _property int get_Count( );
[VB] Public ReadOnly Property Count As Integer
[JScript] public function get Count( ): int;
Description
Gets the number of prefix-namespace pairs in the collection.
Add
[C#] public void Add(string prefix, string ns);
[C++] public: void Add(String* prefix, String* ns);
[VB] Public Sub Add(ByVal prefix As String, ByVal ns As String)
[JScript] public function Add(prefix: String, ns: String);
Description
Adds a prefix-namespace pair to an System.Xml.Serialization.XmlSerializerNamespaces object.
If you want the System.Xml.Serialization.XmlSerializer to qualify the element and attribute names in an XML document, you must System.Xml.Serialization.XmlSerializerNamespaces.Add(System.String,System.String) the prefix-namespace pairs to an System.Xml.Serialization.XmlSerializerNamespaces object. The prefix associated with an XML namespace. An XML namespace.
ToArray
[C#] public XmlQualifiedName[ ] ToArray( );
[C++] public: XmlQualifiedName* ToArray( )[ ]
[VB] Public Function ToArray( ) As XmlQualifiedName( )
[JScript] public function ToArray( ): XmlQualifiedName[ ];
Description
Gets the array of prefix-namespace pairs in an System.Xml.Serialization.XmlSerializerNamespaces object.
Return Value: An array of System.Xml.XmlQualifiedName objects that are used as qualified names in an XML-document instance.
XmlTextAttribute class (System.Xml.Serialization)
ToString
Description
Indicates to the System.Xml.Serialization.XmlSerializer that the member should be treated as XML text when the containing class is serialized or deserialized.
The System.Xml.Serialization.XmlTextAttribute belongs to a family of attributes that controls how the System.Xml.Serialization.XmlSerializer serializes and deserializes an object (through its System.Xml.Serialization.XmlSerializer.Serialize(System.IO.Textwriter,System.Object) and System.Xml.Serialization.XmlSerializer.Deserialize(System.IO.Stream) methods). See the System.Xml.Serialization.XmlSerializer class for a complete list of similar attributes.
XmlTextAttribute
Example Syntax:
ToString
[C#] public XmlTextAttribute( );
[C++] public: XmlTextAttribute( );
[VB] Public Sub New( )
[JScript] public function XmlTextAttribute( ); Initializes a new instance of the System.Xml.Serialization.XmlTextAttribute class.
Description
Initializes a new instance of the System.Xml.Serialization.XmlTextAttribute class.
You can override the way that the System.Xml.Serialization.XmlSerializer serializes a public field or public read/write property by creating an System.Xml.Serialization.XmlAttributes object, and setting its System.Xml.Serialization.XmlAttributes.XmlText property to an System.Xml.Serialization.XmlTextAttribute object. For more details, see the System.Xml.Serialization.XmlAttributeOverrides class.
XmlTextAttribute
Example Syntax:
ToString
[C#] public XmlTextAttribute(Type type);
[C++] public: XmlTextAttribute(Type* type);
[VB] Public Sub New(ByVal type As Type)
[JScript] public function XmlTextAttribute(type: Type);
Description
Initializes a new instance of the System.Xml.Serialization.XmlTextAttribute class.
Type
ToString
[C#] public Type Type {get; set;}
[C++] public: _property Type* get_Type( );public: _property void set_Type(Type*);
[VB] Public Property Type As Type
[JScript] public function get Type( ): Type;public function set Type(Type);
Description
Gets or sets the type of the member.
TypeId
XmlTypeAttribute class (System.Xml.Serialization)
ToString
Description
Represents a complex type XML element.
The System.Xml.Serialization.XmlTypeAttribute belongs to a family of attributes that controls how the System.Xml.Serialization.XmlSerializer serializes or deserializes an object. For a complete list of similar attributes, see the System.Xml.Serialization.XmlSerializer class.
XmlTypeAttribute
Example Syntax:
ToString
[C#] public XmlTypeAttribute( );
[C++] public: XmlTypeAttribute( );
[VB] Public Sub New( )
[JScript] public function XmlTypeAttribute( ); Initializes a new instance of the System.Xml.Serialization.XmlTypeAttribute class.
Description
Initializes a new instance of the System.Xml.Serialization.XmlTypeAttribute class.
XmlTypeAttribute
Example Syntax:
ToString
[C#] public XmlTypeAttribute(string typeName);
[C++] public: XmlTypeAttribute(String* typeName);
[VB] Public Sub New(ByVal typeName As String)
[JScript] public function XmlTypeAttribute(typeName: String);
Description
Initializes a new instance of the System.Xml.Serialization.XmlTypeAttribute class, specifying the name of the XML type. The name of the XML type that the System.Xml.Serialization.XmlSerializer generates when it serializes the class instance (and recognizes when it deserializes the class instance).
IncludeInSchema
ToString
[C#] public bool IncludeInSchema {get; set;}

[C++] public: _property bool get_IncludeInSchema( );public: _property void set_IncludeInSchema(bool);
[VB] Public Property IncludeInSchema As Boolean
[JScript] public function get IncludeInSchema( ): Boolean; public function set IncludeInSchema(Boolean);
Description
  Gets or sets a value indicating whether to include the type in XML schema documents.
  Apply the System.Xml.Serialization.XmlTypeAttribute to a class to specify the XML type's namespace, the XML type name, and whether to include the type in the XML schema document. To see the results of setting the System.Xml.Serialization.XmlTypeAttribute class's properties, compile your application as an executable or DLL, and pass the resulting file to the XML Schema Definition tool (XSD.exe). The tool writes the schema—including the type definition.
    Namespace
    ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);
Description
  Gets or sets the namespace of the XML type.
  TypeId
  TypeName
  ToString
Description
  Gets or sets the name of the XML type.
  Apply the System.Xml.Serialization.XmlTypeAttribute to a class to specify the XML type's namespace, the XML type name, and whether to include the type in the XML schema document. To see the results of setting the System.Xml.Serialization.XmlTypeAttribute class's properties, compile your application as an executable or DLL, and pass the resulting file to the XML Schema Definition tool (XSD.exe). The tool writes the schema—including the type definition.
    XmlTypeMapping class (System.Xml.Serialization)
    ToString
Description
    ElementName
    ToString
[C#] public string ElementName {get;}
[C++] public: _property String* get_ElementName( );
[VB] Public ReadOnly Property ElementName As String
[JScript] public function get ElementName( ): String;
Description
    Namespace
    ToString
[C#] public string Namespace {get;}
[C++] public: _property String* get_Namespace( );
[VB] Public ReadOnly Property Namespace As String
[JScript] public function get Namespace( ): String;
Description
    TypeFullName
    ToString
[C#] public string TypeFullName {get;}
[C++] public: _property String* get_TypeFullName( );
[VB] Public ReadOnly Property TypeFullName As String
[JScript] public function get TypeFullName( ): String;
Description
    TypeName
    ToString
[C#] public string TypeName {get;}
[C++] public: _property String* get_TypeName( );
[VB] Public ReadOnly Property TypeName As Strin
    System.Xml.XPath
    This namespace contains the XPath parser and evaluation engine.
Description
    This namespace contains the XPath parser and evaluation engine. XPathNavigable interface (System.Xml.XPath)
Description
    Provides an accessor to the System.Xml.XPath.XPathNavigator.
    Methods:
    CreateNavigator
[C#] XPathNavigator CreateNavigator( );
[C++] XPathNavigator* CreateNavigator( );
[VB] Function CreateNavigator( ) As XPathNavigator
[JScript] function CreateNavigator( ): XPathNavigator;
Description
    Creates a new System.Xml.XPath.XPathNavigator for this IXPathNavigable interface.
    Return Value: An XPathNavigator object.
    If the CreateNavigator method is called from an System.Xml.XmlNode object, the XPathNavigator is initially positioned on the node from which the method was called. If CreateNavigator is called from an System.Xml.XPath.XPathDocument object, the XPathNavigator is positioned on the root of the document.
    XmlCaseOrder enumeration (System.Xml.XPath)
    CreateNavigator
Description
    Specifies the sort order for upper and lower case letters.
    CreateNavigator
[C#] public const XmlCaseOrder LowerFirst;
[C++] public: const XmlCaseOrder LowerFirst;
[VB] Public Const LowerFirst As XmlCaseOrder
[JScript] public var LowerFirst: XmlCaseOrder;
Description
    Lower case letters are sorted before upper case letters.
    CreateNavigator
[C#] public const XmlCaseOrder None;
[C++] public: const XmlCaseOrder None;
[VB] Public Const None As XmlCaseOrder
[JScript] public var None: XmlCaseOrder;
Description
    Ignore the case.
    CreateNavigator
[C#] public const XmlCaseOrder UpperFirst;
[C++] public: const XmlCaseOrder UpperFirst;
[VB] Public Const UpperFirst As XmlCaseOrder
[JScript] public var UpperFirst: XmlCaseOrder;
Description
    Upper case letters are sorted before lower case letters.
    XmlDataType enumeration (System.Xml.XPath)
    ToString
Description
    Specifies the data type used to determine sort order.
    ToString
[C#] public const XmlDataType Number;
[C++] public: const XmlDataType Number;
[VB] Public Const Number As XmlDataType
[JScript] public var Number: XmlDataType;
Description
    Values are sorted numerically.
    ToString
[C#] public const XmlDataType Text;
[C++] public: const XmlDataType Text;
[VB] Public Const Text As XmlDataType
[JScript] public var Text: XmlDataType;

Description
   Values are sorted alphabetically.
   XmlSortOrder enumeration (System.Xml.XPath)
   ToString
Description
   Specifies the sort order.
   ToString
[C#] public const XmlSortOrder Ascending;
[C++] public: const XmlSortOrder Ascending;
[VB] Public Const Ascending As XmlSortOrder
[JScript] public var Ascending: XmlSortOrder;
Description
   Nodes are sorted in ascending order. For example, if the numbers 1,2,3,4 were being sorted in an ascending order, they would appear as 1,2,3,4.
   ToString
[C#] public const XmlSortOrder Descending;
[C++] public: const XmlSortOrder Descending;
[VB] Public Const Descending As XmlSortOrder
[JScript] public var Descending: XmlSortOrder;
Description
   Nodes are sorted in descending order. For example, if the numbers 1,2,3,4 were being sorted in an descending order, they would appear as, 4,3,2,1.
   XPathDocument class (System.Xml.XPath)
   ToString
Description
   Provides a fast and performant read-only cache for XML document processing using XSLT.
   This class is optimized for XSLT processing and the XPath data model. It does not maintain node identity nor does it do all of the rule checking required by the W3C DOM.
   Constructors:
   XPathDocument
   Example Syntax:
   ToString
[C#] public XPathDocument(Stream stream);
[C++] public: XPathDocument(Stream* stream);
[VB] Public Sub New(ByVal stream As Stream)
[JScript] public function XPathDocument(stream: Stream);
Description
   Initializes a new instance of the XPathDocument class. The stream containing the data to load.
   XPathDocument
   Example Syntax:
   ToString
[C#] public XPathDocument(string uri);
[C++] public: XPathDocument(String* uri);
[VB] Public Sub New(ByVal uri As String)
[JScript] public function XPathDocument(uri: String);
Description
   Initializes a new instance of the XPathDocument class. A URI that specifies a file containing the data to load.
   XPathDocument
   Example Syntax:
   ToString
[C#] public XPathDocument(TextReader reader);
[C++] public: XPathDocument(TextReader* reader);
[VB] Public Sub New(ByVal reader As TextReader)
[JScript] public function XPathDocument(reader: TextReader);
Description
   Initializes a new instance of the XPathDocument class. A System.IO.TextReader containing the data to load.
   XPathDocument
   Example Syntax:
   ToString
[C#] public XPathDocument(XmlReader reader);
[C++] public: XPathDocument(XmlReader* reader);
[VB] Public Sub New(ByVal reader As XmlReader)
[JScript] public function XPathDocument(reader: XmlReader);
Description
   Initializes a new instance of the XPathDocument class.
   If the XmlReader is positioned on a node, the data is loaded from the current position of the XmlReader through all its siblings. This enables you to load only a portion of a document. An System.Xml.XmlReader containing the data to load.
   XPathDocument
   Example Syntax:
   ToString
[C#] public XPathDocument(string uri, XmlSpace space);
[C++] public: XPathDocument(String* uri, XmlSpace space);
[VB] Public Sub New(ByVal uri As String, ByVal space As XmlSpace)
[JScript] public function XPathDocument(uri: String, space: XmlSpace);
Description
   Initializes a new instance of the XPathDocument class. A URI that specifies a file containing the data to load. An System.Xml.XmlSpace value indicating whether to preserve whitespace. Setting this to XmlSpace.Default preserves only significant whitespace; XmlSpace.Preserve preserves all whitespace.
   XPathDocument
   Example Syntax:
   ToString
[C#] public XPathDocument(XmlReader reader, XmlSpace space);
[C++] public: XPathDocument(XmlReader* reader, XmlSpace space);
[VB] Public Sub New(ByVal reader As XmlReader, ByVal space As XmlSpace)
[JScript] public function XPathDocument(reader: XmlReader, space: XmlSpace); Initializes a new instance of the XPathDocument class.
Description
   Initializes a new instance of the XPathDocument class.
   If the XmlReader is positioned on a node, the data is loaded from the current position of the XmlReader through all its siblings. This enables you to load only a portion of a document. An System.Xml.XmlReader containing the data to load. An System.Xml.XmlSpace value indicating whether to preserve whitespace. Setting this to XmlSpace.Default preserves only significant whitespace; XmlSpace.Preserve preserves all whitespace.
   CreateNavigator
[C#] public XPathNavigator CreateNavigator( );
[C++] public: _sealed XPathNavigator* CreateNavigator( );
[VB] NotOverridable Public Function CreateNavigator( ) As XPathNavigator
[JScript] public function CreateNavigator( ): XPathNavigator;
Description
   Creates an System.Xml.XPath.XPathNavigator for navigating this document.
   Return Value: An System.Xml.XPath.XPathNavigator object.
   The XPathNavigator is positioned at the root of the document. This method is part of the System.Xml.XPath.IXPathNavigable interface.
   XPathException class (System.Xml.XPath)
   ToString Description
  Represents the exception that is thrown when there is error processing an XPath expression.
    XPathException
    Example Syntax:
    ToString
[C#] public XPathException(string res);
[C++] public: XPathException(String* res);
[VB] Public Sub New(ByVal res As String)
[JScript] public function XPathException(res: String);
Description
  XPathException
  Example Syntax:
  ToString
[C#] public XPathException(SerializationInfo info, StreamingContext context);
[C++] public: XPathException(SerializationInfo* info, StreamingContext context);
[VB] Public Sub New(ByVal info As SerializationInfo, ByVal context As StreamingContext)
[JScript] public function XPathException(info: SerializationInfo, context: StreamingContext);
Description
  XPathException
  Example Syntax:
  ToString
[C#] public XPathException(string message, Exception innerException);
[C++] public: XPathException(String* message, Exception* innerException);
[VB] Public Sub New(ByVal message As String, ByVal innerException As Exception)
[JScript] public function XPathException(message: String, innerException: Exception);
  XPathException
  Example Syntax:
  ToString
[C#] public XPathException(string res, string arg);
[C++] public: XPathException(String* res, String* arg);
[VB] Public Sub New(ByVal res As String, ByVal arg As String)
[JScript] public function XPathException(res: String, arg: String);
Description
  XPathException
  Example Syntax:
  ToString
[C#] public XPathException(string res, string[ ] args);
[C++] public: XPathException(String* res, String* args _ gc[ ]);
[VB] Public Sub New(ByVal res As String, ByVal args( ) As String)
[JScript] public function XPathException(res: String, args: String[ ]);
Description
  XPathException
  Example Syntax:
  ToString
[C#] public XPathException(string res, string arg1, string arg2);
[C++] public: XPathException(String* res, String* arg1, String* arg2);
[VB] Public Sub New(ByVal res As String, ByVal arg1 As String, ByVal arg2 As String)
[JScript] public function XPathException(res: String, arg1: String, arg2: String);

Description
  Properties:
  HelpLink
  HResult
  InnerException
  Message
  ToString
Description
  Source
  StackTrace
  TargetSite
  GetObjectData
[C#] public override void GetObjectData(SerializationInfo info, StreamingContext context);
[C++] public: void GetObjectData(SerializationInfo* info, StreamingContext context);
[VB] Overrides Public Sub GetObjectData(ByVal info As SerializationInfo, ByVal context As StreamingContext)
[JScript] public override function GetObjectData(info: SerializationInfo, context: StreamingContext);
Description
  XPathExpression class (System.Xml.XPath)
  ToString
Description
  Encapsulates a compiled XPath expression. This class is returned as a result of a call to System.Xml.XPath.XPathNavigator.Compile(System.String) and is used by the System.Xml.XPath.XPathNavigator.Select(System.Xml.XPath.XPathExpression), System.Xml.XPath.XPathNavigator.Evaluate(System.Xml.XPath.XPathExpression) and System.Xml.XPath.XPathNavigator.Matches(System.Xml.XPath.XPathExpression) methods.
  Expression
  ToString
[C#] public abstract string Expression {get;}
[C++] public: _property virtual String* get_Expression( )=0;
[VB] MustOverride Public ReadOnly Property Expression As String
[JScript] public abstract function get Expression( ): String;
Description
  When overridden in a derived class, gets a string representation of the XPathExpression.
Description
  Gets a string representation of the XPathExpression.
  This could be used for diagnostic purposes or as input to another expression.
  ReturnType
  ToString
[C#] public abstract XPathResultType ReturnType {get;}
[C++] public: _property virtual XPathResultType get_ReturnType( )=0;
[VB] MustOverride Public ReadOnly Property ReturnType As XPathResultType
[JScript] public abstract function get ReturnType( ): XPathResultType;
Description
  Gets the result type of the XPathExpression as defined by the W3C XPath specification.
  AddSort
[C#] public abstract void AddSort(object expr, IComparer comparer);
[C++] public: virtual void AddSort(Object* expr, IComparer* comparer)=0;
[VB] MustOverride Public Sub AddSort(ByVal expr As Object, ByVal comparer As IComparer)

[JScript] public abstract function AddSort(expr: Object, comparer: IComparer); Sorts the nodes selected by the XPathExpression.
Description
Sorts the nodes selected by the XPathExpression, according to the System.Collections.IComparer interface.
This method enables users to sort objects by their data type rather than by string or number. The IComparer interface provides an implementation of the System.Collections.IComparer.Compare(System.Object,System.Object) method that supports sorting on user defined classes. An expression representing the sort key. This can be a string or an XPathExpression object. The result of this expression is converted to a string, according to the XPath specification, for comparison. In an XSLT stylesheet, if xsl:sort is used, but no select expression is specified, then string(.) is used by default. A class derived from the IComparer interface to use for the data type comparison.
AddSort
[C#] public abstract void AddSort(object expr, XmlSortOrder order, XmlCaseOrder caseOrder, string lang, XmlDataType dataType);
[C++] public: virtual void AddSort(Object* expr, XmlSortOrder order, XmlCaseOrder caseOrder, String* lang, XmlDataType dataType)=0;
[VB] MustOverride Public Sub AddSort(ByVal expr As Object, ByVal order As XmlSortOrder, ByVal caseOrder As XmlCaseOrder, ByVal lang As String, ByVal dataType As XmlDataType)
[JScript] public abstract function AddSort(expr: Object, order: XmlSortOrder, caseOrder: XmlCaseOrder, lang: String, dataType: XmlDataType);
Description
Sorts the nodes selected by the XPathExpression according to the supplied parameters.
The order in which the sorts are added provides the sort key order. An expression representing the sort key. This can be a string or an XPathExpression object. The result of this expression is converted to a string, according to the XPath specification, for comparison. In an XSLT stylesheet, if xsl:sort is used, but no select expression is specified, then string(.) is used by default. A System.Xml.XPath.XmlSortOrder value indicating the sort order. A System.Xml.XPath.XmlCaseOrder value indicating how to sort upper/lower case letters. This is language dependent, providing a lang parameter is supplied. The language to use for comparison. Uses the System.Globalization.CultureInfo class that can be passed to the String.Compare method for the language types, for example, "us-en" for US English. If an empty string is specified, the system environment is used to determine the CultureInfo. System.Xml.XPath.XmlDataType indicating sort order for data type.
Clone
[C#] public abstract XPathExpression Clone( );
[C++] public: virtual XPathExpression* Clone( )=0;
[VB] MustOverride Public Function Clone( ) As XPathExpression
[JScript] public abstract function Clone( ): XPathExpression;
Description
Clones the XPathExpression.
Return Value: A new XPathExpression object.
SetContext
[C#] public abstract void SetContext(XmlNamespaceManager nsManager);
[C++] public: virtual void SetContext(XmlNamespaceManager* nsManager)=0;
[VB] MustOverride Public Sub SetContext(ByVal nsManager As XmlNamespaceManager)
[JScript] public abstract function SetContext(nsManager: XmlNamespaceManager);
Description
Specifies the System.Xml.XmlNamespaceManager to use for resolving namespaces.
Namespace resolution is supported using the System.Xml.XmlNamespaceManager which stores prefix and namespace URI mappings. If the XPathExpression requires namespace resolution, the prefix and namespace URI pair must be added to the XmlNamespaceManager, and the SetContext method must be called to specify the XmlNamespaceManager to use for namespace resolution. The XmlNamespaceManager object used for resolving namespaces.
XPathNavigator class (System.Xml.XPath)
ToString
Description
Reads data from any data store using a cursor model.
XPathNavigator is based on the XPath data model and provides the methods required to implement XPath queries over any data store. To implement an XPathNavigator over an XML document or a System.Data.DataSet (via the System.Xml.XmlDataDocument class), use the CreateNavigator method available in the System.Xml.XmlNode and System.Xml.XPath.XPathDocument classes, or in the System.Xml.XPath.IXPathNavigable interface. Additionally, you can create your own implementation of XPathNavigator over other data stores such as file systems or databases.
XPathNavigator
Example Syntax:
ToString
[C#] protected XPathNavigator( );
[C++] protected: XPathNavigator( );
[VB] Protected Sub New( )
[JScript] protected function XPathNavigator( );
BaseURI
ToString
[C#] public abstract string BaseURI {get;}
[C++] public: _property virtual String* get_BaseURI( )=0;
[VB] MustOverride Public ReadOnly Property BaseURI As String
[JScript] public abstract function get BaseURI( ): String;
Description
When overridden in a derived class, gets the base URI for the current node.
A networked XML document is comprised of chunks of data, aggregated using various W3C standard inclusion mechanisms, and therefore contains nodes that come from different places. DTD entities are an example of this, however, this is not limited to DTDs. The BaseURI property tells you where these nodes originate from.
HasAttributes
ToString
[C#] public abstract bool HasAttributes {get;}
[C++] public: _property virtual bool get_HasAttributes( )=0;
[VB] MustOverride Public ReadOnly Property HasAttributes As Boolean
[JScript] public abstract function get HasAttributes( ): Boolean;
Description
When overridden in a derived class, gets a value indicating whether the element node has any attributes.
The XPathNavigator should be positioned on an element node before calling this method.
HasChildren
ToString

[C#] public abstract bool HasChildren {get;}
[C++] public: _property virtual bool get_HasChildren( )=0;
[VB] MustOverride Public ReadOnly Property HasChildren As Boolean
[JScript] public abstract function get HasChildren( ): Boolean;
Description
When overridden in a derived class, gets a value indicating whether the current node has child nodes.
The following table lists the System.Xml.XPath.XPathNodeType and what type of child nodes they may have, if any.
　IsEmptyElement
　ToString
[C#] public abstract bool IsEmptyElement {get;}
[C++] public: _property virtual bool get_IsEmptyElement( )=0;
[VB] MustOverride Public ReadOnly Property IsEmptyElement As Boolean
[JScript] public abstract function get IsEmptyElement( ): Boolean;
Description
When overridden in a derived class, gets a value indicating whether the current node is an empty element (for example,).
This property enables you to determine the difference between the following: (IsEmptyElement is true).
　LocalName
　ToString
[C#] public abstract string LocalName {get;}
[C++] public: _property virtual String* get_LocalName( )=0;
[VB] MustOverride Public ReadOnly Property LocalName As String
[JScript] public abstract function get LocalName( ): String;
Description
When overridden in a derived class, gets the name of the current node without the namespace prefix.
　Name
　ToString
[C#] public abstract string Name {get;}
[C++] public: _property virtual String* get_Name( )=0;
[VB] MustOverride Public ReadOnly Property Name As String
[JScript] public abstract function get Name( ): String;
Description
When overridden in a derived class, gets the qualified name of the current node.
　NamespaceURI
　ToString
[C#] public abstract string NamespaceURI {get;}
[C++] public: _property virtual String* get_NamespaceURI( )=0;
[VB] MustOverride Public ReadOnly Property NamespaceURI As String
[JScript] public abstract function get NamespaceURI( ): String;
Description
When overridden in a derived class, gets the namespace URI (as defined in the W3C Namespace Specification) of the current node.
Only element and attribute nodes can have a namespace URI.
　NameTable
　ToString
[C#] public abstract XmlNameTable NameTable {get;}
[C++] public: _property virtual XmlNameTable* get_NameTable( )=0;
[VB] MustOverride Public ReadOnly Property NameTable As XmlNameTable
[JScript] public abstract function get NameTable( ): XmlNameTable;
Description
When overridden in a derived class, gets the System.Xml.XmlNameTable associated with this implementation.
The XmlNameTable stores atomized strings of any System.Xml.XPath.XPathNavigator.LocalName, System.Xml.XPath.XPathNavigator.NamespaceURI, and System.Xml.XPath.XPathNavigator.Prefix used by XPathNavigator. This means that when the same name is returned multiple times (like "book") then the same String object is returned for that name. This makes it possible to write efficient code that does object comparisons on these strings instead of expensive string comparisons.
　NodeType
　ToString
[C#] public abstract XPathNodeType NodeType {get;}
[C++] public: _property virtual XPathNodeType get_NodeType( )=0;
[VB] MustOverride Public ReadOnly Property NodeType As XPathNodeType
[JScript] public abstract function get NodeType( ): XPathNodeType;
Description
When overridden in a derived class, gets the type of the current node.
　Prefix
　ToString
[C#] public abstract string Prefix {get;}
[C++] public: _property virtual String* get_Prefix( )=0;
[VB] MustOverride Public ReadOnly Property Prefix As String
[JScript] public abstract function get Prefix( ): String;
Description
When overridden in a derived class, gets the atomized string of the prefix associated with the current node.
　Value
　ToString
[C#] public abstract string Value {get;}
[C++] public: _property virtual String* get_Value( )=0;
[VB] MustOverride Public ReadOnly Property Value As String
[JScript] public abstract function get Value( ): String;
Description
When overridden in a derived class, gets the text value of the current node.
　XmlLang
　ToString
[C#] public abstract string XmlLang {get;}
[C++] public: _property virtual String* get_XmlLang( )=0;
[VB] MustOverride Public ReadOnly Property XmlLang As String
[JScript] public abstract function get XmlLang( ): String;
Description
When overridden in a derived class, gets the xml:lang scope for the current node.
Using the XML text below, if the navigator were positioned on the name element, the user can call this property to find out that the element is in the scope of a US English xml:lang attribute.
　Clone
[C#] public abstract XPathNavigator Clone( );
[C++] public: virtual XPathNavigator* Clone( )=0;
[VB] MustOverride Public Function Clone( ) As XPathNavigator

[JScript] public abstract function Clone( ): XPathNavigator;
Description

When overridden in a derived class, creates a new XPathNavigator positioned at the same node as this XPathNavigator.
Return Value: A new XPathNavigator object.

The cloned XPathNavigator is not affected by subsequent changes to the current XPathNavigator.

ComparePosition

[C#] public virtual XmlNodeOrder ComparePosition(XPathNavigator nav);
[C++] public: virtual XmlNodeOrder ComparePosition(XPathNavigator* nav);
[VB] Overridable Public Function ComparePosition(ByVal nav As XPathNavigator) As XmlNodeOrder
[JScript] public function ComparePosition(nav: XPathNavigator): XmlNodeOrder;
Description Compares the position of the current navigator with the position of the specified XPathNavigator.
Return Value: An System.Xml.XmlNodeOrder value representing the comparative position of the two navigators. The following table describes the XmlNodeOrder enumeration.

The method behavior is dependent on the node type the XPathNavigator is currently positioned on. When comparing nodes in the XML document, the following rules apply: Element nodes—These nodes are returned in document order from the source document. The XPathNavigator to compare against.

Compile

[C#] public virtual XPathExpression Compile(string xpath);
[C++] public: virtual XPathExpression* Compile(String* xpath);
[VB] Overridable Public Function Compile(ByVal xpath As String) As XPathExpression
[JScript] public function Compile(xpath: String): XPathExpression;
Description Compiles a string representing an XPath expression and returns an System.Xml.XPath.XPathExpression.
Return Value: An XPathExpression object representing the XPath expression.

An XPath expression is evaluated to yield one of the following return types: Node-set—an unordered collection of nodes without duplicates Boolean—true or false Number—a floating-point number String—a sequence of UCS characters Expressions that return a node-set can be used in the System.Xml.XPath.XPathNavigator.Select(System.Xml.XPath.XPathExpression) method. Expressions that return a boolean, number, or string can be used in the System.Xml.XPath.XPathNavigator.Evaluate(System.Xml.XPath.XPathExpression) method. The rules on valid expressions for the System.Xml.XPath.XPathNavigator.Matches(System.Xml.XPath.XPathExpression) method are specific to that method. A string representing an XPath expression.

Evaluate

[C#] public virtual object Evaluate(string xpath);
[C++] public: virtual Object* Evaluate(String* xpath);
[VB] Overridable Public Function Evaluate(ByVal xpath As String) As Object
[JScript] public function Evaluate(xpath: String): Object;
Description Evaluates the string representing an XPath expression and returns the typed result (int, boolean or string).
Return Value: The result of the expression.

The following C# code converts the Price/text( ) node to a number, multiplies it by 10, and returns the resulting value. A string representing an XPath expression that can be evaluated.

Evaluate

[C#] public virtual object Evaluate(XPathExpression expr);
[C++] public: virtual Object* Evaluate(XPathExpression* expr);
[VB] Overridable Public Function Evaluate(ByVal expr As XPathExpression) As Object
[JScript] public function Evaluate(expr: XPathExpression): Object; Evaluates the given expression and returns the typed result.
Description Evaluates the System.Xml.XPath.XPathExpression and returns the typed result (int, boolean or string).
Return Value: The result of the expression.

The following C# code returns a number after converting the Price/text( ) node to a number and multiplying the value by 10. An XPathExpression that can be evaluated.

Evaluate

[C#] public virtual object Evaluate(XPathExpression expr, XPathNodeIterator context);
[C++] public: virtual Object* Evaluate(XPathExpression* expr, XPathNodeIterator* context);
[VB] Overridable Public Function Evaluate(ByVal expr As XPathExpression, ByVal context As XPathNodeIterator) As Object
[JScript] public function Evaluate(expr: XPathExpression, context: XPathNodeIterator): Object;
Description Evaluates the System.Xml.XPath.XPathExpression using the supplied context and returns the typed result (int, boolean or string).
Return Value: The result of the expression.

The expression is evaluated using the System.Xml.XPath.XPathNodeIterator.Current node of the XPathNodeIterator as the context node. If context is null, the node on which the XPathNavigator is currently positioned is used as the context node. An XPathExpression that can be evaluated. An System.Xml.XPath.XPathNodeIterator pointing to the selected node set that the evaluation should be performed on.

GetAttribute

[C#] public abstract string GetAttribute(string localName, string namespaceURI);
[C++] public: virtual String* GetAttribute(String* localName, String* namespaceURI)=0;
[VB] MustOverride Public Function GetAttribute(ByVal localName As String, ByVal namespaceURI As String) As String
[JScript] public abstract function GetAttribute(localName: String, namespaceURI: String): String;
Description When overridden in a derived class, gets the value of the attribute with the specified System.Xml.XPath.XPathNavigator.LocalName and System.Xml.XPath.XPathNavigator.NamespaceURI.
Return Value: The value of the specified attribute or String.Empty if a matching attribute is not found.

The XPathNavigator should be positioned on an element node before calling this method. The local name of the attribute. The namespace URI of the attribute.

GetNamespace

[C#] public abstract string GetNamespace(string name);
[C++] public: virtual String* GetNamespace(String* name)=0;
[VB] MustOverride Public Function GetNamespace(ByVal name As String) As String

[JScript] public abstract function GetNamespace(name: String): String;
Description
When overridden in a derived class, returns the value of the namespace node corresponding to the specified local name. Return Value: The value of the namespace node or String.Empty if a matching node is not found.
For a definition of namespace nodes, see section 5.4 of the W3C XML Path Language (XPath) recommendation which may be located on the World Wide Web (www.) at w3.org/TR/xpath#data-model. The local name of the namespace node.
IsDescendant
[C#] public virtual bool IsDescendant(XPathNavigator nav);
[C++] public: virtual bool IsDescendant(XPathNavigator* nav);
[VB] Overridable Public Function IsDescendant(ByVal nav As XPathNavigator) As Boolean
[JScript] public function IsDescendant(nav: XPathNavigator): Boolean;
Description
Determines whether the specified XPathNavigator is a descendant of the current XPathNavigator.
Return Value: true if nav is a descendant of the current navigator; otherwise false.
A navigator is a descendant of another navigator if it is positioned on a descendant node of the current navigator. For example, using the following XML string: widget If the current navigator is positioned on the item node and nav is positioned on the name node, IsDescendant returns true. The XPathNavigator that you want to compare against.
IsSamePosition
[C#] public abstract bool IsSamePosition(XPathNavigator other);
[C++] public: virtual bool IsSamePosition(XPathNavigator* other)=0;
[VB] MustOverride Public Function IsSamePosition(ByVal other As XPathNavigator) As Boolean
[JScript] public abstract function IsSamePosition(other: XPathNavigator): Boolean;
Description
When overridden in a derived class, determines whether the current XPathNavigator is at the same position as the specified XPathNavigator.
Return Value: true if other and this navigator have the same position; otherwise, false.
This method assumes that other is an XPathNavigator that shares the same implementation and is pointing at the same document instance as the current navigator. The XPathNavigator that you want to compare against.
Matches
[C#] public virtual bool Matches(string xpath);
[C++] public: virtual bool Matches(String* xpath);
[VB] Overridable Public Function Matches(ByVal xpath As String) As Boolean
[JScript] public function Matches(xpath: String): Boolean;
Description
Determines whether the current node matches the specified XPath expression.
Return Value: true if the current node matches the XPath expression; otherwise, false.
This method has no effect on the state of the XPathNavigator. An XPath expression.
Matches
[C#] public virtual bool Matches(XPathExpression expr);
[C++] public: virtual bool Matches(XPathExpression* expr);
[VB] Overridable Public Function Matches(ByVal expr As XPathExpression) As Boolean
[JScript] public function Matches(expr: XPathExpression): Boolean; Determines whether the current node matches the specified expression.
Description
Determines whether the current node matches the specified System.Xml.XPath.XPathExpression.
Return Value: true if the current node matches the XPathExpression; otherwise, false.
This method has no effect on the state of the XPathNavigator. An XPathExpression.
MoveTo
[C#] public abstract bool MoveTo(XPathNavigator other);
[C++] public: virtual bool MoveTo(XPathNavigator* other)=0;
[VB] MustOverride Public Function MoveTo(ByVal other As XPathNavigator) As Boolean
[JScript] public abstract function MoveTo(other: XPathNavigator): Boolean;
Description
When overridden in a derived class, moves to the same position as the specified XPathNavigator.
Return Value: true if successful; otherwise false. If false, the current navigator is returned to its position before the call.
This method always returns true if other is an XPathNavigator that shares the same implementation and is pointing at the same document instance as the current navigator. The XPathNavigator positioned on the node that you want to move to.
MoveToAttribute
[C#] public abstract bool MoveToAttribute(string localName, string namespaceURI);
[C++] public: virtual bool MoveToAttribute(String* localName, String* namespaceURI)=0;
[VB] MustOverride Public Function MoveToAttribute(ByVal localName As String, ByVal namespaceURI As String) As Boolean
[JScript] public abstract function MoveToAttribute(localName: String, namespaceURI: String): Boolean;
Description
When overridden in a derived class, moves to the attribute with matching System.Xml.XPath.XPathNavigator. LocalName and System.Xml.XPath.XPathNavigator. NamespaceURI.
Return Value: true if the attribute is found; otherwise, false. If false, the position of the navigator does not change.
The navigator should be positioned on an element when calling this method. The local name of the attribute. The namespace URI of the attribute.
MoveToFirst
[C#] public abstract bool MoveToFirst( );
[C++] public: virtual bool MoveToFirst( )=0;
[VB] MustOverride Public Function MoveToFirst( ) As Boolean
[JScript] public abstract function MoveToFirst( ): Boolean;
Description
When overridden in a derived class, moves to the first sibling of the current node.
Return Value: true if there is a first sibling node; false if there is no first sibling or if the navigator is currently positioned on an attribute node.
MoveToFirstAttribute
[C#] public abstract bool MoveToFirstAttribute( );
[C++] public: virtual bool MoveToFirstAttribute( )=0;
[VB] MustOverride Public Function MoveToFirstAttribute( ) As Boolean

[JScript] public abstract function MoveToFirstAttribute( ): Boolean;
Description
When overridden in a derived class, moves to the first attribute.
Return Value: true if there is an attribute for the XPathNavigator to move to; otherwise, false.
The navigator should be positioned on an element when calling this method; otherwise, this method returns false and the position of the navigator does not change.
MoveToFirstChild
[C#] public abstract bool MoveToFirstChild( );
[C++] public: virtual bool MoveToFirstChild( )=0;
[VB] MustOverride Public Function MoveToFirstChild( ) As Boolean
[JScript] public abstract function MoveToFirstChild( ): Boolean;
Description
When overridden in a derived class, moves to the first child of the current node.
Return Value: true if there is a first child node; otherwise false.
Root and Element are the only two XPath node types that can have children. This property always returns false for all other node types.
MoveToFirstNamespace
[C#] public abstract bool MoveToFirstNamespace( );
[C++] public: virtual bool MoveToFirstNamespace( )=0;
[VB] MustOverride Public Function MoveToFirstNamespace( ) As Boolean
[JScript] public abstract function MoveToFirstNamespace( ): Boolean;
Description
When overridden in a derived class, moves the XPathNavigator to first namespace node of the current element.
Return Value: true if there is a first namespace node; otherwise false.
The navigator should be positioned on an element node when calling this method. After the navigator has been moved to the namespace node the System.Xml.XPath.XPathNavigator.Name property reflects the name of the namespace.
MoveToId
[C#] public abstract bool MoveToId(string id);
[C++] public: virtual bool MoveToId(String* id)=0;
[VB] MustOverride Public Function MoveToId(ByVal id As String) As Boolean
[JScript] public abstract function MoveToId(id: String): Boolean;
Description
When overridden in a derived class, moves to the node that has an attribute of type ID whose value matches the specified string.
Return Value: true if the move was successful; otherwise false. If false, the navigator is returned to its position before the call.
This method can be used to identify nodes by unique ID provided the source document explicitly declares attributes of type ID using a DTD. The ID value of the node to which you want to move. This argument does not need to be atomized.
MoveToNamespace
[C#] public abstract bool MoveToNamespace(string name);
[C++] public: virtual bool MoveToNamespace(String* name)=0;
[VB] MustOverride Public Function MoveToNamespace (ByVal name As String) As Boolean
[JScript] public abstract function MoveToNamespace(name: String): Boolean;
Description
When overridden in a derived class, moves the XPathNavigator to the namespace node with the specified local name.
Return Value: true if the move was successful; false if a matching namespace node was not found or if the navigator is not positioned on an element node.
The navigator should be positioned on an element node when calling this method. After the navigator has been moved to the namespace node the System.Xml.XPath.XPathNavigator.Name property reflects the name of the namespace. The local name of the namespace node.
MoveToNext
[C#] public abstract bool MoveToNext( );
[C++] public: virtual bool MoveToNext( )=0;
[VB] MustOverride Public Function MoveToNext( ) As Boolean
[JScript] public abstract function MoveToNext( ): Boolean;
Description
When overridden in a derived class, moves to the next sibling of the current node.
Return Value: true if there is a next sibling node; false if there are no more siblings or if the navigator is currently positioned on an attribute node.
MoveToNextAttribute
[C#] public abstract bool MoveToNextAttribute( );
[C++] public: virtual bool MoveToNextAttribute( )=0;
[VB] MustOverride Public Function MoveToNext Attribute( ) As Boolean
[JScript] public abstract function MoveToNextAttribute( ): Boolean;
Description
When overridden in a derived class, moves to the next attribute.
Return Value: true if there is a next attribute; false if there are no more attributes.
The navigator should be positioned on an element when calling this method; otherwise, this method returns false and the position of the navigator does not change.
MoveToNextNamespace
[C#] public abstract bool MoveToNextNamespace( );
[C++] public: virtual bool MoveToNextNamespace( )=0;
[VB] MustOverride Public Function MoveToNextNamespace( ) As Boolean
[JScript] public abstract function MoveToNextNamespace( ): Boolean;
Description
When overridden in a derived class, moves the XPathNavigator to the next namespace node.
Return Value: true if there is a next namespace node; otherwise false.
The navigator should be positioned on a namespace node when calling this method.
MoveToParent
[C#] public abstract bool MoveToParent( );
[C++] public: virtual bool MoveToParent( )=0;
[VB] MustOverride Public Function MoveToParent( ) As Boolean
[JScript] public abstract function MoveToParent( ): Boolean;
Description
When overridden in a derived class, moves to the parent of the current node.
Return Value: true if there is a parent node; otherwise false.
The following table lists the System.Xml.XPath.XPathNodeType and what type of parent node they may have, if any.
MoveToPrevious
[C#] public abstract bool MoveToPrevious( );
[C++] public: virtual bool MoveToPrevious( )=0;

[VB] MustOverride Public Function MoveToPrevious( ) As Boolean
[JScript] public abstract function MoveToPrevious( ): Boolean;
Description
When overridden in a derived class, moves to the previous sibling of the current node.
Return Value: true if there is a previous sibling node; false if there is no previous sibling or if the navigator is currently positioned on an attribute node.
MoveToRoot
[C#] public abstract void MoveToRoot( );
[C++] public: virtual void MoveToRoot( )=0;
[VB] MustOverride Public Sub MoveToRoot( )
[JScript] public abstract function MoveToRoot( );
Description
When overridden in a derived class, moves to the root node to which the current node belongs.
All nodes belong to one and only one document. Therefore, this method is always successful. For a definition of a root node, see section 5.1 of the W3C XML Path Language (XPath) recommendation which may be located on the World Wide Web (www.) at w3.org/TR/xpath#data-model.
Select
[C#] public virtual XPathNodeIterator Select(string xpath);
[C++] public: virtual XPathNodeIterator* Select(String* xpath);
[VB] Overridable Public Function Select(ByVal xpath As String) As IXPathNodeIterator
[JScript] public function Select(xpath: String): XPathNodeIterator;
Description
Selects a node set using the specified XPath expression.
Return Value: An System.Xml.XPath.XPathNodeIterator pointing to the selected node set.
The context for the selection is the position of the navigator when you called this method. After calling this method, the XPathNodeIterator returned represents the set of selected nodes. Use System.Xml.XPath.XPathNodeIterator.MoveNext on the XPathNodeIterator to walk the selected node set. Use any of the Move methods on the XPathNavigator to move within the current node tree. The XPathNavigator navigation methods are independent of the selected nodes and the XPathNodeIterator. A string representing an XPath expression.
Select
[C#] public virtual XPathNodeIterator Select(XPathExpression expr);
[C++] public: virtual XPathNodeIterator* Select(XPathExpression* expr);
[VB] Overridable Public Function Select(ByVal expr As XPathExpression) As XPathNodeIterator
[JScript] public function Select(expr: XPathExpression): XPathNodeIterator; Selects a node set using the specified XPath expression.
Description
Selects a node set using the specified System.Xml.XPath.XPathExpression.
Return Value: An System.Xml.XPath.XPathNodeIterator pointing to the selected node set.
The context for the selection is the position of the navigator when you called this method. After calling this method, the XPathNodeIterator returned represents the set of selected nodes. Use System.Xml.XPath.XPathNodeIterator.MoveNext on the XPathNodeIterator to walk the selected node set. Use any of the Move methods on the XPathNavigator to move within the current node tree. The XPathNavigator navigation methods are independent of the selected nodes and the XPathNodeIterator. An XPathExpression.
SelectAncestors
[C#] public virtual XPathNodeIterator SelectAncestors(XPathNodeType type, bool matchSelf);
[C++] public: virtual XPathNodeIterator* SelectAncestors(XPathNodeType type, bool matchSelf);
[VB] Overridable Public Function SelectAncestors(ByVal type As XPathNodeType, ByVal matchSelf As Boolean) As XPathNodeIterator
[JScript] public function SelectAncestors(type: XPathNodeType, matchSelf: Boolean): XPathNodeIterator; Selects all the ancestor element nodes of the current node matching the selection criteria.
Description
Selects all the ancestor element nodes of the current node with the matching System.Xml.XPath.XPathNodeType.
Return Value: An System.Xml.XPath.XPathNodeIterator pointing to the selected nodes.
This method has no effect on the state of the XPathNavigator. The XPathNodeType of the ancestor nodes. true to include the context node in the selection; otherwise false.
SelectAncestors
[C#] public virtual XPathNodeIterator SelectAncestors (string name, string namespaceURI, bool matchSelf);
[C++] public: virtual XPathNodeIterator* SelectAncestors (String* name, String* namespaceURI, bool matchSelf);
[VB] Overridable Public Function SelectAncestors(ByVal name As String, ByVal namespaceURI As String, ByVal matchSelf As Boolean) As XPathNodeIterator
[JScript] public function SelectAncestors(name: String, namespaceURI: String, matchSelf: Boolean): XPathNodeIterator;
Description
Selects all the ancestor element nodes of the current node with the supplied local name and namespace URI.
Return Value: An System.Xml.XPath.XPathNodeIterator pointing to the selected nodes.
This method has no effect on the state of the XPathNavigator. The local name of the ancestor nodes. The namespace URI of the ancestor nodes. true to include the context node in the selection; otherwise false.
SelectChildren
[C#] public virtual XPathNodeIterator SelectChildren (XPathNodeType type);
[C++] public: virtual XPathNodeIterator* SelectChildren(XPathNodeType type);
[VB] Overridable Public Function SelectChildren(ByVal type As XPathNodeType) As XPathNodeIterator
[JScript] public function SelectChildren(type: XPathNodeType): XPathNodeIterator; Selects all the child nodes of the current node matching the selection criteria.
Description
Selects all the child nodes of the current node with the matching System.Xml.XPath.XPathNodeType.
Return Value: An System.Xml.XPath.XPathNodeIterator pointing to the selected nodes.
This method has no effect on the state of the XPathNavigator. The XPathNodeType of the child nodes.
SelectChildren
[C#] public virtual XPathNodeIterator SelectChildren(string name, string namespaceURI);
[C++] public: virtual XPathNodeIterator* SelectChildren (String* name, String* namespaceURI);
[VB] Overridable Public Function SelectChildren(ByVal name As String, ByVal namespaceURI As String) As XPathNodeIterator

[JScript] public function SelectChildren(name: String, namespaceURI: String): XPathNodeIterator;
Description
Selects all the child element nodes of the current node with the supplied local name and namespace URI.
Return Value: An System.Xml.XPath.XPathNodeIterator pointing to the selected nodes.
This method has no effect on the state of the XPathNavigator. The local name of the child nodes. The namespace URI of the child nodes.
SelectDescendants
[C#] public virtual XPathNodeIterator SelectDescendants (XPathNodeType type, bool matchSelf);
[C++] public: virtual XPathNodeIterator* SelectDescendants(XPathNodeType type, bool matchSelf);
[VB] Overridable Public Function SelectDescendants(ByVal type As XPathNodeType, ByVal matchSelf As Boolean) As XPathNodeIterator
[JScript] public function SelectDescendants(type: XPathNodeType, matchSelf: Boolean): XPathNodeIterator; Selects all the descendant nodes of the current node matching the selection criteria.
Description
Selects all the descendant nodes of the current node with the matching System.Xml.XPath.XPathNodeType.
Return Value: An System.Xml.XPath.XPathNodeIterator pointing to the selected nodes.
This method has no effect on the state of the XPathNavigator. The XPathNodeType of the descendant nodes. true to include the context node in the selection; otherwise false.
SelectDescendants
[C#] public virtual XPathNodeIterator SelectDescendants (string name, string namespaceURI, bool matchSelf);
[C++] public: virtual XPathNodeIterator* SelectDescendants(String* name, String* namespaceURI, bool matchSelf);
[VB] Overridable Public Function SelectDescendants(ByVal name As String, ByVal namespaceURI As String, ByVal matchSelf As Boolean) As XPathNodeIterator
[JScript] public function SelectDescendants(name: String, namespaceURI: String, matchSelf: Boolean): XPathNodeIterator;
Description
Selects all the descendant element nodes of the current node with the supplied local name and namespace URI.
Return Value: An System.Xml.XPath.XPathNodeIterator pointing to the selected nodes.
This method has no effect on the state of the XPathNavigator. The local name of the descendant nodes. The namespace URI of the descendant nodes. true to include the context node in the selection; otherwise false.
ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
ToString
[C#] public override string ToString( );
[C++] public: String* ToString( );
[VB] Overrides Public Function ToString( ) As String
[JScript] public override function ToString( ): String;
Description
Gets the text value of the current node. This method is equivalent to returning the System.Xml.XPath.XPathNavigator.Value property.

Return Value: The content returned depends on the System.Xml.XPath.XPathNavigator.NodeType of the node.
XPathNodeIterator class (System.Xml.XPath)
ToString
Description
Provides an iterator over a set of selected nodes.
XPathNodeIterator
Example Syntax:
ToString
[C#] protected XPathNodeIterator( );
[C++] protected: XPathNodeIterator( );
[VB] Protected Sub New( )
[JScript] protected function XPathNodeIterator( );
Count
ToString
[C#] public virtual int Count {get;}
[C++] public: _property virtual int get_Count( );
[VB] Overridable Public ReadOnly Property Count As Integer
[JScript] public function get Count( ): int;
Description
Gets the index of the last node in the selected set of nodes.
The Count property can be used to check whether nodes have been selected. The following C# code shows an example of this.
Current
ToString
[C#] public abstract XPathNavigator Current {get;}
[C++] public: _property virtual XPathNavigator* get_Current( )=0;
[VB] MustOverride Public ReadOnly Property Current As XPathNavigator
[JScript] public abstract function get Current( ): XPathNavigator;
Description
When overridden in a derived class, returns the navigator for this XPathNodeIterator positioned on the current node.
You can use the properties of the XPathNavigator to return information on the current node. However, the XPathNavigator cannot be used to move away from the selected node set. Doing so could invalidate the state of the navigator. Alternatively, you can clone the XPathNavigator. The cloned XPathNavigator can then be moved away from the selected node set. This is an application level decision. Providing this functionality may affect the performance of the XPath query.
CurrentPosition
ToString
[C#] public abstract int CurrentPosition {get;}
[C++] public: _property virtual int get_CurrentPosition( )=0;
[VB] MustOverride Public ReadOnly Property CurrentPosition As Integer
[JScript] public abstract function get CurrentPosition( ): int;
Description
When overridden in a derived class, gets the index of the current position in the selected set of nodes.
Clone
[C#] public abstract XPathNodeIterator Clone( );
[C++] public: virtual XPathNodeIterator* Clone( )=0;
[VB] MustOverride Public Function Clone( ) As XPathNodeIterator
[JScript] public abstract function Clone( ): XPathNodeIterator;
Description
When overridden in a derived class, creates a new XPathNodeIterator.
Return Value: A new XPathNodeIterator object.

The cloned XPathNodeIterator is not affected by subsequent changes to the current XPathNodeIterator.
  MoveNext
[C#] public abstract bool MoveNext( );
[C++] public: virtual bool MoveNext( )=0;
[VB] MustOverride Public Function MoveNext( ) As Boolean
[JScript] public abstract function MoveNext( ): Boolean;
Description
  When overridden in a derived class, moves the System.Xml.XPath.XPathNavigator to the next node in the selected set.
Return Value: true if the XPathNavigator moved to the next node; false if there are no more selected nodes.
  The node set is created in document order, therefore calling this method moves to the next node in document order. The XPathNodeIterator is positioned on the first node in the selected set after the initial call to MoveNext. This makes it easy to write a while loop.
  ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
  XPathNodeType enumeration (System.Xml.XPath)
  ToString
Description
  Specifies the XPath node types which can be returned from the System.Xml.XPath.XPathNavigator.
  ToString
[C#] public const XPathNodeType All;
[C++] public: const XPathNodeType All;
[VB] Public Const All As XPathNodeType
[JScript] public var All: XPathNodeType;
Description
  All node types.
  ToString
[C#] public const XPathNodeType Attribute;
[C++] public: const XPathNodeType Attribute;
[VB] Public Const Attribute As XPathNodeType
[JScript] public var Attribute: XPathNodeType;
Description
  An attribute in the node tree.
  ToString
[C#] public const XPathNodeType Comment;
[C++] public: const XPathNodeType Comment;
[VB] Public Const Comment As XPathNodeType
[JScript] public var Comment: XPathNodeType;
Description
  A comment.
  ToString
[C#] public const XPathNodeType Element;
[C++] public: const XPathNodeType Element;
[VB] Public Const Element As XPathNodeType
[JScript] public var Element: XPathNodeType;
Description
  An element in the node tree.
  ToString
[C#] public const XPathNodeType Namespace;
[C++] public: const XPathNodeType Namespace;
[VB] Public Const Namespace As XPathNodeType
[JScript] public var Namespace: XPathNodeType;
Description
  A namespace node. This is equivalent to a DOM attribute that declares a namespace (for example, xmlns).
  ToString

[C#] public const XPathNodeType ProcessingInstruction;
[C++] public: const XPathNodeType ProcessingInstruction;
[VB] Public Const ProcessingInstruction As XPathNodeType
[JScript] public var ProcessingInstruction: XPathNodeType;
Description
  A processing instruction.
  ToString
[C#] public const XPathNodeType Root;
[C++] public: const XPathNodeType Root;
[VB] Public Const Root As XPathNodeType
[JScript] public var Root: XPathNodeType;
Description
  The root of the node tree.
  ToString
[C#] public const XPathNodeType SignificantWhitespace;
[C++] public: const XPathNodeType SignificantWhitespace;
[VB] Public Const SignificantWhitespace As XPathNodeType
[JScript] public var SignificantWhitespace: XPathNodeType;
Description
  A node with whitespace and xml:space set to preserve.
  ToString
[C#] public const XPathNodeType Text;
[C++] public: const XPathNodeType Text;
[VB] Public Const Text As XPathNodeType
[JScript] public var Text: XPathNodeType;
Description
  The text content of an element or attribute.
  ToString
[C#] public const XPathNodeType Whitespace;
[C++] public: const XPathNodeType Whitespace;
[VB] Public Const Whitespace As XPathNodeType
[JScript] public var Whitespace: XPathNodeType;
Description
  A node with only whitespace characters and no significant whitespace.
  XPathResultType enumeration (System.Xml.XPath)
  ToString
Description
  Specifies the return type of the XPath expression.
  ToString
[C#] public const XPathResultType Any;
[C++] public: const XPathResultType Any;
[VB] Public Const Any As XPathResultType
[JScript] public var Any: XPathResultType;
Description
  Any of the XPath node types.
  ToString
[C#] public const XPathResultType Boolean;
[C++] public: const XPathResultType Boolean;
[VB] Public Const Boolean As XPathResultType
[JScript] public var Boolean: XPathResultType;
Description
  Boolean value true or false.
  ToString
[C#] public const XPathResultType Error;
[C++] public: const XPathResultType Error;
[VB] Public Const Error As XPathResultType
[JScript] public var Error: XPathResultType;
Description
  The expression does not evaluate to the correct XPath type.
  ToString
[C#] public const XPathResultType Navigator;
[C++] public: const XPathResultType Navigator;
[VB] Public Const Navigator As XPathResultType
[JScript] public var Navigator: XPathResultType;

Description
  A tree fragment.
  ToString
[C#] public const XPathResultType NodeSet;
[C++] public: const XPathResultType NodeSet;
[VB] Public Const NodeSet As XPathResultType
[JScript] public var NodeSet: XPathResultType;
Description
  A node collection.
  ToString
[C#] public const XPathResultType Number;
[C++] public: const XPathResultType Number;
[VB] Public Const Number As XPathResultType
[JScript] public var Number: XPathResultType;
Description
  Numeric value.
  ToString
[C#] public const XPathResultType String;
[C++] public: const XPathResultType String
  System.Xml.Xsl
  This namespace provides support for XSL/T transformations.

[C++] int get Maxargs( );
[VB] ReadOnly Property Maxargs As Integer
[JScript] abstract function get Maxargs( ): int;
Description
  Gets the maximum number of arguments for the function. This enables the user to differentiate between overloaded functions.
  Minargs
[C#] int Minargs {get;}
[C++] int get Minargs( );
[VB] ReadOnly Property Minargs As Integer
[JScript] abstract function get Minargs( ): int;
Description
  Gets the minimum number of arguments for the function. This enables the user to differentiate between overloaded functions.
  ReturnType
[C#] XPathResultType ReturnType {get;}
[C++] XPathResultType get ReturnType( );
[VB] ReadOnly Property ReturnType As XPathResultType

| Type Name | Description |
|---|---|
| System.Xml.Xsl.IXsltContextFunction | Provides an interface to a given function defined in the XSLT stylesheet during runtime execution. |
| System.Xml.Xsl.IXsltContextVariable | Provides an interface to a given variable that is defined in the stylesheet during runtime execution. |
| System.Xml.Xsl.XsltArgumentList | Contains a variable number of arguments which are either XSLT parameters or extension objects. |
| System.Xml.Xsl.XsltCompileException | The exception that is thrown by the System.Xml.Xsl.XslTransform.Load(System.String)method when an error is found in the XSLT stylesheet. XsltCompileException |
| System.Xml.Xsl.XsltContext | Encapsulates the current execution context of the XSLT processor allowing XPath to resolve functions, parameters, and namespaces within XPath expressions. abstract |
| System.Xml.Xsl.XsltException | The exception that is thrown when an error occurs while processing an XSL transform. XsltException |
| System.Xml.Xsl.XslTransform | Transforms XML data using an XSLT stylesheet. |

Description
  This namespace provides support for XSL/T transformations.
  IXsltContextFunction interface (System.Xml.Xsl)
Description
  Provides an interface to a given function defined in the XSLT stylesheet during runtime execution.
  Properties:
  ArgTypes
[C#] XPathResultType[ ] ArgTypes {get;}
[C++] XPathResultType get_ArgTypes( );
[VB] ReadOnly Property ArgTypes As XPathResultType ( )
[JScript] abstract function get ArgTypes( ): XPathResultType[ ];
Description
  Gets the supplied XPath types for the function's argument list. This information can be used to discover the function's signature which allows you to differentiate between overloaded functions.
  Maxargs
[C#] int Maxargs {get;}

[JScript] abstract function get ReturnType( ): XPathResultType;
Description
  Gets the System.Xml.XPath.XPathResultType representing the XPath type returned by the function.
  Methods:
  Invoke
[C#] object Invoke(XsltContext xsltContext, object[ ] args, XPathNavigator docContext);
[C++] Object* Invoke(XsltContext* xsltContext, Object* args _gc[ ], XPathNavigator* docContext);
[VB] Function Invoke(ByVal xsltContext As XsltContext, ByVal args( ) As Object, ByVal docContext As XPathNavigator) As Object
[JScript] function Invoke(xsltContext: XsltContext, args: Object[ ], docContext: XPathNavigator): Object;
Description
  Provides the method to Invoke the function with the given arguments in the given namespace.
  Return Value: An System.Object representing the return value of the function.

The docContext parameter is required so that functions which require a node-set can be supplied the current XSLT context. For example, consider the following XSLT document function:

Exemplary Computing System and Environment

Figure 4:
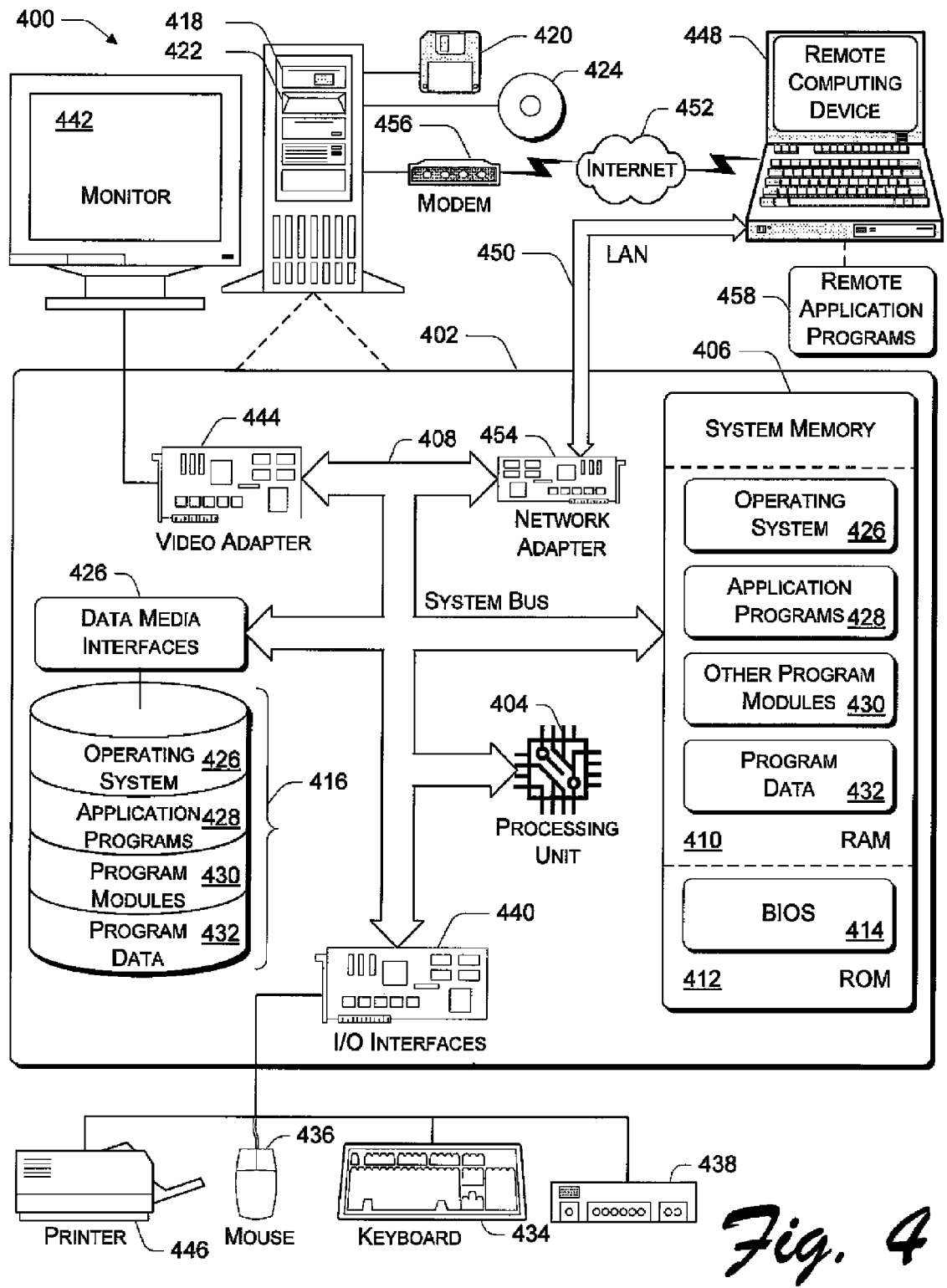
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer system, comprising:
   one or more microprocessors configured to execute an operating system;
   an application program interface; and
   one or more software application programs configured to utilize the application program interface to request services from the operating system, the application program interface including separate commands to request services from the operating system that make available support for processing XML documents, the separate commands being grouped into different hierarchical namespaces containing related functionality, the different hierarchical namespaces including a first namespace containing classes and enumerations to support XSLT (Extensible Stylesheet Language Transformations), a second namespace to support an XPath parser and evaluation engine, and a third namespace to serialize objects into XML format documents or streams, the first namespace, the second namespace, and the third namespace organized under a same fourth namespace that makes available the support for processing the XML documents and is further configured to:
   enable read-only random access to a data store;
   transform XML data using an XSLT stylesheet;
   enable constructing and editing of schemas;
   enable a non-cached forward only way of generating streams and files containing the XML data; and
   enable DTD, XDR, and XSD schema validation; and
   the application program interface being configured to receive a response from the operating system to a request for services from the operating system.

2. A computer system as recited in claim 1, wherein the commands include:
   non-cached forward only access to the XML data;
   resolving external XML resources named by a Uniform Resource Identifier (URI); and
   storage, retrieval, and manipulation of structured data through a relational dataset.

3. A computer system as recited in claim 1, one of the different hierarchical namespaces including an XPathNavigator class that makes available the support to enable read-only random access to the data store, the XPathNavigator class comprising:
   an XPathNavigator constructor that enables initialization of a new instance of the XPathNavigator class;
   a MoveToFirst method that enables moving to a first sibling of a current node of the XML data;
   a MoveToNext method that enables moving to a next sibling of the current node;
   a MoveToPrevious method that enables moving to a previous sibling of the current node;
   a MoveToFirstChild method that enables moving to a first child of the current node;

a MoveToParent method that enables moving to a parent of the current node; and
a NodeType property that enables obtaining a type of node that is moved to from the current node.

4. A computer system as recited in claim 1, one of the different hierarchical namespaces including an XslTransform class that makes available the support to transform the XML data using the XSLT stylesheet, the XslTransform class comprising:
an XslTransform constructor that enables initialization of a new instance of the XslTransform class;
a Load method that enables loading of the XSLT stylesheet; and
a Transform method that enables transforming of the XML data using the loaded XSLT stylesheet and outputs results of the transforming.

5. A computer system as recited in claim 1, one of the different hierarchical namespaces including a set of XmlSchema classes that makes available the support to enable constructing and editing of the schemas, the set of XmlSchema classes comprising:
a Schema class that contains a definition of a schema;
a SchemaObject class that enables creating of an empty schema; and
a SchemaCollection class that contains a cache of defined XML Schema Definition language (XSD) and XML-Data Reduced Language (XDR) schemas.

6. A method comprising:
receiving one or more calls from one or more remote devices over a network, wherein the one or more calls are to one or more functions that make available support for processing XML documents, the one or more functions being grouped into a plurality of hierarchical namespaces containing related functionality, the plurality of hierarchical namespaces including a first namespace containing classes and enumerations to support XSLT (Extensible Stylesheet Language Transformations), a second namespace containing an XPath parser and evaluation engine, and a third namespace containing classes used to serialize objects into XML format documents or streams, the first namespace, the second namespace, and the third namespace organized under a same fourth namespace that makes available the support for processing the XML documents and is further configured for:
enabling read-only random access to a data store;
transforming XML data using an XSLT stylesheet;
enabling constructing and editing of schemas;
enabling a non-cached forward only way of generating streams and files containing the XML data and
enabling DTD, XDR, and XSD schema validation; and
performing the XML document processing.

7. A method as recited in claim 6, wherein the one or more functions further comprises:
an XmlValidatingReader function that makes available the support for enabling the DTD, XDR and XSD schema validation.

8. A method as recited in claim 6, the first namespace including an XPathNavigator class that makes available the support for enabling read-only random access to the data store, the XPathNavigator class comprising:
an XPathNavigator constructor that enables initialization of a new instance of the XPathNavigator class;
a MoveToFirst method that enables moving to a first sibling of a current node of the XML data;
a MoveToNext method that enables moving to a next sibling of the current node;
a MoveToPrevious method that enables moving to a previous sibling of the current node;
a MoveToFirstChild method that enables moving to a first child of the current node;
a MoveToParent method that enables moving to a parent of the current node; and
a NodeType property that enables obtaining a type of node that is moved to from the current node.

9. A method as recited in claim 6, the plurality of hierarchical namespaces including an XslTransform class that makes available the support for transforming the XML data using the XSLT stylesheet, the XslTransform class comprising:
an XslTransform constructor that enables initialization of a new instance of the XslTransform class;
a Load method that enables loading of the XSLT stylesheet; and
a Transform method that enables transforming of the XML data using the loaded XSLT stylesheet and outputs results of the transforming.

10. A method as recited in claim 6, the plurality of hierarchical namespaces including a set of XmlSchema classes that makes available the support for enabling constructing and editing of the schemas, the set of XmlSchema classes comprising:
a Schema class that contains a definition of a schema;
a SchemaObject class that enables creating of an empty schema; and
a SchemaCollection class that contains a cache of defined XML Schema Definition language (XSD) and XML-Data Reduced Language (XDR) schemas.

11. A method as recited in claim 6, the plurality of hierarchical namespaces including an XmlWriter class that makes available the support for enabling the non-cached forward only way of generating the streams and the files containing the XML data, the XmlWriter class comprising:
an XmlWriter constructor that enables initialization of an instance of the XmlWriter class;
a WriteState property that enables obtaining a state of the instance of the XmlWriter class; and
a plurality of Write methods that enable writing the XML data via the instance of the XmlWriter class.

12. A method as recited in claim 6, the plurality of hierarchical namespaces including an XmlValidatingReader class that makes available the support for enabling the DTD, XDR and XSD schema validation, the XmlValidatingReader class comprising:
a ValidationType property that enables obtaining an indication of what type of validation to perform on an XML document; and
a Read method that enables reading of nodes of the XML document so that validation of the XML document can be performed.

13. A method as recited in claim 12, where the type of validation to perform is validation according to the DTD schema validation.

14. A method as recited in claim 12, where the type of validation to perform is validation according to the XSD schema validation.

15. A method as recited in claim 12, where the type of validation to perform is validation according to the XDR schema validation.

16. A method comprising:
calling, to one or more remote devices over a network, one or more functions that make available support for processing XML documents, the one or more functions being grouped into a plurality of hierarchical namespaces containing related functionality, the plurality of hierarchical namespaces including a first namespace containing classes and enumerations to support XSLT (Extensible Stylesheet Language Transformations), a second namespace containing an XPath parser and evaluation engine, and a third namespace containing classes used to serialize objects into XML format documents or streams, the first namespace, the second namespace, and the third namespace organized under a same fourth namespace that makes available the support for processing the XML documents and is further configured for:

enabling read-only random access to a data store;
transforming XML data using an XSLT stylesheet;
enabling constructing and editing of schemas;
enabling a non-cached forward only way of generating streams and files containing the XML data; and
enabling DTD, XDR, and XSD schema validation; and
receiving, from the one or more remote devices, a response to the calling.

17. A method as recited in claim 16, wherein the one or more functions further comprises:
an XmlValidatingReader function that makes available the support for enabling the DTD, XDR and XSD schema validation.

18. A method as recited in claim 16, the plurality of hierarchical namespaces including an XmlWriter class that makes available the support for enabling the non-cached forward only way of generating the streams and the files containing the XML data, the XmlWriter class comprising:
an XmlWriter constructor that enables initialization of an instance of the XmlWriter class;
a WriteState property that enables obtaining a state of the instance of the XmlWriter class; and
a plurality of Write methods that enable writing the XML data via the instance of the XmlWriter class.

19. A method as recited in claim 16, the plurality of hierarchical namespaces including an XmlValidatingReader class that makes available the support for enabling the DTD, XDR and XSD schema validation, the XmlValidatingReader class comprising:
a ValidationType property that enables obtaining an indication of what type of validation to perform on an XML document; and
a Read method that enables reading of nodes of the XML document so that validation of the XML document can be performed.

* * * * *